(12) United States Patent
Ebcioglu et al.

(10) Patent No.: US 12,353,863 B2
(45) Date of Patent: Jul. 8, 2025

(54) METHOD AND SYSTEM FOR CONVERTING A SINGLE-THREADED SOFTWARE PROGRAM INTO AN APPLICATION-SPECIFIC SUPERCOMPUTER

(71) Applicants: Kemal Ebcioglu, Cheshire, CT (US); Emre Kultursay, Kirkland, WA (US)

(72) Inventors: Kemal Ebcioglu, Cheshire, CT (US); Emre Kultursay, Kirkland, WA (US)

(73) Assignee: Global Supercomputing Corporation, Yorktown Heights, NY (US)

( * ) Notice: Subject to any disclaimer, the term of this patent is extended or adjusted under 35 U.S.C. 154(b) by 65 days.

(21) Appl. No.: 18/097,420

(22) Filed: Jan. 16, 2023

(65) Prior Publication Data
US 2023/0153087 A1    May 18, 2023

Related U.S. Application Data

(63) Continuation of application No. 17/411,116, filed on Aug. 25, 2021, now Pat. No. 11,579,854, which is a
(Continued)

(51) Int. Cl.
*G06F 8/41*    (2018.01)
*G06F 8/40*    (2018.01)
(Continued)

(52) U.S. Cl.
CPC .............. *G06F 8/4452* (2013.01); *G06F 8/40* (2013.01); *G06F 8/452* (2013.01); *G06F 9/52* (2013.01);
(Continued)

(58) Field of Classification Search
None
See application file for complete search history.

(56) References Cited

U.S. PATENT DOCUMENTS 5,386,562 A * 1/1995 Jain .................. G06F 8/452
                                              717/160
5,542,075 A * 7/1996 Ebcioglu ........... G06F 9/3834
                                              712/225
(Continued)

OTHER PUBLICATIONS

EPO communication pursuant to Article 94(3) EPC dated Apr. 5, 2023 for divisional application EP 20175956.0 filed May 22, 2020 at the EPO, from parent application EP 12849946.4 claiming priority of U.S. Appl. No. 13/296,232 (5 pages).
(Continued)

*Primary Examiner* — Qing Chen

(57) ABSTRACT

The invention comprises (i) a compilation method for automatically converting a single-threaded software program into an application-specific supercomputer, and (ii) the supercomputer system structure generated as a result of applying this method. The compilation method comprises: (a) Converting an arbitrary code fragment from the application into customized hardware whose execution is functionally equivalent to the software execution of the code fragment; and (b) Generating interfaces on the hardware and software parts of the application, which (i) Perform a software-to-hardware program state transfer at the entries of the code fragment; (ii) Perform a hardware-to-software program state transfer at the exits of the code fragment; and (iii) Maintain memory coherence between the software and hardware memories. If the resulting hardware design is large, it is divided into partitions such that each partition can fit into a single chip. Then, a single union chip is created which can realize any of the partitions.

2 Claims, 70 Drawing Sheets

Hardware implementation of recursive N-queens

Related U.S. Application Data continuation of application No. 16/819,405, filed on Mar. 16, 2020, now Pat. No. 11,132,186, which is a continuation of application No. 16/166,164, filed on Oct. 22, 2018, now Pat. No. 10,642,588, which is a continuation of application No. 15/257,319, filed on Sep. 6, 2016, now Pat. No. 10,146,516, which is a continuation of application No. 14/581,169, filed on Dec. 23, 2014, now Pat. No. 9,495,223, which is a continuation of application No. 13/296,232, filed on Nov. 15, 2011, now Pat. No. 8,966,457.

(51) Int. Cl.
| | |
|---|---|
| *G06F 9/52* | (2006.01) |
| *G06F 15/173* | (2006.01) |
| *G06F 30/30* | (2020.01) |
| *G06F 30/323* | (2020.01) |
| *G06F 30/392* | (2020.01) |
| *G06F 115/10* | (2020.01) |

(52) U.S. Cl.
CPC ........ *G06F 15/17381* (2013.01); *G06F 30/30* (2020.01); *G06F 30/323* (2020.01); *G06F 30/392* (2020.01); *G06F 2115/10* (2020.01)

(56) References Cited

U.S. PATENT DOCUMENTS

| | | | | | |
|---|---|---|---|---|---|
| 5,761,515 | A * | 6/1998 | Barton, III | ............ | G06F 8/4442 |
| | | | | | 712/E9.047 |
| 6,031,992 | A * | 2/2000 | Cmelik | ................ | G06F 9/3812 |
| | | | | | 712/E9.059 |
| 6,073,233 | A * | 6/2000 | Chapman | .............. | G06F 15/177 |
| | | | | | 708/200 |
| 6,507,947 | B1 * | 1/2003 | Schreiber | ................ | G06F 30/30 |
| | | | | | 717/160 |
| 7,111,274 | B1 * | 9/2006 | Edwards | ................ | G06F 30/30 |
| | | | | | 716/108 |
| 7,219,342 | B2 * | 5/2007 | Metzgen | ............... | G06F 30/343 |
| | | | | | 716/132 |
| 7,315,991 | B1 * | 1/2008 | Bennett | ................... | G06F 30/30 |
| | | | | | 716/106 |
| 7,320,062 | B2 * | 1/2008 | Master | ...................... | G06F 7/57 |
| | | | | | 712/15 |
| 7,409,670 | B1 * | 8/2008 | Pritchard | .............. | G06F 30/327 |
| | | | | | 711/100 |
| 7,577,822 | B2 * | 8/2009 | Vorbach | .............. | G06F 15/7867 |
| | | | | | 712/34 |
| 7,698,118 | B2 * | 4/2010 | Reblewski | .............. | G06F 30/33 |
| | | | | | 326/38 |
| 7,761,687 | B2 * | 7/2010 | Blumrich | .......... | G06F 15/17337 |
| | | | | | 712/11 |
| 2004/0117563 | A1 * | 6/2004 | Wu | ........................... | G06F 9/52 |
| | | | | | 711/E12.019 |
| 2007/0083730 | A1 * | 4/2007 | Vorbach | .............. | G06F 15/7867 |
| | | | | | 712/E9.067 |
| 2008/0120497 | A1 * | 5/2008 | Chai | ....................... | G06F 8/433 |
| | | | | | 713/1 |
| 2009/0006769 | A1 * | 1/2009 | Blumrich | ............ | G06F 12/0831 |
| | | | | | 711/146 |
| 2009/0144690 | A1 * | 6/2009 | Spackman | .............. | G06F 30/30 |
| | | | | | 716/104 |
| 2011/0202789 | A1 * | 8/2011 | Ong | ........................ | G11C 29/56 |
| | | | | | 714/E11.055 |
| 2011/0270986 | A1 * | 11/2011 | Archer | .................. | G06F 9/5011 |
| | | | | | 709/226 |
| 2011/0307663 | A1 * | 12/2011 | Kultursay | ............... | G06F 30/30 |
| | | | | | 711/E12.041 |

OTHER PUBLICATIONS

Applicant's response dated Sep. 29, 2023 to EPO communication pursuant to Article 94(3) EPC dated Apr. 5, 2023 for divisional application EP 20175956.0 filed May 22, 2020 at the EPO, from parent application EP 12849946.4 claiming priority of U.S. Appl. No. 13/296,232 (13 pages).

EPO communication dated May 8, 2024 stating an intention to grant a patent under Rule 71(3) EPC for divisional application EP 20175956.0 filed May 22, 2020 at the EPO, from parent application EP 12849946.4 claiming priority of U.S. Appl. No. 13/296,232 (307 pages).

\* cited by examiner

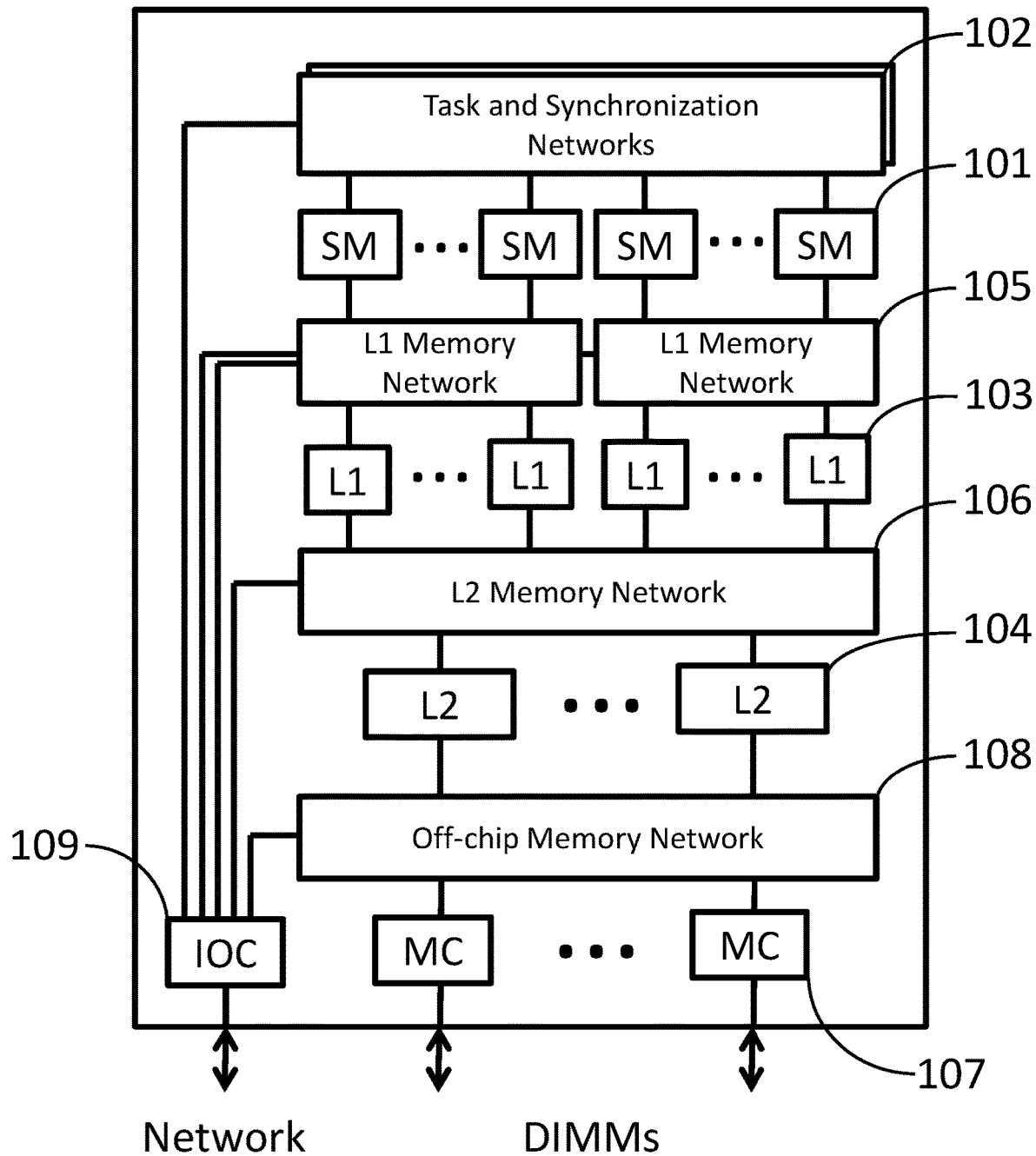
FIG 1  Supercomputer at the chip level

FIG 2    Supercomputer at rack module level
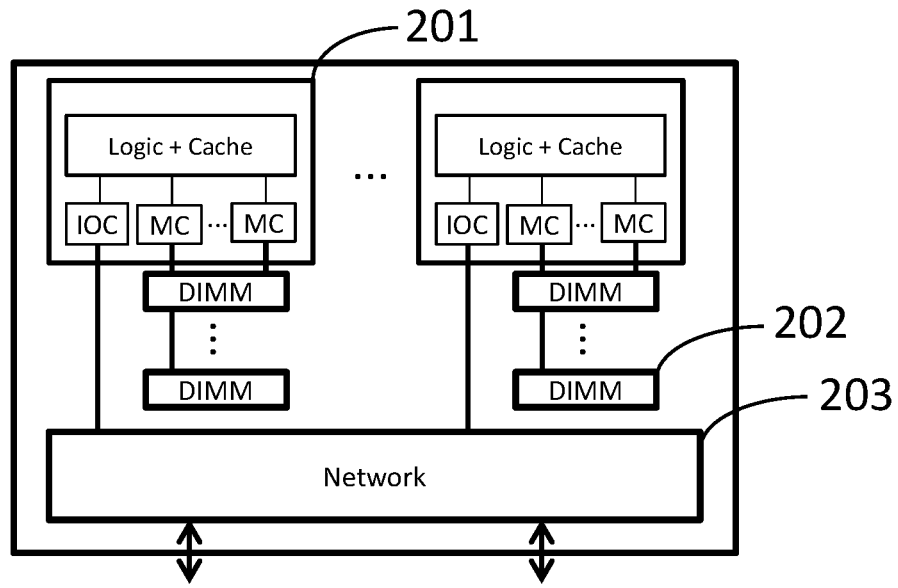
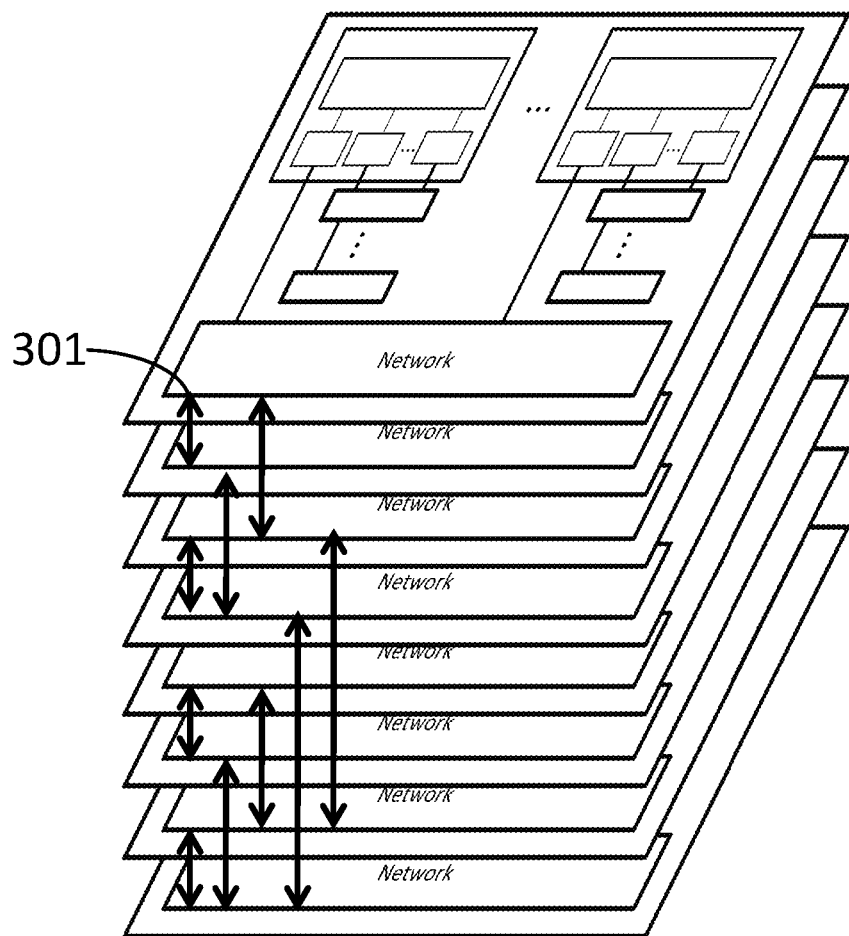
FIG 3    Supercomputer at the rack level

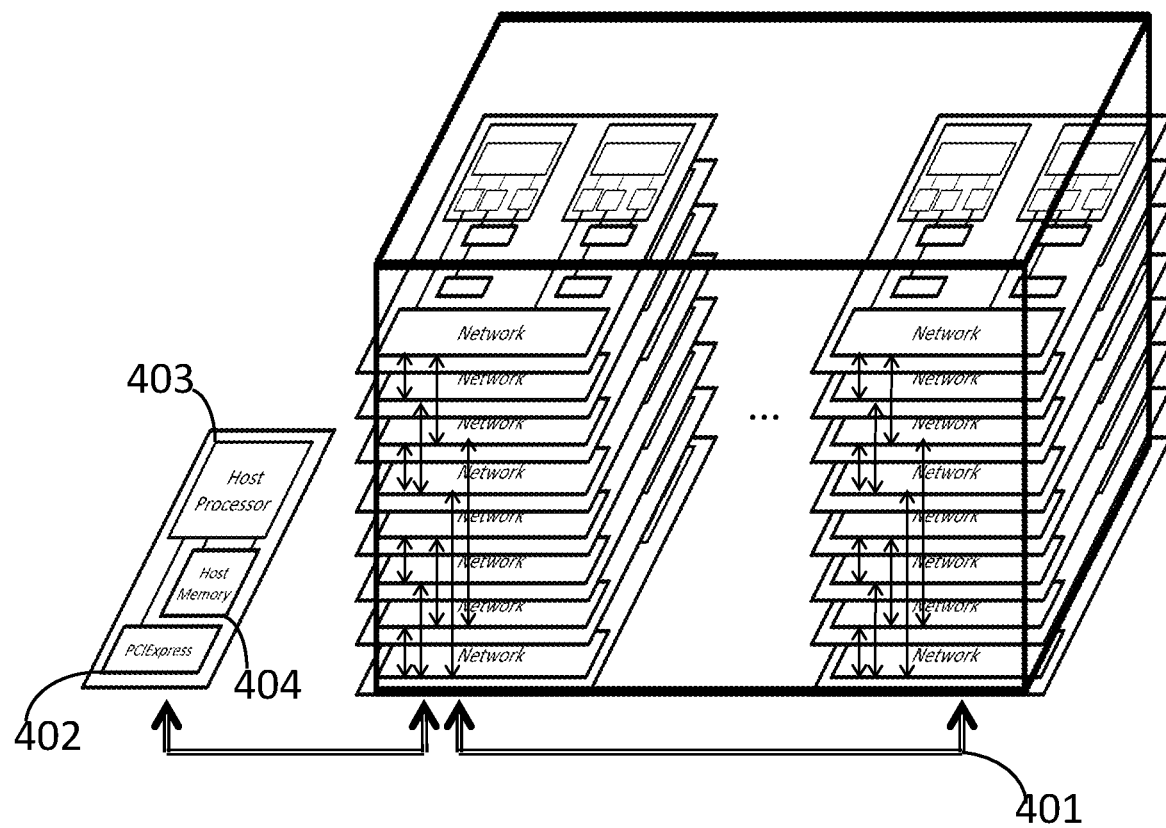
FIG 4    Supercomputer at the whole system level

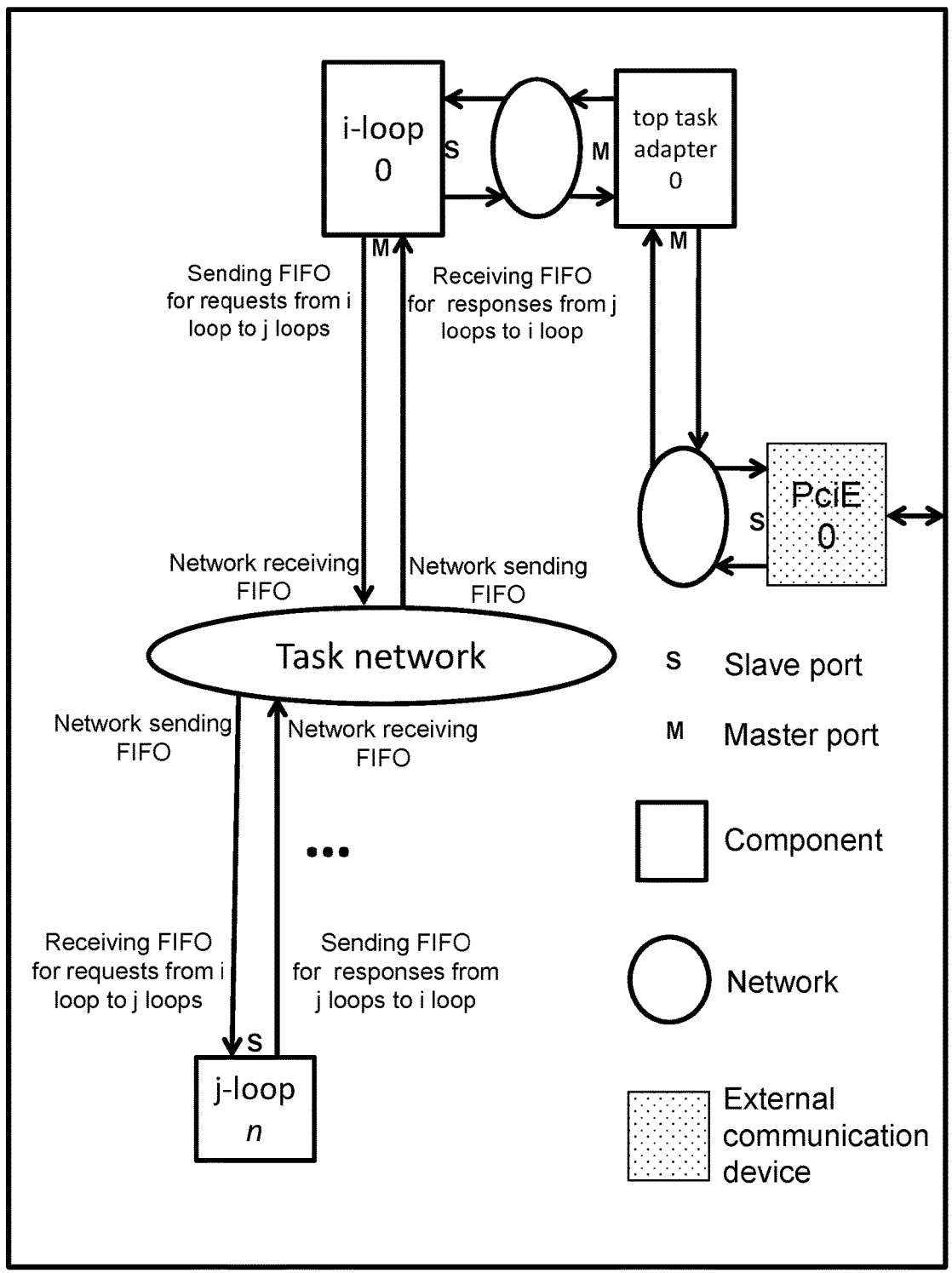
FIG 5  Examples of components, networks, external communication devices, master and slave ports

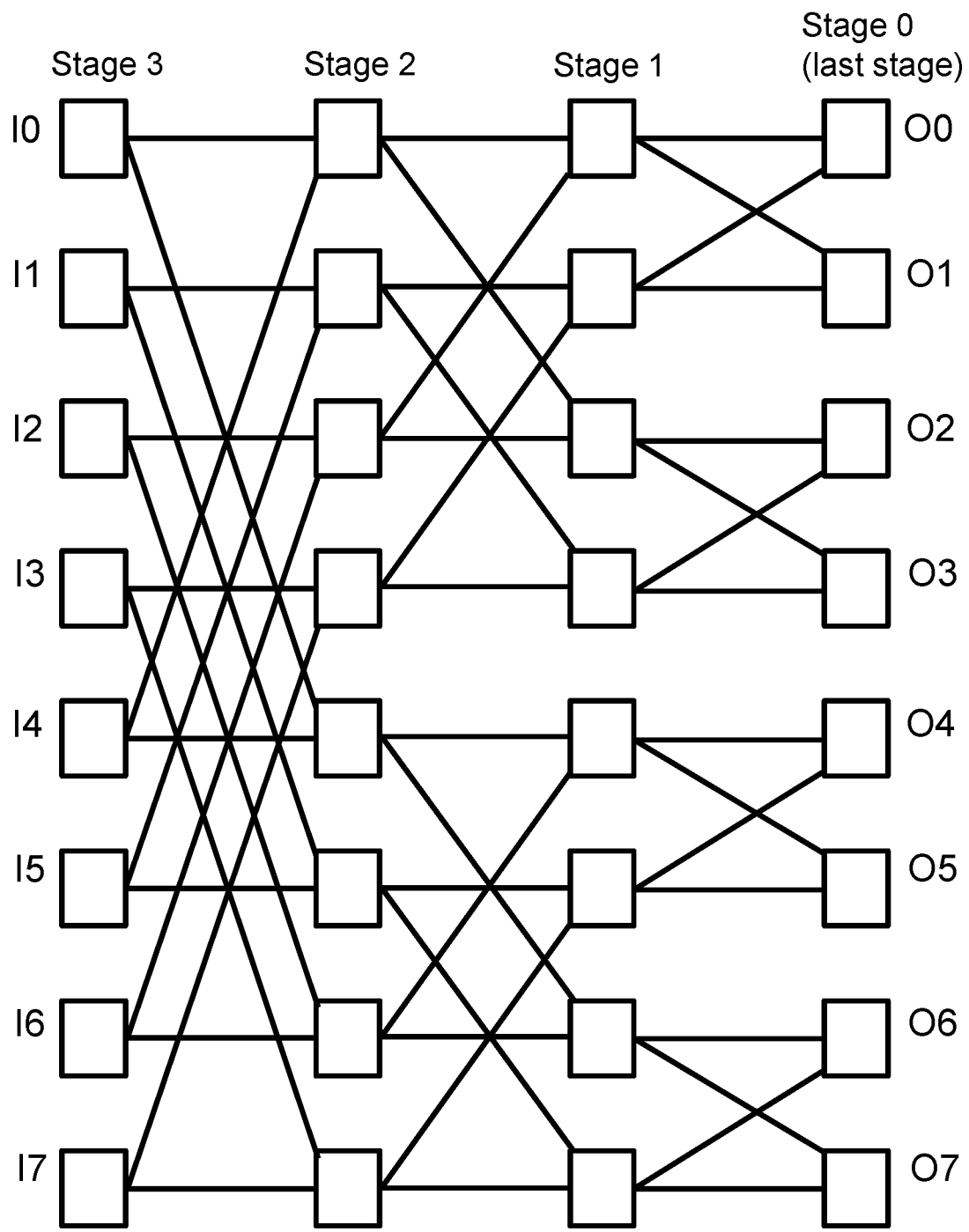
FIG 6 (PRIOR ART) A standard 8 input 8 output butterfly subnetwork

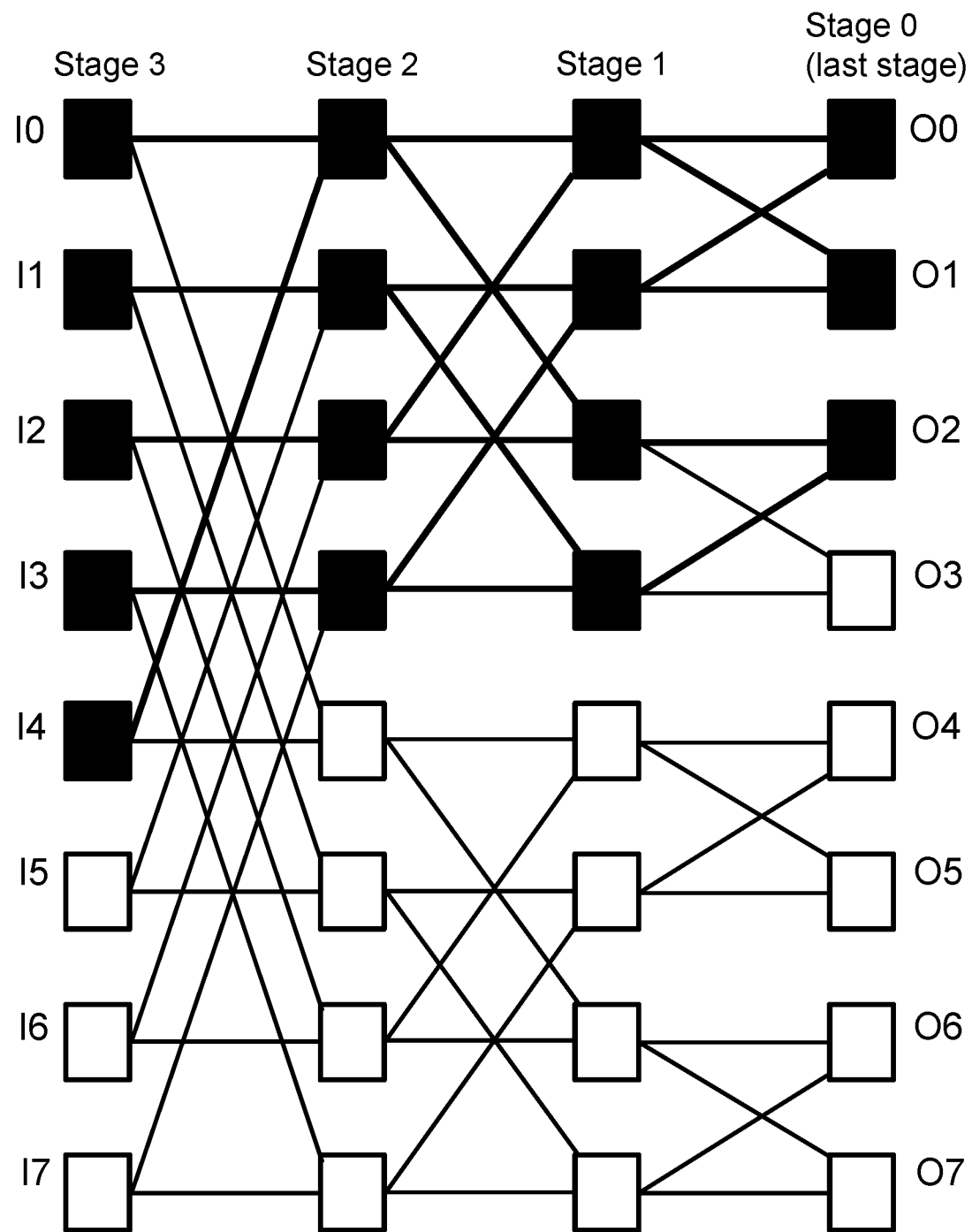
FIG 7    An *incomplete* 5 input 3 output butterfly subnetwork

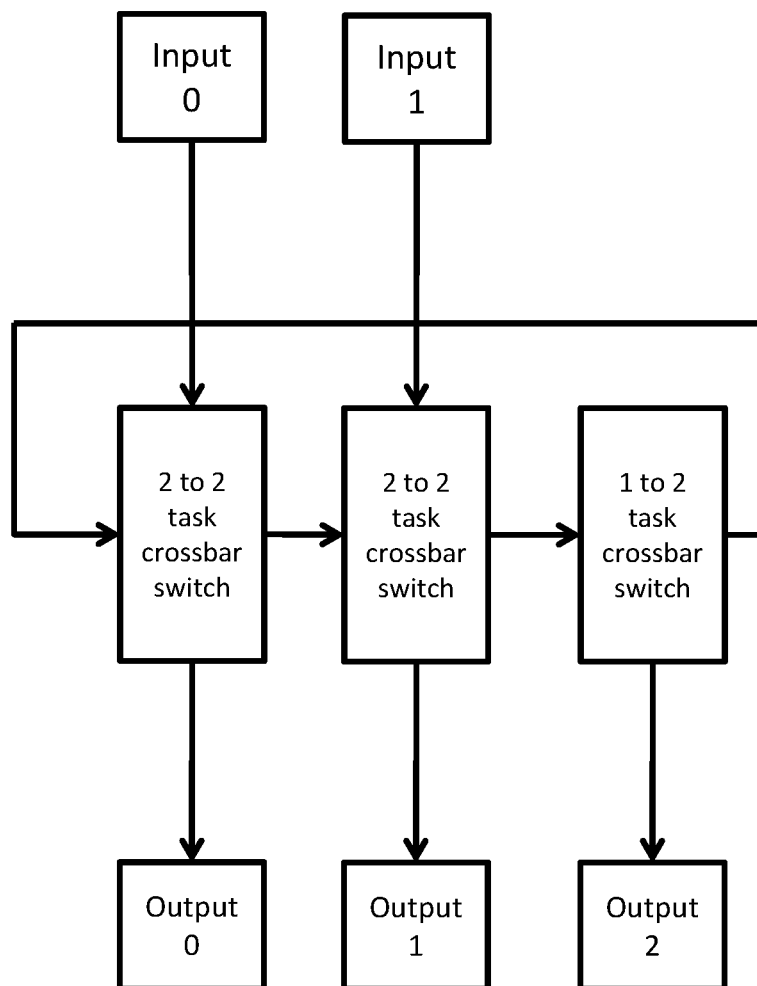
FIG 8    A 2 input to 3 output task network (1D torus)

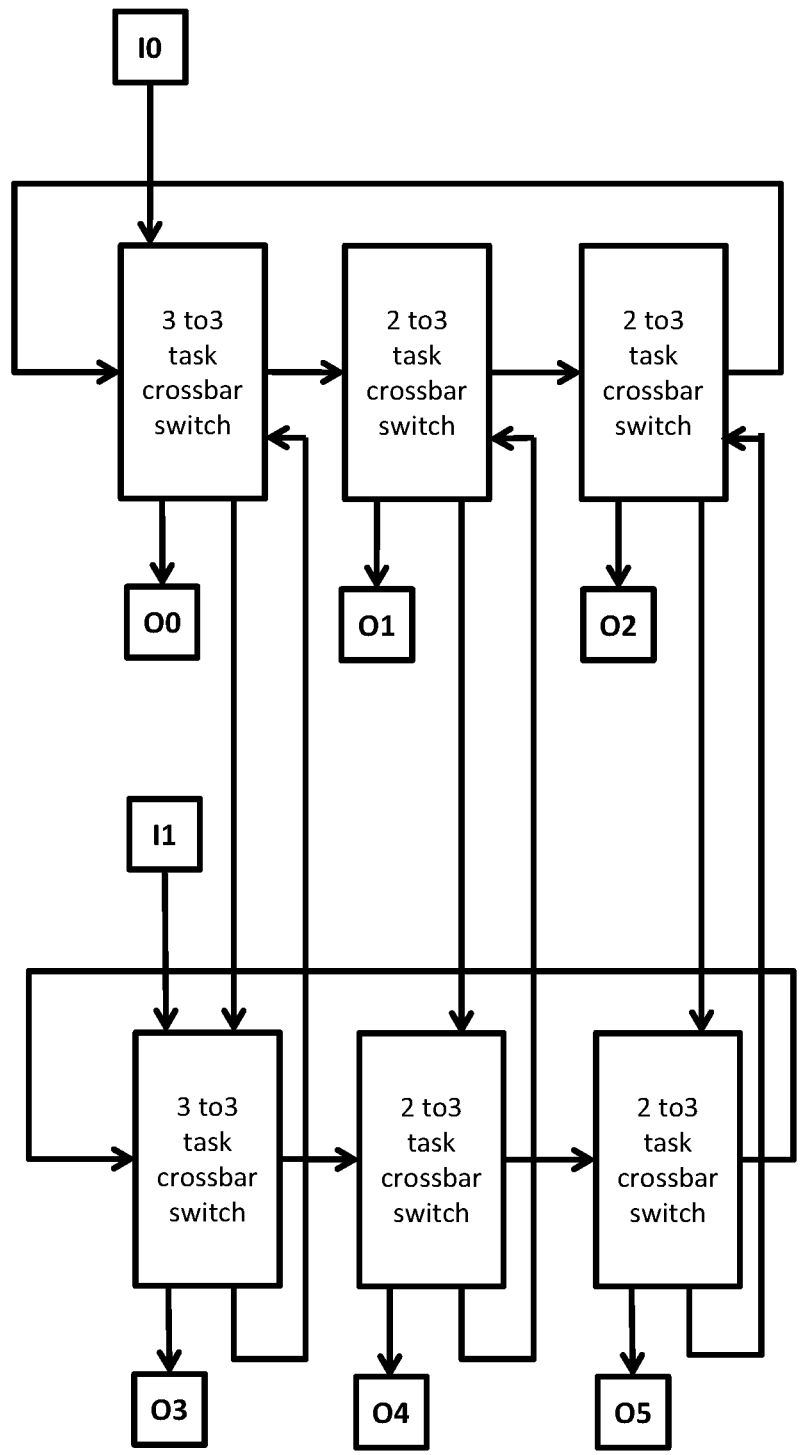
FIG 9   A 2 input to 6 output task network (2D torus)

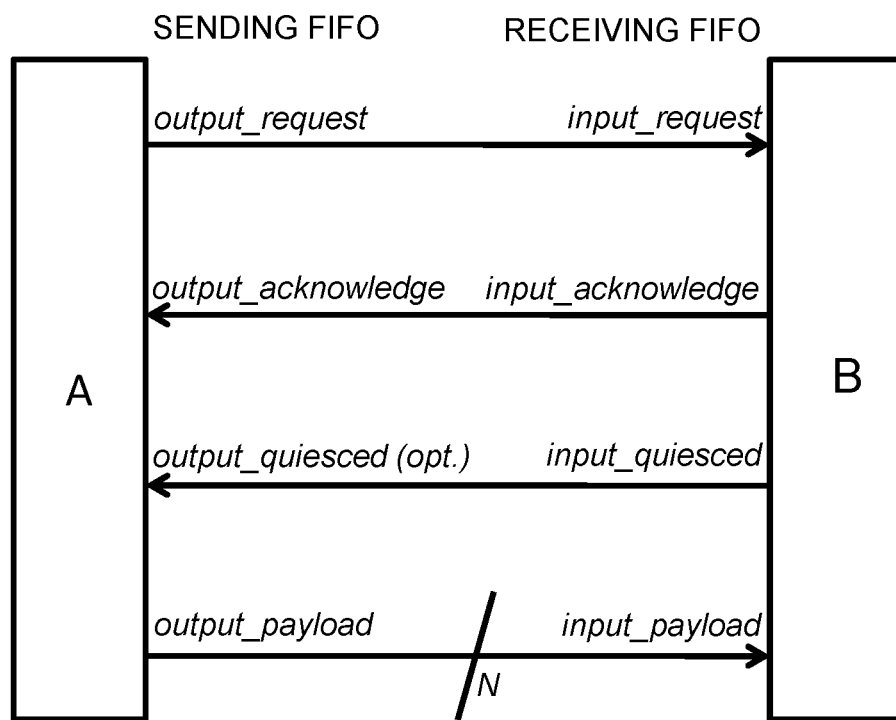
FIG 10 Sending and receiving FIFO interfaces

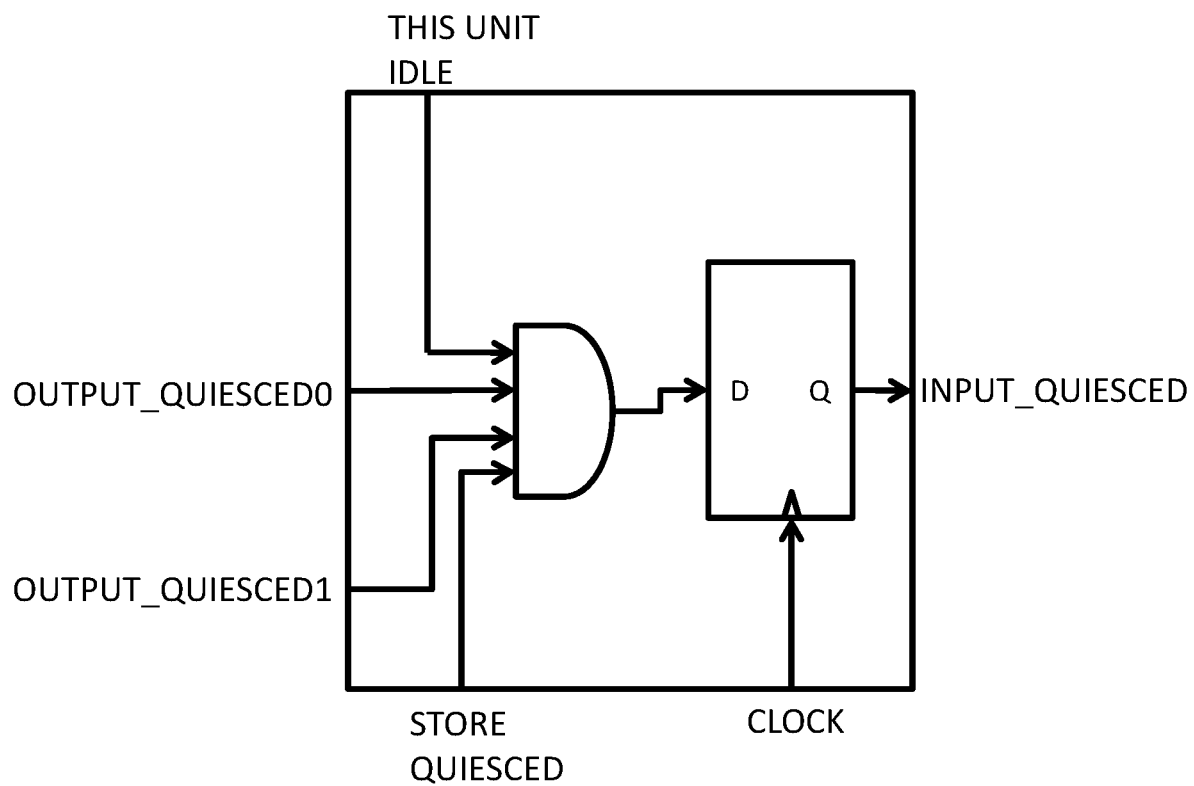
FIG 11  A quiescence circuit building block (Qunit)

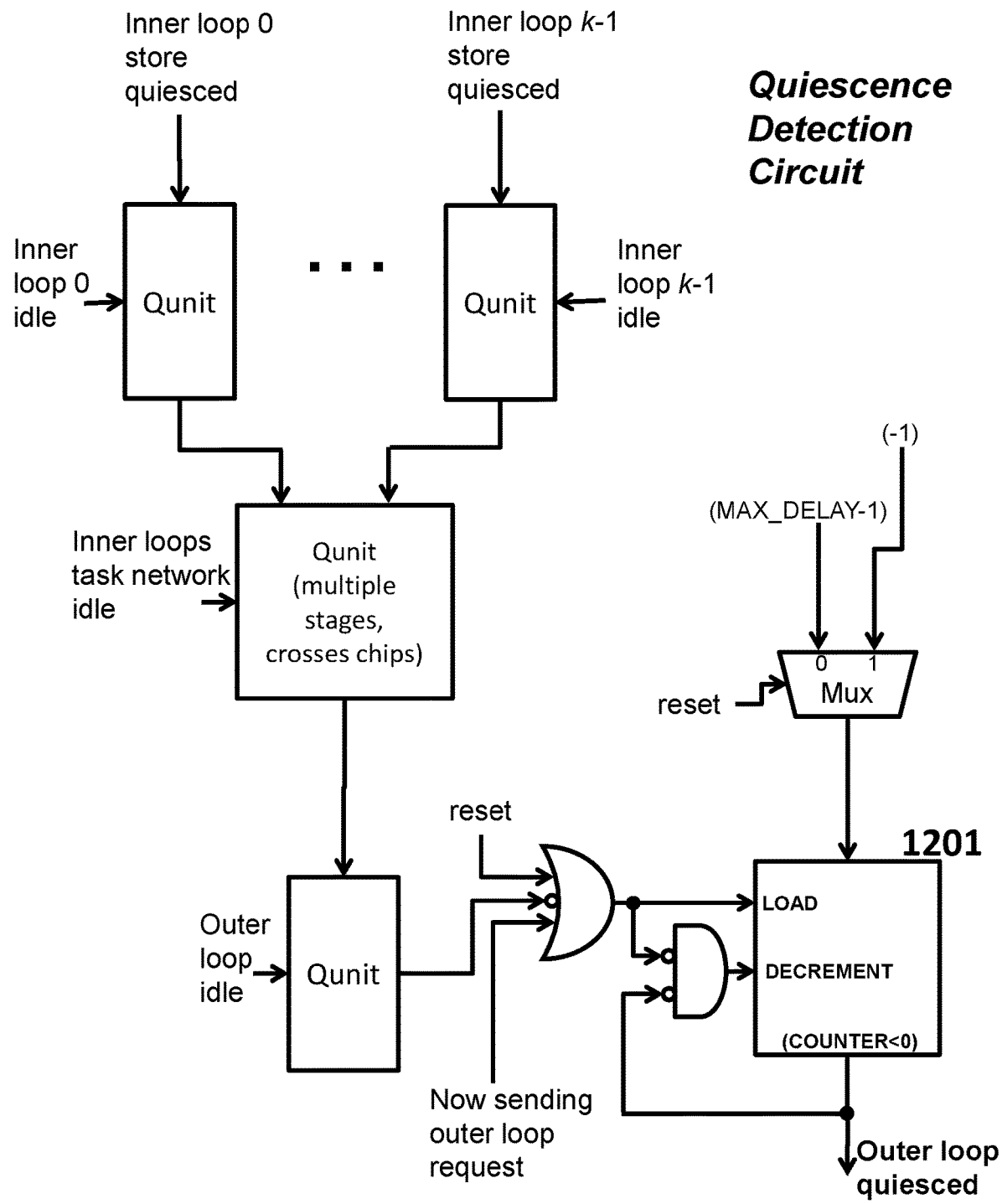
FIG 12 Quiescence detection circuit

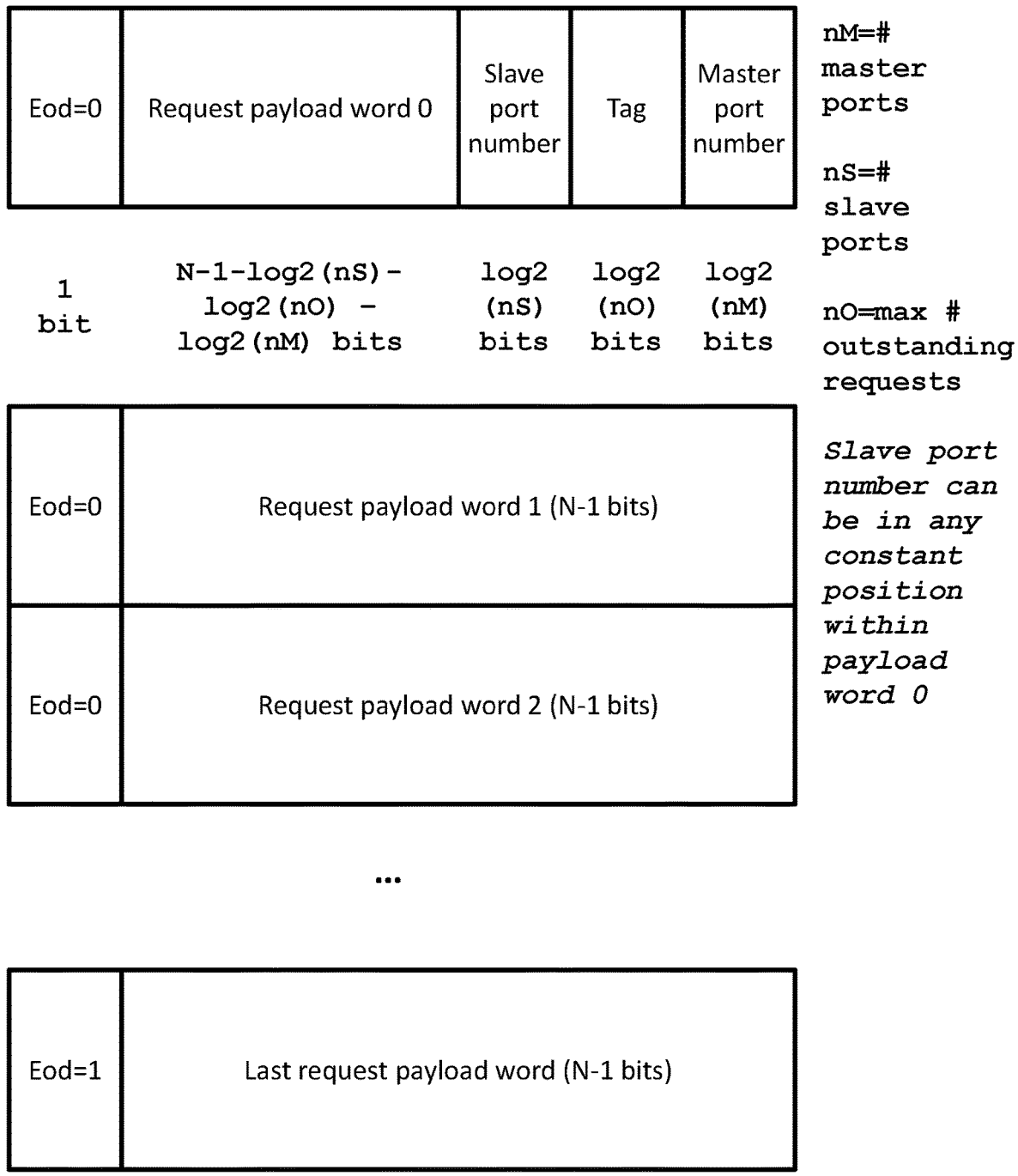
FIG 13  Request packet format

Response packet format
(LS bit is on the right)
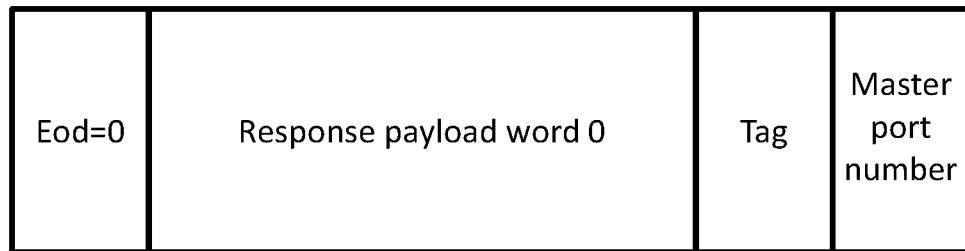
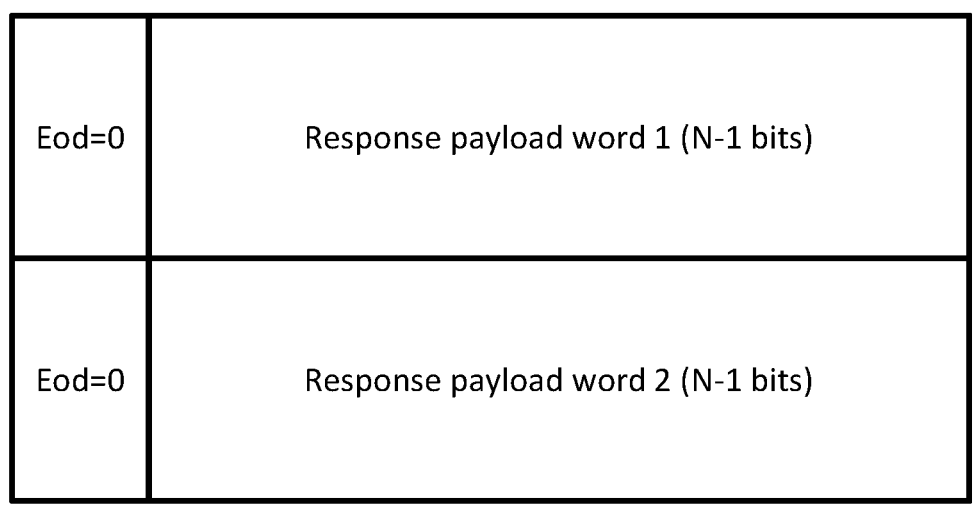
...
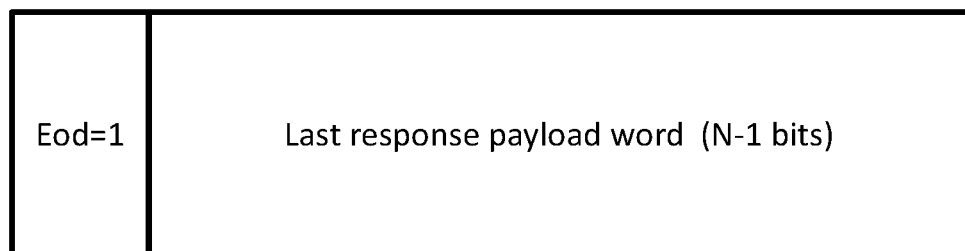
FIG 14  Response packet format

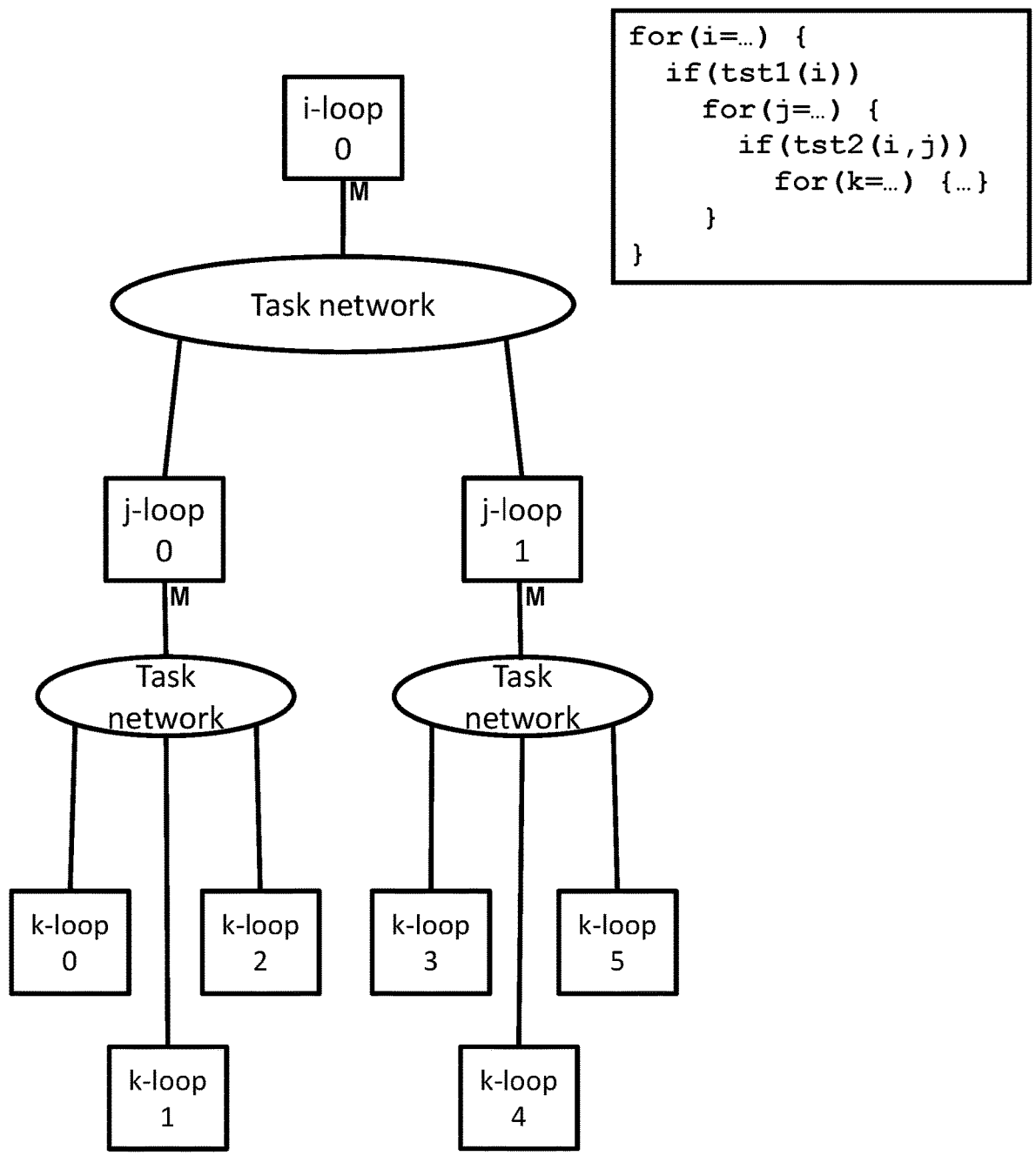
FIG 15 Hierarchical software pipelining

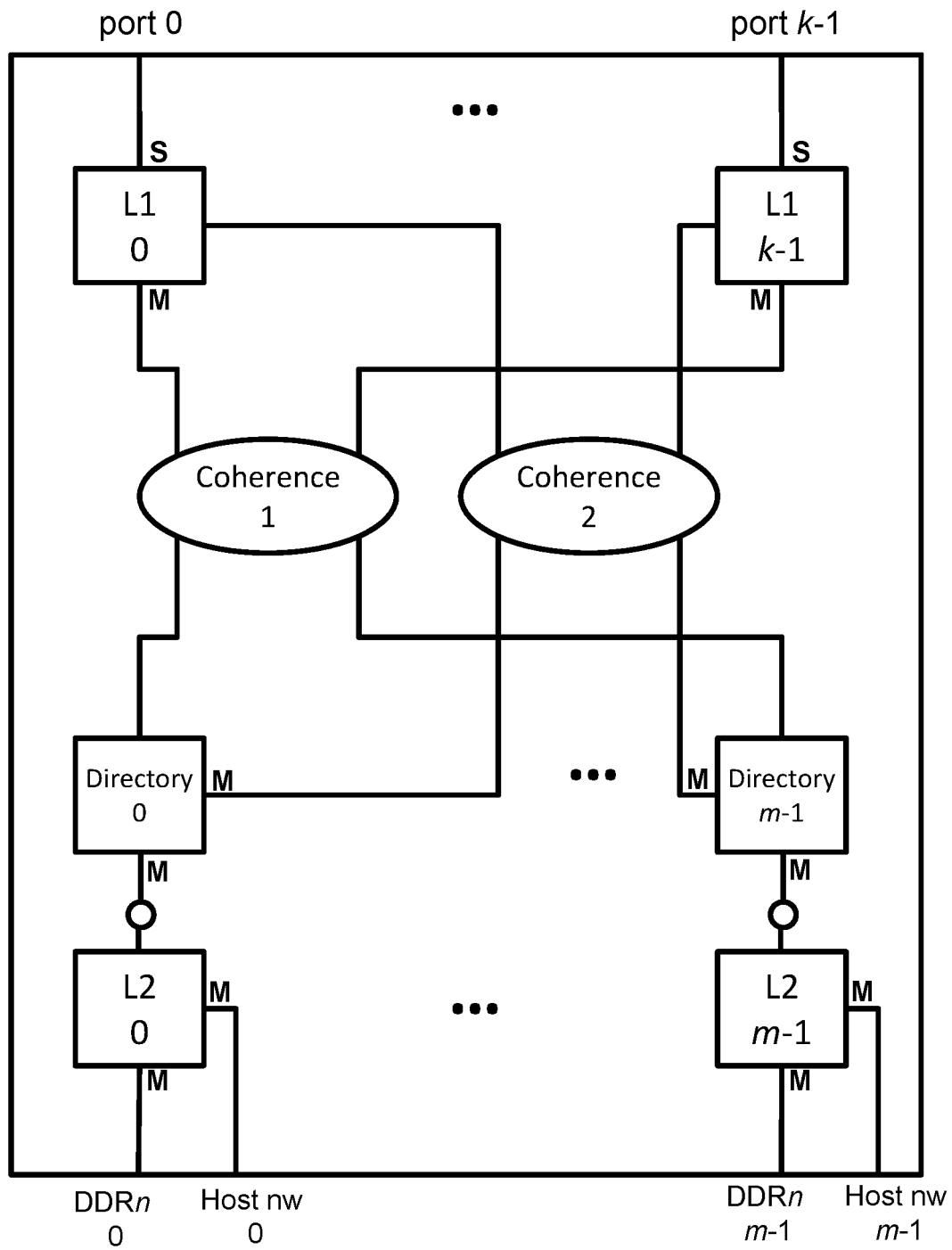
FIG 16  Memory hierarchy with coherent L1 caches

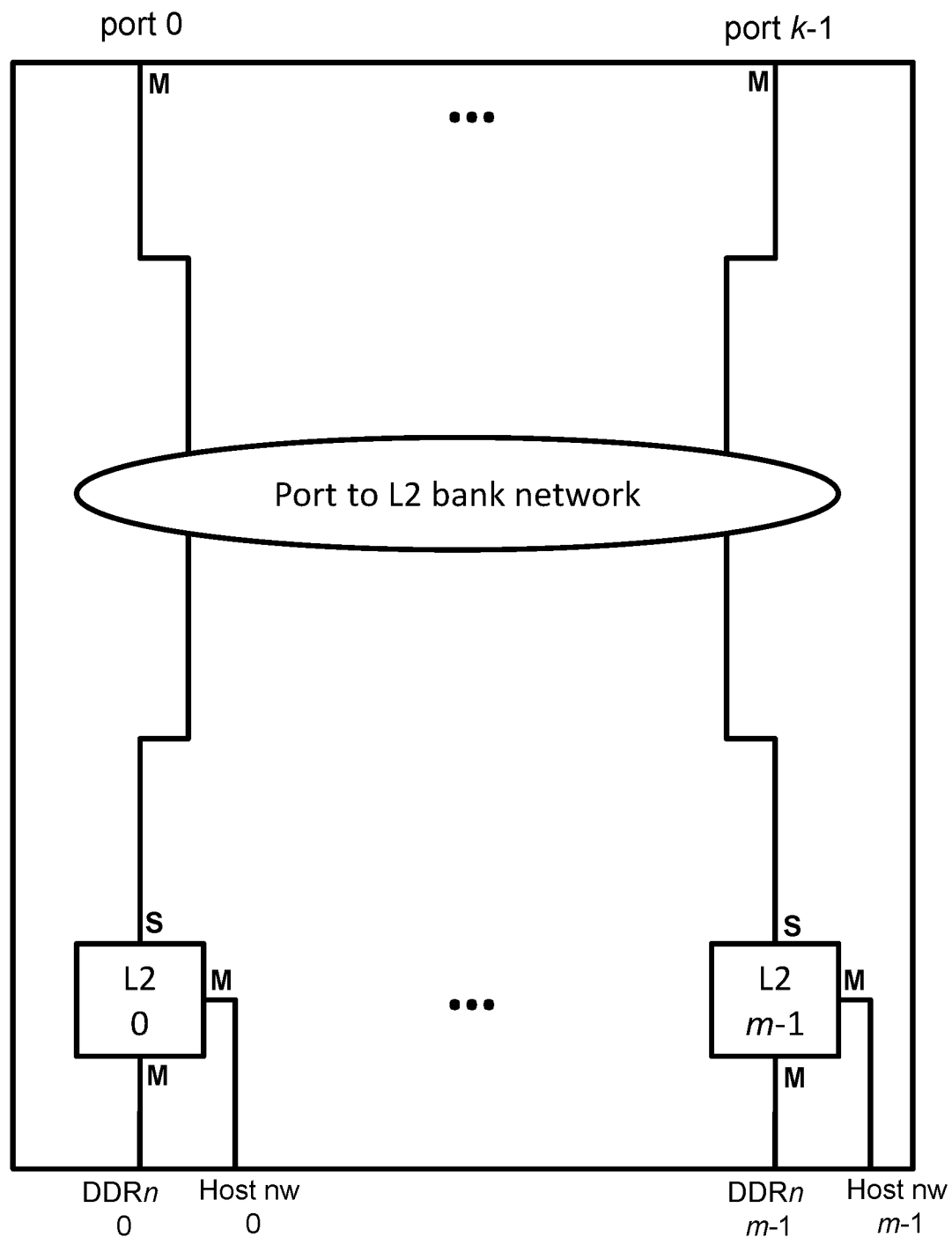
FIG 17  Memory hierarchy without L1 caches, and with interleaved L2 cache banks.

```
//Program example: Random Access
int table[N];
int ranStarts[P];

void RandomAccess() {
  for(int i=0;i<P; ++i) {
    int ran=ranStarts[i];
    for(int j=0;j<NUPDATES/P; ++j) {
      ran=((ran<<1)^(ran<0? 0x7: 0));
      table[ran&(N-1)] ^= ran;
    }
  }
}
```

FIG 18  An example program (RandomAccess)

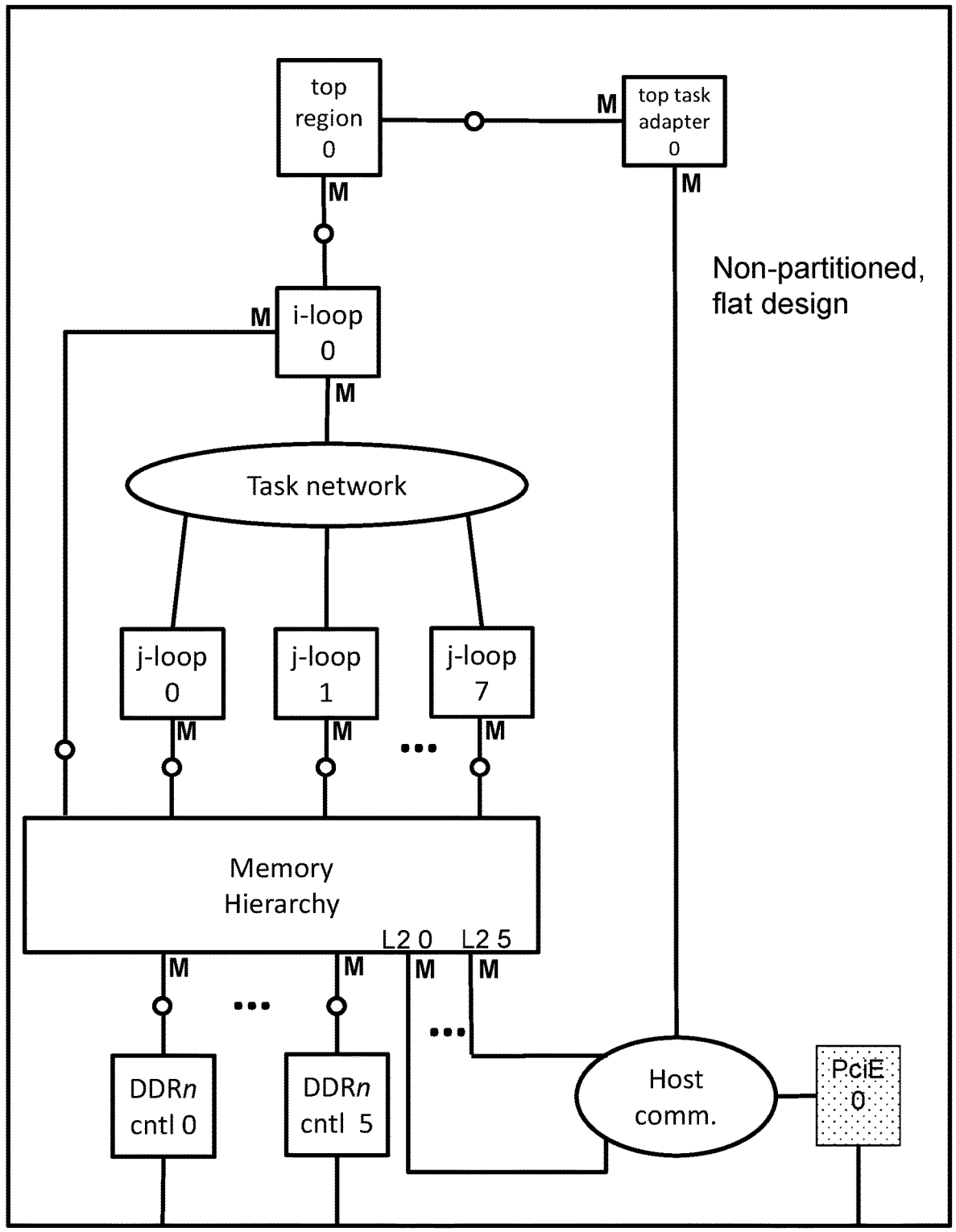
FIG 19 A flat design for RandomAccess

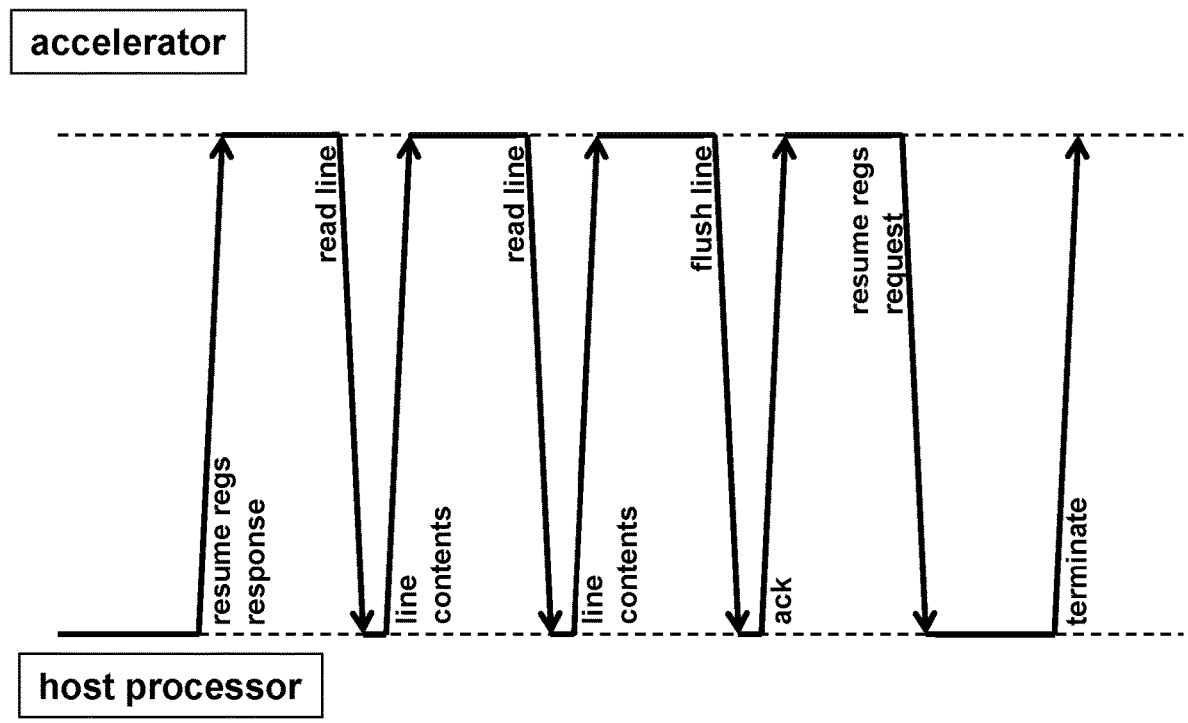
FIG 20 Example of Host-Accelerator communication protocol

```
//C code for RandomAccess
//inner loop
for(int j=0;j<LIM; ++j) {
  ran=((ran<<1)^(ran<0? POLY: 0));
  table[ran&(N-1)] ^= ran;
}
```

```
//SEQUENTIAL CODE BEFORE EPS
start:
receive r1=P,0,32
r8=0
loop:
//--fence---
cc2=(r8<LIM)
if(!cc2) goto exit
r2=r1<<1;
cc1=r1<0
if(!cc1) goto L1
r3=POLY
goto L2
L1:
r3=0
L2:
r1=r2 ^ r3
r5=r1&(N-1)
r6=r5<<2
r7=r6+Table
send MEM,update_xor,r7,r1
r8=r8+1
goto loop
exit: goto start;
```

FIG 21  RandomAccess inner loop, before Enhanced Pipeline Scheduling

```
//AFTER 1st EPS iteration
loop:
r2=r1<<1;
cc1=r1<0;
if(cc1) {
    r3=POLY;
    r1=r2^r3;
    r5=r1&(N-1)
    r6=r5<<2;
    goto L1;
} else {
    //r3=0; //dead
    r1=r2; //r1=r2^r3;
    r5=r2&(N-1)
    r6=r5<<2;
    goto L1;
}
```

```
L1:
//---fence---
cc2=(r8<LIM);
if(!cc2) goto exit
r7=r6+Table
send MEM,update_xor,r7,r1;
r8=r8+1;
goto loop;
```

FIG 22  RandomAccess inner loop after 1st EPS iteration

```
//AFTER 2nd EPS
//iteration
loop:
r2=r1<<1;
cc1=r1<0;
if(cc1) {
    r3=POLY;
    r1=r2^r3;
    r5=r1&(N-1);
    r6=r5<<2;
    goto L1;
} else {
    //r3=0; //dead
    r1=r2; //r1=r2^r3;
    r5=r2&(N-1);
    r6=r5<<2;
    goto L1;
}
```

```
L1:
cc2=(r8<LIM);
r8=r8+1;
r7=r6+Table
r2=r1<<1;
cc1=r1<0;
if(cc1) {
    r3=POLY;
    r1_=r2^r3;
    r5=r1_&(N-1);
    r6=r5<<2;
    goto L2;
} else {
    //r3=0; //dead
    r1_=r2; //r1=r2^r3;
    r5=r2&(N-1);
    r6=r5<<2;
    goto L2;
}
```

```
L2:
//--fence--
if(!cc2) goto exit
send MEM,update_xor,r7,r1;
r1=r1_;
goto L1;
```

FIG 23  RandomAccess inner loop after 2nd EPS iteration

```
//AFTER 3rd EPS              L1:                          L2:
//iteration                  cc2=(r8<LIM);                if(!cc2) {
loop:                        r8=r8+1;                       goto exit;
r2=r1<<1;                    r7=r6+Table                  } else {
cc1=r1<0;                    r2=r1<<1;                      send MEM,update_xor,r7,r1;
if(cc1) {                    cc1=r1<0;                      r1=r1_;
   r3=POLY;                  if(cc1) {                      cc2=(r8<LIM);
   r1=r2^r3;                    r3=POLY;                    r8=r8+1;
   r5=r1&(N-1)                  r1_=r2^r3;                  r7=r6+Table
   r6=r5<<2;                    r5=r1_&(N-1)                r2=r1<<1;
   goto L1;                     r6=r5<<2;                   cc1=r1<0;
} else {                        goto L2;                    if(cc1) {
   //r3=0;  //dead           } else {                          r3=POLY;
   r1=r2;  //r1=r2^r3;          //r3=0;  //dead               r1_=r2^r3;
   r5=r2&(N-1)                  r1_=r2;  //r1=r2^r3;          r5=r1_&(N-1)
   r6=r5<<2;                    r5=r2&(N-1)                   r6=r5<<2;
   goto L1;                     r6=r5<<2;                     goto L2;
}                               goto L2;                   } else {
                             }                                //r3=0;  //dead
                                                              r1_=r2;  //r1=r2^r3;
                                                              r5=r2&(N-1)
                                                              r6=r5<<2;
                                                              goto L2;
                                                           }
                                                         }
```

FIG 24 RandomAccess inner loop after 3rd (last) EPS iteration

```
//Final tree VLIWs
//(parallel semantics)
start:
receive r1=P,0,32
r8=0;
goto loop;

loop:
if(r1<0) {
   r1=(r1<<1)^POLY;
   r6=(((r1<<1)^POLY)&
       (N-1))<<2;
   goto L1;
} else {
   r1=(r1<<1);
   r6=((r1<<1)
       &(N-1))<<2;
   goto L1;
}
```

```
L1:
r7=r6+Table
cc2=(r8<LIM);
r8=r8+1;
if(r1<0) {
   r1_=(r1<<1)^POLY;
   r6=(((r1<<1)^POLY)&
       (N-1))<<2;
   goto L2;
} else {
   r1_=(r1<<1);
   r6=((r1<<1)&
       (N-1))<<2;
   goto L2;
}
```

```
L2:
if(!cc2) {
   goto exit;
} else {
   send MEM,update_xor,r7,r1;
   r1=r1_;
   r7=r6+Table
   cc2=(r8<LIM);
   r8=r8+1;
   if(r1_<0) {
      r1_=(r1_<<1)^POLY;
      r6=(((r1_<<1)^POLY)&
        (N-1))<<2;
      goto L2;
   } else {
      r1_=(r1_<<1);
      r6=((r1_<<1)&
        (N-1))<<2;
      goto L2;
   }
}
```

FIG 25 RandomAccess inner loop final tree VLIWs with conditional execution

```
//`define SYM_Table 32'h00400000
//`define POLY 32'h8000000d
//`define LIM 100
//`define N 4096
//`define OP_update_xor 8'hff
module jloop
#(parameter
   M_MPORT=1, //my master port no on M network
   M_MPORTSZ=5 //log2(#copies of jloop on M network)
)
(
  input reset
  ,input clock //receiving FIFO of slave port of P(arent) network
  ,input P_input_request
  ,output reg P_input_acknowledge
  ,output reg P_input_quiesced
  ,input[31:0] P_input_payload //sending FIFO of M(emory) network
  ,output reg M_output_request
  ,input M_output_acknowledge
  ,output reg[71+M_MPORTSZ:0] M_output_payload //receiving FIFO of M network (zero width)
  ,input M_input_request
  ,output M_input_acknowledge

);
```

FIG 26 RandomAccess inner loop Verilog module part 1 of 7 (I/O pins)

```
//declare registers occurring in the tree VLIW program
reg cc2;
reg[31:0] r1,r8,r1_,r6,r7;
//truncate integer to M_MPORTSZ bits
function[M_MPORTSZ-1:0] xtnd_M(input[31:0] in);
   xtnd_M=in;
endfunction
```

FIG 27  RandomAccess inner loop Verilog module part 2 of 7 (register declarations)

```
//main finite state machine, one state per tree VLIW
reg[1:0] state;   localparam S_start=0, S_loop=1,S_L1=2,S_L2=3;
always @(posedge clock) begin
  if (reset) begin
    state <=S_start;
  end else
    case(state) //synthesis full case parallel case
      S_start: casez(P_input_request)
        1'b1: begin
          r1 <= P_input_payload;
          r8 <= 0;
          state <= S_loop;
        end
        default: begin end //wait
      endcase
      S_loop: casez(r1[31])
        1'b1: begin
          r1 <=(r1<<1)^`POLY;
          r6 <=(((r1<<1)^`POLY)&(`N-1))<<2;
          state <= S_L1;
        end
        1'b0: begin
          r1 <=(r1<<1);
          r6 <=((r1<<1)&(`N-1))<<2;
          state <= S_L1;
        end
      endcase
```

FIG 28  RandomAccess inner loop Verilog module part 3 of 7 (FSM)

```
    S_L1: casez({r1[31]})
        //synthesis full case parallel case
       1'b1: begin
          r7  <= r6+`SYM_Table;
          cc2 <=(r8<`LIM);
          r8  <=r8+1;
          r1_ <=(r1<<1)^`POLY;
          r6  <=(((r1<<1)^`POLY)&(`N-1))<<2;
          state <= S_L2;
       end
       1'b0: begin
          r7  <= r6+`SYM_Table;
          cc2 <=(r8<`LIM);
          r8  <=r8+1;
          r1_ <=(r1<<1);
          r6  <=((r1<<1)&(`N-1))<<2;
          state <= S_L2;
       end
    endcase
```

FIG 29 RandomAccess inner loop Verilog module part 4 of 7 (FSM continued)

```verilog
      S_L2: casez({M_output_acknowledge,r1_[31],cc2})
        //synthesis full case parallel case
        3'b??0: begin
          state <= S_start;
        end
        3'b111: begin
          //send M,op_update_xor,r7,r1
          r1 <= r1_;
          r7 <= r6+`SYM_Table;
          cc2 <=(r8<`LIM);
          r8 <=r8+1;
          r1_ <=(r1_<<1)^`POLY;
          r6 <=(((r1_<<1)^`POLY)&(`N-1))<<2;
          state <= S_L2;
        end
        3'b101: begin
          //send M,Op_update_xor,r7,r1
          r1 <= r1_;
          r7 <= r6+`SYM_Table;
          cc2 <=(r8<`LIM);
          r8 <=r8+1;
          r1_ <=(r1_<<1);
          r6 <=((r1_<<1)&(`N-1))<<2;
          state <= S_L2;
        end
        default: begin end//wait for network
      endcase
    endcase //casez(state)
end //always @(posedge clock) begin
```

FIG 30 RandomAccess inner loop Verilog module part 5 of 7 (FSM continued)

```
always @(*) begin //combinatorial outputs
  case(state) //synthesis full case parallel case
    S_start: begin
      //receive r1=P
      P_input_acknowledge=1;
      M_output_request=0;
      M_output_payload={r1,r7,`OP_update_xor,xtnd_M(M_MPORT)};
    end
    S_L2: casez(cc2)
      1'b1: begin
        //send M,update_xor,r7,r1
        P_input_acknowledge=0;
        M_output_request=1;
        M_output_payload={r1,r7,`OP_update_xor,xtnd_M(M_MPORT)};
      end
      default: begin //default outputs
        P_input_acknowledge=0;
        M_output_request=0;
        M_output_payload={r1,r7,`OP_update_xor,xtnd_M(M_MPORT)};
      end
    endcase
    default: begin  //default outputs
      P_input_acknowledge=0;
      M_output_request=0;
      M_output_payload={r1,r7,`OP_update_xor,xtnd_M(M_MPORT)};
    end
  endcase
end //always @(*) begin //combinatorial outputs
```

FIG 31  RandomAccess inner loop Verilog module part 6 of 7 (FSM combinatorial outputs)

```
    //quiescence circuit for M network and P network
    //updates have quiesced whenever ctr== -1
    localparam LOG2MAXOUTSTANDING=12;
    reg[LOG2MAXOUTSTANDING:0] ctr;
    wire q1=ctr[LOG2MAXOUTSTANDING];//sign bit
    always @(posedge clock) begin
        if(reset) begin
            ctr <= -1;
        end else
            casez({M_output_request&&M_output_acknowledge,
                M_input_request})
                //synthesis full case parallel case
                2'b10:   ctr <= ctr+1;
                2'b01:   ctr <= ctr-1;
                default: begin end
            endcase
    end
    always @(posedge clock) begin//Qunit circuit
        //j-loop quiesced when all updates done and
        //unit idle
        P_input_quiesced <= (q1 && state==S_start);
    end
    assign M_input_acknowledge=1;

endmodule //jloop
```

FIG 32   RandomAccess inner loop module part 7 of 7 (quiescence circuit)

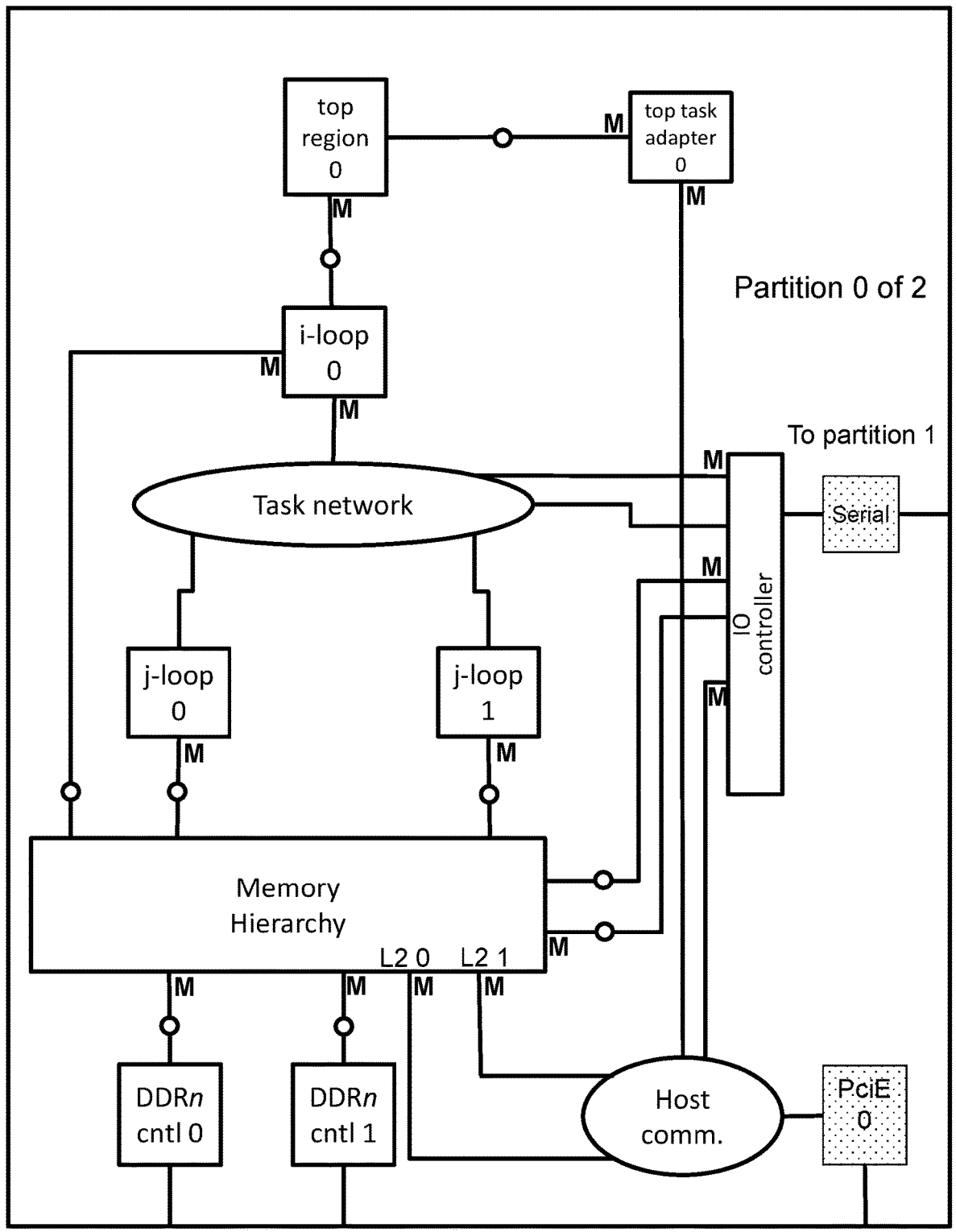
FIG 33  Partition 0 of 2

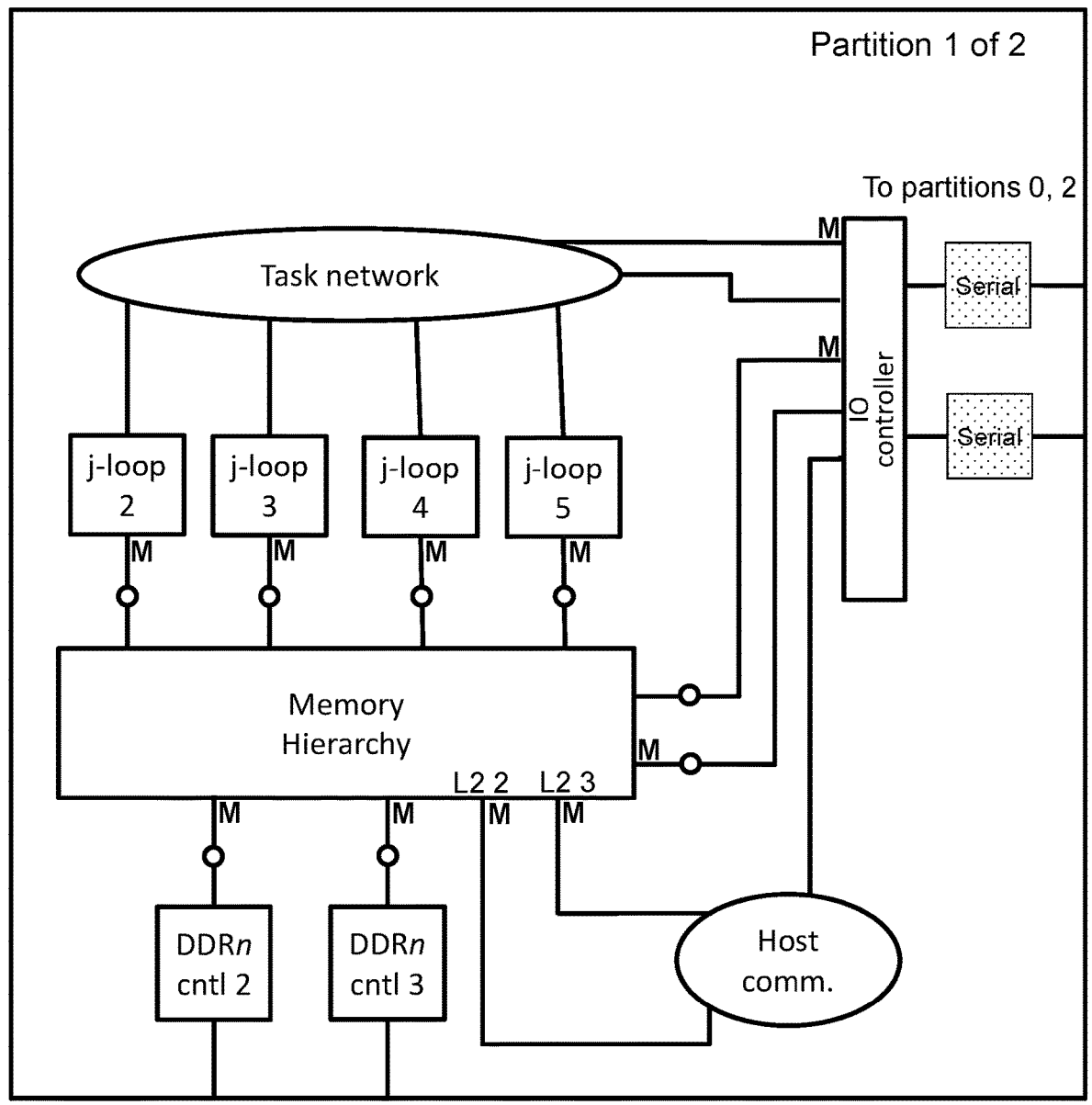
FIG 34 Partition 1 of 2

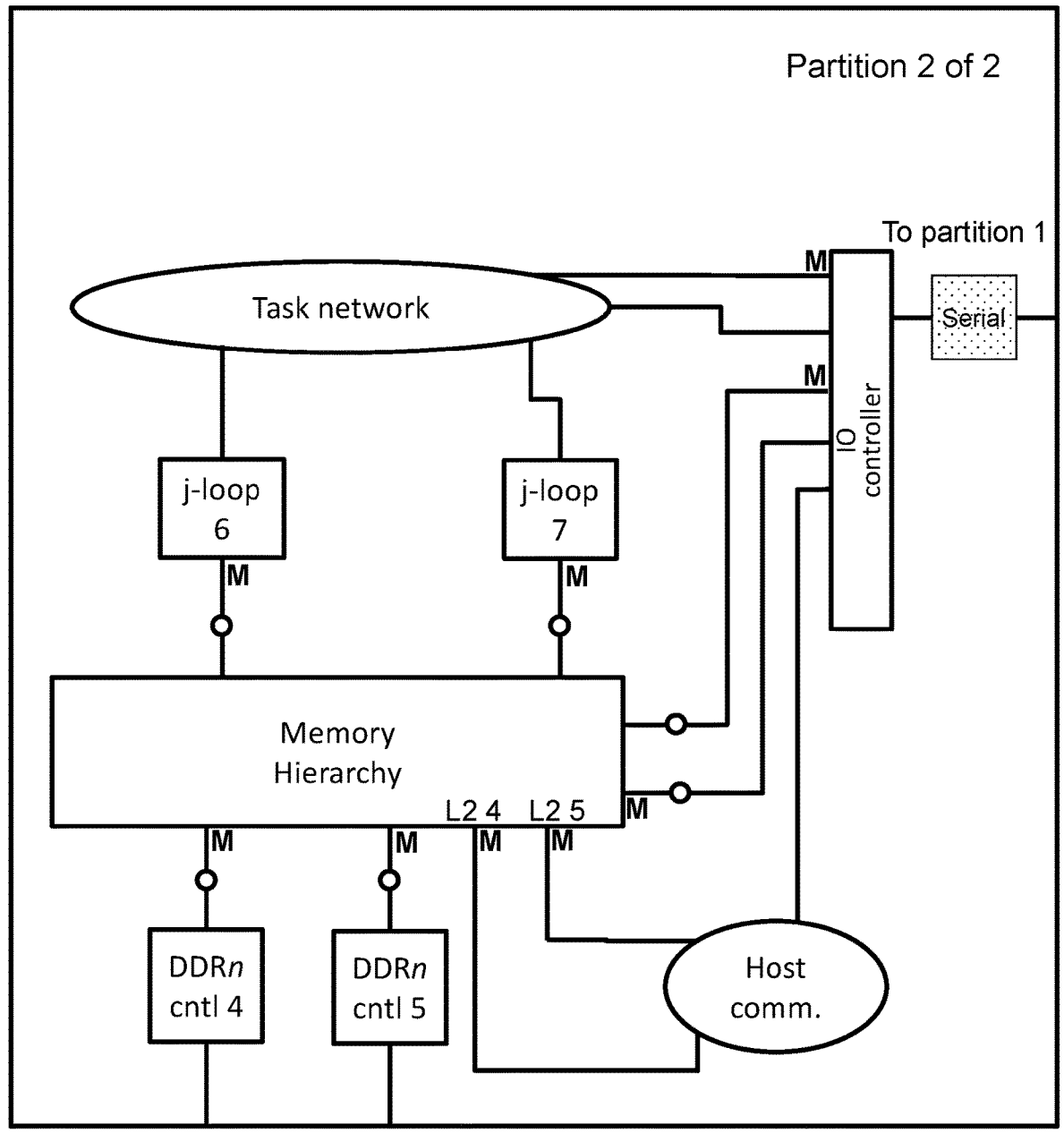
FIG 35  Partition 2 of 2

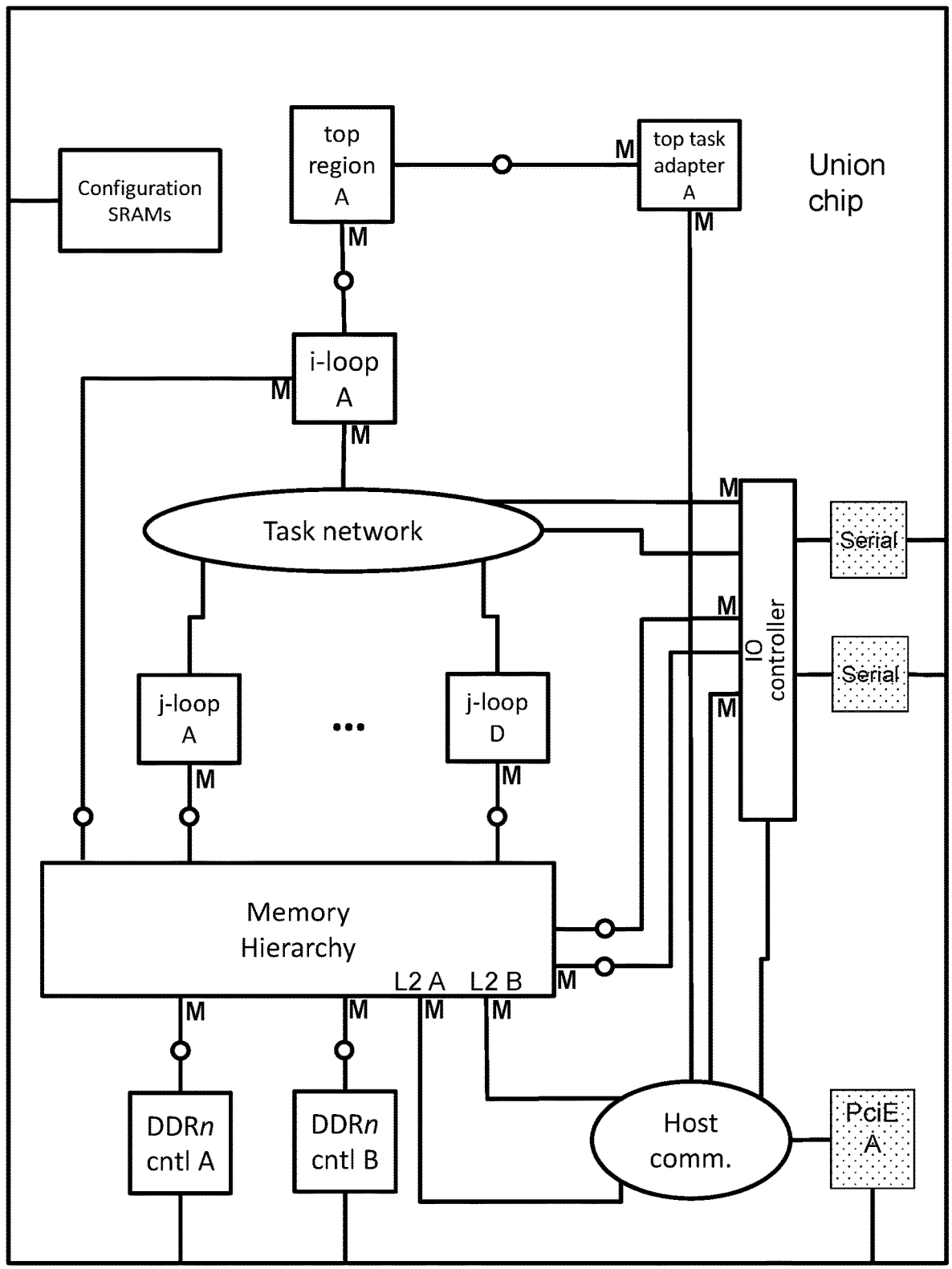
FIG 36 The Union Chip

| | Top task adapter A | Top region A | i-loop A | j-loop A | j-loop B | j-loop C | j-loop D | L2 A | L2 B | PciE A |
|---|---|---|---|---|---|---|---|---|---|---|
| Partition 0 | Top task adapter 0 | Top region 0 | i-loop 0 | j-loop 0 | j-loop 1 | ---- | ---- | L2 0 | L2 1 | PciE 0 |
| Partition 1 | ---- | ---- | ---- | j-loop 2 | j-loop 3 | j-loop 4 | j-loop 5 | L2 2 | L2 3 | ---- |
| Partition 2 | ---- | ---- | ---- | j-loop 6 | j-loop 7 | ---- | ---- | L2 4 | L2 5 | ---- |

Local to global component map in union chip

FIG 37 The global to local component map in the Union Chip

| Host communication network routing configuration SRAMs in union chip |||||||
|---|---|---|---|---|---|---|
| *Global master port to local master port map* |||||||
| Partition 0 || Partition 1 || Partition 2 ||
| L2 2-5 | IOC | L2 0-1,4-5 | IOC | L2 0-3 | IOC |
| L2 0 | L2 A | L2 2 | L2 A | L2 4 | L2 A |
| L2 1 | L2 B | L2 3 | L2 B | L2 5 | L2 B |
| *Global master port to chip id map* |||||||
| L1 0-1 |||| 0 |||
| L2 2-3 |||| 1 |||
| L2 4-5 |||| 2 |||
| *Global slave port to local slave port map* |||||||
| Partition 0 || Partition 1 || Partition 2 ||
| PciE 0 | PciE A | PciE 0 | IOC | PciE 0 | IOC |
| *Global slave port to chip id map* |||||||
| PciE 0 |||| 0 |||

FIG 38 Routing configuration SRAMs for a network in the Union Chip

```
int A[N];                              int A[N];
for(int i=0;i<N;++i)                   for(int i=0;i<N;++i)
{                                      {
   j=f(i);                                j=f(i);
   k=g(i);                                k=g(i);
   //A[j]=A[j]+A[k];
   r1=A[j];                               r1=A[j];//r1==A[j]
                                          //load A[k] eliminated if k==j
   r2=A[k];                               r2=(k==j?r1:A[k])//r2==A[k]
   r3=r1+r2;                              r3=r1+r2;
   A[j]=r3                                //A[j]=r3 eliminated //r3==A[j]
                                          //update cached A[k] if k==j
                                          r2_=(k==j?r3:r2);//r2_==A[k]

//A[k]=A[k]+2;
   r4=A[k];                               //r4=A[k]//load eliminated
   r5=r4+2;                               r5=r2_+2;

A[k]=r5                                //A[k]=r5 eliminated//r5==A[k]
                                          //update cached A[j] if k==j
                                          r3_=(k==j?r5:r3);//r3_==A[j]

//A[j]=A[j]+3;
   r6=A[j];                               //r6=A[j] eliminated
   r7=r6+3;                               r7=r3_+3;
   A[j]=r7                                //A[j]=r7 eliminated //r7==A[j]
}                                         A[j]=r7;//flush A[j] cache
                                          A[k]=r5;//flush A[k] cache
                                       }
```

FIG 39  Register promotion based on compiling the write update cache coherence protocol

```
int A[N][N];//initially 0
int B[N];
for(int i=0;i<N;++i) {
   int ran=i;
   for(int j=0;j<1000*N;++j)
      {int n=ran%N; A[i][n]^=(B[n]&0x7); ran=next(ran)}
}
for(int j=0;j<1000*N; ++j) (
   int ran=1;
   {int n=ran%N; A[n][n]+=h(j); ran=next(ran);}
}
```

```
int A[N][N];
int B[N];
link B=MEM;
link A=MEM;
for(int i=0;i<N;++i) {
   {
      link A1=A;
      int ran=i;
      for(int j=0;j<1000*N;++j)
         {int n=ran%N; A1[i][n]^=(B[n]&0x7); ran=next(ran)}
      unlink A=A1;
   }
}
for(int j=0;j<1000*N; ++j) {int n=rand()%N; A[n][n]+=h(j);}
unlink MEM=A;
unlink MRM=B;
```

FIG 40 Hierarchical memory partitioning code example

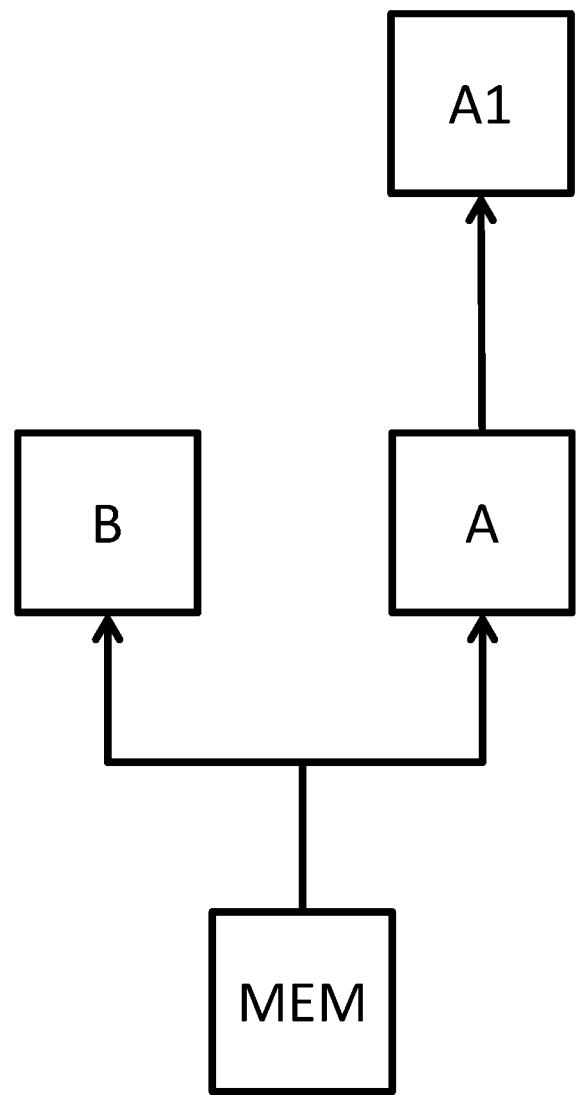
FIG 41 Memory address space hierarchy example

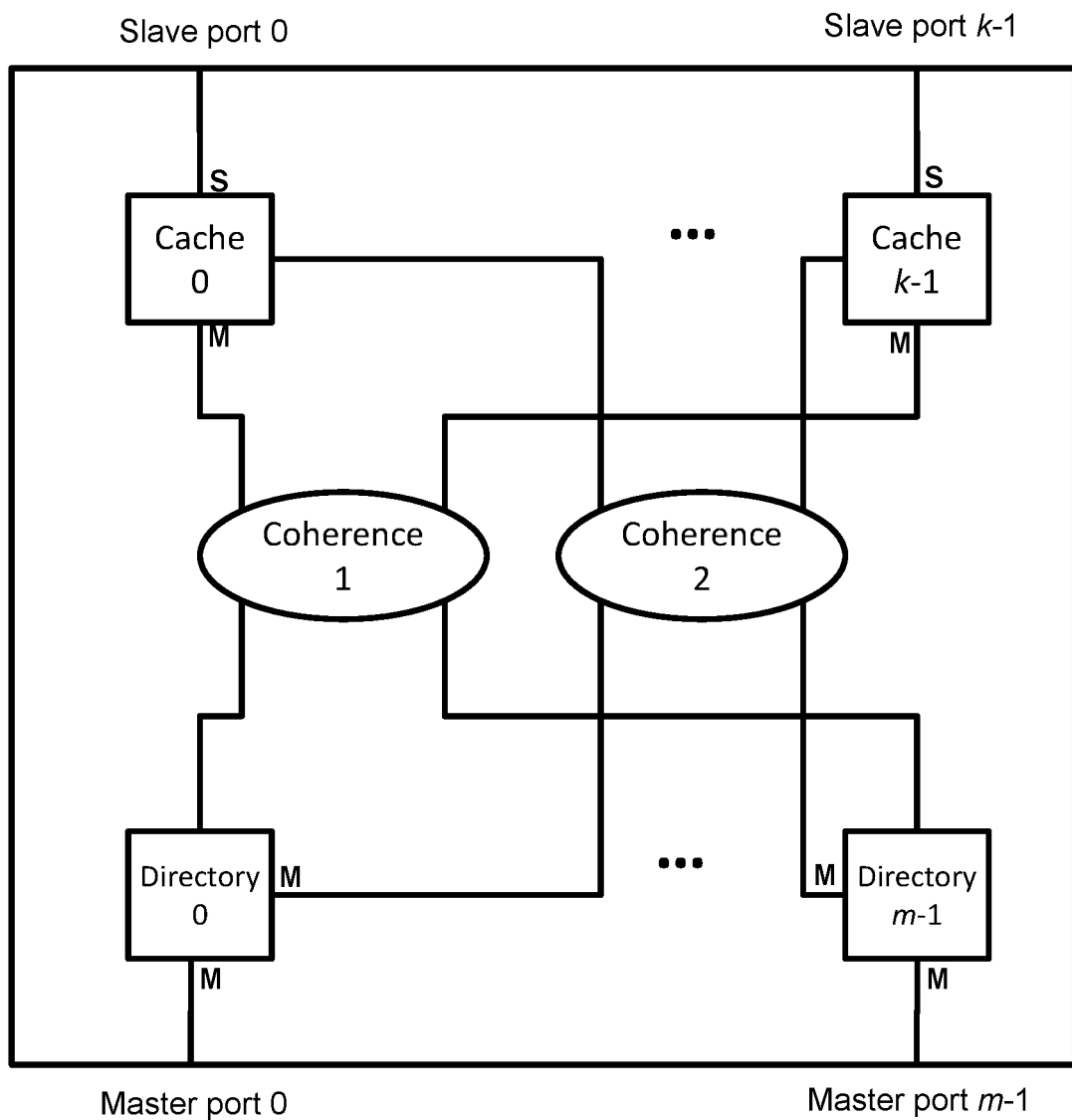
FIG 42 Memory node implementation with private coherent caches

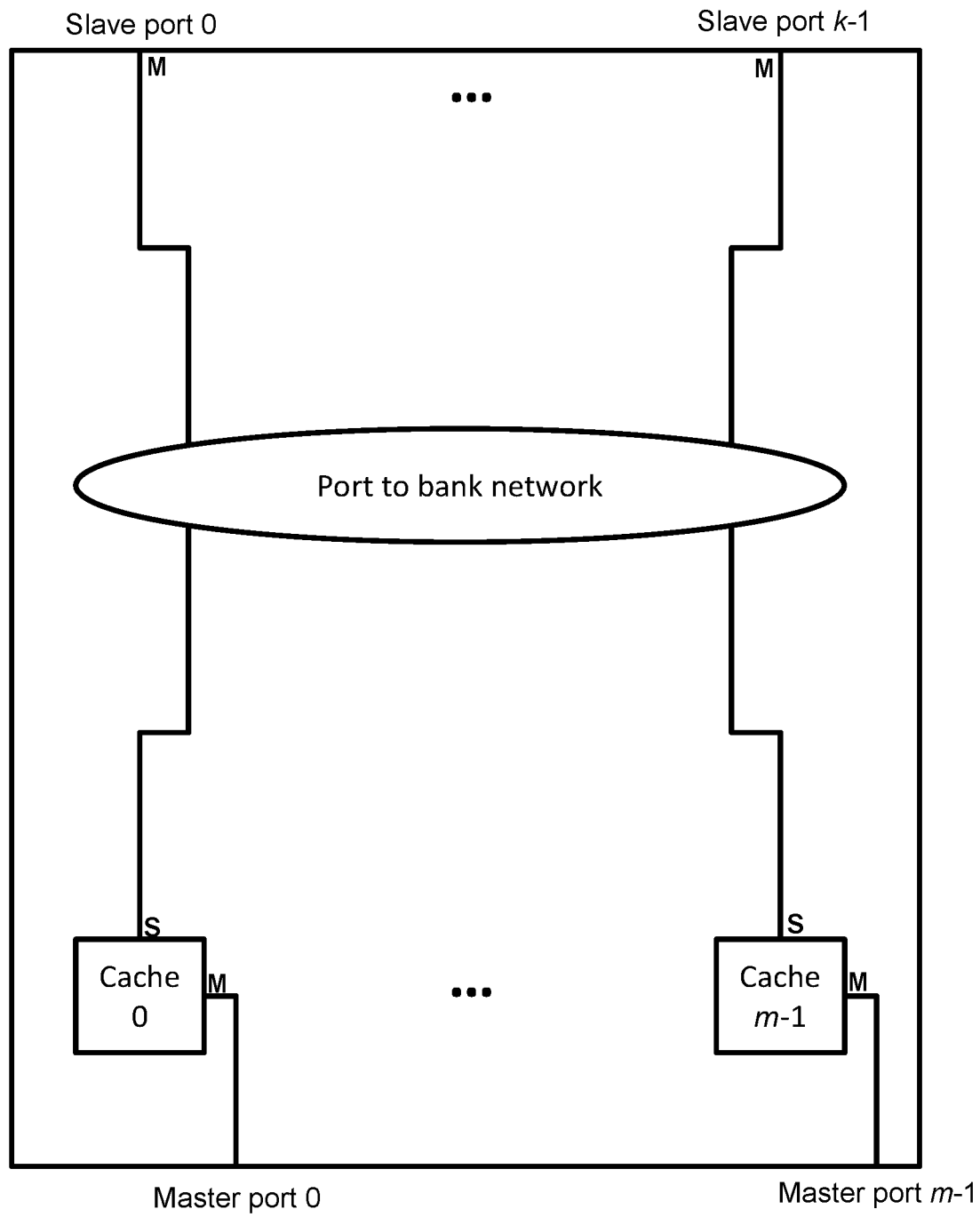
FIG 43 Memory node implementation with shared bank-interleaved caches

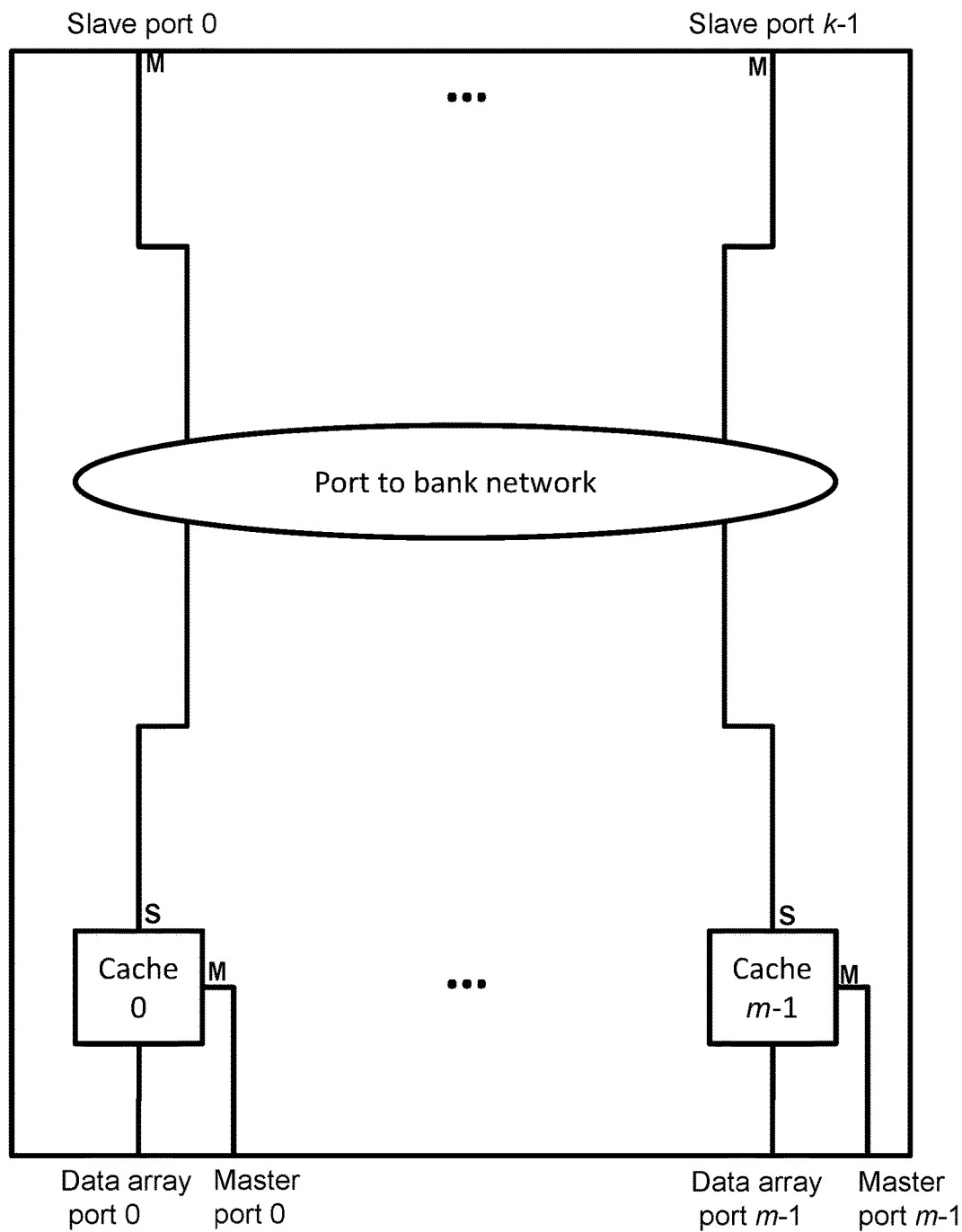
FIG 44 Memory node implementation with shared bank-interleaved caches (data array external)

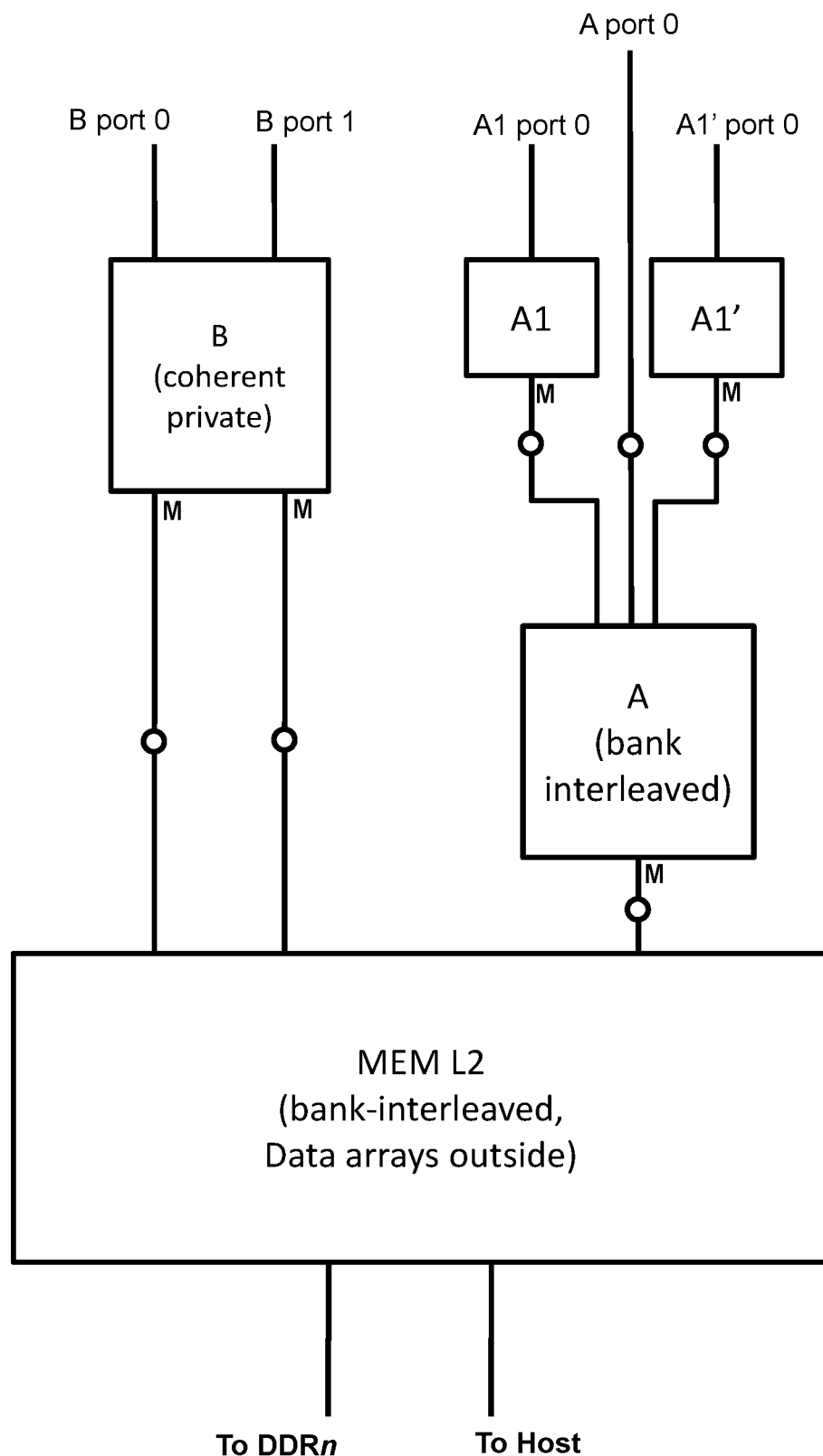
FIG 45 Implementation of memory hierarchy example

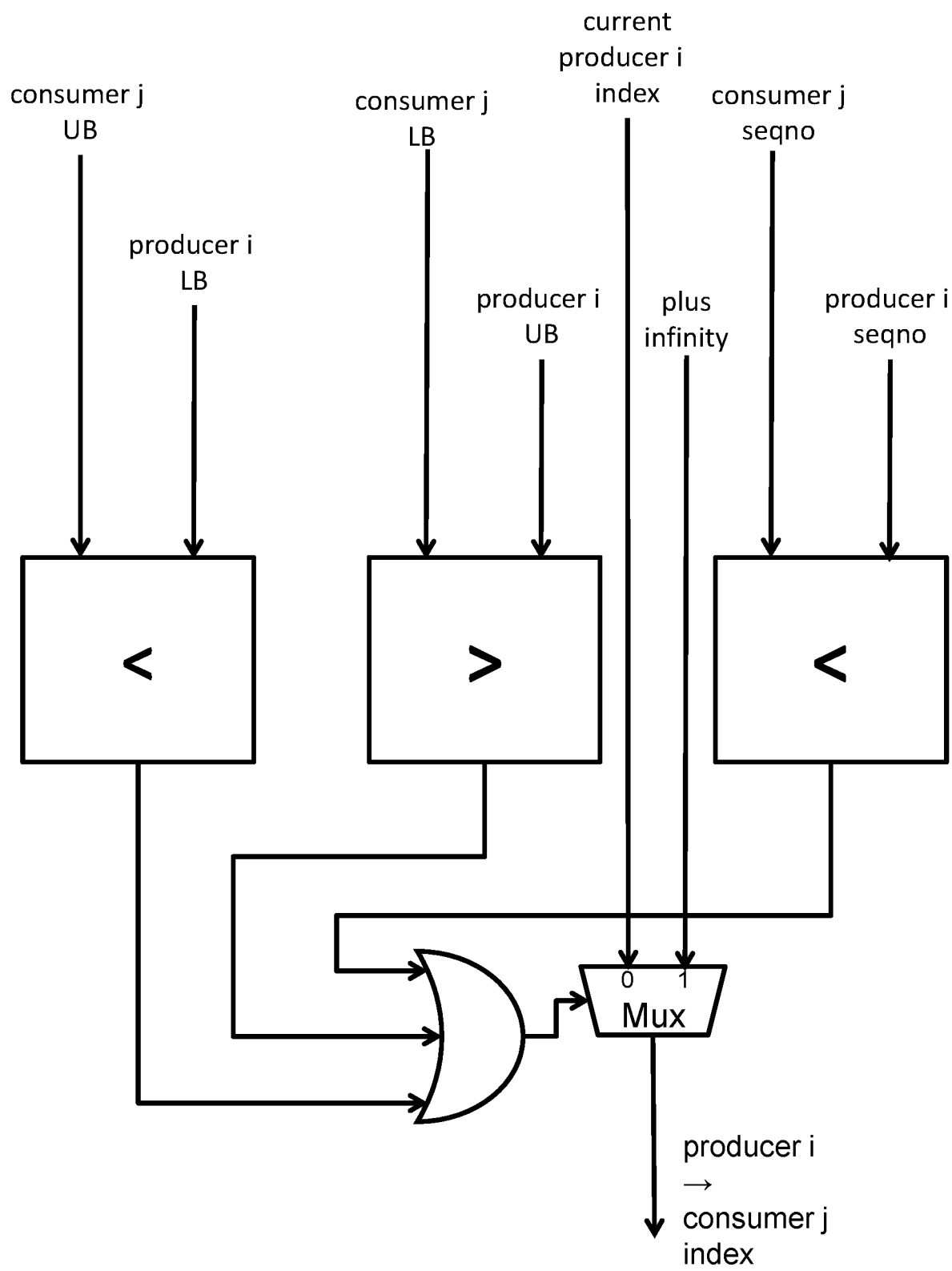
FIG 46 Train crash synchronization unit, part 1 of 2

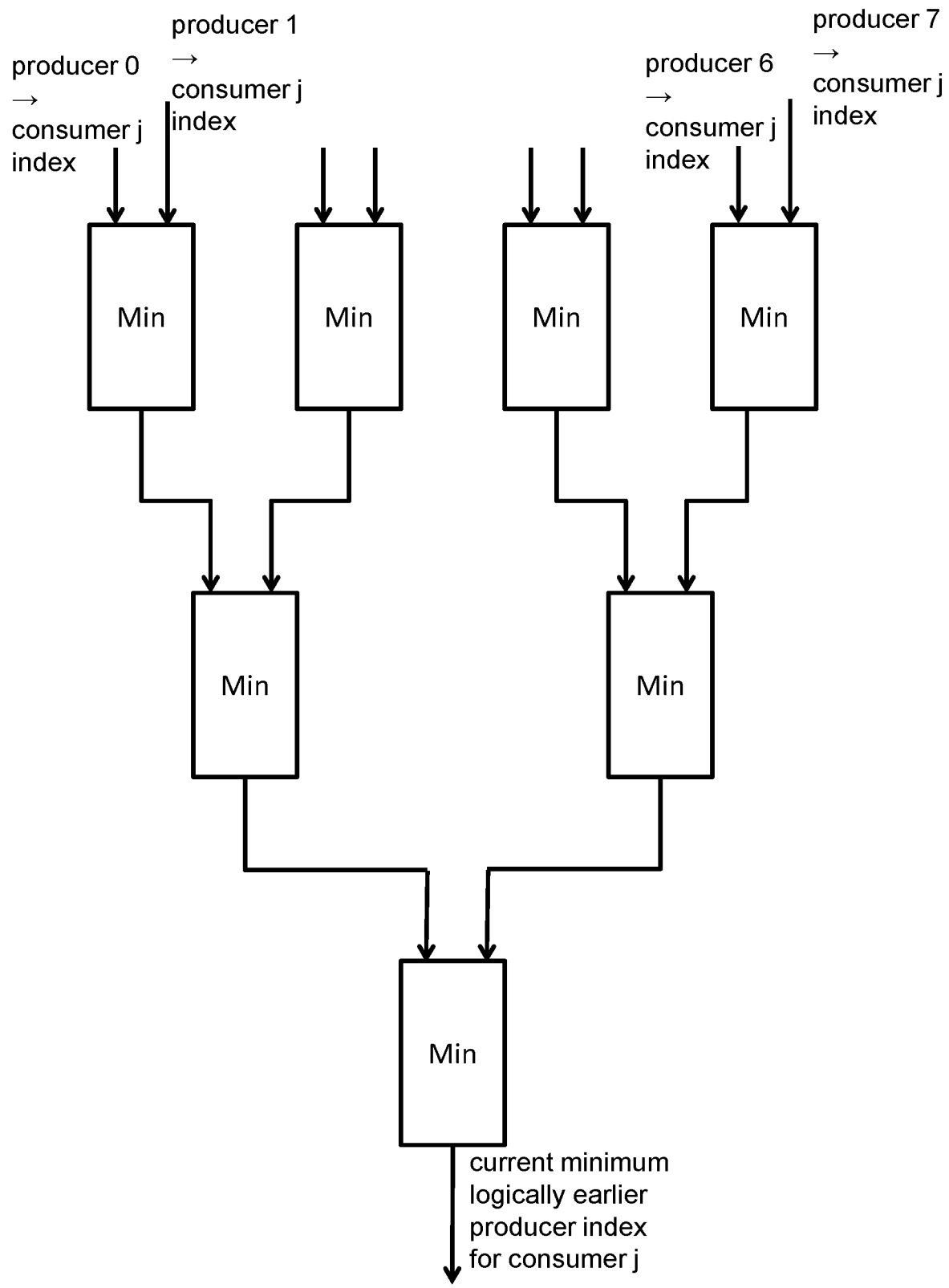
FIG 47 Train crash synchronization unit, part 2 of 2

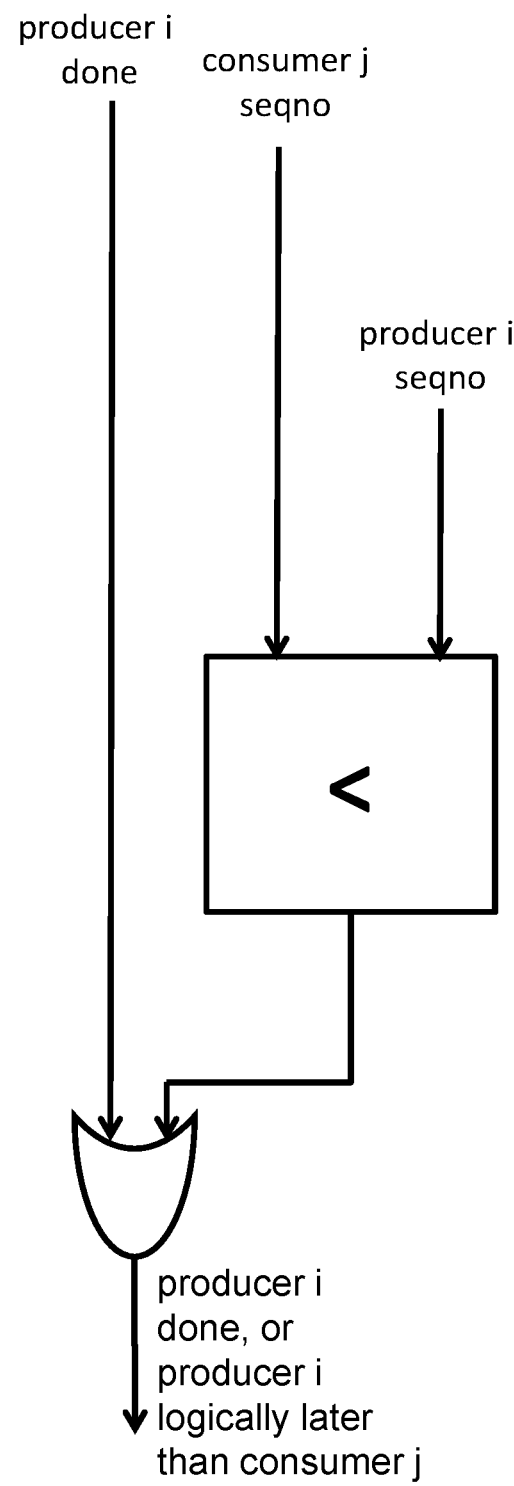
FIG 48 Serialization synchronization unit, part 1 of 2

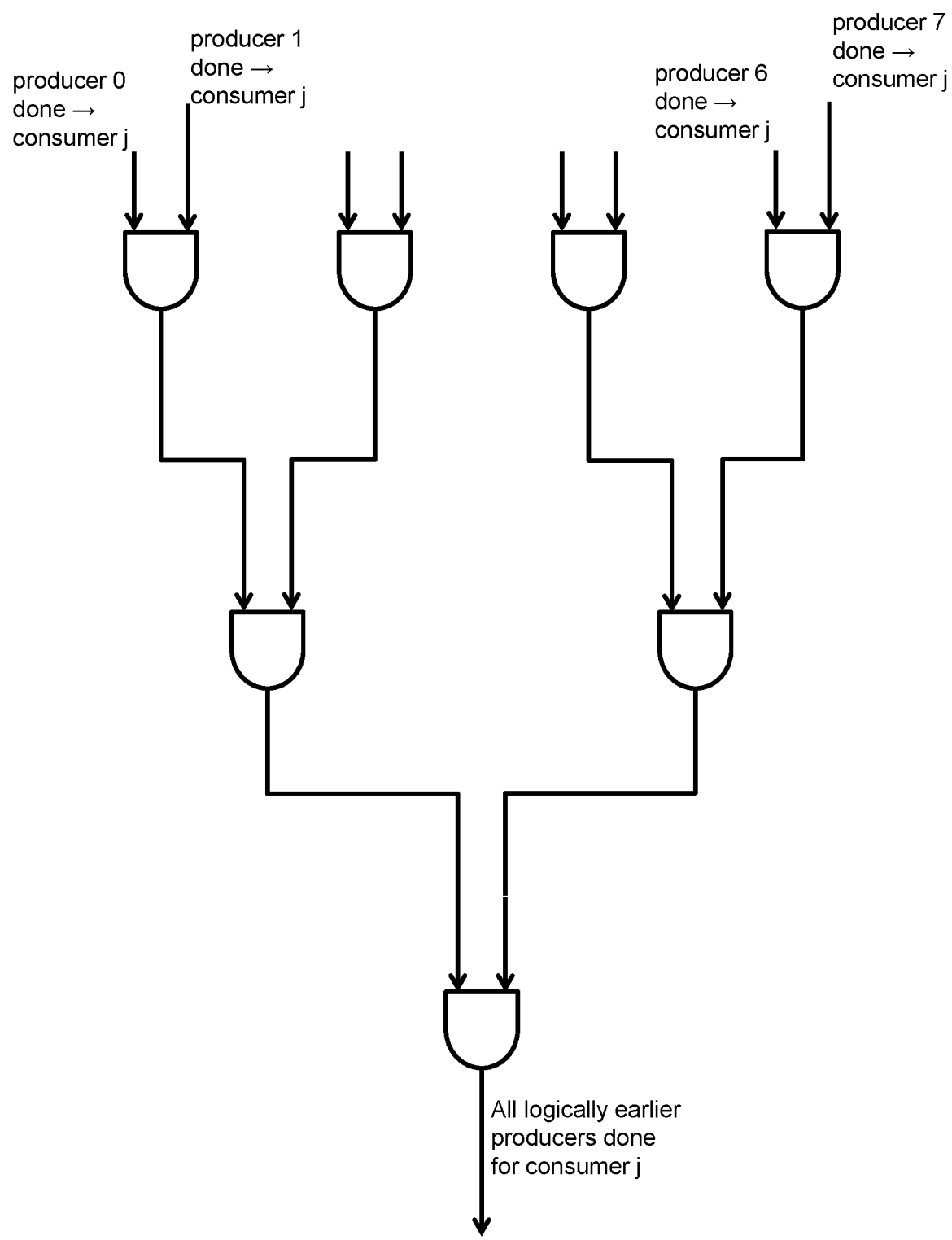
FIG 49 Serialization synchronization unit, part 2 of 2

```
//Program example: synchronization
//with dynamic thread sequence numbers
int a[N];
int keys[M];
int stats[K];
for(int i=0;i<M; ++i) {
  if(tst1(i))
    for(int j=0;j<N;++j) {
      if(tst2(i,j))
        for(int l=0;l<1000;++l)
          independent_op();
      if(matches(keys[i],a[j]))
        for(int k=1;k<K;++k)
          stats[k]=
            update(stats[k],stats[k-1],i,j);
    }
}
//(k loop) serialization dep. on logically earlier (j loop)
//(k loop) train crash dep. on logically earlier (k loop)
```

FIG 50 Program example for synchronization with dynamic thread sequence numbers

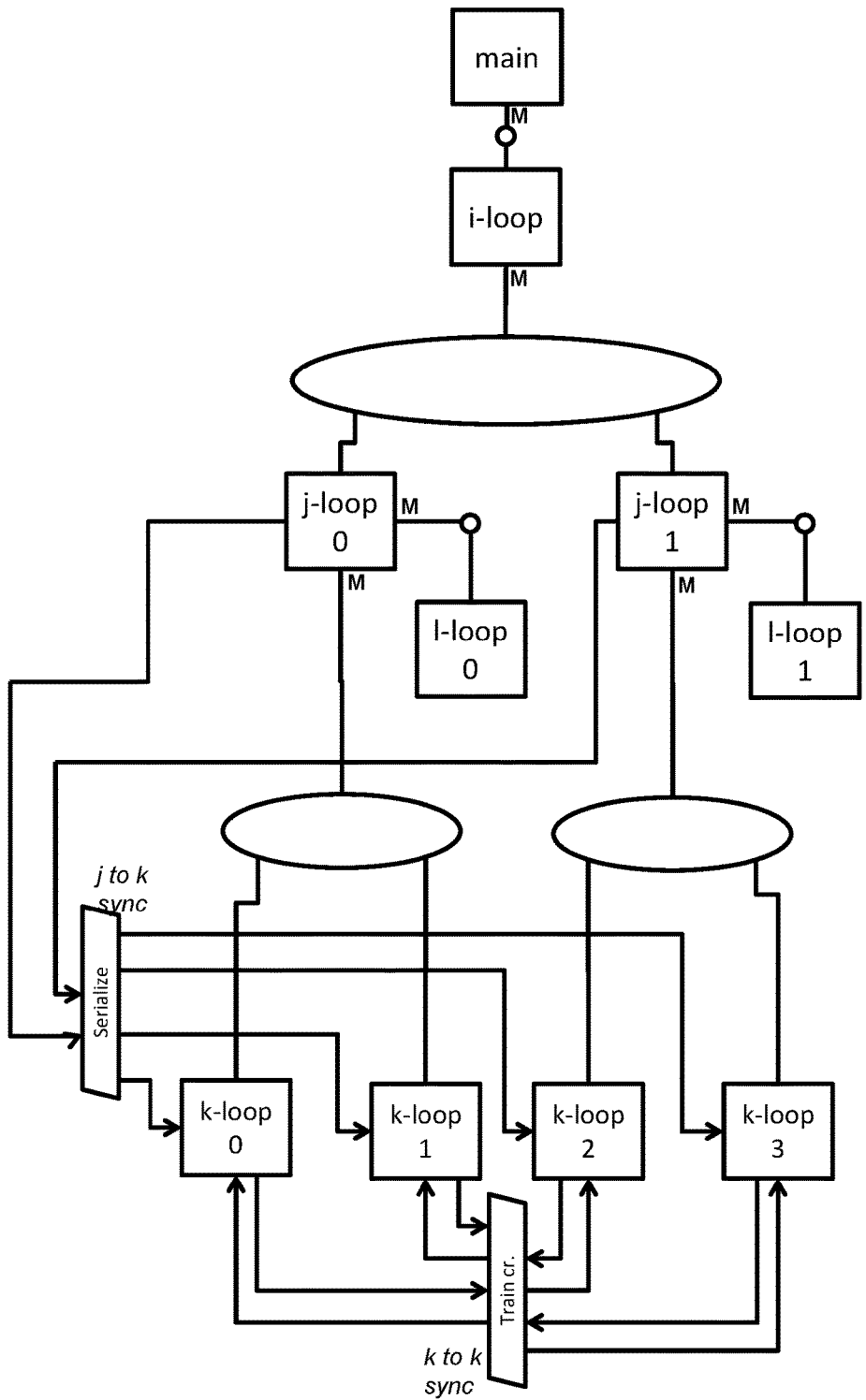
FIG 51 Hardware implementation of synchronization with dynamic thread sequence numbers

```
//Program example: Eratosthenes' sieve
bool s[N];
int primes() {
   for(int i1=0;i1<N;++i1)//i1 loop
     s[i1]=(i1==2||(i1>=3 && (i1&1)));
   int nPrimes=1;
   for(int i2=3;i2<N; i2+=2) {//i2 loop
     if(s[i2]) {
        for(int j=i2+i2;j<N;j=j+i2)//j loop
           s[j]=0;
        ++nPrimes;
     }
   }
   return nPrimes;
}
//(i2 loop) train crash dep. on (i1 loop)
//(i2 loop) train crash dep. on (j loop)
//(j loop) train crash dep. on (i1 loop)
```

FIG 52  Program example: Eratosthenes's sieve

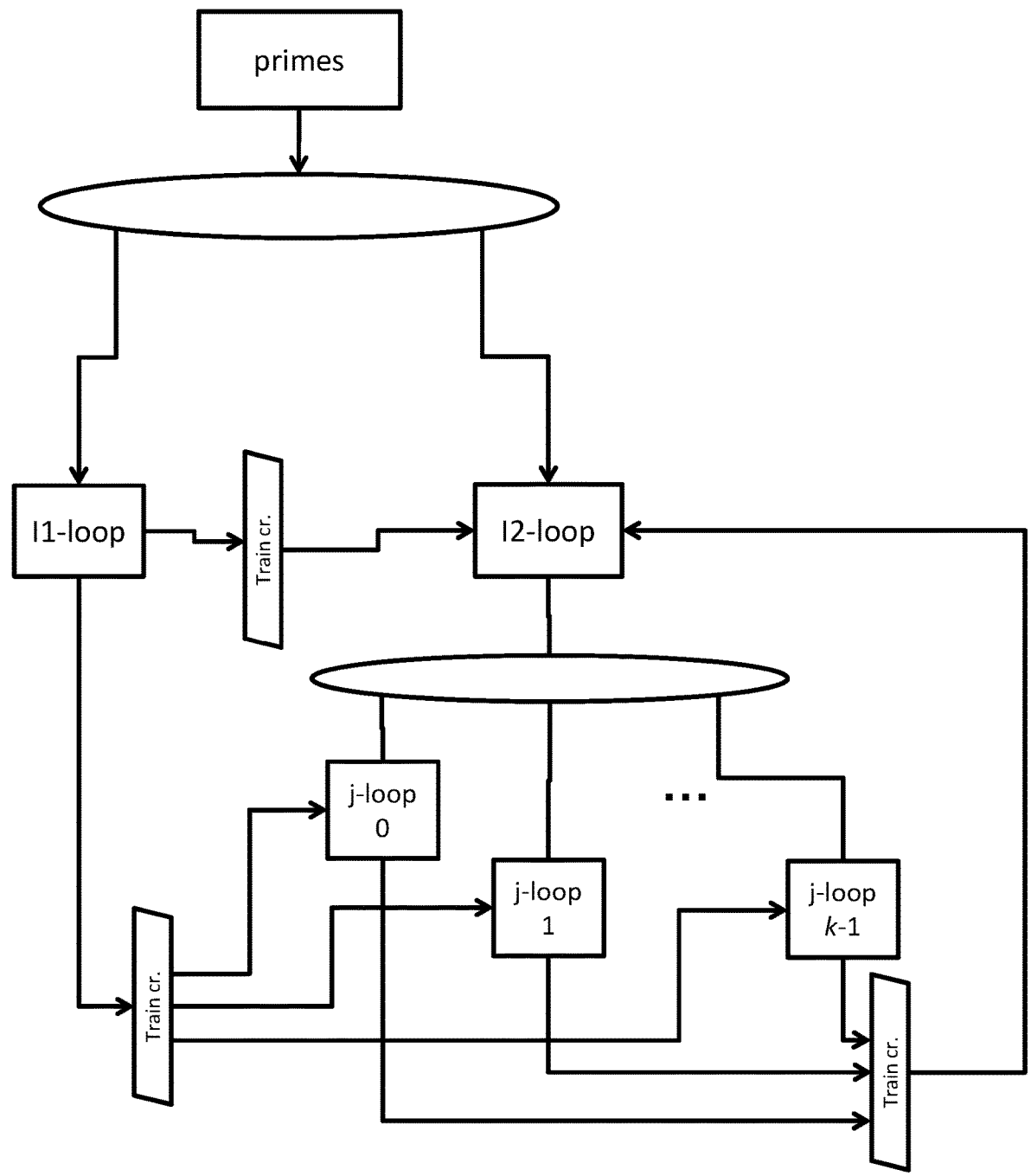
FIG 53 Hardware implementation of Eratosthenes's Sieve

```
//Program example: bubble sort
int a[N];
for(int i=0;i<N-1; ++i) {
   for(int j=0;j<(N-1-i);++j)  {
     if (a[j] > a[j + 1]) {
        int t= a[j];
        a[j] = a[j + 1];
        a[j + 1] = t;
     };
   };
};
//(j loop) train crash dep.
//on logically earlier (j loop)
```

FIG 54  Program example: bubble sort

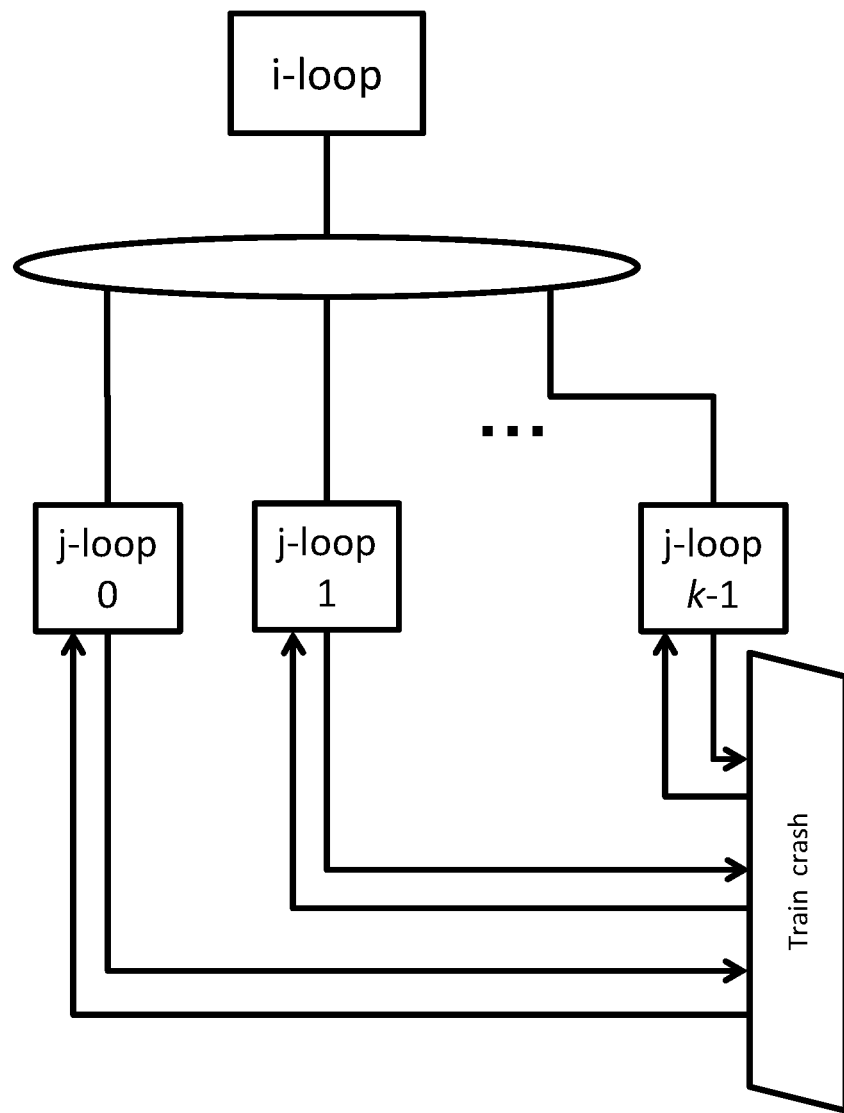
FIG 55  Hardware implementation of bubble sort with train crash synchronization

```
//Program example: bubble sort with
//cascaded filters
int a[N];
for(int i=0;i<N-1; i+=8) {
   for(int j0=0;j0<(N-1-i);++j0)   {
     if (a[j0] > a[j0 + 1]) {
        int t= a[j0];
        a[j0] = a[j0 + 1];
        a[j0 + 1] = t;
     };
   };
   ...
  for(int j7=0;j7<(N-1-i-7);++j7)   {
     if (a[j7] > a[j7 + 1]) {
        int t= a[j7];
        a[j7] = a[j7 + 1];
        a[j7 + 1] = t;
     };
   };
};
//(j0 loop) train crash dep.
//on logically earlier (j7 loop)
//j(n+1) loop FIFO dep.
//on j(n) loop
//for n=0,...,6
```

FIG 56  Bubble sort to be implemented with cascaded filters

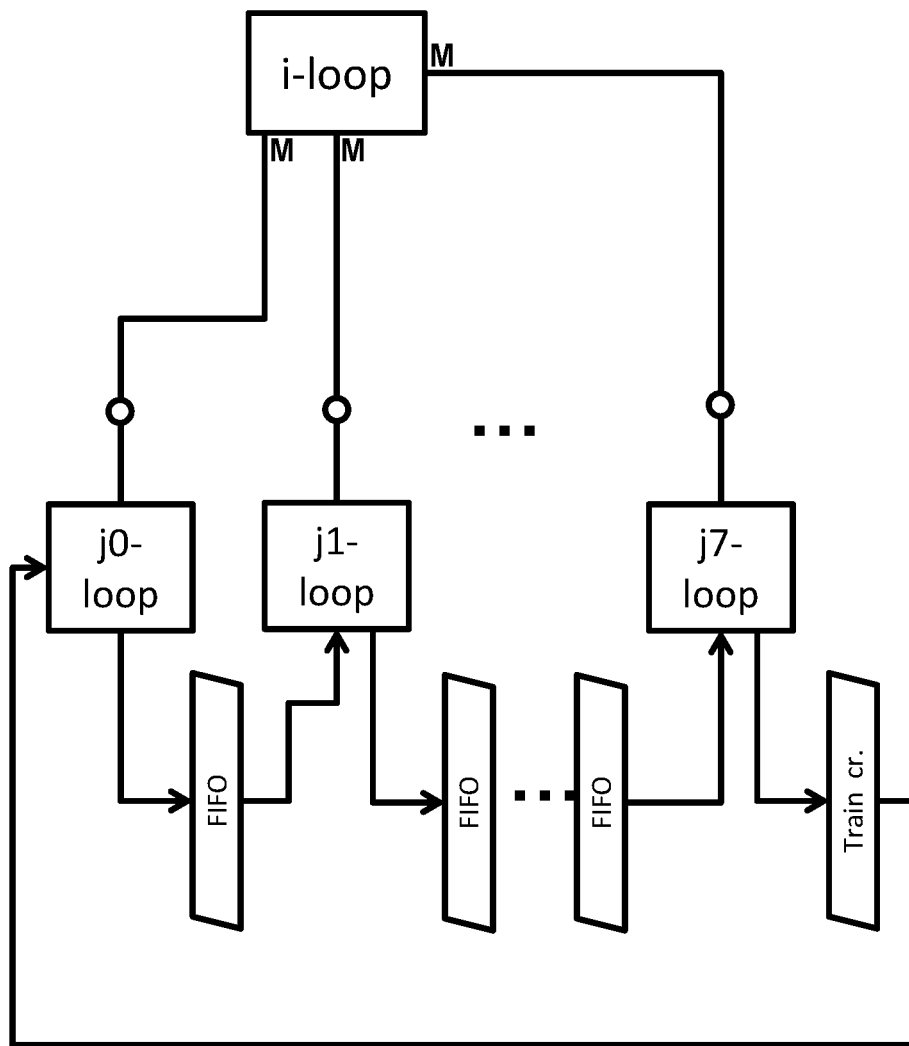
FIG 57 Cascaded filter implementation of bubble sort.

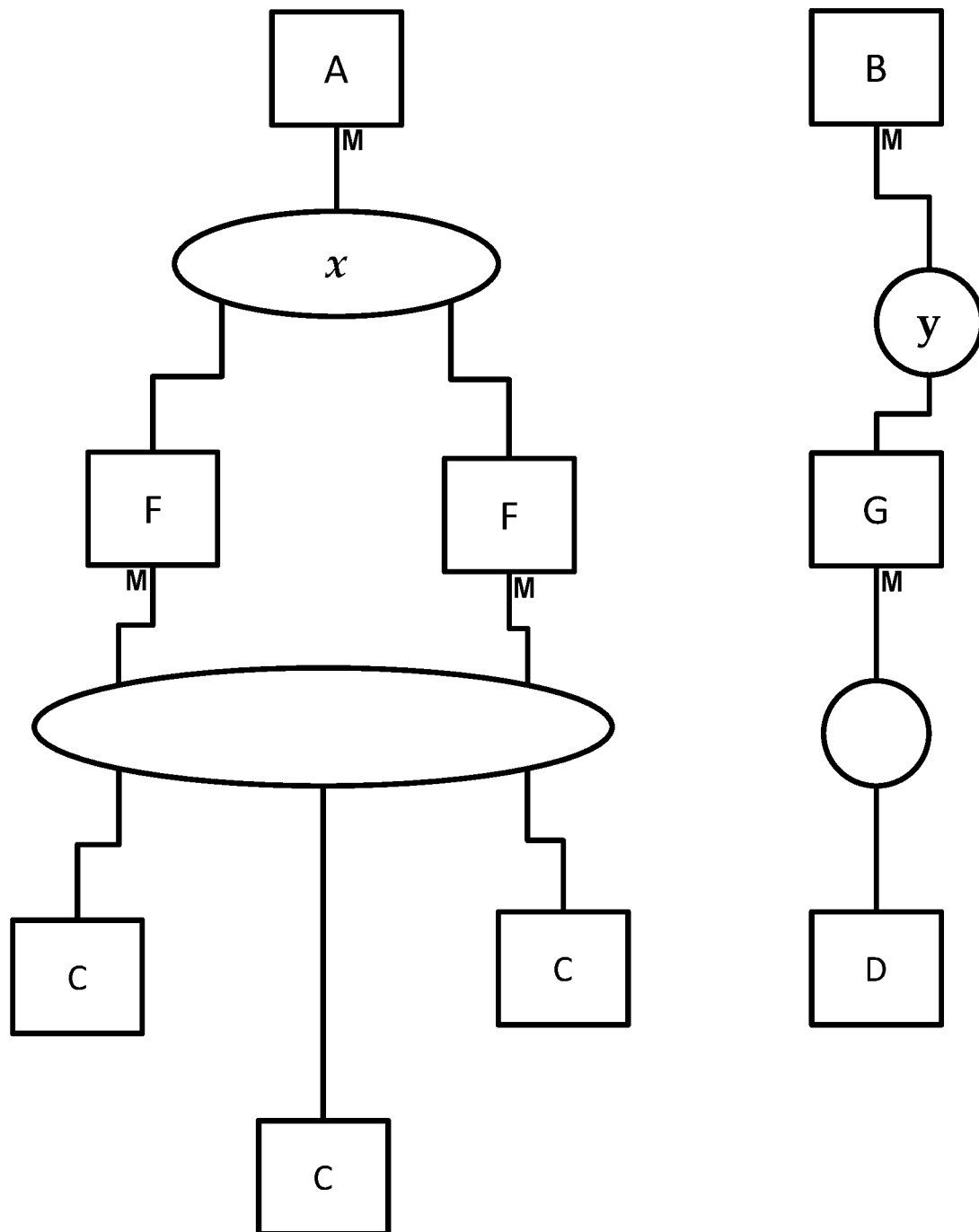
FIG 58  Resource sharing: Before merging F and G functions

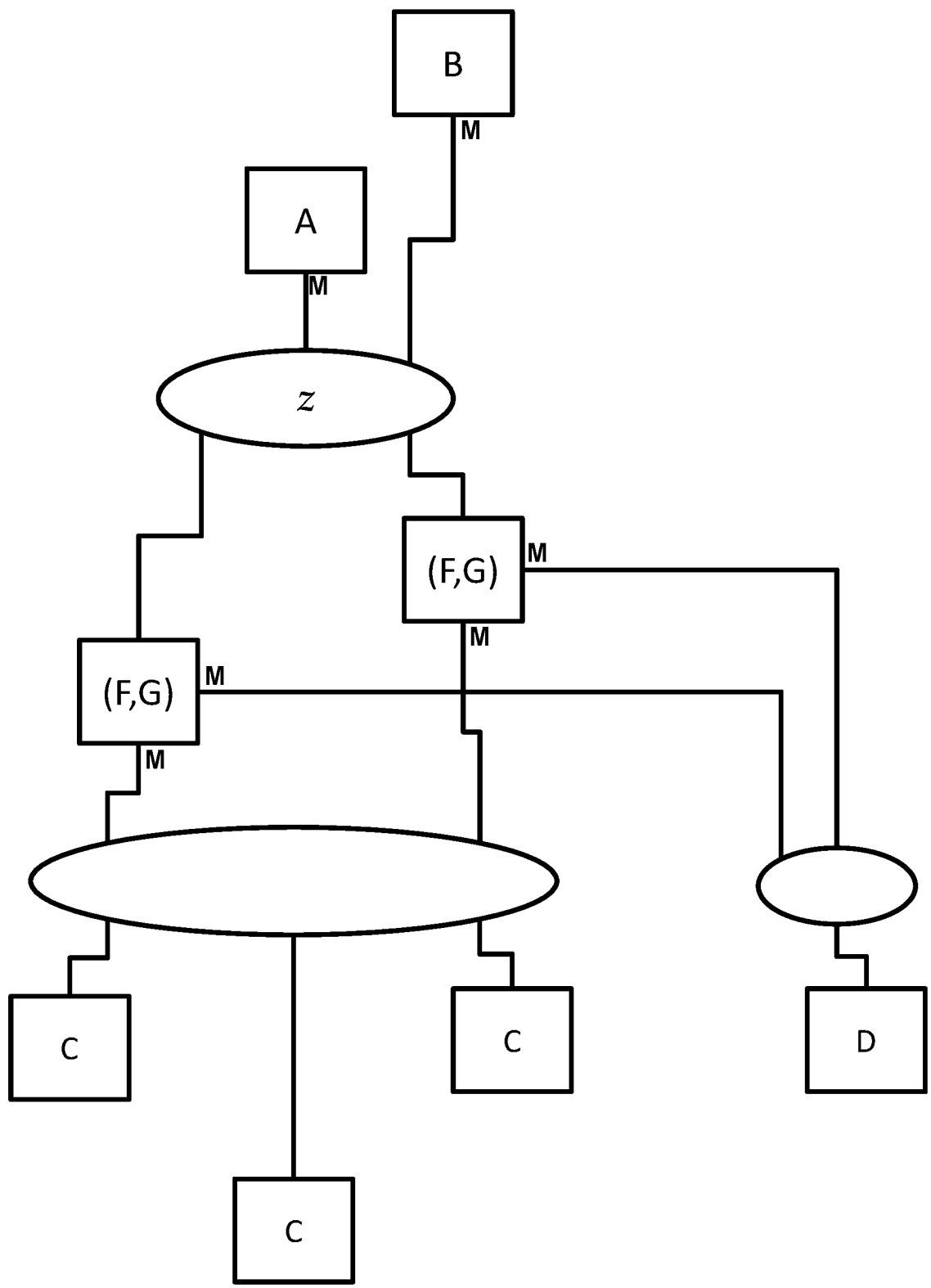
FIG 59  Resource sharing: after merging F and G functions

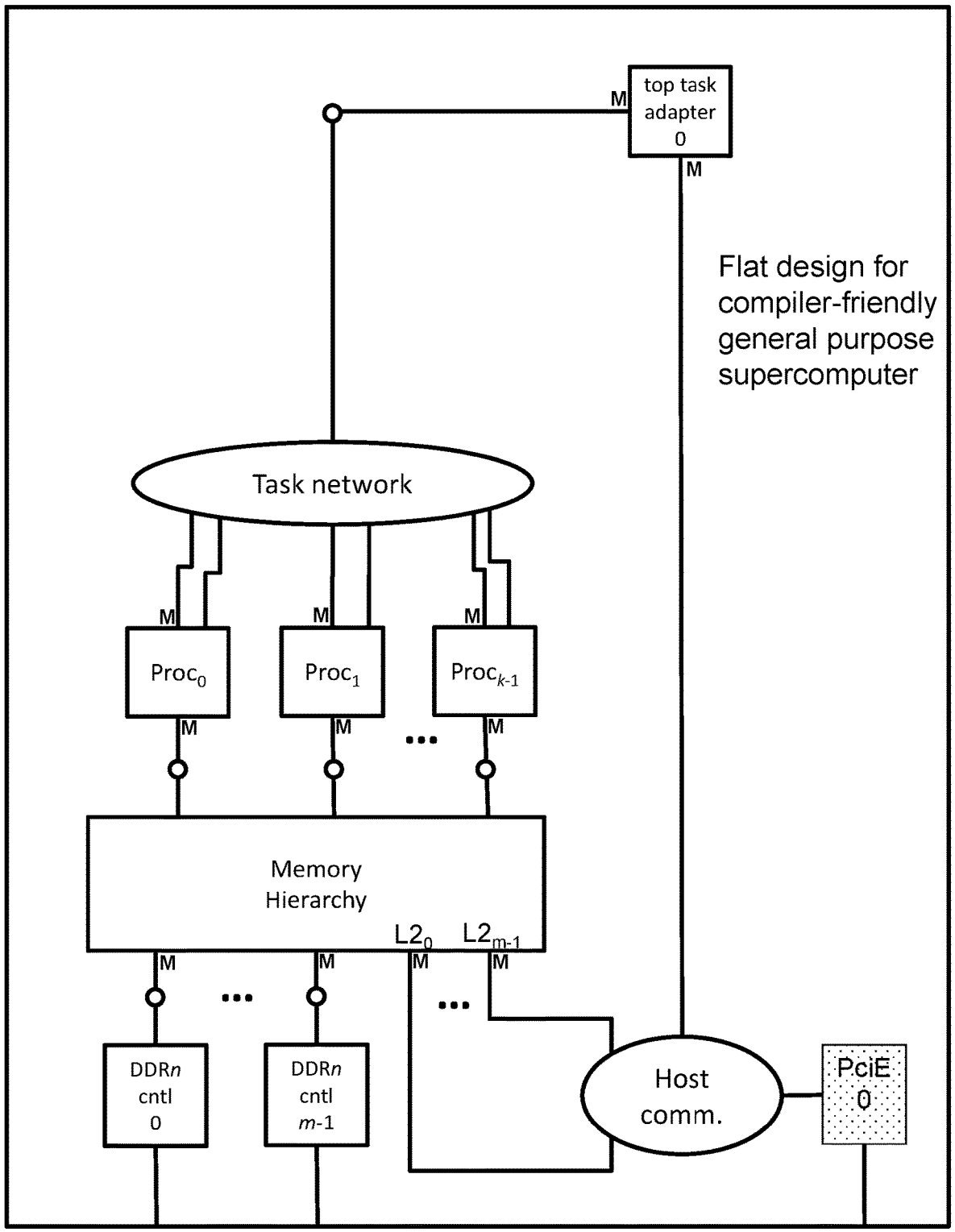
FIG 60  Flat design for a compiler-friendly general purpose supercomputer

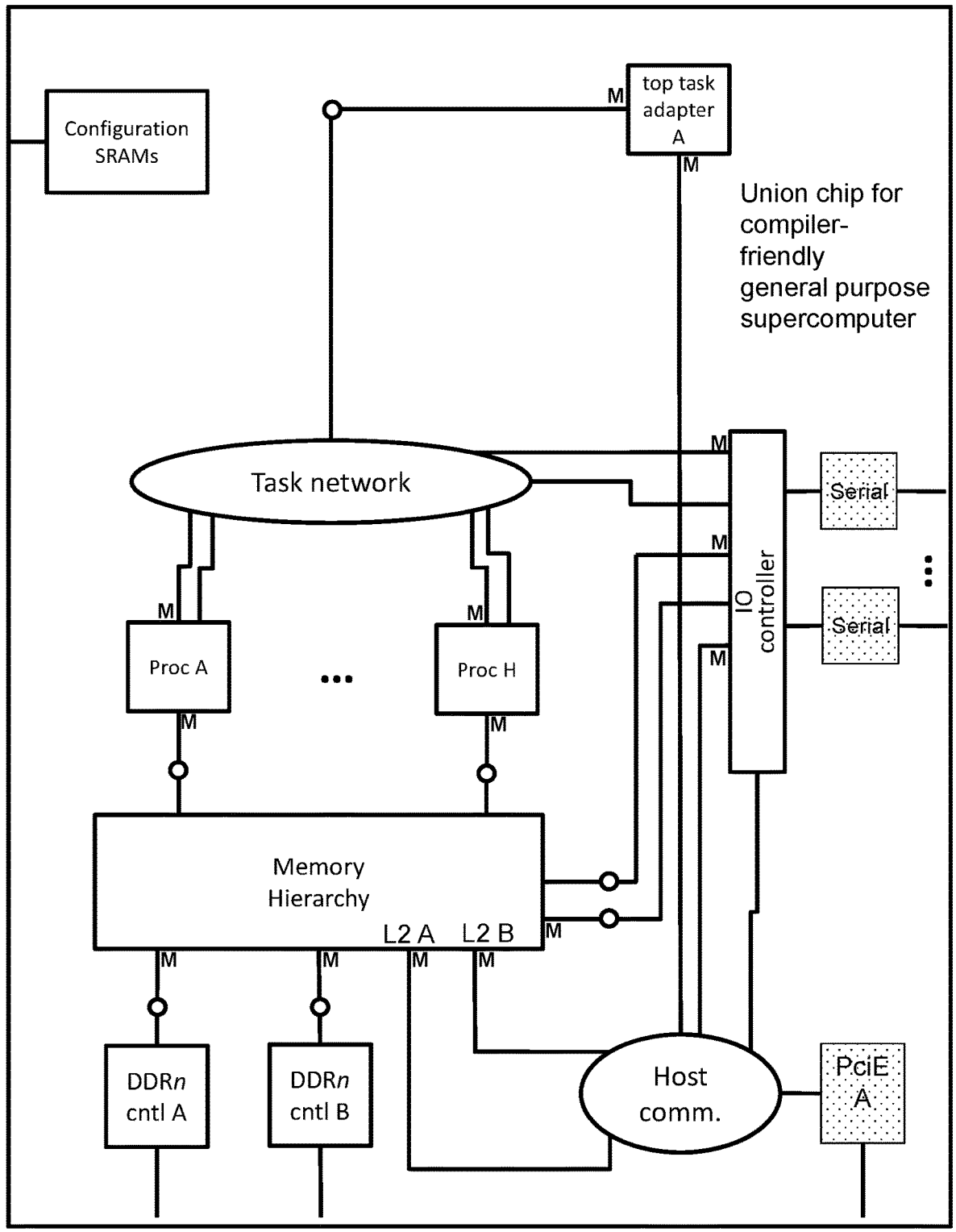
FIG 61 Union chip for the compiler friendly general purpose supercomputer

```
//find number of solutions to N-queens problem
int isolateRightmostBit(int x) {
  return (-x)&x;
}
int resetRightmostBit(int x) {
  return ~(-x)&x;
}
int nS=0; // number of solutions
void queens(int n,int l, int d, int r) {
  if (n==N) {nS++; return;}
  int cand= ~(l|d|r) & ((1<<N)-1);
  //cand=non-threatened columns
  while(cand!=0) {
    int t1= isolateRightmostBit(cand);
    queens(
        n+1,
        (l|t1)<<1,
        (d|t1),
        (r|t1)>>1
    );
    cand=resetRightmostBit(cand);
  }
} int queensMain() {
  queens(0,0,0,0);
  return nS;
}
```

FIG 62  Recursive program example: N-queens

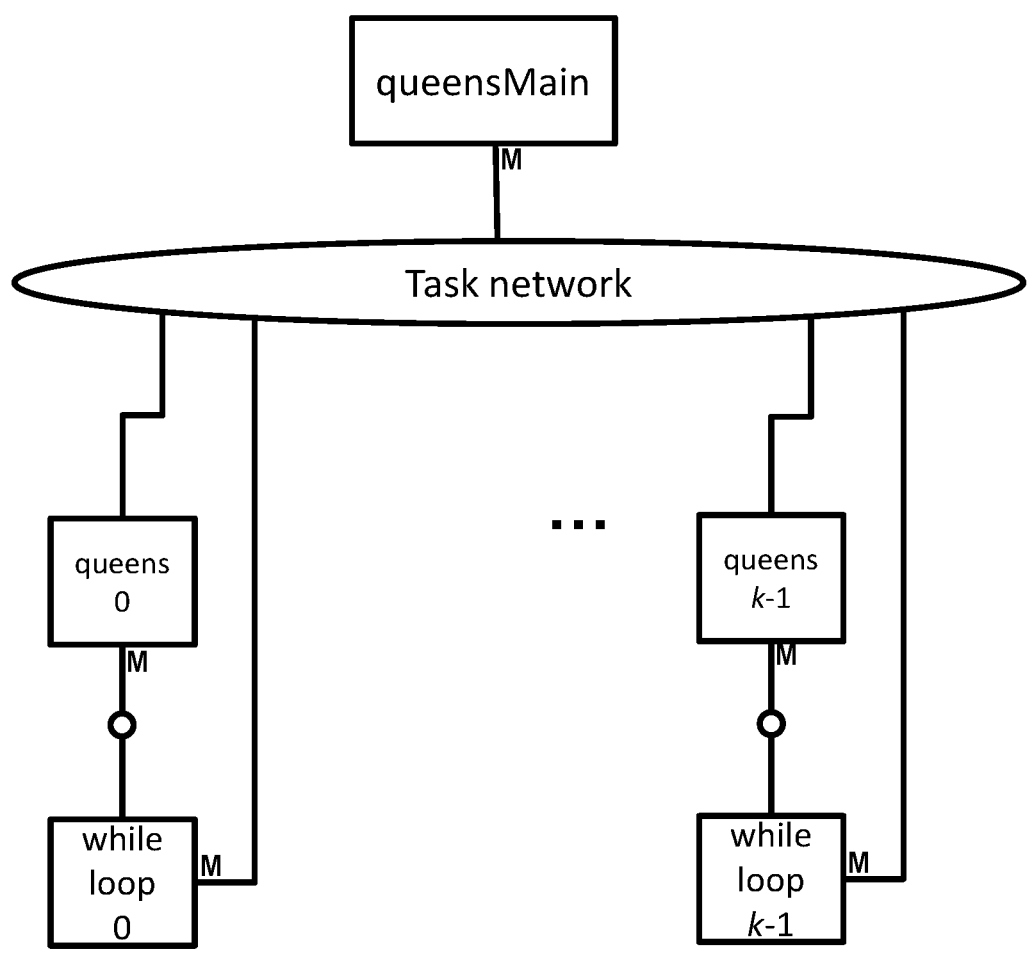
FIG 63 Hardware implementation of recursive N-queens

```
//Alpha-beta pruning (J. Pearl algorithm): sequential code
int scout(const Node& node, int depth, int alpha, int beta){
  if (depth == 0 || node.isTerminal())
    return node.heuristicEval();
  Node c[MAXCHILDREN]; node.getChildren(c);
  //find first child's value
  int t0 = -scout(c[0], depth-1, -beta, -alpha);
  if (t0>=beta) return t0;
  if (t0>alpha) alpha=t0;
  //for loop train crash dep. on getChildren
  for(unsigned i=1; !c[i].isLast(); ++i) {
    //quickly test if c[i] is already a worse choice
    //than the best move found so far, using an empty window
    int t1= -scout(c[i], depth-1, -alpha-1, -alpha); //test call
    //EPS can start it. i+1,i+2,… speculatively before it. i ends
    if (t1>=beta) return t1;
    if (t1>t0) t0=t1;
    if (t1>alpha) { //test failed
      int t2= -scout(c[i],depth-1,-beta,-alpha);//must find true val
      if (t2>=beta) return t2;
      if (t2>alpha) alpha=t2;
      if (t2>t0) t0=t2;
      //if alpha or t0 changed: re-execute it i+1,i+2,…
    }
  }
  return t0;
}
int scoutMain(const Node& origin, int depth0) {
  return scout(origin, depth0, -infinity, +infinity);
}
```

FIG 64  Recursive sequential algorithm for Alpha-Beta pruning

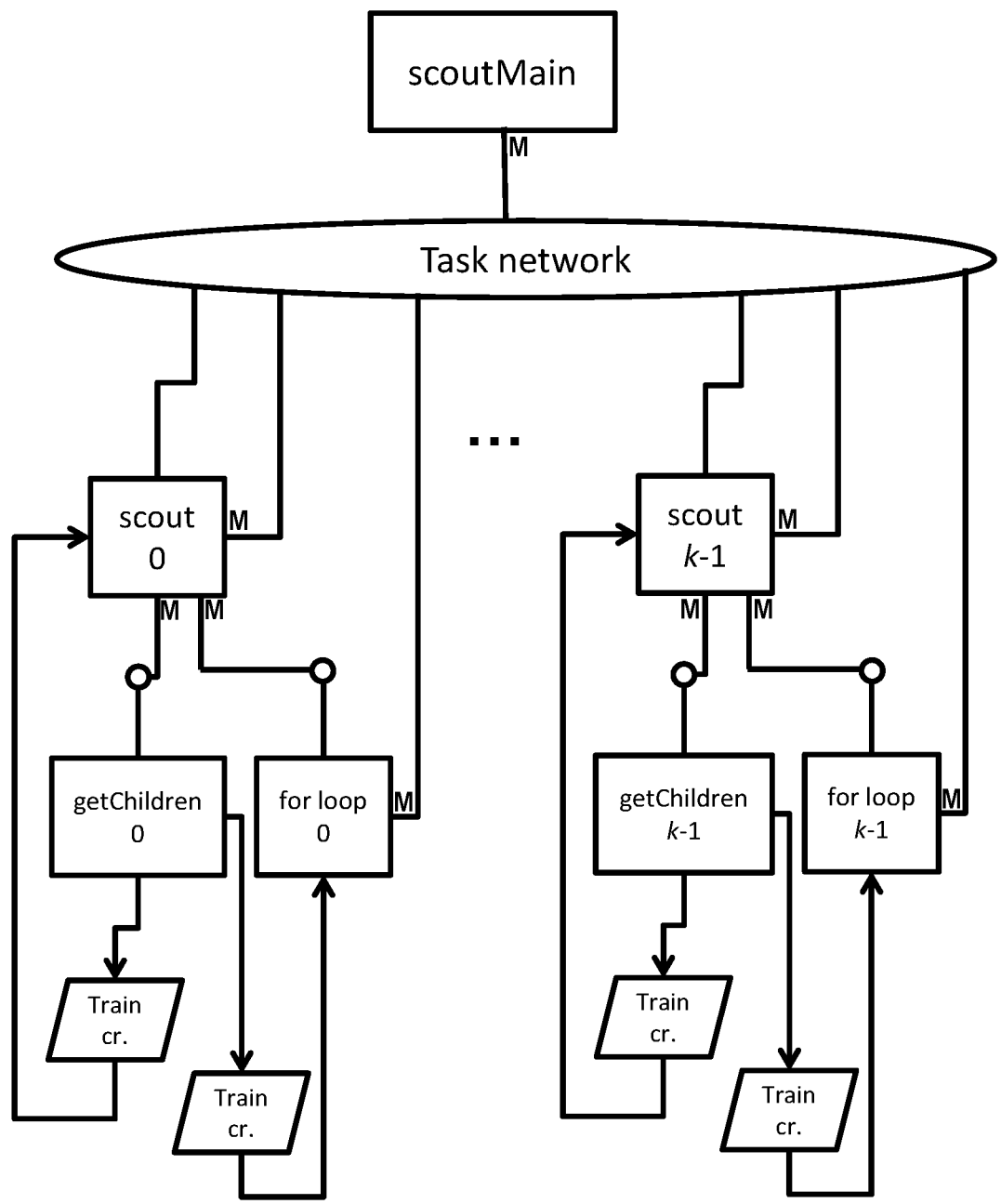
FIG 65  Hardware implementation of Alpha-Beta pruning

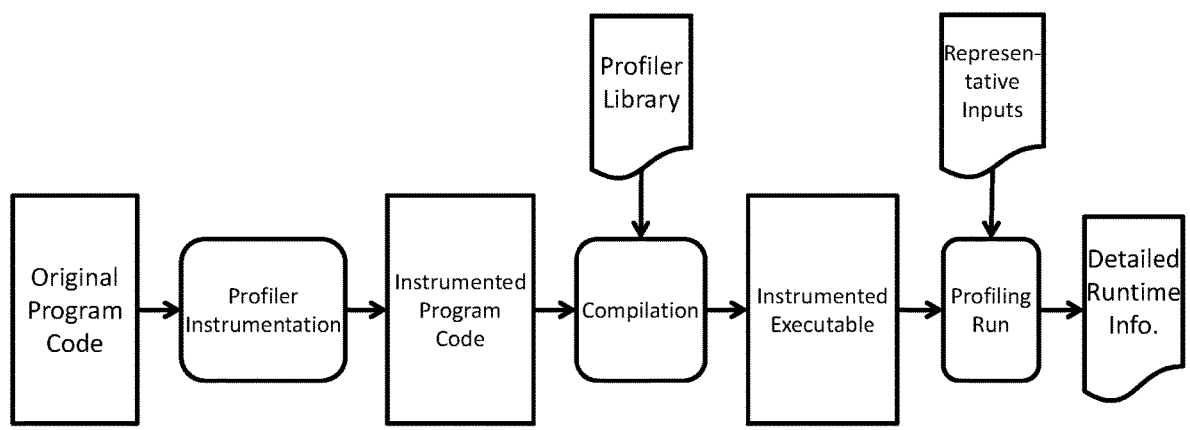
FIG 66  Steps of the Deep Profiler

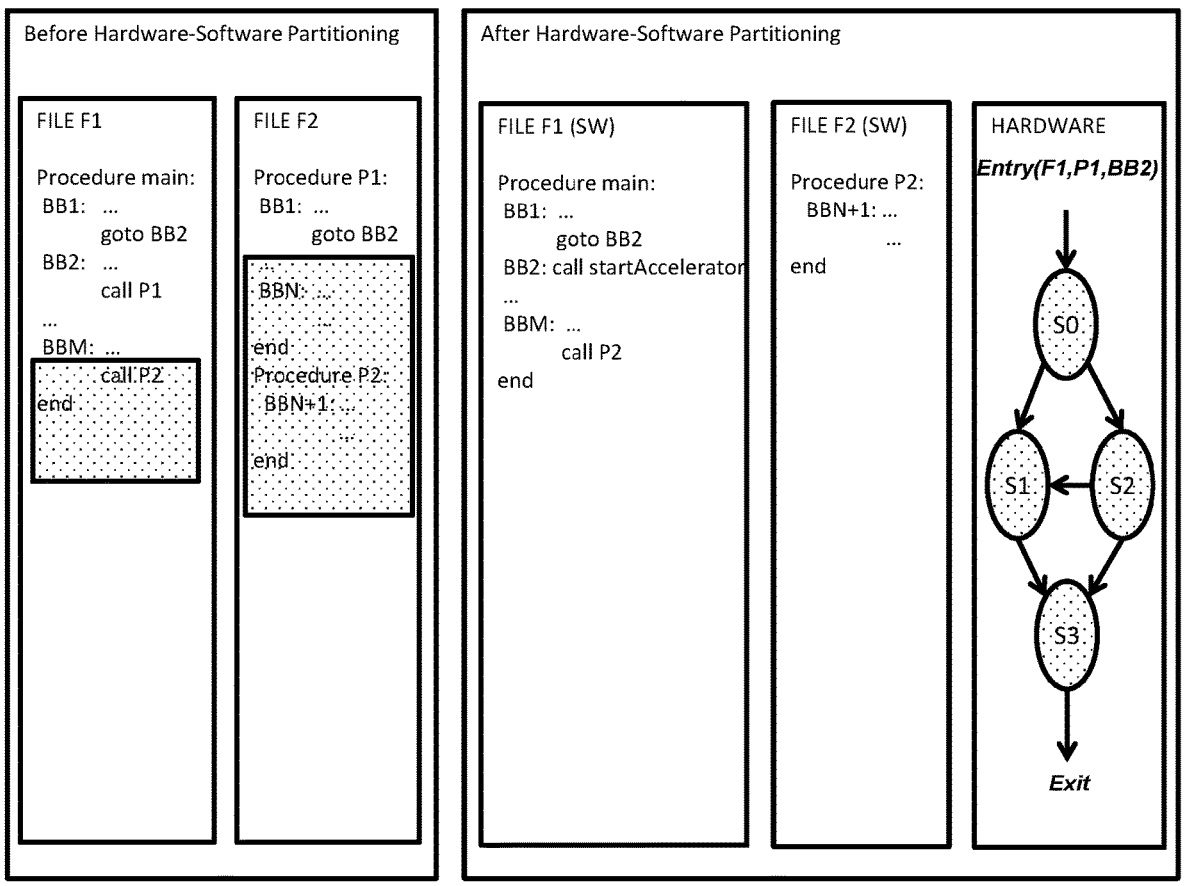
FIG 67 Partial procedure inlining across files, for hardware-software partitioning

```
procedure HW_SW_PARTITION(
  G,
  AREA_LIMIT,
  TIME_PERCENTAGE,
  WEIGHT_THRESHOLD
)
  area ← 0
  time ← 0
  HW_BBs ← ∅
  SW_BBs ← G.vertices
  while area < AREA_LIMIT and  time < TIME_PERCENTAGE  do
    seed ← find a the software BB with highest execution time
    HW_BBs ← HW_BBs ∪ {seed}
    SW_BBs ← SW_BBs - {seed}
    area ← area + area(seed)
    time ← time + profiler.timestatistics(seed)
    while ∃n' ∈ SW_BBs such that
       ∃e ∈ G.edges that connects n' and
       a hardware basic block and
       the total weight of the edges
       between n' and HW_BBs > WEIGHT_THRESHOLD
    do
      HW_BBs ← HW_BBs ∪ {n'}
      SW_BBs ← SW_BBs - {n'}
      area ← area + area(n')
      time ← time + profiler.timestatistics(n')
    done
  done
```

FIG 68  Algorithm for hardware-software partitioning

```
procedure SYMBOLICEXECUTION(CFG)
  BBs ← findBasicBlocks(CFG)
  Loops ← findLoops(CFG)
  // set of induction variables discovered by the algorithm
  indVars ← ∅
  repeat  // fixed-point computation loop
    // induction variables discovered at current iteration
    newIndVars ← ∅
    for all L ∈ Loops do
      // union of program facts at loop entry edges of loop L
      FL ← unionForwardEdges(L)
      // union of program facts at loop back edges of loop L
      BL ← unionBackwardEdges(L)
      for all (*addr = valF) ∈ FL such that isScalar(addr) do
        // a scalar variable with value valF at loop entry
        // and with value valB at loop exit
        valB ← BL.lookup(addr)
        if valF ≠ valB and addr ∉ indVars then
          // if valF and valB are not equal and
          // the variable is not already discovered as an
          // induction variable at an earlier iteration then
          // this variable must be a new induction variable
          newIndVars ← newIndVars ∪ {addr}
        end if
      end for
      if newIndVars ≠ ∅ then
        // if there are any new induction variables found
        for all b ∈ BBs in and after L in reverse post order do
          // evaluate rest of the program to propagate frozen
          // values of newly discovered induction variables
          evaluateBasicBlockSymbolic(b)
        end for
      end if
    end for
    indVars ← indVars ∪ newIndVars
    // continue iterating as long as there are
    // new induction variables discovered
  until newIndVars ← ∅
end procedure
```

FIG 69 Algorithm for symbolic execution

```
1:  i=0
    // State={true, i↦0}
2:  while(i<M) do
       // Predicate={v1<M},
       // State={i↦v₁}
3:     j=0
       // Predicate={v1<M},
       // State={i↦v₁,j↦0 }
4:     while(j<N) do
          // Predicate={v₁<M, v₂<N},
          // State={i↦v₁, j↦v₂ }
5:        A[i][j]=A[i][j+4]+1
          // Predicate={v₁<M, v₂<N},
          // State={i↦v₁, j↦v₂, A[v₁][v₂]↦A[v₁][v₂+4]+1 }
6:        j=j+1
          // Predicate={v₁<M, v₂<N},
          // State={i↦v₁, j↦v₂+1, A[v₁][v₂]↦A[v₁][v₂+4]+1 }
7:     done
       // Predicate={v₁<M, v₂'≥N},
       // State={i↦v₁, j↦v₂+1, A[v₁][v₂]↦A[v₁][v₂+4]+1 }
8:     i=i+1
       // Predicate={v₁<M, v₂'≥N},
       // State={i↦v₁+1, j↦v₂+1, A[v₁][v₂]↦A[v₁][v₂+4]+1 }
9:  done
    // Predicate={v'₁≥M, v₂'≥N},
    // State={i↦v₁+1, j↦v₂+1, A[v₁][v₂]↦A[v₁][v₂+4]+1 }
10: k=0
    // Predicate={v₁'≥M, v₂'≥N},
    // State={i↦v₁+1, j↦v₂+1, A[v₁][v₂]↦A[v₁][v₂+4]+1, k↦0 }
11: while(k<N) do
       // Predicate={v₁'≥M, v₂'≥N, v₃<N},
       // State={i↦v₁+1, j↦v₂+1, A[v₁][v₂]↦A[v₁][v₂+4]+1,
       // k↦v₃ }
12:    B[k]=k
       // Predicate={v₁'≥M, v₂'≥N, v₃<N},
       // State={i↦v₁+1, j↦v₂+1, A[v₁][v₂]↦A[v₁][v₂+4]+1,
       // k↦v₃ , B[v₃]↦v₃ }
13:    k=k+1
       // Predicate={v₁'≥M, v₂'≥N, v₃<N},
       // State={i↦v₁+1, j↦v₂+1, A[v₁][v₂]↦A[v₁][v₂+4]+1,
       // k↦v₃+1 , B[v₃]↦v₃ }
14: done
    // Predicate={v₁'≥M, v₂'≥N, v₃'≥N},
    // State={i↦v₁+1, j↦v₂+1, A[v₁][v₂]↦A[v₁][v₂+4]+1,
    // k↦v₃+1 , B[v₃]↦v₃ }
```

FIG 70 Symbolic execution example

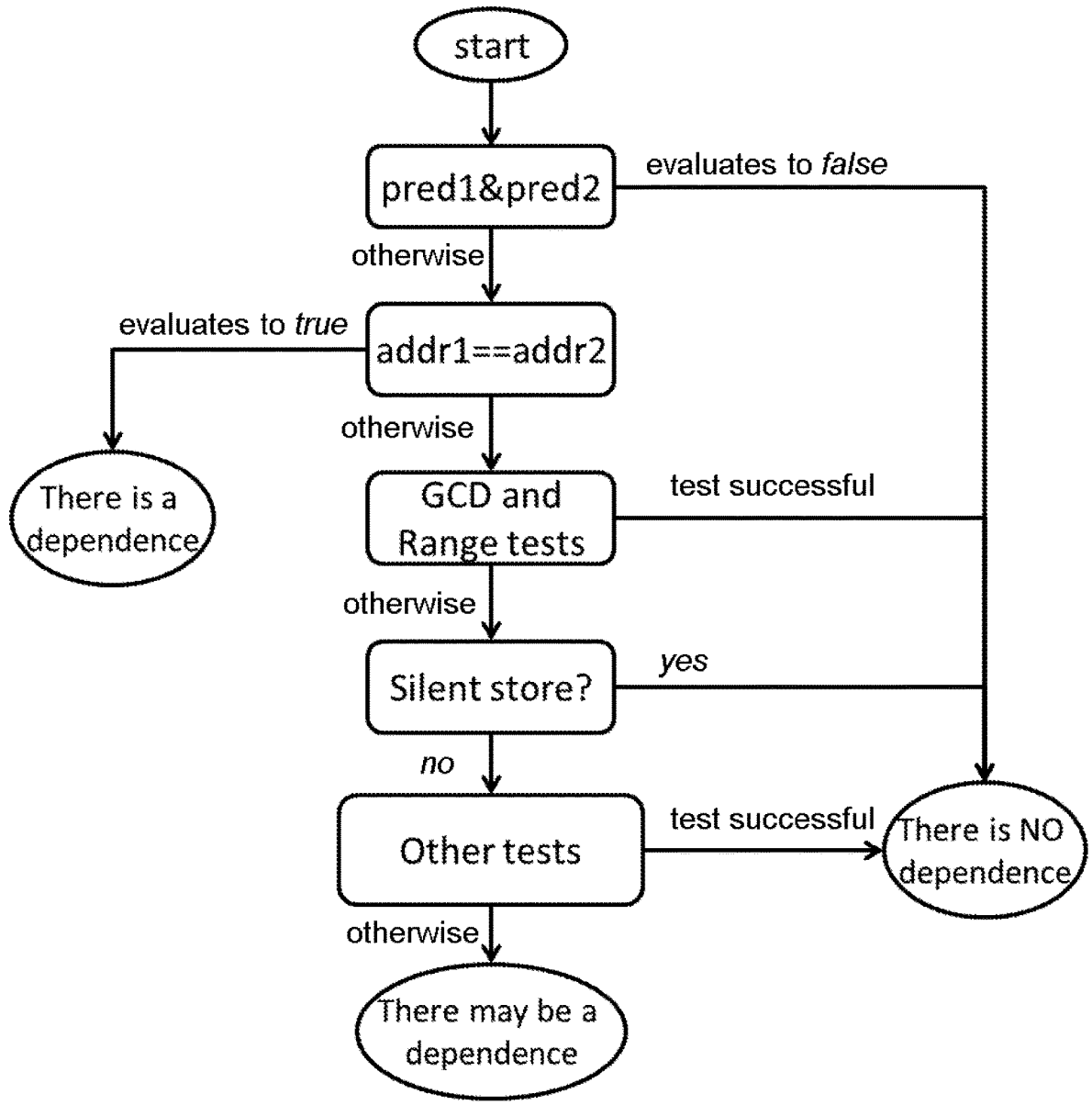
FIG 71 Algorithm for dependence analysis

METHOD AND SYSTEM FOR CONVERTING A SINGLE-THREADED SOFTWARE PROGRAM INTO AN APPLICATION-SPECIFIC SUPERCOMPUTER

This application claims priority, as a continuation application, to U.S. patent application Ser. No. 17/411,116 filed on Aug. 25, 2021, now U.S. Pat. No. 11,579,854, which claims priority, as a continuation application, to U.S. patent application Ser. No. 16/819,405 filed on Mar. 16, 2020, now U.S. Pat. No. 11,132,186, which claims priority, as a continuation application, to U.S. patent application Ser. No. 16/166,164 filed on Oct. 22, 2018, now U.S. Pat. No. 10,642,588, which claims priority, as a continuation application, to U.S. patent application Ser. No. 15/257,319 filed on Sep. 6, 2016, now U.S. Pat. No. 10,146,516, which claims priority, as a continuation application, to U.S. patent application Ser. No. 14/581,169 filed on Dec. 23, 2014, now U.S. Pat. No. 9,495,223, which claims priority, as a continuation application, to U.S. patent application Ser. No. 13/296,232 filed on Nov. 15, 2011, now U.S. Pat. No. 8,966,457. Ser. Nos. 17/411,116, 16/819,405, 16/166,164, 15/257,319, 14/581,169, 13/296,232, U.S. Pat. No. 11,132,186, 10,642,588, 10,146,516, 9,495,223 and 8,966,457 are hereby incorporated by reference.

REFERENCES CITED

Related co-pending, co-owned US patent:

| U.S. patent application Ser. No. | Date | Title | Inventors | Assignee |
|---|---|---|---|---|
| Non provisional application Ser. No. 13/156,881 | Filed Jun. 9, 2011 | Storage unsharing | Kultursay et al. | Global Super-computing Corporation |

U.S. Patents

| U.S. Pat. No. | Date | Title | Inventors | Assignee |
|---|---|---|---|---|
| 7,111,274 B1 | September 2006 | Scheduling hardware generated by High-Level Language compilation to preserve functionality of source code design implementation | Edwards et al. | Xilinx, Inc. |
| 7,315,991 B1 | January 2008 | Compiling HLL into massively pipelined systems | Bennett | Xilinx, Inc. |
| 7,409,670 B1 | August 2008 | Scheduling logic on a programmable device implemented using a high-level language | Pritchard et al. | Altera Corporation |
| 7,219,342 B2 | May 2007 | Software to hardware compiler | Metzgen | Altera Corporation |
| 7,761,687 B2 | July 2010 | Ultrascalable petaflop parallel supercomputer | Blumrich et al. | International Business Machines Corporation |
| 7,577,822 B2 | August 2009 | Parallel task operation in processor and reconfigurable coprocessor configured based on information in link list including termination information for synchronization | Vorbach | Pact XPP Technologies AG |
| 2008/0120497 | May 2008 | Automated configuration of a processing system using decoupled memory access and computation | Chai et al. | Motorola, INC. |
| 2009/0006769 | January 2009 | Programmable partitioning for high-performance coherence domains in a multiprocessor system | Blumrich et al. | International Business Machines Corporation |
| 5,761,515 | June 1998 | Branch on cache hit/miss for compiler assisted delay tolerance | Barton III et al. | International Business Machines Corporation |
| 6,031,992 | February 2000 | Combining hardware and software for providing an improved processor | Cmelik et al. | Transmeta Corporation |
| 5,542,075 | July 1996 | Method and apparatus for improving performance of out of sequence load operations in a computer system. | Ebcioglu et al. | International Business Machines Corporation |
| 5,386,562 | January 1995 | Circular scheduling method and apparatus for executing computer programs by moving independent instructions out of a loop | Jain et al. | MIPS Computer Systems, Inc. |

OTHER PUBLICATIONS

[1] M. V. Wilkes, J. B. Stringer, 1953. Microprogramming and the design of the control circuits in an electronic digital computer. Proc. Cambridge Phil. Soc., pt. 2, vol. 49, pp. 230-238, April, 1953. http://researchn.micrsoft.com/en-us/um/people/gbell/computer_structures_principles_and_examples/csp0174.htm

[2] Joseph A. Fisher, 1979. Optimization of horizontal microcode within and beyond basic blocks. An application of processor scheduling with resources. Courant Mathematics and Computing Laboratory. Department of Energy report COO-1077-161. October 1979. http://www.archive.org/stream/optimizationofho00fish

[3] P. P. Chang, S. A. Mahlke, W. Y. Chen, N. J. Warter, and W. W. Hwu, "IMPACT: An Architectural Framework for Multiple-Instruction-Issue Processors", in Proc. ISCA, 1991, pp. 266-275.

[4] Scott A. Mahlke, David C. Lin, William Y. Chen, Richard E. Hank, Roger A. Bringmann. Effective compiler support for predicated execution using the hyperblock. In Proceedings of MICRO'1992. pp. 45-54

[5] M. Budiu, G. Venkataramani, T. Chelcea, and S. C. Goldstein, "Spatial computation", in Proc. ASPLOS, 2004, pp. 14-26.

[6] G. S. Sohi, S. E. Breach, and T. N. Vijaykumar, "Multiscalar Processors", in Proc. ISCA, 1995, pp. 414-425.

[7] K. Ebcioğlu. A Compilation Technique for Software Pipelining of Loops with Conditional Jumps. Proc. 20th Workshop on Microprogramming, pp. 69-79, ACM Press, December 1987.

[8] K. Ebcioğlu. Some Design Ideas for a VLIW Architecture for Sequential Natured Software. Parallel Processing (Proc. IFIP WG 10.3 Working Conference on Parallel Processing), M. Cosnard, M. H. Barton, M. Vanneschi (eds.), pp. 3-21, North Holland, 1988. http://global-supercomputing.com/people/kemal.ebcioglu/pdf/Ebeioglu-IFIP88.pdf

[9] K. Ebcioğlu and R. Groves, Some Global Compiler Optimizations and Architectural Features for Improving Performance of Superscalars, Research Report no. RC16145, IBM T. J. Watson Research Center, Yorktown Heights, N Y, 1990. (Presented at the ICCD-1990 conference). http://global-supercomputing.com/people/kemal.ebcioglu/pdf/RC16145.pdf

[10] S. M. Moon, K. Ebcioğlu. Parallelizing Non-Numerical Code with Selective Scheduling and Software Pipelining. ACM Transactions on Programming Languages and Systems, November 1997, Vol. 19, No. 6, pp. pp. 853-898, ACM Press.

[11] K. Ebcioğlu and T. Nakatani, A New Compilation Technique for Parallelizing Loops with Unpredictable Branches on a VLIW Architecture. In Languages and Compilers for Parallel Computing, D. Gelernter, A. Nicolau, and D. Padua (eds.), Research Monographs in Parallel and Distributed Computing, pp. 213-229, MIT Press, 1990.

[12] João M. P. Cardoso, Pedro C. Diniz. Compilation Techniques for Reconfigurable Architectures. Springer, 2008. 223 p.

[13] R. M. Tomasulo. An Efficient Algorithm for Exploiting Multiple Arithmetic Units, IBM Journal of Research and Development, 11(1):25-33, January 1967

[14] K. Sankaralingam, R. Nagarajan, P. Gratz, R. Desikan, D. Gulati, H. Hanson, C. Kim, H. Liu, N. Ranganathan, S. Sethumadhavan, S. Sharif, P. Shivakumar, W. Yoder, R. McDonald, S. W. Keckler, and D. C. Burger. "The Distributed Microarchitecture of the TRIPS Prototype Processor," 39th International Symposium on Microarchitecture (MICRO), December, 2006.

[15] Keith D. Cooper and John Lu. Register Promotion in C Programs. Proc. ACM SIGPLAN Conf Programming Language Design and Implementation (PLDI-97), 1997, pp. 308-319, ACM Press.

[16] Kevin B. Theobald, Guang R. Gao, and Laurie Hendren. On the limits of program parallelism and its smoothability. Proc. MICRO-25, 1992, pp. 10-19.

[17] K. Ebcioğlu, E. R. Altman, S. Sathaye, and M. Gschwind. Optimizations and Oracle Parallelism with Dynamic Translation. Proc. MICRO-32, Haifa, Israel, December 1999.

[18] Lawrence Livermore National Labs POSIX threads tutorial. https://computing.llnl.gov/tutorials/pthreads/

[19] C-to-HDL. Wikipedia article. http://en.wikipedia.org/wiki/C_to_HDL

[20] David J. Kuck. The structure of computers and computations. Wiley, 1978. 511 p.

[21] D. A. Padua, D. J. Kuck, and D. H. Lawrie, "High-Speed Multiprocessors and Compilation Techniques", IEEE Trans. Computers, 1980, pp. 763-776.

[22] Milind Girkar and Constantine D. Polychronopoulos, Automatic Extraction of Functional Parallelism from Ordinary Programs. IEEE transactions on parallel and distributed systems, Vol. 3, No. 2, March 1992, pp. 166-178.

[23] E. Dijkstra. Cooperating Sequential Processes. 1965. EWD 123. http://www.cs.utexas.edu/~EWD/transcriptions/EWD01xx/EWD123.html

[24] G. Lee, C. P. Kruskal, and D. J. Kuck, "The Effectiveness of Automatic Restructuring on Nonnumerical Programs", in Proc. ICPP, 1985, pp. 607-613.

[25] Frances Allen, Michael Burke, Ron Cytron, Jeanne Ferrante, Wilson Shieh, Vivek Sarkar, A framework for determining useful parallelism. Proc. Second International Conference on Supercomputing, ICS 88, ACM, New York. Pp. 207-215.

[26] J. Ferrante, K. Ottenstein, and K. Warren. The program dependence graph and its use in optimization. ACM Transactions on Programming Languages and Systems. Pp. 319-349. July 1987.

[27] J. Llosa, A. Gonzalez, E. Ayguade, and M. Valero. Swing Modulo Scheduling: a lifetime-sensitive approach. Proc. PACT '96.

[28] Wikipedia. Prefix Sum article. http://en.wikipedia.org/wiki/Prefix_sum

[29] Wikipedia. Loop Splitting article. http://en.wikipedia.org/wiki/Loop_splitting

[30] Wikipedia. Hypergraph article. http://en.wikipedia.org/wiki/Hypergraph

[31] Engin Demir, Cevdet Aykanat, B. Barla Cambazoglu. Clustering spatial networks for aggregate query processing: A hypergraph approach. Information Systems 33 (2008) 1-17. http://www.cs.bilkent.edu.tr/~aykanat/papers/08IS.pdf

[32] High Performance Fortran Forum. High Performance Fortran Language Specification. Version 2.0. Jan. 31, 1997. http://hpff.rice.edu/versions/hpf2/hpf-v20.pdf

[33] Emre Ozer, Sanjeev Banerjia, Thomas M. Conte. Unified assign and schedule: A new approach to scheduling for clustered register file architectures. MICRO 1998, pp. 308-315

[34] Krishnan Kailas, Kemal Ebcioğlu, Ashok Agrawala: A New Code Generation Framework for Clustered ILP Processors. Proc. Seventh International Symposium on High Performance Computer Architecture (HPCA-7), pp. 133-143, Monterrey, Mexico, January 2001.

[35] Wikipedia, Dominator article. http://en.wikipedia.org/wiki/Dominator_(graph_theory)

[36] Judea Pearl. Asymptotic properties of minimax trees and game-searching procedures. Artificial Intelligence, 14 (2), pages 113-138, September 1980.

[37] Bradley C. Kuszmaul, Synchronized MIMD computing, PhD thesis, MIT, May 1994.

[38] J. M. Borkenhagen, R. J. Eickemeyer, R. N. Kalla, and S. R. Kunkel. 2000. A multithreaded PowerPC processor for commercial servers. IBM J. Res. Dev. 44, 6 (November 2000), 885-898.

[39] Supercomputing Technologies Group. Cilk 5.4.6 Reference Manual. Supercomputing Technologies Group. MIT Laboratory for Computer Science. Copyright 1998, MIT. http://supertech.lcs_mit.edu/cilk

[40] G. M. Silberman and K. Ebcioğlu, An Architectural Framework for Supporting Heterogeneous Instruction-Set Architectures. IEEE Computer, Vol. 26, No. 6, June 1993, pp. 39-56.

[41] K. Ebcioğlu and E. Altman. DAISY: Dynamic VLIW Compilation for 100% Architectural Compatibility, Research Report RC20538, IBM T.J. Watson Research Center, Yorktown Heights, August 1996. 82 p. http://global-supercomputing.com/people/kemal.ebcioglu/pdf/RC20538.pdf

[42] K. Ebcioğlu and E. Altman. DAISY: Dynamic VLIW Compilation for 100% Architectural Compatibility, pp. 26-37, Proc. International Symposium on Computer Architecture (ISCA) 1997, ACM press.

[43] V. H. Allan, B. Su, P. Wijaya, and J. Wang, "Foresighted Instruction Scheduling Under Timing Constraints", IEEE Trans. Computers, 1992, pp. 1169-1172.

[44] A. D. Kshemkalyani, M. Singhal, Distributed Computing: Principles, Algorithms, and Systems, ISBN: 9780521189842, paperback edition, Cambridge University Press, March 2011. 756 pages.

[45] Silicon Graphics Inc. Origin™ and Onyx2™ Theory of Operations Manual. Document Number 007-3439-002. Copyright 1997 Silicon Graphics Inc. 108 p. http://www.futuretech.blinkenlights.nl/origin/007-3439-002.pdf

[46] MESI Protocol. Article in Wikipedia. http://en.wikipedia.org/wiki/MESI_protocol

FIELD OF THE INVENTION

The invention relates to the conversion of a single-threaded software program into an application-specific supercomputer.

BACKGROUND OF THE INVENTION

The Difficulty of Writing Parallel Programs

It is much more difficult to write parallel applications than sequential applications due to several reasons. First, identifying the available parallelism in an application requires a complete understanding of all possible interactions between the statements in the application and the semantic effects of executing these statements in parallel. Further, it is not sufficient to just identify the parts of the application that will execute in parallel, but there is also the problem of rewriting the application using parallel programming constructs. Even after a parallel version of the application is obtained, one needs to verify that this new version behaves identically to the sequential version. It is also a daunting task to verify that the generated parallel application has indeed exactly the same semantics as a sequential application. These difficulties in manual parallel programming, together with the advances in compiler technology, have led to the idea of automatic parallelization of sequential applications.

Definition of Automatic Parallelization

In automatic parallelization, a sequential program expressed using traditional sequential programming language constructs is automatically converted into its parallel equivalent by a tool called a parallelizing compiler. The process of automatic parallelization consists of a number of steps where the compiler performs various analyses and, using their results, optimizes/parallelizes the application. For instance, in order to execute parts of the application in parallel, the compiler should detect the code blocks that can be executed in parallel without violating the sequential semantics of the application. This information is obtained by performing an analysis called dependence analysis which identifies the data dependences between the statements in the application. The compiler can reorder two statements (or decide to execute them in parallel) only after verifying that two statements do not depend on each other.

Out-of-order superscalar processors [13] also perform automatic fine-grain parallelization of sequential software through hardware alone, by implementing a parallel form of a compiler algorithm in hardware, which runs continuously in real time and reorders independent instructions on the predicted path of execution, in order to achieve a shorter execution time within that predicted path.

Target System for Automatic Parallelization: General-Purpose Processors or Application-Specific Hardware Compilers that perform automatic parallelization can also be classified with respect to the system that they are targeting: general-purpose or special-purpose systems.

Automatic Parallelization for General-Purpose Processors

Much historical research has been done on automatic parallelization of sequential code [20] [21] [22]. Although some scientific codes could be automatically parallelized, automatic parallelization techniques have been less successful on general non-numerical codes [24], resulting in very little parallelism. Some compilers today, such as gcc, open64, xlc, etc., target general-purpose processors and convert sequential applications into parallel applications. Traditionally, these compilers targeted distributed multiprocessor systems; however, with the introduction of shared memory multicore processors that provide multiple processing elements and shared on-chip resources (e.g., shared caches) on a single die, the idea of automatic parallelization for general-purpose processing is being revisited. The most important difference with the new multicore systems is that, the low access latency of on-chip caches that are shared by multiple cores introduces significant improvements in the memory behavior of the system.

Automatic Parallelization for Application-Specific Hardware

The process of application-specific hardware generation from a high level program specification is known as high-level synthesis. As a result of this process, the high level representation of the program, which is expressed using a high level programming language such as C or C++, is converted into hardware which is typically expressed in a hardware description language (HDL). Hence, the process is also called C-to-HDL synthesis.

In principle, creating application-specific hardware at the register transfer level should offer the most flexibility for automatic parallelization, since the sky is the limit with what can be done using specialized hardware design. In fact, specialized hardware circuits can overcome the difficulties that have impeded progress in automatic parallelization in the past, and can be the key to success in automatic parallelization. But, at present, automatic parallelization targeting application-specific hardware has had limited success and has not yet exploited its potential advantages, in the current generation of C-to-HDL tools [12] [19]. Some shortcomings of present-day C-to-HDL tools will be summarized in the paragraph below beginning with the words "Currently, there is no C-to-HDL synthesis tool that can . . . ".

Difficulties of Automatic Parallelization

Although the idea of automatic parallelization is very simple and its advantages are clear, in reality, it is very difficult to implement effective parallelizing compilers. One important reason is that, dependence analysis of some programming language constructs is very difficult. For instance, programs that use indirect addressing, pointers, recursion, arbitrary control flow (unstructured conditional branches and loops) and indirect function calls extensively cannot be easily parallelized. Furthermore, it is also difficult to parallelize programs containing statements that access global resources, such as I/O, due to the difficulty of coordination for those resources.

Existing Tools/Approaches and Their Deficiencies

Since "supercomputer" is sometimes used as an imprecise marketing term, it is desirable to precisely define this term in the context it is used within the present specification. As used in the present specification and the appended claims, we define the term supercomputer to mean: a hardware system exhibiting substantial parallelism and comprising at least one chip, where the chips in the system are interconnected by a network and are placed in hierarchically organized enclosures.

A large hardware system filling a machine room, with several racks, each containing several boards/rack modules, each containing several chips, all interconnected by a scalable network, is one particular example of a supercomputer. A single rack of such a large hardware system is another example of a supercomputer. A single chip exhibiting substantial parallelism and containing several hardware components can equally be considered to be a supercomputer, since as feature sizes decrease in the future, the amount of hardware that can be incorporated in a single chip will likely continue to increase.

We will summarize here the earlier efforts for automatic parallelization of sequential single-threaded software, using hardware, compilers or both. We can analyze this work along the following dimensions:

Productivity benefit: Using hardware and/or a compiler, is a high level of abstraction (e.g., sequential program) automatically being converted to a lower level parallel representation (operations in the reservation stations of an out-of-order execution engine, horizontal microcode, Register Transfer Level hardware) while preserving sequential semantics?

Depth of parallelism: What is the depth of the parallelism? This can be measured as the depth of the sub-thread tree, plus 1 to account for instruction level parallelism. For example, a system consisting of a set of parallel threads and their sub-threads has depth 3.

Hedging the bets: Clearly a parallel execution system is faced with a tree of possible outcomes of future unknown events: A conditional branch is taken, or not; A load operand overlaps with a prior store operand, or not; A logically later thread reads memory locations written by a logically earlier thread, or not. Rather than waiting to know the outcome, a parallel execution system often predicts the outcome or speculates that the outcome will have a certain value, using various techniques including branch prediction, control speculation, data speculation, and value prediction. The questions to ask include: Is the predicted path through the tree of future possibilities a linear path, or is it bushier (is the parallel engine hedging its bet)? Are there global serialization points, where the world stops, when a prediction turns out to be incorrect?

Implementation of unified global memory: How efficiently is the single global memory requirement of the sequential program implemented?

Systematic hardware duplication: Studying an instruction execution trace reveals that the maximum parallelism in the trace can be higher than the number of unique instructions in the trace. Therefore an approach that allocates at most one hardware functional unit per unique instruction will be unable to reach the inherent available parallelism. Are hardware resources being systematically duplicated to address this resource bottleneck?

Currently, there is no C-to-HDL synthesis tool that can provide a comprehensive solution to the problem of converting a sequential program to an application-specific supercomputer. The analysis techniques employed in the state-of-the-art C-to-HDL synthesis tools provide very limited dependence analysis, support only a small subset of the input high-level language features, and can only be applied to programs written in a specific style. Typically, these tools can only convert small procedures into application-specific hardware. Furthermore, none of the existing tools can generate a supercomputer, i.e., do not use a method that can create parallel hardware systems scaling seamlessly from a single chip to a large system consisting of many racks. These tools are designed to generate hardware components, but not complete parallel systems. They cannot automatically generate hardware that will be distributed to multiple application-specific chips, can perform only limited memory optimizations, do not include any scalable network structures, and do not effectively utilize the potential synchronization capabilities of custom hardware. A survey of these tools is available in [12].

Prior studies on the theoretical limits of parallelism on a large sample of single-threaded sequential natured code including the SPECint benchmarks (e.g., [16][17]), have shown that:

(i) There is substantial potential parallelism in single-threaded sequential-natured code;

(ii) The longer a trace of instructions to be parallelized, the greater the potential parallelism within that trace.

Because of (ii), the number of instructions between global serialization points (i.e., points where the world stops) in the execution trace is a key factor in determining the success of a parallelization technique.

A most commonly used parallelization technique is out-of-order execution of instruction primitives through hardware [13]. This is in fact done by a parallel scheduling algorithm implemented in hardware, which runs continuously, reordering operations on the predicted execution path in real-time, to reduce the total execution time of that predicted path. The out-of-order execution paradigm is widely adopted in today's processor design. In this paradigm, while fine-grain parallelism can be obtained within the execution trace in between branch mispredictions, branch mispredictions result in a global serialization of the parallel execution. In addition, a pipeline fill overhead is incurred during branch mispredictions, taking many cycles. Run time parallelization within a high frequency out-of-order processor requires a significant amount of power, since the processor is not only executing the operations; it is also dynamically scheduling/compiling them. Large look-ahead windows (essential for achieving high parallelism) are difficult to implement at high frequency. Also, multiple loads/ stores per cycle are expensive in an out-of-order superscalar processor when the unified coherent memory model is implemented literally.

Horizontal microcode was an important invention by Maurice Wilkes [1], in effect creating a single finite state machine interpreter capable of realizing multiple finite state machines, depending on the microcode, and thus leading to hardware design productivity. The Very Long Instruction Word (VLIW) architecture proposed by Joseph A. Fisher [2] has exposed the horizontal microcode to a parallelizing compiler, thus achieving an important productivity benefit by automatically translating sequential code to the lower level horizontal microcode representation. However, Fisher's VLIW architecture and compiler created traces, or sequences of basic blocks which followed the predicted directions of conditional branches. The compiler could then schedule a trace as if it were a single big basic block, thus extracting more parallelism than the amount available in a single basic block. However, where traces were stitched together (at the entries or exits of traces), global serialization points would occur.

The hyperblock concept [4] (which influenced the Intel IA-64™ processor) converted the contents of certain if-then-else-endif statements to a particular dialect of predicated instructions (instructions executed only when a specified condition or flag register is true), therefore removing conditional branches from the instruction stream and creating longer branch-free blocks for fine-grain parallelization. However, this approach also incurred frequent global serialization when the remaining conditional branches after predication were mispredicted, when following a traditional processor pipeline design.

A general purpose parallelizing compiler should also be able to handle non-numerical codes with complex control flow (as opposed to only scientific applications). The Enhanced Pipeline Scheduling[11][10][9] (EPS) compiler scheduling technique, as well as the earlier Pipeline Scheduling [7][8] technique, provided the critical capability to software pipeline general loops with conditional jumps. Along with generalized multi-way branch support hardware for tree VLIWs with conditional execution [8], EPS avoided the branch misprediction penalty altogether within a given loop invocation, by speculatively executing operations on all paths. To conserve resources, EPS would also stop the execution of the remaining operations on a path as soon it was known that that path was not taken, and would identify each common operation occurring on multiple paths and execute it only once. However, EPS too caused global serialization at loop invocation boundaries, i.e., at the entry and exit points of both inner and outer loops.

The multiscalar architecture [6] divided the execution trace into a linear sequence of thread executions, where each thread was a program region, such as an inner or outer loop. The predicted next thread n+1 in the dynamic sequence of threads could start before thread n ended. Fine grain parallelism could also be extracted within a thread by a modified out-of-order processor. It was speculatively assumed that (i) thread n+1 was independent of thread n. (ii) the predicted next thread was indeed going to be the next one to be executed. If in fact the speculation was incorrect, a global serialization and recovery would occur.

The TRIPS architecture [14] is another important innovation, since it exposed the decoded instructions within the reservation stations of an out of order execution processor to the compiler, in a way analogous to how VLIW exposed horizontal microcode to the compiler. The TRIPS machine could execute a predicted sequence of hyperblocks just like the multiscalar architecture could execute a predicted sequence of threads in overlapped fashion. But when the prediction was incorrect, TRIPS too caused a global serialization, like the multiscalar architecture. Unlike the threads dispatched by a multiscalar processor, the TRIPS hyperblocks could not contain loops.

Mihai Budiu at al. described a method called spatial computation [5] to compile a sequential C program into asynchronous dataflow hardware units, creating about one functional unit per each operation in the original program. This method was used for reducing energy consumption. However this method also caused a global serialization at the entry and exits of each loop, due to the limitations of the particular data flow model that was used for loop representations, and due to the lack of systematic hardware duplication (necessary to extract high parallelism). This approach also implemented one global unified coherent memory literally, without partitioning.

The hierarchical task graph was described in [22], which was a compiler attempt to extract parallelism from an ordinary program within multiple hierarchical program regions. However, because this approach did not perform speculation (respected control dependences), did not spawn multiple parallel instances of program regions in a general way (necessary for high parallelism), used the cobegin-coend model of parallelism, did not extract fine grain parallelism, and used a small basic block as the minimum unit of thread-level parallelism (instead of a larger region such as a loop invocation), the maximum parallelism extracted by the hierarchical task graph on sequential-natured code was bounded. The cobegin coend (or parbegin-parend) model of parallelism [23] is a structured and elegant way to express parallelism explicitly by hand, but it in effect inserts an often unnecessary barrier synchronization among sub-statements at the end of the cobegin-coend, which causes a slowdown. The PTRAN compiler for automatic parallelization [25] also attempted to extract hierarchical parallelism from ordinary code, but suffered from the same problems. A number of independent but related efforts in the hardware research field [Edwards et al., U.S. Pat. No. 7,111,274] [Bennett, U.S. Pat. No. 7,315,991] also converted each level within the region hierarchy of a program into parallel hardware units, however, like the hierarchical task graph approach, they suffered from parallelism limitations.

The present document's method is different from the cited work, because of the following unique features:
  Productivity benefit: Along with the current advances in the compilation of high level programming languages to optimized sequential code, and the current advances in the translation of a Register Transfer Level hardware description to GDS II for an ASIC chip design; the potential productivity benefit of translating single-threaded sequential code to the Register Transfer Level representation of an application-specific supercomputer is high, since it can bridge the gap from software to parallel hardware. The present document's method can generate a customized, application-specific supercomputer, from arbitrary sequential single-threaded code, at the Register Transfer Level. The hardware system can be distributed across multiple chips.
  Depth of parallelism: While most of the cited work is limited to a parallelism nesting depth of about 2 (such as a sequence of hyperblocks, where each hyperblock contains instruction level parallelism), in the present document, program regions can become parallel threads with arbitrary nesting (involving sub-threads of sub-threads of . . . threads). Instead of using the restrictive cobegin-coend model, in the present document's method, parallel threads are spawned and are kept running for as long as possible using a spawn-and-forget model, which is unstructured as compared to cobegin/coend, but which extracts better parallelism.

Hedging the bets: While the cited work relies on a speculation that a predicted sequence of instructions or instruction groups will be executed, in the present document's method, there is no linear predicted sequential order between threads. Program regions at any level of the region hierarchy run independently when their operands are ready, and handle their own internal serializations within their hierarchical region, without stopping the rest of the world. Branch misprediction penalties are avoided, through speculation on all paths when dependences and resources permit.

Implementation of global unified memory: The present document's method partitions memory hierarchically, to enable high memory parallelism, to avoid expensive coherence hardware and to enable the generation of specialized memories, while remaining semantically equivalent to the unified coherent memory model of sequential code.

Systematic hardware duplication: The present document's method contains a number of highly specialized hardware synchronization units and a unique hierarchical software pipelining algorithm, which systematically duplicates hardware as a way to address the resource bottleneck mentioned above.

SUMMARY OF THE INVENTION

The invention comprises (i) a compilation method for automatically converting a single-threaded software program into an application-specific supercomputer, and (ii) the supercomputer system structure generated as a result of applying this method. The compilation method comprises:

a. Converting an arbitrary code fragment from the application into customized hardware whose execution is functionally equivalent to the software execution of the code fragment; and b. Generating interfaces on the hardware and software parts of the application, which:
i. Perform a software-to-hardware program state transfer at the entries of the code fragment;
ii. Perform a hardware-to-software program state transfer at the exits of the code fragment; and
iii. Maintain memory coherence between the software and hardware memories.

The key phases of the method are summarized below:

Initial Phases and Hierarchical Software Pipelining

Starting from optimized sequential code produced by an ordinary optimizing compiler for a high level language program, a code fragment to convert to hardware is identified through a hardware-software partitioning algorithm. Then, hierarchical regions (such as loops, begin-end blocks) within the said code fragment are identified. Dependence analysis is done. Then hierarchical software pipelining is performed, enabling systematic duplication of hardware resources to achieve parallelism, as follows:

Each leaf region in the region hierarchy of the code fragment is converted to a pipelined hardware finite state machine.

At least one copy of the finite state machine is created for the said region, and a scalable network is added for communication with the state machines, such that the combined finite state machine copies and network behave as a single pipelined primitive operation for performing the function of the region.

The previous two steps are recursively applied bottom-up to the region hierarchy of the program, so that at each point where a parent region invokes a child region in the software execution, the finite state machine for the parent region initiates the primitive pipelined operation for the child region in the hardware execution.

The overall system is then created from the said finite state machines, scalable networks, memory/cache structures, and unique hardware synchronization units, which enforce the sequential program semantics using parallel hardware.

Design Partitioning

If the resulting hardware design is large, it is divided into partitions such that each partition can fit into a single chip (or a single hardware module).

Chip Unioning

To reduce the non-recurring expenses for an ASIC implementation, such as mask expenses, a single union chip is created which can realize any of the partitions.

Runtime Memory Coherence

The system also includes a connection to a host processor. During the operation of this system, a runtime coherence protocol keeps the memory on the host machine and the memory on the generated application-specific hardware coherent.

This invention includes several compiler optimizations that existing approaches to automatic parallelization do not have. By targeting application-specific hardware, high efficiency and low overhead implementations of these optimizations and mechanisms are realized.

BRIEF DESCRIPTION OF THE DRAWINGS

FIG. 1 Illustrates the supercomputer system hierarchy at the chip level.

FIG. 2 Illustrates the supercomputer system hierarchy at the rack module level.

FIG. 3 Illustrates the supercomputer system hierarchy at the rack level.

FIG. 4 Illustrates the supercomputer system hierarchy at the whole system level.

FIG. 5 Illustrates the components, networks and external communication devices within a chip. It also illustrates the master and slave ports.

FIG. 6 Illustrates a standard 8 input 8 output butterfly sub-network (PRIOR ART).

FIG. 7 Illustrates an example of an incomplete butterfly sub-network used by the invention.

FIG. 8 Illustrates a task sub-network organized as a 1-dimensional torus.

FIG. 9 Illustrates a task sub-network organized as a 2-dimensional torus.

FIG. 10 Illustrates the sending FIFO and receiving FIFO interfaces.

FIG. 11 Illustrates a building block of a quiescence detection circuit.

FIG. 12 Illustrates a quiescence detection circuit for an outer loop spawning multiple instances of an inner loop.

FIG. 13 Illustrates the request packet format of custom networks within the supercomputer.

FIG. 14 Illustrates the response packet format of custom networks within the supercomputer.

FIG. 15 Illustrates an example of the hierarchical software pipelining idea.

FIG. 16 Illustrates a memory hierarchy example with coherent private L1 caches.

FIG. 17 Illustrates a memory hierarchy example with no L1 caches and bank-interleaved L2 caches, suitable for applications with low locality of reference.

FIG. 18 Provides the RandomAccess C program, which is used as a running example.

FIG. 19 Illustrates a complete flat design for RandomAccess before partitioning.

FIG. 20 Describes the host-accelerator communication protocol.

FIG. 21 Provides the sequential intermediate code and C code for the RandomAccess inner loop.

FIG. 22 Shows the RandomAccess inner loop after Enhanced Pipeline Scheduling (EPS) stage 1.

FIG. 23 Shows the RandomAccess inner loop after Enhanced Pipeline Scheduling (EPS) stage 2.

FIG. 24 Shows the RandomAccess inner loop after Enhanced Pipeline Scheduling (EPS) stage 3 (last stage).

FIG. 25 Shows the RandomAccess inner loop final Tree VLIWs with conditional execution.

FIG. 26 Shows the Verilog module for RandomAccess inner loop, part 1 of 7 (I/O pins of module).

FIG. 27 Shows the Verilog module for RandomAccess inner loop, part 2 of 7 (register declarations).

FIG. 28 Shows the Verilog module for RandomAccess inner loop, part 3 of 7 (Finite State Machine).

FIG. 29 Shows the Verilog module for RandomAccess inner loop, part 4 of 7 (Finite State Machine, continued).

FIG. 30 Shows the Verilog module for RandomAccess inner loop, part 5 of 7 (Finite State Machine, continued).

FIG. 31 Shows the Verilog module for RandomAccess inner loop, part 6 of 7 (Finite State Machine, combinatorial FIFO handshaking outputs).

FIG. 32 Shows the Verilog module for RandomAccess inner loop, part 7 of 7 (quiescence detection circuit for the memory and parent loop networks).

FIG. 33 Illustrates the partition 0 of 2, within RandomAccess.

FIG. 34 Illustrates the partition 1 of 2 within RandomAccess.

FIG. 35 Illustrates the partition 2 of 2 within RandomAccess.

FIG. 36 Illustrates the results of chip unioning applied to the partitioned RandomAccess example.

FIG. 37 Provides the global component to local component map within the RandomAccess union chip.

FIG. 38 Provides the routing tables to be used within the RandomAccess union chip.

FIG. 39 Shows an example for register promotion based on write update cache coherence protocol.

FIG. 40 Shows a code example for hierarchical memory partitioning.

FIG. 41 Illustrates the memory address space hierarchy for the code example.

FIG. 42 Illustrates a memory node implementation with private coherent caches.

FIG. 43 Illustrates a memory node implementation with shared bank-interleaved caches.

FIG. 44 Illustrates a memory node implementation with shared bank-interleaved caches (data array external).

FIG. 45 Illustrates an implementation of the memory hierarchy example.

FIG. 46 Illustrates a train crash hazard prevention circuit, part 1 of 2.

FIG. 47 Illustrates a train crash hazard prevention circuit, part 2 of 2.

FIG. 48 Illustrates a serialization circuit, part 1 of 2.

FIG. 49 Illustrates a serialization circuit, part 2 of 2.

FIG. 50 Shows a program example using dynamic thread sequence numbers.

FIG. 51 Illustrates the hardware implementation of the program example using dynamic thread sequence numbers.

FIG. 52 Shows the Eratosthenes's sieve program.

FIG. 53 Illustrates the hardware implementation of Eratosthenes's sieve program.

FIG. 54 Shows the Bubble Sort Program.

FIG. 55 Illustrates the hardware implementation of Bubble sort with train crash synchronization only.

FIG. 56 Shows the Bubble sort algorithm, to be implemented with cascaded filters.

FIG. 57 Illustrates the implementation of Bubble sort with cascaded filters.

FIG. 58 Illustrates a resource sharing example, before merging the F and G functions.

FIG. 59 Illustrates the resource sharing example, after merging the F and G functions.

FIG. 60 Flat design for a compiler-friendly general purpose supercomputer.

FIG. 61 Union chip for the compiler-friendly general purpose supercomputer.

FIG. 62 Shows the program examples with recursive N-queens.

FIG. 63 Illustrates the hardware implementation of recursive N-queens.

FIG. 64 Recursive sequential algorithm for Alpha-Beta pruning

FIG. 65 Hardware implementation of Alpha-Beta pruning

FIG. 66 Illustrates the Steps of the Deep Profiler.

FIG. 67 Illustrates the partial inlining process for hardware software partitioning.

FIG. 68 Illustrates the hardware software partitioning algorithm.

FIG. 69 Illustrates the algorithm for symbolic execution.

FIG. 70 Illustrates a code example on which symbolic execution is done.

FIG. 71 Illustrates the dependence analysis algorithm.

DESCRIPTION OF THE PREFERRED EMBODIMENT

We are about to describe the details a method to automatically convert a single-threaded software program into an application-specific supercomputer, where the method comprises:
- a. Converting an arbitrary code fragment from the application into customized hardware whose execution is functionally equivalent to the software execution of the code fragment; and
- b. Generating interfaces on the hardware and software parts of the application, which:
  - i. Perform a software-to-hardware program state transfer at the entries of the code fragment;
  - ii. Perform a hardware-to-software program state transfer at the exits of the code fragment; and
  - iii. Maintain memory coherence between the software and hardware memories.

We will also describe the application-specific supercomputer system produced by the method in detail. Since the field of compiling arbitrary single-threaded software to an application-specific supercomputer is new, we have provided plenty of detail in the present document.

The preferred embodiment is organized in four major parts, as follows:
1. Structure of the customized supercomputer hardware: We describe our baseline application-specific supercomputer architecture at the structural level, including:
    The entire supercomputer system,
    19 inch racks,
    19 inch boards/modules within the racks,
    FPGA/ASIC chips on the modules,
    The pinout and internal operation of each kind of hardware unit within the chips,
        Incomplete butterfly sub-networks
        Task sub-networks
        Quiescence detection circuits
        Customized thread units
        Data cache units and memory hierarchy
        I/O controllers and the incomplete hypercube network for cross-chip communication,
        PCI Express interface for host processor-accelerator communication.
    The host processor communication interface.
    We also describe the algorithm that, given a sequential program's customized thread units as input, instantiate and connect the components at the top level.
    This completes the top level structural design of the customized hardware hierarchy for a sequential program.
2. Compiling the sequential code into customized hardware thread units: We then describe the algorithms to create the customized pipelined thread units from a given program:
    We give the fundamental correctness rules of parallelism, i.e., program dependences within a sequential program which a parallel hardware version of the same should satisfy.
    We then describe hierarchical software pipelining, a compilation technique to create an application-specific supercomputer from a sequential program within the paradigm described above, such that the parallel hardware execution does satisfy all the program's dependences, and is a functionally 100% compatible replacement for the software execution of the same sequential program.
    We describe the compiler techniques to obtain the customized pipelined thread units of the supercomputer hardware at the register transfer level, from hierarchical regions within an arbitrary sequential software program.
    Together with the top-level structural design algorithm above, this completes the description of the baseline application-specific supercomputer design and its compilation. However, this design may be too large to fit on a single chip.
3. Partitioning large designs: To handle designs that do not fit on a single chip, we describe techniques to:
    partition a large design into multiple chips, and
    finally create a "union" chip that can realize any one of the partitions of the design, for achieving reduced Non-Recurring Expenses, such as ASIC mask expenses, when building the hardware.
    This completes all the steps to convert a sequential program into a baseline application specific supercomputer.
4. Optimizations: We then describe a number of optimizations and additional applications of the baseline application-specific supercomputing system and the associated compilation techniques.

Structure of the customized supercomputer hardware
Supercomputer System Architecture As a result of applying the method in this document, a supercomputer system that is specifically configured according to the needs of the application is constructed. The supercomputer system hierarchy, from the leaves to the root, consists of:
  i. Logic chips (FPGA or ASIC) and DRAM units (e.g., DRAM memory chips following the DDRn standard, organized within Dual Inline Memory Modules),
  ii. 19" rack modules,
  iii. 19" racks, and
  iv. The complete supercomputing system.

We are describing here only the key hardware modules pertaining to achieving high performance computation, and not the usual known components that should be part of the system to make it function, such as power supplies.

Referring to FIG. 1, inside an FPGA or ASIC chip, the main computation is performed within finite state machines (101) called thread units. The task and synchronization networks (102) connect the finite state machines and are used to dispatch threads and execute operations in correct order. A multi-level partitioned on-chip cache hierarchy (103, 104) is accessed using memory networks (105, 106). The off-chip memory is accessed using memory controllers (107) and an off-chip memory network (108). The I/O controller (108) is used for cross-chip communication when the design does not fit in a single logic chip.

Referring to FIG. 2, within a rack module, there are multiple FPGA or ASIC chips (201) that are connected to one or more DRAM units (202) which constitute the main accelerator memory. Each FPGA/ASIC chip is connected to its neighbor FPGA/ASIC chip using wide busses on the board, with differential high speed signaling (203). Each FPGA/ASIC chip is also connected to at least one high-speed serial communication cable.

Referring to FIG. 3 and FIG. 4, between the rack modules in a rack and across racks throughout the entire system, high-speed serial optical or copper cables (301, 401) are used to realize a scalable, possibly incomplete hypercube network[1]. One of the FPGA/ASIC chips of the accelerator is connected to a host system through a PCI-Express connection (402). The host system comprises a host microprocessor (403) that the software part of the application runs on and a memory consisting of one or more host memory DRAM units (404) that is kept coherent with the memory on the accelerator. The host system can be a separate 19 inch module on one of the racks, or can be integrated with one of the supercomputer's 19 inch modules.

[1] While we will focus solely on incomplete hypercube networks in this document for simplicity of presentation, a single FPGA or ASIC chip may not have enough communication links to create a hypercube network for a large supercomputer. In this case the cube-connected cycles topology provides a solution. A small group of FPGA/ASIC chips on a rack module can act as a single hypercube node, such that the total number of external links of each group is increased, compared to a single chip. For example, assume the group contains chips A, B, C and D on a rack module with internal wide differential busses connecting A, B, C and D In a torus organization. Assume that there are 12 serial communication cables connecting a rack module to the outside world. Chip A on the rack module connects to serial communication cables 0, 1, 2; chip B connects to cables 3, 4, 5; chip C connects to 6, 7, 8; and chip D connects to 9, 10, 11. Then the entire group {A,B,C,D} constituting the rack module can form a hypercube node within a supercomputer system, with up to $2^{12}$=4096 rack modules (16384 FPGA/ASIC chips). For chip A to send a message out on link 4 of group {A,B,C,D}, the message has to be routed first to chip B with the on-board differential wide bus connection. A message arriving into the group {A,B,C,D} on link 4 (i.e., arriving at B) destined to chip A, also has to be routed first to the correct destination chip (A) internally within the group {A,B,C,D}. Parallel supercomputer systems of other sizes are of course possible as well.

The hypercube network is possibly incomplete, in the sense that the number of nodes can be any number, not necessarily a power of two.

The supercomputer generated by the present document's method acts as a coprocessor/accelerator attached to a host uniprocessor. The supercomputer is used to accelerate the execution of the sequential single-threaded application running at this host uniprocessor, by mapping one or more program fragments within the application to hardware, using a hardware-software partitioning algorithm, such as the one given in APPENDIX I. The supercomputer hardware is functionally 100% compatible with the software code fragments it replaces.

Components, Networks and Communication Devices within Each System Chip

Referring to FIG. 5, each FPGA or ASIC chip within the system consists of hardware modules called components, networks, and external communication devices. These are the computational modules, in addition to the usual circuits that should be there to make the chip function, e.g., a Phase Locked Loop for driving the various clocks within the chip.

A component contains an arbitrary synchronous digital circuit possibly also including memories; and communicates with messages through its sending FIFO and receiving FIFO interfaces. Examples of components include:

A thread unit that is an optimized finite state machine for executing a specific inner or outer loop, or begin-end block of the program, by repeatedly doing the following:
    Waiting for a new task request (loop invocation) to arrive from its parent loop,
    Working on the task (possibly sending memory load/store requests to the data cache units or further task requests to its inner loops, implemented in separate thread units), and
    If a result (task response) is needed, sending back the response of the task to the requester.
  A pipelined data cache that accepts a new load or store request (every cycle when dependences permit), performs the load or store, handles line misses and line flushes as needed, and sends back the load data, or the store acknowledgement as the response.
  A pipelined integer divide unit, which receives a dividend and divisor every cycle and returns a quotient and remainder a fixed number of cycles later.
  An I/O controller for directing cross-chip message traffic.

A sub-network is a very simple high-frequency router for routing messages from one or more inputs (connected to sending FIFOs of some components) to one or more outputs (connected to receiving FIFOs of some components). Examples of sub-networks include: an incomplete butterfly sub-network made from primitive high frequency, 2 input 2 output core crossbar switches (where the message is sent to a specifically addressed output port of the sub-network), or a task sub-network (which sends an input message to any sub-network output port which is free to accept the message, i.e., whose receiving fifo is not full). Referring to FIG. 8 and FIG. 9, for good load balancing, a task network can be implemented as a torus of one, two or more dimensions, so that tasks circulate in the network until they find a free thread unit. The building block of a task sub-network is the task crossbar switch, which efficiently connects the requesting inputs (the inputs whose FIFOs are not empty) to the available outputs (the outputs whose FIFOs are not full) in left-to-right order in one cycle.

The incomplete butterfly sub-network is incomplete in the sense that the number of inputs and outputs of the network do not need to be a power of 2: they can be any number. A standard 8 input 8 output butterfly sub-network is provided for reference to prior art in FIG. 6. However, referring to FIG. 7, a 5 input 3 output incomplete butterfly sub-network used by the present document, is obtained by deleting unneeded graph edges and graph nodes from the underlying, traditional 8 input, 8 output complete butterfly sub-network.

An incomplete butterfly sub-network design is described in detail in APPENDIX A
  A task sub-network design is described in detail in APPENDIX B.

A network is formed usually from two sub-networks, one for sending requests in the forward direction, and the other for receiving responses in the reverse direction.

An external communication device might consist of a PCI Express IP core, which is connected to the PCI Express lanes outside the chip. Or, it can be a high speed optical or copper serial communication IP core, implementing one end of a high-speed bidirectional serial communication link within an incomplete hypercube network. Or, it can be an IP core connected to a wide high bandwidth high-speed bus on the board, with differential signaling, connecting two neighboring FPGA/ASIC chips. Or, it might be a DDRn memory controller IP core connected to a neighboring dynamic memory unit. All communication devices have one sending FIFO and one receiving FIFO facing inside the chip. Parts of the external communication devices will likely be manufacturer-specific IP cores, while the components and networks are comprised only of technology-independent units designed at the Register Transfer Level, which are either created by the compiler from scratch, or instantiated by the compiler from a library of reusable/parametrizable Verilog modules designed by expert engineers (designed once, before the compiler is shipped; there is no manual hardware design work that is required of the user of the system). The RTL descriptions of components and networks are portable across manufacturer platforms to the extent possible.

A sending FIFO interface (i.e. collection of pins) of a component (or network) attaches point-to-point to a receiving FIFO interface of another network (or component). A component always goes through a network to communicate with another component. By virtue of this important property, it possible to partition any large design by spreading the many components connected to a given network over multiple chips, through I/O controllers (which are components for cross-chip communication).

The external communication devices, like components, also connect to a network on their signals facing inside the chip. Their signals facing outside the chip are used to perform an external communication function, for example, by connecting to the PCI Express lanes on the board.

As a special case, single input, single output networks, whose endpoint components are on the same chip, can be deleted (i.e., replaced by a wire connection), through the network elision optimization after the final partitioning and chip unioning phase, thus allowing the sending-FIFO wires of one component to directly connect to the receiving-FIFO wires of another component.

Let us give components, networks, and communication devices a common name, unit.

All components and networks run with the same system clock, and all units share a common reset signal. Thanks to internal FIFOs that use different clocks for their back and front sides, an IP core for an external communication device may run with a different clock rate than the rest of the system, when it has a different natural frequency, although its sending and receiving FIFO interfaces facing inside the chip will use the common system clock.

Referring to FIG. 10, we specify here the FIFO interfaces for clarity. Here is the signal interface for a sending FIFO I/O pin set of a unit:

output_request: output, 1 bit//sending fifo of this unit not empty
output_acknowledge: input, 1 bit//receiving fifo of other unit not full
output_quiesced: optional input, 1 bit//spanning subtree rooted here has quiesced
output_payload: output, Nbits//the data to be transmitted to other unit When output_request and output_acknowledge are both 1 in a given cycle, at the next rising clock edge, the output_payload is removed from the front of the sending fifo of this unit, and placed in the back of the connected unit's receiving fifo. Transfers occur on every rising clock edge while output_request and output_acknowledge both remain 1. When at least one of output_request and output_acknowledge is 0 in a given cycle, no transfer occurs at the next rising clock edge.

output_quiesced is an optional signal (present only on certain FIFO interfaces that are on a quiescence detection circuit), which indicates that the collection of units connected to this FIFO interface has no activity. Quiescence detection circuits are neither networks nor components; instead, they are small gate and flip-flop circuits that thread through the networks and components whose activity is being monitored, with connections in the form of a spanning tree[2]. When the output_quiesced signal is 1 for a sufficient number of back-to-back cycles (where the number is precisely defined in APPENDIX C), it is inferred that the designated collection of units has quiesced, i.e., has ceased all activities. Quiescence detection will be explained further at around the paragraph below beginning with the words "Inner loops, which are executed for side effects . . . ". APPENDIX C gives a detailed description of Quiescence Detection Circuits, including a technique to make the circuit cross chips.

[2]http://en.wikipedia.org/wiki/Spanning_tree

Again referring to FIG. 10, here is the signal interface for a receiving FIFO I/O pin set of a unit: The pins will attach point to point to the corresponding pins in another unit's sending FIFO interface.

input_request: input, 1 bit//sending fifo of other unit not empty
input_acknowledge: output, 1 bit//receiving fifo of this unit not full
input_quiesced: optional output, 1 bit//spanning sub-tree rooted here has quiesced
input_payload: input, Nbits//the data to be received When input_request and input_acknowledge are both 1 in a given cycle, the input payload is removed from the front of the other unit's sending fifo and placed in the back of the this unit's receiving fifo at the next rising clock edge. Transfers occur on every rising clock edge while input_request and input_acknowledge both remain 1. When at least one of input_request and input_acknowledge is 0 in a given cycle, no transfer occurs on the next rising clock edge.

input_quiesced is an optional output signal (present only on certain FIFO interfaces that are on a quiescence detection circuit) indicates that the collection of units connected to this FIFO interface has ceased all activity. As in the description of output_quiesced, when this signal is 1 for a sufficient number of back to back cycles, it can be inferred that a designated collection of units has ceased all activity.

N, the number of payload bits, is the request payload size of a network, or the response payload size of a network.

When the network uses multiple-word variable length messages, each N-1 bits long, the most significant bit of the payload (called the end-of-data or eod bit) is reserved to indicate the last packet of a variable length message. The end-of-data bit is 0 for all but the last word of a multi-word message; but in the final word, the end-of-data bit is 1. The payload bits will typically consist of opcode, address, and write data fields for a memory operation, or the data returned by a memory read operation, or the register inputs of a loop invocation, or the register results of a loop invocation.

A sending FIFO and a receiving FIFO of a component frequently work as a pair of FIFOs, called a slave port or a master port. A master port sends a request from the sending FIFO of its pair of FIFOs, and receives a response in the receiving FIFO of its pair. A slave port receives a request in the receiving FIFO of its pair of FIFOs, and sends back a response from the sending FIFO of its pair. A network with one or more master ports and one or more slave ports is implemented as a pair of sub-networks:

A forward sub-network that sends requests from a sending FIFO of any master port, to the receiving FIFO of any slave port. This sub-network is a task network when invoking a loop; otherwise, it is an incomplete butterfly network.

A reverse sub-network that sends responses from the sending FIFO of any slave port to the receiving FIFO of any master port. This sub-network is an incomplete butterfly network.

For example, assume that a component A and a component B are connected to the same network Y. Assume that A (e.g., a customized thread unit for a loop L0) needs to send a request message (such as the register parameters of an inner loop invocation) to B (e.g., a thread unit for an inner loop L1 of L0) and will receive a response (the results of inner loop L1) from B, over network Y. Here is the sequence of events:

A master port of a component A on network Y, sends a request from its sending FIFO
The request reaches the receiving FIFO of a slave port of B, through the forward sub-network of Y.
B accepts the request and prepares the response for the given request parameters
B sends the response from the sending FIFO of its slave port back to the receiving FIFO of the master port of component A, through the reverse sub-network of Y.

The bit widths of request and response payloads of a network may in general be different.

Request routing: $\log_2$(number of slave ports) bits within the first word of the payload body (at a compile-time constant bit position, depending on the network) indicates the slave port number. For example, for a memory implemented with bank-interleaved caches, these are the bank selection bits within the address. Task requests do not need a destination slave port field, they can be sent to any slave port of a thread unit that is not busy (whose receiving FIFO is not full). When the network has only one slave port, the destination slave port number is also not needed.

When sending a multiword message, only the first word contains the slave port number, master port number and tag: the remaining words can be utilized by the payload as needed.

Response routing: The payload part of the request message includes two initial fields in its least significant part, in addition to the payload body: a master port number or requester id (identifying the number of the master port of the network who sent the request), and a tag, identifying which outstanding request this is, with a number. A tag allows multiple outstanding requests (requests for which a response has not been received) to co-exist in the system, e.g., by sending a first request with tag 0, then a second request with tag 1 from the sending FIFO of a master port, without waiting for the response for the first request to come back. A slave port, as it accepts an incoming request message, also remembers the master port number and tag, and adds these fields to the least significant bits of its response, when the response is ready. The master port number enables the response message to find its way back to the requester master port within the reverse incomplete butterfly subnetwork. The tag of the incoming response will then be used in the requester component to identify which outstanding response this is. Responses can in general come back out of order (for example, in a bank-interleaved cache, when request 0 from a given master port misses in the cache using bank 0, and the following request 1 from the same master port hits in the cache using bank 3.).

By convention, the external communication devices such as the PCI Express, or DDRn controller, or chip-to-chip serial or parallel communication devices, are defined to have a slave port facing inside the chip.

Notice that a component may have more than one master port connection to the same network, when parallel access to the network is beneficial. The compiler or a library module design engineer creates Verilog code for the component to receive and send from internal master port numbers for the network (the pin names of the Verilog module). When an instance of the component is instantiated at the top level, the internal master port is connected to an actual network master port outside the component. For example, a thread unit component may have internal master ports 0,1 intended for connection to network n. Two copies of the thread unit may be instantiated at the top level, such that first thread unit's internal master ports 0,1 for network n are connected to master ports 0,1 of the actual network n, respectively, and the second thread unit's internal master ports 0,1 for network n, are connected to master ports 2,3 of the actual network n, respectively. Similarly, a component may have more than one slave port to the same network, identified within the component as internal slave port numbers for that network.

FIG. 13 and FIG. 14 illustrate the request packet format and the response packet format, respectively, in their most general form, of various customized networks within a chip of the supercomputer. Note that the customized networks in the application-specific supercomputer are different than existing general-purpose networks or on-chip networks: they are customized to realize one class of requests/responses only (e.g., load only, store only, integer divide/remainder only, L1 cache miss only). Because of their highly specialized nature and efficient hardware implementation, the present document's networks can be used for functions as critical as a load from a deeply pipelined L1 cache.

The possible custom optimizations on the network packet format include the following:

If the message is not of a multi-word format, the end-of-data (Eod) bit is not used, and the message then consists of a single payload word.

Sometimes communication between a master port of component A and a slave port of component B do not need to be bidirectional. For example, when an outer loop invokes an inner loop, but does not need any register result from the inner loop, communication is one-way (the outer loop at most needs to know if the inner loops have quiesced). When communication is never bidirectional in a given network, the master port number and tag are not needed for that network.

Also, if there can only be one outstanding request, a tag is not needed.

If no requests are speculatively issued (i.e., for all requests that have a response, that response is explicitly received, never discarded, as in the case of a speculative request on an untaken path), and responses will come back in order, a tag is not needed, even when communicating with a deeply pipelined component.

When a network has only one master port, a master port number is also not needed.

When a bit in the packet payload is always constant or dead, or is always a redundant copy of another bit, it can be deleted from the packet while sending the packet, and can be recreated while receiving the packet. For example, a message of the form (c1,c2,x,x,d,y), where c1,c2 are constant bits, d denotes a dead bit not used by the receiving component, and x and y are non-constant bits, can be sent over the custom network as (x,y) without any loss of information, and can then become (c1,c2,x,x,[not connected],y) when it arrives at the receiving component. Based on very comprehensive profiling feedback (described in more detail in APPENDIX H), the "constantness" or redundancy of a bit can even be speculated, causing an error when a bit assumed to be constant or redundant does not match its expected value while being sent. The recovery from this rare error can be accomplished by canceling the accelerator results and reverting to software execution, as also described in optimization 3 of the optimizations section.

Frequency considerations: Request, Acknowledge and Payload signals in these FIFO interfaces should reserve almost an entire cycle for wire delays, and their computation should include very little logic, to help achieve a good overall system frequency. There should be no round trip delays between different units; signals should travel at most from one unit to its connected neighboring unit.

FIFO interfaces have an excellent frequency remedy capability. If a sending FIFO interface of unit A is communicating with a receiving FIFO interface of unit B, and A and B should inevitably be placed far apart (communication between distant modules is inevitable in large butterfly networks, for example), a simple way to remedy the potential frequency decrease due to long wires, is to add one or more small two-element FIFOs on the long wire between A's sending FIFO interface and B's receiving FIFO interface, which does not change the semantics of the complete design (just increases the latency of some paths). Such an addition of an extra FIFO can be done after receiving feedback from a first compilation result, or can be done pre-emptively during a first compilation.

Further frequency considerations are discussed in optimization number 4 in the optimizations section.

Alternative Implementations

We will cite a few examples of alternative implementations in this section.

While the present preferred embodiment solves the problem of compiling single-threaded code to a parallel hardware system at a large scale, the method of the present document can also be applied to create a smaller parallel hardware system, such as:

An application-specific mini-supercomputer consisting of only one rack, supporting the application needs of a department; or A single low-frequency, low-power chip in a mobile device exhibiting substantial parallelism, for improving battery life on the applications being accelerated (making up for the lower frequency with parallelism).

Although in this preferred embodiment, we focus on networks created from incomplete butterfly sub-networks and torus-shaped task sub-networks, and FIFO interfaces to attach components to networks, equivalent communication functionality (N to M forward routing and M to N reverse routing) between components on the same chip can be achieved by replacing each of our preferred networks with, for example, a customized high-speed serial or parallel on-chip bus (with its bus protocol replacing the FIFO interfaces), or a customized fat-tree network. The incomplete hypercube organization of the chip-to-chip network can also be replaced by an alternative network organization such as a fat-tree or a 3-D torus. Also, even though we focus on finite state machines for creating application-specific thread units with low energy consumption, the alternatives that can replace a finite state machine include a customized application-specific data flow circuit [5], or a general-purpose processor, containing only the needed features, wherein the thread-unit program is stored in a ROM in pre-decoded form. Of course, for each alternative, the low-level hardware details of components and networks are extremely important for achieving a high-performance application-specific supercomputer system with low energy consumption.

Introduction to the Thread Unit and Hierarchical Software Pipelining

Given an input program fragment (which we will call "the program" when there is no confusion) with arbitrary control flow, each loop in the nested loop hierarchy of the program (not including any inner loops of the given loop), as well as the outermost region of the program, is converted to a frequency-optimized finite state machine, namely, to a component called a thread unit. A thread unit communicates with the networks that connect it to the rest of the system with point-to-point sending and receiving FIFO connections. We will first describe what a thread unit does here, and later around the paragraph below beginning with the words "We have reduced the problem to scheduling/software pipelining just one loop . . . ", we will show how to create a thread unit Verilog module from the sequential code for a program region. The thread unit implements a finite state machine that repeatedly does the following:

It waits for a loop invocation request to arrive from its parent loop/region, to the receiving FIFO of its sole slave port (the parameters of this request are the registers that are live at the top of the loop and that are used inside the loop).

Then, it executes this loop invocation with the given parameters in pipelined fashion, overlapping the loop iterations. It executes operations on all paths speculatively, issuing operations from iterations n+1, n+2, . . . before iteration n is finished, whenever dependences and resources permit. However, to save power, it stops execution of the remaining operations on a path, as soon it is known that the path will not be taken. It also recognizes identical operations common to multiple paths, and executes them only once. It can support variable iteration issue rates by dynamically taking extra cycles whenever a path that has a longer dependence cycle is chosen in a given iteration. The Enhanced Pipeline Scheduling algorithm [11][10] is used to achieve these properties.

It finally sends back the loop invocation response, namely, the register results (the registers that are set in the loop but live at an exit point of the loop) to its parent loop/region, through the sending FIFO of its slave port.

If the loop is executed for side effects (such as stores) only, no loop invocation response is sent back.

Here is how the thread unit executes the operations in a program region

Operations that take one cycle or less: (e.g., add, shift, logical operations) these are performed inside the loop thread unit without interacting with any networks, as orchestrated by a centrally clocked finite state machine, by allocating a different custom functional unit for each distinct simple operation. More than one dependent operation can be executed in the same cycle, when all of them fit in the cycle, by making a combinatorial chain of operations. For example, shifting or rotating by a constant amount, bit permutation, logical operation (AND, OR) with a constant mask, register copy operations, storing a value in memory and subsequently loading it back (using load-store telescoping [17] or register promotion [15], this becomes equivalent to a register copy), testing any bit in a register when the bit position is a constant, in particular, checking if a signed number is less than zero, zero-extending or sign-extending a narrow variable to a wider size, and other similar simple operations require no gate delays (just wire delays), and take nearly zero time in hardware. Thus, several of these operations can be packed in a single cycle. Also, a bitwise logical operation, such as exclusive-or, requires only a part of a cycle and few gates. Also, functional units with only the required operand widths are created using a bit-width reduction optimization on the initial sequential program. As a result, fine-grain instruction level parallelism is increased, operation latency is reduced, and power is reduced.

Multiple-cycle complex operations: A thread unit can perform the following kinds of multiple-cycle operations:

a load, store or update operation on a port of the memory hierarchy a standard multi-cycle operation implemented through instantiating a Verilog library module (such as an integer division or a floating point operation)

an inner loop of the present loop, itself implemented as a customized pipelined thread unit.

Each kind of complex operation has its own separate network. Connected to each such network, there are one or more master ports of requester thread unit(s), and one or more slave ports of responder components that implement this kind of operation. The number of master ports from a given requester thread unit for an operation kind is bounded above by the parallelism found by the compiler (for example, N simultaneous parallel loads to memory within a region, for a bank-interleaved memory hierarchy, will lead to at most N master ports from this thread unit which can send requests to any of the slave ports of the L1 cache banks).

To perform a multi-cycle complex operation of a given kind, the thread unit sends a request message to the dedicated network from a sending FIFO of a master port of the thread unit. If the operation requires a response, after waiting for at least a predicted number of cycles (where the prediction is based on profiler feedback or static knowledge), the thread unit attempts to receive the response in the receiving FIFO of the same master port. Requests can be pipelined: for example, requests n+1, n+2, ... n+k−1 can be issued before the response to request n comes back.

Inner loops, which are executed for side effects (such as stores to memory) only, do not send back a response. However, the completion of all activity due to a request that started such a non-responding inner loop nest, can be monitored through a quiescence flip-flop that is associated with the master port for the request: The quiescence flip-flop is initially one. When any new request to invoke the loop nest is sent through the master port, the flip-flop associated with the master port is set to zero. When all activity (including the inner-inner . . . inner loops and the stores in them) due to past requests to a loop nest from the given master port are complete, as determined by a quiescence detection circuit, the quiescence flip-flop of the master port will become one again.

FIG. 11 and FIG. 12 illustrate a quiescence circuit for a loop nest consisting of an outer loop and k copies of an inner loop. The RandomAccess program depicted in FIG. 18 is one such loop nest. The outer loop spawns a new inner loop on each iteration (if the task network accepts it), and keeps going. The inner loop performs some stores that can be done in parallel. The objective of the circuit is to detect the completion of all activities within both the outer loop and all the inner loop copies. Referring to FIG. 11, the Qunit circuit in each thread unit and task network are connected in the form of a spanning tree. When the output of a Qunit is 1 for a sufficient number of back to back cycles, it can be announced that the spanning sub-tree of thread units and task sub-networks rooted at this Qunit, has quiesced. Referring to FIG. 12, the counter (1201) is initialized to −1 at system reset time. Each time a "still busy" signal comes from the quiescence detection circuit (formed from Qunits) of the loop nest, or when a new task is dispatched to the loop nest, the counter is set to a delay value equal to the maximum propagation delay of the spanning tree in cycles, plus a safety factor (further defined in APPENDIX C). When the counter is decremented back to −1, it means all thread units, stores, and task networks in the entire loop nest has quiesced. Thus, the sign bit of the counter value serves as the quiescence flip flop for the loop nest. Further details, including how to make quiescence detection circuits cross chips, are given in APPENDIX C. Notice that the detection of the quiescence of a large task sub-network may take many thousands of cycles in a large supercomputer implementation.

The quiescence of a store alone is easier to detect than a loop nest. An outstanding store counter is created for each memory master port, where the counter is initially −1. Each store request increments the counter. Each store acknowledge coming back from the memory hierarchy decrements the counter. It can be inferred that all past store requests have all completed when the counter is decremented back to −1. Thus, the sign bit of the outstanding store counter serves as the quiescence flip flop of a store master port. A store acknowledge is used only for the purpose of detecting the completion of stores.

Of course, a single thread unit for an inner loop is not enough to achieve the execution of multiple loop invocations in pipelined fashion, since the inner loop thread unit is likely to be busy with the pipelined execution of the iterations of one single inner loop. However, we would like to send new complete inner loop invocations back to back, as if the inner loop were a primitive pipelined operation unit like a pipelined multiplier. This sort of pipelined execution of loop invocations is achieved by creating multiple copies of the inner loop and connecting them to a task network. Inner loops of inner loops are recursively duplicated. Referring to the example code and its hardware implementation in FIG. 15, in an i,j,k loop nest, there might be 1 copy of the i loop, N copies of j loop, and M copies of k loop per j loop, leading to N*M copies of the k loop in the system. We call this technique hierarchical software pipelining. Thanks to the j loop thread unit array, the j loop looks like a primitive pipelined operation unit to the i loop. Similarly, the k loop looks like a primitive pipelined operation unit to each of the j loops. Referring to this example in FIG. 15, we can now already state the basic hierarchical software pipelining technique for converting a single-threaded code fragment to a parallel hardware structure, which comprises the following steps:

Converting a leaf region in the region hierarchy of the code fragment to a hardware finite state machine; and Creating at least one copy of the finite state machine for the said region, and adding a network for communication with the state machines, such that the combined finite state machine copies and network behave as a single pipelined primitive operation for performing the function of the region.

Recursively applying the previous two steps to the region hierarchy of the program, so that at each point where a parent region invokes a child region in the software execution, the finite state machine for the parent region initiates the primitive pipelined operation for the child region in the hardware execution.

In the context of the hierarchical software pipelining paradigm described above, the compiler additionally needs to estimate the following parameters to be able to create the hardware:

(i) The predicted latency in cycles for each inner loop (in case a register result is returned by the inner loop);

(ii) The replication count of each loop;

(iii) The latency of memory load operations in cycles, depending on the memory hierarchy organization; and (iv) The latency and replication count of other complex operations, such as dividers/multipliers.

These are estimated using profiling feedback and static knowledge. The details of the estimation method for these parameters are given in APPENDIX D.

Memory Hierarchy

The key requirements of the memory hierarchy of the customized supercomputer is that (i) it should, with the help of hardware synchronization units, support point-to-point synchronization between memory instructions issued from individual memory ports; and (ii) it should scale up to a large number of simultaneous load/store operations. If an instance of a memory instruction $I_2$ issued from port P2, depends on a logically earlier instance of memory instruction $I_1$ issued from port P1, there should be a means for that instance of $I_1$ to signal to a synchronization unit, indicating that $I_1$ is complete (so that $I_2$ will now never overtake $I_1$). This is accomplished by an acknowledge response for a store request. Note that a store instruction normally does not require a response in an ordinary memory hierarchy used in a general purpose microprocessor. By contrast, there is no requirement in the present memory hierarchy design for implementing multiprocessor instructions such as compare and swap or memory barrier, which do not arise in single-threaded software. To keep the baseline supercomputer simple, we will first describe the entire memory hierarchy as a single super-component which satisfies the synchronization requirements and implements a unified global memory with many ports that can be accessed in parallel, as a black box. The pin specification of the memory hierarchy box is:

One or more slave memory load/store ports connected to thread units. Each memory load/store master port on each thread unit connects, using a one-to-one network, with a corresponding memory load/store slave port on the memory hierarchy. The thread unit sends memory requests through these ports. Several outstanding requests can be issued from each port, and the responses for the requests can come back out of order, following the network interface conventions of the present document. Like the load request, the store request also receives a response, in order for a synchronization unit to detect that the store is complete.

One or more host master ports for sending requests such as line read and line flush requests to the host computer, and getting line data responses in the case of line reads. There are connected to the host communication network. The PCI Express external communication device is a slave port on the host communication network, and is used to reach the host application. The host application memory is the root of the memory hierarchy.

One or more L2 data array master ports, connected with a one to one network with the DDRn controller external communication device. These issue read line and write line commands to the external DRAM unit, which includes both the data and tag of each L2 cache line.

Efficient implementation of the memory hierarchy is very important. The best, i.e., the most energy and performance efficient implementation choice is likely to be a customized, application-specific partitioned memory hierarchy, where there is no need for coherence between partitions, as described in optimization 1 in the optimizations section. For the baseline supercomputer, we will forego memory partitioning and describe the following two scalable baseline implementations of the memory hierarchy.

Coherent private L1 caches with a directory-based write-update protocol. Perhaps an ideal cache is a write-update cache, where a store to a shared line causes all shared copies of the line to be updated. The write-update cache idea has not been popular in scalable commercial systems in the past due to concerns about excessive bandwidth requirements. In our directory-based coherence protocol, the set of sharers of a line are known exactly at all times, so write-update is easier to do, using only limited network traffic. A directory unit is separate from the corresponding L2 cache. The information kept in the directory for a cache line (i.e., the set of caches that share a line) is also cached inside the directory unit whenever there is at least one cache that owns the line. In this manner accesses to the L2 are avoided, whenever the line requested by one L1 cache is present in another L1 cache (note that the L2 cache is much slower than the L1 cache since the L2 data and tag array are in external DRAM in the present embodiment). Because the compiler already places synchronization between dependent memory operations, the parallel operation of the L1 caches and directory units is greatly simplified in the present design: there are no roll-backs or "NACK-negative acknowledge" responses in our implementation. A directory-based write-update cache coherence protocol is described in detail in APPENDIX E. FIG. 16 illustrates the structure of this cache.

A bank-interleaved shared cache is another possible memory hierarchy design which leads to simpler logic. However, the cache-hit memory latency is increased because of an additional incomplete butterfly network, which gets inserted between the thread units and L1 caches. The banks in bank-interleaved caches reflect independent sections of an address space and hence do not require coherence. However, minimum access latencies are longer than that of coherent private caches, because of network delays. A bank interleaved L2 cache with no L1 caches, suitable for programs with no locality at all (like the RandomAccess example), is illustrated in FIG. 17. Bank interleaved memory is straightforward to implement, and hence no appendix will be provided to describe its details.

Communication Interface with Host Computer

The host interface consists of the PCI Express interface external communication device connected to the host computer. On the user logic side facing inside the chip, it contains a FIFO sending interface for messages coming from the host (through PCI express lanes external to the chip) and a FIFO receiving interface for messages going to the host (through PCI express lanes external to the chip). The messages are variable-length multi-word messages, where each word is 32 bits. The preferred embodiment uses a software based communication interface on the host, for maximum portability: a call to a subroutine start accelerator is placed just before the entry instruction of an accelerated code fragment within the original software application, which invokes the host-accelerator message exchange function described below.

The host-accelerator message exchange function communicates with the accelerator with the following C/C++ software API.

int send(const void*buf, const int n);

Sends n bytes of the message at address buf and returns n, if the sending was successful. Returns −1 on an error. The message will appear in the PCI Express receiving FIFO of the accelerator.

int receive(void*buf, const int n);

Receives a message placed in the PCI Express sending FIFO of the accelerator, of no more than n bytes into address buf and returns the number of bytes received. Returns −1 on an error.

On the accelerator side, the PCI Express sending and receiving FIFOs constitute the sole slave port of the host communication network, already discussed in the memory hierarchy section. The master ports of this network are:

A top task adapter connected to the task network for the top program region thread unit. Notice that by convention, the accelerator is always the master when communicating with the host. At the beginning of the application, we pretend that the accelerator sent a resume_request message to the host to start the application, and the accelerator is now waiting for a resume_response message, to receive the new register state that the accelerator should continue from. The top task adaptor receives the initial register state with a resume_response message from the host and sends back the final register state in its resume_request message, in the format understood by the host messaging software.

The host master ports of the bottom level (e.g., L2) caches in the memory hierarchy, as discussed in the memory hierarchy section. Line read or line flush requests from each bottom level cache are sent to the host, and the line contents are received back from the host, for the case of line reads.

Host-accelerator message exchange function: Here is how the host communicates with the accelerator. Assume that a particular program fragment within a sequential software application is chosen for acceleration and is converted to parallel hardware. We obtain a new program from the original application such that:

When the program arrives at the beginning of the chosen code fragment, it invokes the start_accelerator subroutine, which sends the initial register values, and program counter to the hardware accelerator via a resume_response message, and starts waiting for response from the accelerator.

The accelerator runs, starting with empty caches.

When the accelerator is finished, it flushes all dirty entries in its cache to the host application memory and invalidates its caches.

The accelerator then sends the final register contents and the final program counter to the host, with a resume_request message.

The host then restores these registers and jumps to the given program counter, corresponding to the exit point of the chosen code fragment.

The accelerated code fragment may be invoked zero or more times during the execution of the software application.

When the host application is finished, the application sends a terminate message to the accelerator in order to cause the completion of accelerator activities.

For example, upon receiving the terminate message, the accelerator lights up an LED indicating "done". If a Verilog simulation of the accelerator is being performed within a second software process communicating with the process of the application, the terminate message causes the Verilog simulation process to also finish.

```
//communication between host and accelerator
start accelerator:
send RESUME_RESPONSE program counter,registers//send initial
regs
Message x;
do {
  receive x
  switch(x)
    case READ_LINE, addr
      If the line can be accessed, send the line
      else send zeros
      break;
    case WRITE_LINE, addr,data, dirty bit mask
      write the specified dirty bytes of line data into addr
      send acknowledge
      break;
    case RESUME_REQUEST program counter,registers
      break;
}
} while (x.opcode!=RESUME_REQUEST);
Restore the registers in message x, and jump to the program
counter given by message x.
```

FIG. 20 shows the host-accelerator communication protocol.

Alternative implementations: The following alternative implementations of the host-accelerator communication protocol are also possible:

Using a Direct Memory Access (DMA) hardware capability, a line flush from the accelerator is written to the correct application memory area under the correct byte mask, and a line read from the accelerator reads from the correct application memory area, without intermediate buffering or software intervention. Zeros are returned when a location inaccessible to the application is read by the accelerator.

A full symmetric coherence protocol (where the accelerator does not flush its lines when it is finished, the host gets them back on demand). This is most easily done by making the memory hierarchy of the supercomputer (e.g., the one in APPENDIX E) the system memory, and attaching the host microprocessor to the same memory hierarchy, as if the host microprocessor were one of the thread units. In this organization, the line read and line flush messages from the accelerator are no longer required (the memory coherence protocol replaces them).

Alternative ways to enter the accelerated code fragment, beyond the start accelerator software subroutine call, include:

1. A lightweight system call executing the host-accelerator message exchange loop given above
2. A new hardware instruction start accelerator performing the same message exchange loop in hardware.

The last two approaches should support external interrupts, to be detailed in the optimizations section, optimization number 12.

Supporting multiple different accelerator functions: In case multiple different program fragments extracted from disjoint regions of a software application are mapped to hardware, there will be one top level task adapter that will dispatch the initial task to the top level region thread unit for the requested program fragment. The bottom level caches may be shared among program fragments, or may be different for each program fragment. In any case, the requester id/master port number within each line read request indicates which cache should receive the line as a response. When sending the initial resume response message containing initial registers from the host to the accelerator, the resume response message also contains the correct program counter (entry point) address. A custom decoder within the top task unit sends the message to the correct top level region thread unit, based on the value of the entry point address.

Top Level Design Algorithm for Components and Networks

Now that we know how the top task adapter, the memory hierarchy, the PCI Express communication device, and the DDRn communication device(s) are to be connected together, we are ready to add the thread units and task networks to these, to complete the wiring of top level components.

FIG. 18 is an example program (a supercomputer application called RandomAccess). FIG. 19 shows the flat non-partitioned design for the RandomAccess program. A hierarchical software pipelining structure consisting of one copy of the top region, one copy of the i-loop and 8 copies of the j-loops constitute the thread units in this example. The host processor sends the initial register values over the PCI Express connection to the accelerator through the top task adapter, and receives the final register values also from the top task adapter. Each thread unit accessing memory is connected to separate ports in the multi-port memory hierarchy super-component. The external DRAM units (6 in this example) provide the lowest level cache for the system. When the DRAM cache units also cause a miss, the lines are obtained from the host processor through the PCI Express connection over the host communication network. When the accelerator is finished, it flushes its dirty lines also through the PCI Express connection to the software application address space.

Given the replication count for each loop, and the region hierarchy of the program, and total number of DDRn controllers, APPENDIX F describes the detailed algorithm for creating the top level components of the non-partitioned, flat supercomputer and connecting them, obtaining the result shown in FIG. 19 for the RandomAccess example.

This algorithm completes the top level flat design for a single chip. If this design fits on a chip, we are done. But if the design exceeds the area limits, it should now be partitioned, after exploding the memory hierarchy to its internal components and networks.

Compiling the Sequential Code into Customized Hardware Thread Units

In the previous sections we described how to create the flat, non-partitioned design for the complete application-specific supercomputer, assuming that the correct customized thread units were already available as components to instantiate. In this section we will describe how to create these customized thread units, given the input code fragment within the software application (we will again call this code fragment "the program" when there is no confusion) to be converted to hardware. For understanding thread units, understanding why and how the original program will work correctly on the parallel hardware is useful.

Correctness Rules of Parallelization

We should first define dependence:

An instruction is uniquely identified by its line number (or hexadecimal instruction address) within an object code/assembly listing of the program. An execution trace is the dynamic sequence of instructions executed by a program when started with a given memory and register state, until (if ever) the program ends. In general, the execution trace can be different for each different input register/memory state. Notice that a particular instruction $I_1$ may be executed multiple times, i.e., may occur multiple times in an execution trace. Each of these occurrences is called an instance of the instruction $I_1$.

An instance of a load/store instruction $I_1$ and an instance of a load/store instruction $I_2$ in the execution trace are said to have a memory dependence, if the said instances of $I_1$ and $I_2$ refer to the same data operand address, and at least one of $I_1$ or $I_2$ is a store.

An instance of instruction $I_1$ and an instance of instruction $I_2$ in the execution trace have a register dependence if the said instances of $I_1$ sets a register which is then used by the said instance of $I_2$. We can ignore the dependences where a register r1 is written by $I_1$ and written again by $I_2$, or read by $I_1$ and then written by $I_2$, since the register r1 written by $I_2$ can be renamed to e.g., r1', and its uses can also be renamed to r1', possibly with the introduction of a new copy r1=r1', instruction, with known compiler techniques [10].

We say that an instance of instruction $I_1$ and an instance of instruction $I_2$ are dependent, if there is either a memory dependence, or a register dependence, or both, between these instances.

The parallel hardware version of a software program should give the same results as the original sequential software program, meaning that: given any initial state of memory and registers and program counter, it should produce the same final memory, registers and program counter as the (software) program. This means that, the hardware should meet the following correctness rules for parallelization. Namely, given an initial register/memory state and the corresponding execution trace, when the hardware is started in the same initial state:

1. The hardware should execute all instruction instances within the execution trace.
   a. Comment: Notice that some instructions (like add, shift) take one cycle or less and are done inside a finite state machine, while others (like divide, load) can take multiple cycles and are done by sending messages to a library module and receiving responses.
   b. Comment: A compiler may first optimize the program to obtain equivalent but faster sequential code for a hardware implementation. For example, hardware has far more registers and therefore register promotion [15] can be applied. Dead or constant bits of results can be discovered by compiler analysis and removed, leading to operations and registers smaller than the full word length.
2. If the execution trace contains an instance of instruction $I_1$ and an instance of instruction $I_2$, where these instances of $I_1$ and $I_2$ are dependent, the parallel hardware version of the program should also execute the said instance of $I_2$ after the said instance of $I_1$.
   a. Comment: In practice, here is how ordering of instruction instances is achieved in a parallel hardware implementation. If the instances of $I_1$ and $I_2$ are executed within the same chip with a common clock, the instance of $I_2$ may begin in a cycle following the cycle where the instance of $I_1$ completes. $I_2$ possibly uses the result of $I_1$, which is kept in a register or memory location, or passed as part of a message. Alternatively, $I_2$ could be executed in the same cycle after $I_1$ as combinatorial circuits, if $I_1$ and $I_2$ are very simple operations. If the instances of $I_1$ and $I_2$ are executed in different chips A and B, the result of the execution of $I_1$ contributes to a message sent from chip A to chip B over a chip-to-chip interconnection, and $I_2$ in chip B waits for that message before it can begin.
3. For instruction instances that are not dependent, the hardware can execute them in any order, or in parallel, at the same time.

The correctness rules should be satisfied for all execution traces, i.e., for all program input states. The $3^{rd}$ rule given above is where the parallelism comes from. Regarding the critical $2^{nd}$ correctness rule given above, enforcing the memory dependences is the most important issue, since the compiler sometimes does not know (at compile time) if there is a dependence between two given memory instructions, whereas for register dependences, the dependence is completely clear to the compiler.

Hardware synchronization units: For handling a dependence between two memory instructions ($I_1$,$I_2$), one of which is a store, the hardware version of the sequential single-threaded program incorporates at least one customized, application-specific hardware synchronization unit, which communicates directly or indirectly with the memory hierarchy ports for performing $I_2$ and also with the memory hierarchy ports for performing $I_1$ (note that in general multiple ports will be used since multiple instances of $I_1$ and $I_2$ may execute in parallel). The function of the hardware synchronization unit is specified below:

---

The function of the hardware synchronization unit is to ensure the following hardware execution order: If a memory instruction instance $I_2$ is dependent on a logically earlier memory instruction instance $I_1$ in the software execution, the said instance of $I_2$ is executed after the said instance of $I_1$ in the hardware execution.

---

If $I_1$ is a store and $I_2$ is a load, the instance of $I_1$ can also forward its data directly to the instance of $I_2$ (where the instance of $I_2$ is accessing the same address as the instance of $I_1$) via the synchronization unit, without going through memory. Also, for the case where the compiler is not sure if a memory dependence, the synchronization unit may allow the instance of $I_2$ to execute speculatively before the instance of $I_1$ (with a wrong data speculation); in this case, the instance of $I_2$ should be re-executed by the synchronization unit after the instance of $I_1$ is executed, when the dependence is finally discovered, e.g., by comparing the operand address of $I_2$ and $I_1$ at run-time. We will describe several efficient implementations of customized, application-specific hardware synchronization units in the present preferred embodiment, namely:

- The quiescence detection circuit in APPENDIX C and optimization 6. Here, $I_1$ is in a program region (loop nest) A and $I_2$ is in a program region (loop nest) B. The instance of B waits for all memory instructions in the logically earlier instances of A to complete, before it begins. Hence the instance of $I_2$ in B will wait for the instance of $I_1$ in A to complete.
- The serialization synchronization unit in optimization 2 within the optimizations section. This is a more flexible variant of the quiescence detection circuit.
- The train crash synchronization unit in optimization 2. Here $I_1$ is in a region A where $I_1$ is executed repeatedly, and $I_2$ is in a region B, where $I_2$ is executed repeatedly. $I_2$ in B continually receives signals from logically earlier instances of $I_1$ indicating either "you are free to proceed" or "you are not free to proceed" through the synchronization unit; thus, B can start executing before A completes by monitoring the incremental signals from A.
- The FIFO synchronization unit in optimization 2. This is a special case of the train crash synchronization circuit, where the data is bypassed point-to-point from each member of a sequence of instances of $I_1$ in region A to the corresponding dependent member of a sequence of instances of $I_2$ in region B.
- The compiled snoopy write-update cache synchronization circuit in optimization 1. Here the instance of $I_2$ is synchronizes with the instance of $I_1$ directly, without any intermediate circuits as in quiescence detection, using highly customized logic. For example, when load $I_2$'s data is already cached in a register, store $I_1$ causes the cached register data for $I_2$ to be updated without causing any memory access, when the dependence is finally discovered.
- The synchronization circuit supporting thread-level speculative execution in optimization 3. Here $I_1$ is in a region A and $I_2$ is in a region B. The synchronization circuit lets the instance of B execute before the logically earlier instance of A containing $I_1$ completes. It then re-executes B (and therefore $I_2$) when the dependence is finally discovered.

Alternative embodiments of the customized hardware synchronization unit not explicitly included in the present document (for example, for supporting the parallel execution of a first thread A writing a data structure in random order and a second thread B reading the same data structure in sequential order) are also possible.

Disregarding control dependence: Notice that we did not say that an operation that follows a conditional branch in the execution trace should be executed after the conditional branch. The dependence between a conditional branch that guards an operation (i.e., that determines whether to execute that operation or not), and the operation itself, is called control dependence [26]. When control dependence is ignored and an operation is executed before the conditional branch that guards it, the operation is said to be speculatively executed, as an instance of control speculation (distinct from data speculation). A speculatively executed operation may become a wasted computation, depending on the outcome of the conditional branch. Speculative execution is essential for achieving higher parallelism, as shown in the following example:

```
//example showing importance
//of speculative execution
int controlDep(int x,int n) {
    int z=1;
    for(int i=0;i<n;++i) {
        int y=f(x);
        if(y<0) {
            z=h1(z);
        } else {
            z=h2(z);
        }
        x=g(z);
    }
    return x;
}
```

Here, if the control dependence from y<0 to z=h1(z) or z=h2(z) is respected, and x=g(z) therefore waits for y=f(x), y<0, and one of z=h1(z) or z=h2(z) to execute, almost no parallelism will be available during the execution of this loop, since there is a cycle of dependences: y=f(x)→if y<0→z=h1(z) or z=h2(z)→x=g(z)→back to y=f(x). But if the cycle is broken by not respecting the control dependence and cutting the edges emanating from y<0, by, for example, speculatively computing both h1(z) and h2(z) within iteration i immediately after the value of z is available from the previous iteration i−1, and later selecting the correct one when y<0 is finally computed in the current iteration i, more parallelism becomes available. If by the time iteration i wishes to compute the new value of z, y<0 is not yet computed even in iteration i−1 (hence the value of z from iteration i−1 is unknown, it is one of multiple possible values), computing the value of z in iteration i will require deeper speculation. If z'=h1(z) and z"h2(z) were the candidate values of z in iteration i−1, then h1(z'), h2(z'), h1(z"), h2(z') can all be computed as the candidate values of z in iteration i, while the possible values of x in iteration i−1 can at the same time be speculatively computed as g(z') and g(z"). While such aggressive all-paths speculation can explode into an exponential number of speculative computations, the total number of speculatively executed operations often does not exceed a practically feasible number, since whenever y<0 is finally known in a given iteration, half of all the speculatively computed values are discarded. If the operations f g, h1, h2 take only a single cycle, the speculation will be fine grain. If they are complex function calls or operations suitable for speculation, the speculation will be coarse grain—yet both fine grain and coarse grain speculative execution is important for getting speedup from highly sequential code fragments such as this one. For the case where f g, h1, h2 indeed take one cycle, the tree VLIW code [7] below demonstrates that it is possible to execute this loop with a state machine, at a rate of one cycle per iteration, with modest all-paths speculation. The point we wish to convey is that, in order to achieve higher parallelism, speculative execution is both essential and practical. Notice that a present-day superscalar processor execution of this code would suffer from a serialization overhead at each branch misprediction. All-paths speculation achieves better parallelism than branch prediction.

```
//Sequential code for speculation example
loop:
cc=(i<n);
if (!cc) goto exit
y=f(x);
if(!(y<0)) goto L1
z=h1(z)
goto L2
L1:
z=h2(z);
L2:
x=g(z);
i=i+1;
goto loop
exit: //x live here
```

```
//Tree VLIWs with conditional execution
//(state machine) for the speculation example.
//
//(1T) means operation belongs to iteration 1,
//assuming: y<0 is true (T) in iteration 1.
//
//(2F-1T) means operation belongs to iteration 2,
//assuming: y<0 is true (T) in iteration 1, and
//y<0 is false (F) in iteration 2.
loop:
z1=h1(z); //(1T)
z2=h2(z); //(1F)
goto V1;
V1:
cc=(i<n); //(1)
y=f(x); //(1)
x1=g(z1); //(1T)
x2=g(z2); //(1F)
i=i+1;     //(1)
z3=h1(z1); //(2T-1T)
z4=h2(z1); //(2F-1T)
z5=h1(z2); //(2T-1F)
z6=h2(z2); //(2F-1F)
goto V2;
```

```
V2: //executed in one cycle/iteration
if(!cc) { //(1)
    goto exit;
} else {
    if(y<0) { //(1T)
        //Use only z1,x1 (1T), z3 (2T-1T), z4 (2F-1T)
        //Discard z2,x2 (1F), z5 (2T-1F) , z6 (2F-1F)
        x=x1; //(1T)
        cc=(i<n); //(2)
        y=f(x1); //(2-1T)
        x1=g(z3); //(2T-1T)
        x2=g(z4); //(2F-1T)
        i=i+1;     //(2)
        z5=h1(z4); //(3T-2F-1T)
        z6=h2(z4); //(3F-2F-1T)
        z4=h2(z3); //(3F-2T-1T)
        z3=h1(z3); //(3T-2T-1T)
        goto V2;
    } else { //(1F)
        //Use only z2,x2 (1F), z5 (2T-1F),z6 (2F-1F)
        //Discard z1,x1 (1T), z3 (2T-1T), z4 (2F-1T)
        x=x2; //(1F)
        cc=(i<n); //(2)
        y=f(x2) ; //(2-1F)
        x1=g(z5); //(2T-1F)
        x2=g(z6); //(2F-1F)
        i=i+1;     //(2)
        z3=h1(z5); //(3T-2T-1F)
        z4=h2(z5); //(3F-2T-1F)
        z5=h1(z6); //(3T-2F-1F)
        z6=h2(z6); //(3F-2F-1F)
        goto V2;
    }
}
exit: //x live here
```

We will show below how tree VLIWs with conditional execution can be converted to state machines.

If a loop will iterate many times, and a control dependence is not on any dependence cycle of the loop, the control dependence can be respected without harming performance, by creating one or more select z=cc,z',z"

instructions, instead of the conditional branch using known compiler techniques. The meaning of the select instruction example given above is the C code equivalent z=(cc?z':z"). This transformation into select instructions is useful for the purpose of reducing code explosion. A select instruction creates a 2 to 1 multiplexer operation within a tree VLIW/ state; it does not increase the number of tree VLIWs/states like conditional branches can.

To further demonstrate that the requirement for speculative execution applies not only to simple one-cycle operations but also to loads from memory, as well as to entire region invocations, we provide the Alpha-Beta pruning algorithm for chess playing in FIG. 64, which has limited parallelism when speculation is not done: in this case, an entire recursive subroutine call must be speculatively executed to get high parallelism from this application. The details of Alpha-Beta pruning will be described in optimization 7 and 8 in the optimizations section.

Hierarchical Software Pipelining

Mealy finite state machines with a central clock, where each distinct operation is mapped to about one functional unit, are very attractive for creating application specific parallel hardware that is simple and that has minimal synchronization overhead. The operands of any given operation are ready in, e.g., flip-flops near the functional unit that will execute the operation, when the finite state machine arrives at the state and condition where the operation executes: there is no waiting for operands or synchronization overhead, beyond the finite state machine mechanism itself. The finite state machine approach has been chosen by the present preferred embodiment because of its simplicity.

A large program of arbitrary control complexity (e.g., a program with two or more loops, each of these loops having different conditional branches depending on the input data) can lead to too many states when its parallel execution is controlled by a single finite state machine. An entire program is too large, while a hierarchical region of the program such as a loop, with its inner loops/begin-end blocks converted to single complex instructions, is often of an acceptable size for conversion to a finite state machine for parallel execution. On the other hand, making a state machine cover a region smaller than a loop invocation, such as a small basic block, would lead to little instruction level parallelism within the region, and would increase communication and synchronization across dependent regions. With small regions, cross region communication (through memory or registers/task networks) can unnecessarily waste energy and possibly lengthen the global critical path. For this reason, our preferred approach has been to construct finite state machines for hierarchical program regions with substantially long execution traces where no global serialization point occurs, with each inner region (inner loop or begin-end block) collapsed into a single complex instruction. Instruction level parallelism in an outer loop, whose instructions are complex instructions each containing instruction level parallelism, and the recursive nesting of complex instructions (hierarchical software pipelining), can lead to a multiplicative effect on the total instruction primitives per cycle. Hence the higher the (possibly complex) instruction level parallelism at each loop level, the higher the potential multiplicative effect on instruction level parallelism, due to the recursive nesting. To help avoid creating state machines for program regions with little instruction level parallelism, inner loops that are typically executed very few times as determined by profiling feedback, can be peeled a few times with loop peeling [29], thus becoming integrated with the outer loop, when the number of iterations in the inner loop are indeed few.

The sequential semantics of a complex instruction representing an inner loop or begin-end block (as opposed to an atomic instruction representing a primitive operation such as an add or a store) is that, the complex instruction reads and writes all the registers and memory locations that would have been read or written by the original program region, when started in the same initial state. Executing the complex instruction is equivalent to executing the corresponding original program region in the same starting state. Both the program region and the corresponding complex instruction achieve the same functional transformation on the given input (state of memory and registers).

Given an initial state before a region starts execution, we define a hierarchical execution trace for that region and input to consist of a sequence of pairs:

(I,T)

Where I is an atomic or complex instruction immediately within the region, and T is either a hierarchical execution sub-trace corresponding to I, if I is a complex instruction, or is NULL, if I is an atomic instruction.

The sequence of the hierarchical execution trace is the sequence of atomic and complex instructions executed by the region given the particular input. Flattening a hierarchical execution trace will yield a standard (non-hierarchical) atomic instruction trace for a region and input.

A region can be parallelized at its hierarchical level by a scheduling and software pipelining algorithm, considering both atomic and complex instructions as if they were ordinary pipelined operations. But any parallelization should obey the following rule.

We state the hierarchical software pipelining correctness rule:

For any hierarchical execution trace of a program region with a given input, where inner program regions have been collapsed into complex instructions, if two atomic or complex instructions in the hierarchical execution trace are dependent, they cannot be reordered during the parallel hardware execution of this program region with the same input.

This rule ensures that all of the dependences in any original execution trace of the program region are respected, since if instances of two atomic instructions that might be deeply nested within instances of complex ones are dependent during an execution, the complex instructions should also be dependent, and will not be reordered as a consequence of the rule, and therefore the original instances of the atomic instructions will not be reordered. Therefore the key correctness rule 2 within the section above entitled "Correctness Rules of Parallelization" will be satisfied. Independent instances of atomic or complex instructions within a hierarchical loop execution trace can be arbitrarily reordered, or executed in parallel, to extract better parallelism. A good way to achieve this is to create multiple copies of custom functional units (finite state machines) to execute a complex instruction, and connect these copies to a network, such that the final result is a primitive pipelined operation (similar to a pipelined multiply or divide operation) implementing the inner loop/complex instruction, as already dictated by the hierarchical software pipelining principles.

Thus, all that a scheduling/software pipelining algorithm for constructing a finite state machine should do, is to follow the hierarchical software pipelining correctness rule, and not reorder (possibly complex) instructions that are dependent.

Scheduling and Software Pipelining Algorithm

We have reduced the problem to scheduling/software pipelining just one loop of the program, whose inner loops have all been collapsed into a complex pipelined operation (behaving in a way similar to a pipelined multiply or divide operation), following the hierarchical software pipelining principles stated above. This one loop needs to be software pipelined and then converted to a frequency optimized finite state machine, which will become the thread unit for the loop (A Verilog or other HDL module at the register transfer level).

The method of the present document will work on any single-threaded sequential program, including unoptimized programs, but starting with a program optimized with state-of-the-art compiler techniques will improve the quality of the results. In this preferred embodiment, we begin with a highly optimized sequential program.

Starting with the sequential code for a loop, we should obtain a finite state machine in a hardware description language such as Verilog. This is achieved by:

Converting all loads/stores, nontrivial arithmetic operations (divide, etc.) and inner loop invocations to send and receive operations;

Representing all the required dependences in the hierarchical sequential program possibly containing complex instructions, according to hierarchical software pipelining correctness rule, by introducing dummy dependence registers, and quiescence flip-flops, as needed;

Creating the software pipelined version of the sequential code; and

Creating the finite state machine from the software pipelined code and outputting the thread unit at the Register Transfer Level in a hardware description language such as Verilog, including the FIFO I/O pin interfaces.

A dummy register is a register which is used to create a dependence (that does not otherwise exist) between a send or receive operation O1 and a send or receive operation O2. O1 is made to set the dummy register and O2 is made to use the same dummy register, forcing the scheduler to schedule O2 in a cycle after the cycle where O1 is scheduled. However, since the contents of the dummy register is not used, the width of the dummy register is zero: a dummy register does not generate any hardware register. If the program takes a path where O1 is never executed, O2 can be executed without waiting for O1, as if the dummy register had a valid initial value.

In prior sections around the paragraph above beginning with the words "Inner loops, which are executed for side effects . . . ", we described the hardware implementation of a quiescence flip flop. Here we describe how a quiescence flip-flop behaves as seen by a compiler/scheduler algorithm. Like a dummy register, a quiescence flip flop also forces an ordering between a send operation O1 that sets the flip flop, and another send operation O2 which uses the flip-flop. However, unlike a dummy register, a quiescence flip flop imposes a (generally unpredictable) latency for O1:O2 cannot begin until O1's latency has elapsed. A quiescence flip flop is initially 1. When used as a destination of a send instruction, the flip flop is first immediately set to 0, and then it becomes 1 by itself after all activities (including inner loops, inner inner loops, stores, updates, . . . ) started by all prior instances of this send instruction have completed. A second instruction that uses this quiescence flip flop will wait until the quiescence flip flop is one, before proceeding. In the case where there were no prior invocations of the first instruction, the second instruction can also proceed immediately, since the quiescence flip flop of the first instruction is already 1.

Each load operation to memory in the sequential code (such as the load_short_unsigned instruction below) will be converted to a send of the load request and address from a master port of the memory, followed by a receive of the load response from the same master port, with k (the predicted minimum delay amount for this load) single cycle delay operations in between, as shown below:

```
load_short_unsigned rt=MEM,ra
=>
send t1=MEM,OP_load_short_unsigned,ra,d0,q0
delay t1=t1 //t1=tag identifies outstanding request
delay t1=t1
delay t1=t1
receive rt=MEM,t1,0,32 //load data starts at bit 0 of payload
//load data width=32 bits
receive d1=MEM,t1,32,0 //dummy reg, width=0 bits (no HW)
```

The send operation sends the address register ra to the network of the memory MEM, while creating a new tag for the request, which is returned in t1. While waiting for the result of the load, the tag is copied from register to register (possibly the same register, t1) with delay operations, whose sole purpose is to enforce a wait time of at least k cycles between the send and the receive. The optional dummy input register d0 used by the send may be set by a previously executed dependent (atomic or complex) memory operation, and is used to ensure that the send occurs after the dependent operation. The optional quiescence flip-flop q0, is set by a previously executed dependent atomic or complex memory operation (such as a store, or an inner loop executed for side effects only). The send stalls until all activities started by prior instructions setting q0 have completed (i.e., until q0 is 1).

As described above, the final zero-width dummy result register d1 can be used to ensure dependent (atomic or complex) memory operations are not started before the load completes.

A store instruction (such as the store_byte instruction below) is converted to a send of the store request including the memory name MEM, opcode, address and data (without a corresponding receive). It sets a quiescence flip-flop, for example, q1. Any operation that depends on this store, should wait for the quiescence flip-flop q1 to become 1. In case nothing depends on the store within this loop, q1 is not needed. The optional dummy input register for the send, d0, may be set by a prior dependent memory load operation or prior dependent inner loop that returns a register result. The send will wait until the prior load instruction or inner loop instruction is complete. The optional quiescence flip-flop input, q0, for the send, is set by a prior store or prior inner loop that does not return a register result. The present send will wait until all activities initiated by the prior store instruction or non-returning inner loop instruction are complete. Note that there may be zero or more input dummy registers and input quiescence flip-flops in a send, based on the number of prior instructions that this send depends on.

```
store_byte MEM,rAddr,rData
=>
send q1=MEM,OP_store_byte,rAddr,rData,d0,q0
```

An invocation of an inner loop (such as the for loop shown below) of the current loop which returns register results is converted to: a send of the loop parameters (the registers that are live at the top of the loop and used inside the loop) to the loop task sub-network, followed by k single cycle delay operations, followed by a receive of the inner loop results (the registers that are live at some loop exit, and set inside the loop) from the reverse task sub-network. Note that an inner loop can exit from different exit points, conditionally. For an inner loop with more than one exit point, to enable the containing loop to figure out how the inner loop exited, the values of all but one of the loop exit condition registers should also be received from the inner loop and checked.

```
//struct Node {Node* link; int data;};
//for(Node* r1=linked_list_addr;r1!=NULL;r1=r1->link) {
// if (r1->data==r3) {found: ...; break;}
//} notfound: ...
copy r1=linked_list_addr;
loop: //r1=linked list, r3=key to search
compare_eq cc1=r1,NULL
if (cc1) goto notfound
load r2=data(r1)
compare_eq cc2=r3,r2
if (cc2) goto found
load r1=link(r1)
goto loop
notfound:
...
found:
...use r1
=>
copy t1=linked_list_addr
send t1=LOOP2345,r1,r3,d0,q0
delay t1=t1
...
delay t1=t1
receive r1=LOOP2345,t1,0,32 //bits 31:0 of payload
receive cc1=LOOP2345,t1,32,1//bit 32 of payload
receive d1=LOOP2345,t1,33,0//dummy reg, no HW
if (!cc1) goto found //how did the inner loop exit?
notfound:
...
found:
...use r1
```

A loop, which is executed for side effects (such as stores or updates) only, does not return any registers. In this case a send operation that sets a quiescence flip-flop, without a corresponding receive, is sufficient, as shown below:

```
//for(i=0;i<n;++i) X[i]=y;
copy i=0
loop:
compare_lt cc1=i,n
if (!cc1) goto exit
shift_left t2=i,2
add rAddr=X, t2
store MEMX,rAddr,y
add i=i,1
goto loop
exit:
next instruction
=>
send q1=LOOP3456,n,y,d0,q0
exit:
next instruction
```

Again, if no other operation within this loop is dependent on the inner loop, the quiescence flip-flop is not needed.

Any complex, multiple cycle operation (integer divide, floating point) is changed to a send of a request to the dedicated network for the operation of the given kind, followed by k delay operations, followed by a receive of the result(s) of the operation. No dummy registers or quiescence flip-flops are needed, since a purely arithmetic operation such as division does not set or use any memory. This is illustrated for the divide_unsigned instruction below.

```
divide_unsigned rt=r1,r2
=>
send t1=DIV4567,OP_divide_unsigned,r1,r2,d0,q0
delay t1=t1
...
delay t1=t1
receive rt=DIV4567,t1,0,32 //start position=0, width=32
//quotient is received, remainder is discarded
```

Given a pair of memory instructions $(I_1, I_2)$, where each among $I_1$ and $I_2$ is either located in the present loop or is nested inside any of the present loop's inner loops, and where at least one of $I_1$ and $I_2$ is a store, the dependence analysis algorithm should answer the question: is there an instance of $I_1$ and an instance of $I_2$ in the execution trace of any invocation of the present loop, such that the said instance of $I_2$ refers to the same address as the said instance of $I_1$? If the dependence analysis algorithm's answer is a maybe (meaning it does not know the answer) or yes, it should be conservatively inferred that the pair of instructions $(I_1, I_2)$ are dependent within the present loop. To get this answer using a dependence analysis technique based on symbolic execution (as described in APPENDIX J), which creates symbolic expressions in the simplest form for the address of each load/store, and uses a symbolic subtraction and other tests to check dependence, we should restrict the dependence check for $(I_1, I_2)$, between $I_1$ with current loop index j and $I_2$ with current loop index j', to only the following cases:

$I_2$ follows $I_1$ in the loop body in reverse post order, and j'>=j; or $I_2$ precedes $I_1$ in the loop body in reverse post order, and j'>j.

The indices of the loops enclosing the current loop are kept the same in the symbolic address expressions of both $I_1$ and $I_2$ while any indices of inner loops of the current loop are replaced by different variables in the symbolic address expressions of $I_1$ and $I_2$.

Given two memory instructions $I_1$ and $I_2$ anywhere within the present loop or its inner loops, such that $(I_1, I_2)$ are dependent within the present loop according to the compiler dependence analysis above, here is how the dependence is enforced:

If $I_1$ is in an inner loop A that does not return a register result and $I_2$ is in an inner loop B
the send operation for the inner loop A containing $I_1$ sets quiescence register q1 and the send operation for the inner loop B containing $I_2$ uses $q_1$. B is not issued until all previously initiated executions of the first loop A have completed, i.e., until q1 becomes 1.

If $I_1$ is in an inner loop A that does not return a register result and $I_2$ is a load or store immediately within the loop
the send operation for the inner loop A containing $I_1$ sets quiescence register q1 and the send operation for the load or store operation $I_2$ uses q1. $I_2$ is therefore not issued until the first loop A has quiesced. $I_2$ will wait for all previously initiated executions of A to end.

If $I_1$ is in an inner loop A that returns a register result, and $I_2$ is in an inner loop B
The receive operation for the register results of the inner loop A containing $I_1$ sets dummy register d1, and the send operation for inner loop B uses d1, ensuring proper ordering. Note that as the inner loop A returns a register, all memory operations within it (including $I_1$) should have already completed.

If/$I_1$ is in an inner loop A that returns a register result, and $I_2$ is a load or store immediately within the loop
The receive operation for the register results of the inner loop containing $I_1$ sets dummy register d1, and the send operation for $I_2$ uses d1, ensuring proper ordering. Note that as the inner loop A returns a register, all memory operations within it (including $I_1$) should have already completed.

If $I_1$ is a store immediately within the loop and $I_2$ is in an inner loop B
The send operation for $I_1$ sets quiescence flip-flop q1 and the send operation for the inner loop B containing $I_2$ uses q1, to wait for all prior instances of $I_1$ to quiesce.

If $I_1$ is a store immediately within the loop and $I_2$ is a load or store immediately within the loop,
The send operation for $I_1$ sets quiescence flip-flop q1, and the send operation for $I_2$ uses q1 to wait for all prior instances of the store $I_1$ to quiesce.

If $I_1$ is a load immediately within the loop and $I_2$ is in an inner loop B
The receive operation for $I_1$ sets dummy register d1, and the send operation for the inner loop B containing $I_2$ uses d1. At the time B starts, $I_1$ has already ended.

If $I_1$ is a load immediately within the loop and $I_2$ is a store immediately within the loop,
The receive operation for $I_1$ sets dummy register d1 and the send operation for $I_2$ uses d1. At the time, $I_2$ starts, $I_1$ has already ended.

Quiescence dependences implied by transitive closure can be ignored. For example, if $(I_1, I_2)$ have a quiescence dependence, and $(I_2, I_3)$ have a quiescence dependence, and $I_3$ is executed if and only if $I_2$ is executed, and $I_2$ is executed if and only if $I_1$ is executed, then any quiescence dependence edge $(I_1, I_3)$ can be ignored. This is because, whenever $I_3$ is executed, $I_2$ has already been executed, which in turn means that $I_1$ has also already been executed. This optimization can reduce hardware by removing unneeded quiescence dependences (lead to an AND gate with smaller fan-in, see the mainLoop example below).

Notice that by examining every dependent pair of memory instructions in the current loop, the above rules can be used to add the quiescence flip-flops, and the zero-width dummy registers to the results and source operands of atomic and complex instructions in the sequential code for a loop, making it ready for the scheduling/software pipelining algorithm.

Finally, the following modifications are made to the beginning and end of the sequential code for the loop:
Code is added to the beginning of the loop, to receive the next loop invocation request from the parent loop/region.
If the loop does return a register result (nonzero-width registers set in the loop are live at the loop exit):
Code is added at the exit of the loop, to send the register results of the loop in a response message to the parent loop. This message will wait for all inner loops and stores within the current loop to quiesce before it is sent.

The receiving of the next loop invocation parameters cannot be overlapped with any activity in the current loop invocation (otherwise deadlock could occur, if the current loop waits for the outer loop to send the next invocation parameters, and the outer loop waits to receive the results of the current loop invocation). This dependence can be ensured with a dummy zero-width register, which is set by the final send of the loop invocation results and which is used by the initial receive of the loop invocation parameters.

This completes the algorithm for the construction of sequential code, which is now ready for scheduling.

To make dependences between complex instructions/inner loops more clear, here is an example demonstrating the operation of quiescence detection circuits and quiescence flip-flops for enforcing dependences between inner loops of a loop:

```
int X[N][N];
int sum[N];
int mainLoop(int n) {
    for (i=0;i<n;++i) {
        if (tst1(i)) {
            unsigned r=i+1;
            for(int j1=0;j1<n;++j1) {
                r=nextRandom(r);
                sum[i]+=X[r%N][r%N];
            }
        }
        if (tst2(i)) {
            for(int j2=0;j2<n;++j2) {
                X[i][j2]=f(i,j2);
            }
        }
    }
    return 0;
}
```

```
//sequential code for mainLoop
start:
receive n=P,0,32,d0 //receive n
copy i=0
loop:
cc0=i<n
if(!cc0) goto exit
cc1=tst1(i);
if(!cc1) goto L1
//j1 loop waits for j2 loop
send q1=LOOPj1,i,q2
L1:
cc2= tst2(i);
if(!cc2) goto L2
//j2 loop waits for j1 loop
send q2=LOOPj2,i,q1
L2:
add i=i,1
goto loop
exit:
//mainLoop waits for all to quiesce
send d0=P,0,q1,q2
goto start //go pick up new input
```

Here, each instance of the j loop depends on all the logically earlier instances of the j2 loop, since the j1 loop can read any location in the X matrix, and logically earlier executions of the j2 loop write the X matrix. Also, each instance of the j2 loop depends on all logically earlier instances of the j1 loop, since the old values in X should first be read by the j1 loop, before the j2 loop stores new values in the X matrix (possibly to the same locations that have been read by the j1 loop). The j1 loops of different iterations of the i loop are not dependent on each other, since they only read the X matrix. The j2 loops of different iterations of the i loop are not dependent on each other, since they write different parts of the X matrix. Therefore, the sending of the j1 loop request is gated on the quiescence flip-flop q2 of the j2 loop, and the sending of the j2 loop request is gated on the quiescence flip-flop q1 of the j1 loop. There are no other memory dependences in the i loop.

If during the parallel execution of loop i, an earlier instance of the j2 loop was started and is not yet finished, and the current iteration of the i loop executes the j1 loop (tst1(i) is true). The sending of the request for the j1 loop invocation will wait until all prior invocations of the j2 loop have quiesced, to ensure that they have written the new values into matrix X.

Similarly, if a j2 loop is being invoked when a logically earlier instance of the j1 loop has been started but is not yet finished, the j2 loop will wait until all the logically earlier invocations of the j1 loop have quiesced, to ensure that these j1 loops have read the old values in the X matrix.

If, in a sequence of the i loop iterations, only the j1 loop is invoked, the j1 loop invocations can be issued up to once every cycle, in deeply pipelined fashion, as if the j1 loop thread unit array were a pipelined functional unit. Similarly, in a sequence of i loop iterations where only the j2 loop is invoked, the j2 loop invocations can be issued up to once every cycle, in deeply pipelined fashion, as if the j2 loop thread unit array were a pipelined functional unit.

We will now describe the scheduling and software pipelining algorithm. Any general-purpose software pipelining algorithm can be used with the present document. In this preferred embodiment we use the Enhanced Pipeline Scheduling (EPS) technique [10] as the main scheduling technique, since it is resource constrained, it handles arbitrary conditional branches and conditional exits within a loop, and also implements speculative execution of operations on all paths and can thus be resilient to branch mispredictions. We will provide a summary of the EPS algorithm here, using a step-by-step example. An advantage of EPS is that its result, consisting of tree VLIW instructions with conditional execution, can be easily converted to a Verilog finite state machine, as follows:

After sends and receives have been introduced and quiescence and dummy dependence registers have been added, run the complete EPS algorithm (including register allocations, peephole compaction) on the sequential loop program;

Starting from the final tree VLIWs with conditional execution produced by EPS, create an FSM state for each VLIW tree instruction;

Translate the tree VLIW instruction program to a Verilog module, using the following key translation algorithms:

Each path through the tree VLIW represents a mutually exclusive combination of condition code registers. For example:

```
//Example of a Tree VLIW
//with conditional execution
L0:
if(cc1) {
    r1=f(r2);
    if (cc2) {
```

```
            r3=g(r3);
            goto L1;//cc1&cc2
        } else {
            r4=h(r5);
            goto L2; //cc1&!cc2
        }
    } else {
        goto L3; //!cc1
    }
```

Each leaf of the tree VLIW (labeled L0 in the example) represents (i) a combination of condition registers, (ii) a set of operations to execute when these conditions are true, and (iii) a next VLIW label to jump to. The conditions are mutually exclusive. This is illustrated in the following table for the example tree VLIW labeled L0:

| Conditions | Operations to execute | Next VLIW |
|---|---|---|
| cc1 = T & cc2 = T | r1 <= f(r2), r3 <= g(r3) | L1 |
| cc1 = T & cc2 = F | r1 <= f(r2), r4 <= h(r5) | L2 |
| cc1 = F & cc2 = ? (Don't care) | None | L3 |

This tree VLIW is then translated to a Verilog casez statement each of whose internal cases corresponds to a leaf of the tree VLIW. When the Boolean combination conditions specific to a tree leaf is true, the corresponding set of operations are executed, and the next state is set to the FSM state corresponding to the VLIW label this leaf branches to. Since the conditions for each leaf of the tree VLIW are mutually exclusive, the synthesis annotation "full case parallel case" can be safely added (meaning: the conditions of the cases are mutually exclusive and the cases cover all possibilities), which can result in a more optimized state machine to be synthesized from a Register Transfer Level Verilog specification. The following Verilog code illustrates the translation of a tree VLIW program including L0:

```
reg [LOG2NSTATES-1: 0]   state;
localparam S_start=0, ..., S_L0=2, S_L1=3, ...;
always @ (posedge clock) begin
    if(reset) begin
        state <=S_start;//initial state
    end else
    case(state) //for each VLIW instruction
        //synthesis full case parallel case
        ...
        S_L0: casez ( {cc1,cc2} )
            //synthesis full case parallel case
            2'b11:  begin
                r1  <=  f(r2);
                r3  <=  g(r3);
                state  <=  S_L1;
            end
            2'b10:  begin
                r1  <=  f (r2) ;
                r4  <=  h(r5);
                state  <=  S_L2;
            end
            2'b0?:  begin
                state  <=  S_L3;
            end
            endcase //S_L0: casez ( {cc1,cc2} )
        ...
    endcase  // case (state)
    end   // always @ (posedge clock)
```

A general purpose tree VLIW machine supporting conditional execution [8] is a finite state machine interpreter that can interpret any tree VLIW program, executing each FSM state transition in one cycle. But by translating the tree VLIW program directly to a hardware finite state machine as in the present document, we can avoid the interpretation overhead, potentially resulting in significant power savings and performance advantages in comparison to the general-purpose tree VLIW machine.

Here is how send and receive operations are implemented within the finite state machine: The output signal output_request for a given sending FIFO interface is asserted (set to 1), and the output_payload output bus is set to the correct value, only when in the state and condition when a send should be executed. Once in a state and condition where a send is executed, the finite state machine does not proceed to the next state until the output_acknowledge input is also asserted. The input_acknowledge output is asserted only when in a state and condition where a receive from this network should be executed. The finite state machine does not proceed to the next state until the input_request input is also asserted, at which time the datum is received from the network.

The following small example is taken from FIG. 6(c), p. 863, of the Enhanced Pipeline Scheduling paper [10]. We will show how to convert this example into a Verilog module.

```
//sequential code from FIG. 6, p. 863 in EPS paper
//r0 live here
loop:
r0=f (r0);
cc0=r0<C;
if(cc0) goto loop
exit:  //r0 live here
```

In EPS, the code to be scheduled is made acyclic, by always using a fence that cuts a set of edges the loop's current control flow graph. The initial fence is placed at the start of the loop body. At each stage of EPS, empty tree VLIWs are created at the edges cut by the fence, and ready operations on a path reachable from the empty VLIW and that does not cross the fence, is moved to the empty VLIWs. The graph is incrementally modified while making the code motion; for example, registers may be renamed, and copies of an operation may be made on edges joining the path of code motion. Each incremental step is a correct transformation: the semantics of the program is not changed. Once all the empty VLIWs of the fence are filled with once cycle's worth of operations and conditional branches, the fence is moved to the outgoing edges of the newly created VLIWs, and the next EPS stage begins. The EPS stages continue until all operations from iteration 1 have been scheduled in some VLIW. Arbitrary conditional branches and loop exits in the input code can be handled by EPS.

The sequential code obtained after adding send/receive operations is given below.

```
//after adding send/receive ops:
//receive inputs for next task from parent loop
start:
    receive r0=P, 0, 32, d0
//original loop
loop:
    r0=f (r0) ;
    cc0=r0<C;
    if(cc0)   goto loop
exit://r0 live
//send task response to parent loop
    send d0=P, r0
    goto start
```

We will explain below the step-by-step EPS scheduling [10] for this loop. Starting from the main loop part of this code, rewritten as tree VLIWs containing one operation each, the fence is initially placed at the beginning of the loop body, as shown below. The tree VLIWs with conditional execution used during the EPS stages have sequential semantics: they can also be correctly executed by an ordinary RISC microprocessor. However each group of operations placed by EPS within a tree VLIW can be executed all in parallel. In EPS stage 1, loop iteration 1, cycle 1 is scheduled. The only operation that can be scheduled in this cycle is r0 f(r0), which immediately follows the fence:

```
//before EPS stage 1
loop: {
//==fence==
    goto loop_:
}
loop_: {
    r0=f (r0);
    goto L1;
}
L1: {
    cc0=r0<C;
    goto L2;
}
L2 :
if (cc0) {
    goto loop;
} else {
    goto exit;
}
exit://r0 live
//EPS stage 1-a,
//moving r0=f (r0) of it 1
loop: {
//==fence==
    r0=(r0);
    goto L1;
}
L1: {
    cc0=r0<C;
    goto L2;
}
L2:
if (cc0) {
    goto loop;
} else {
    goto exit;
}
exit://r0 live
```

In the second stage of EPS, the fence is moved down to the outgoing edge of the first fence's VLIW, and cycle 2 of iteration 1 is scheduled, together with cycle 1 of iteration 2 (the VLIW labeled loop) which is now reachable without crossing the fence. First the cc0=r0<C condition computation which is already next to the fence is moved to the fence. The if (cc0) operation of iteration 1 cannot be moved to the fence, because it is not ready yet. But the already-scheduled cycle 1 of iteration 2, containing the r0 f(r0) computation can be moved to the fence. However, since the old value of r0 is still live if iteration 1 exits, it would be incorrect to move r0 f(r0) to the fence as it is, as such a move would overwrite r0, causing the exit to see a wrong value of r0. A new register r1 should be used as the destination register of f(r0). This is done by changing
   r0=f(r0);
to the equivalent sequence
   r1=f(r0);
   r0=r1;
and then moving r1=f(r0) to the fence VLIW. As the operation is being moved past the join point of the loop entry, a copy of the operation r1=f(r0) is created at the loop entry edge. Here, the r1=f(r0) operation is a speculative operation belonging to iteration 2, which is executed within iteration 1, before it is known if iteration 2 will be executed or not: if iteration 1 exits (the speculation is incorrect) this computation will be wasted. Notice that, as a result of the present incremental transformation, we have created an extra operation r0=r1, which has been left in the original location of r0=f(r0). But this extra copy operation is harmless in the sense that it never inhibits parallelism, it is transparent: an operation following r0=r1 and using r0 can always move through r0=r1, by renaming the uses of r0 to r1 within the operation.

```
//EPS stage 2 starting
loop: {
    r0=f (r0);
    goto L1;
}
L1: {
//==fence==
    goto L1_;
}
L1_: {
    cc0=r0<C;
    goto L2;
}
L2:
if (cc0) {
    goto loop;
} else {
    goto exit;
}
exit://r0 live
//EPS stage 2-a,
//moving cc0=r0<C from it 1
loop: {
    r0=f (r0);
    goto L1;
}
L1: {
//==fence==
    cc0=r0<C;
    goto L2;
}
L2:
if(cc0) {
    goto loop;
} else {
    goto exit;
}
exit://r0 live
//EPS stage 2-b-1,
//moving r0=f(r0) from it 2
loop: {
    r1=f (r0) ;
    r0=r1;
    goto L1;
}
L1: {
//==fence==
```

```
            cc0=r0<C;
            goto L2;
        }
        L2:
        if(cc0)  {
            goto loop;
        } else  {
            goto exit;
        }
        exit://r0 live
        //EPS stage 2-b-2,
        //moving r0=f(r0) from it 2
        loop:  {
            r1=f (r0) ;
            goto loop_;
        }
        loop_:  {
            r0=r1;
            goto L1;
        }
        L1:  {
            //==fence==
            cc0=r0<C;
            r1=f (r0) ;
            goto L2;
        }
        L2:
        if(cc0)  {
            goto loop_;
        } else  {
            goto exit;
        }
        exit://r0 live
```

In EPS stage 3, the fence is moved down again to the outgoing edges of the VLIW of the last fence, and then, cycle 3 of iteration 1, as well as the operations from cycle 2 of iteration 2 (VLIW labeled loop), and cycle 1 of iteration 3 (VLIW labeled L1), which are now reachable without crossing the fence, are scheduled together. The if cc0 operation of iteration 1 is finally ready, and is moved to the fence. Then, r1=r0 from iteration 2 is moved to the fence. Finally, cc0=r0<C and r1=f(r0) from iteration 3, are moved to the fence. The steady state software pipelining kernel has been created in the tree VLIW L2. Since no more iteration 1 operations remain to be scheduled, the EPS stages have finished.

```
        //EPS stage 3 starting
        loop:  {
            r1=f (r0);
            goto loop_;
        }
        loop:  {
            r0=r1;
            goto L1;
        }
        L1:  {
            cc0=r0<C;
            r1=f(r0);
            goto L2;
        }
        L2:  {
            //==fence==
            goto L2_;
        }
        L2_:
        if(cc0)  {
            goto loop_;
        } else  {
            goto exit;
        }
        exit://r0 live
        //EPS stage 3-a,
        //moving if (cc0) from it 1
        loop:  {
            r1=f(r0);
            goto loop_;
        }
        loop_:  {
            r0=r1;
            goto L1;
        }
        L1:  {
            cc0=r0<C;
            r1=f(r0);
            goto L2;
        }
        L2:  {
            //==fence==
        if(cc0)  {
            goto loop_;
        } else  {
            goto exit;
        }
        exit://r0 live
        //EPS stage 3-b,
        //moving r0=r1 from it 2
        loop:  {
            r1=f(r0);
            goto loop_;
        }
        loop_:  {
            r0=r1;
            goto L1;
        }
        L1:  {
            cc0=r0<C;
            r1=f (r0);
            goto L2;
        }
        L2:  {
            //==fence==
        if(cc0)  {
            r0=r1
            goto L1;
        } else  {
            goto exit;
        }
        exit://r0 live
        //EPS stage 3-c,3-d,
        //moving cc0=r0<C,
        //r1=f(r0) from it 3
        // (EPS finished)
        loop:  {
            r1=f(r0);
            goto loop ;
        }
        loop_:  {
            r0=r1;
            goto L1;
        }
        L1:  {
            cc0=r0<C;
            r1=f(r0);
            goto L2;
        }
        L2:  {
            //==fence==
        if(cc0)  {
            r0=r1;
            cc0=r0<C,
            r1=f(r0);
            goto L2;
        } else  {
            goto exit;
        }
        exit://r0 live
```

The final tree VLIWs with conditional execution are then obtained from the result of EPS, by:

Changing from sequential to parallel VLIW semantics, where each operation in a VLIW uses a register available in the beginning of the VLIW instruction For example: r0=r1; r1=f(r0) in the same VLIW is changed to r0=r1; r1=f(r1); also, r1=f(r0); r0=r1; is changed to r1=f(r0); r0 f(r0);

Repeatedly merging independent VLIWs that are adjacent in the VLIW control flow graph, until no more merging can be done. This is called peephole compaction.

Performing dead code elimination and register allocation. The final result, including the receiving and sending of the loop invocation parameters, is shown below.

```
//final tree VLIWs
//with conditional execution
//after EPS
//(parallel semantics)
start: {
   receive r0=P, 0, 32, d0
   goto loop;
}
loop: {
   r0=f(r0);
   goto L1;
}
L1: {
   cc0=r0<C;
   r1=f(r0);
   goto L2;
}
L2:
if(cc0) {
   copy r0=r1;
   cc0=r1<C;
   r1=f(r1);
   goto L2;
} else {
   send d0=P, r0
   goto start;
}
```

The paper [10] contains further details of EPS. Using the final tree VLIWs with conditional execution, we can now emit the Verilog module:

```
// ' define f (x)  ...
// ' define C  ...
module loop1
(
  input reset
  ,input clock
  //"reg" outputs are really combinatorial
  //receiving FIFO of slave port of parent loop (P) network
  ,input P_input_request
  ,output reg P_input_acknowledge
  ,input[31:0] P_input_payload
  //sending FIFO of slave port of P network
  ,output reg P_output_request
  ,input P_output_acknowledge
  ,output reg[31:0] P_output_payload
);
   //declare registers occurring in the tree VLIW program
   reg cc0;
   reg[31:0] r0,r1;
//main finite state machine, one state per tree VLIW
reg[1:0] state; localparam S_start=0, S_loop=1, S_L1=2, S_L2=3;
always @(posedge clock) begin
   if (reset) begin
      state <=S_start;
   end else
      case (state) //synthesis full case parallel case
         S_start: casez(P_input_request)
```

-continued

```
            1'b1: begin
               //receive r0=P, 0, 32, d0
               r0 <= P_input payload[31:0];
               state <= S_loop;
            end
            default: begin //wait for next input
            end
         endcase
         S_loop: begin
            r0   <=   'f(r0);
            state  <=   S_L1;
         end
         S_L1: begin
            cc0  <=(r0 < C) ;
            r1   <=   'f(r0);
            state  <=   S_L2;
         end
//S_L2:
         default: casez({cc0, P_output acknowledge})
            //synthesis full case parallel case
            2'b1?: begin
               r0   <=   r1;
               cc0  <=   (r1  <  ' C) ;
               r1   <=   'f(r1);
               //state  <=   S_L2;
            end
            2'b01: begin
               //send d0=P, r0
               state <= S_start;
            end
            default: begin   //wait for network
            end
         endcase
      endcase
   end //always
   always @(*)   begin   //combinatorial outputs
      case(state)   //synthesis full case parallel case
         S_start:  begin
            //receive r0=P, 0, 32, d0
            P_input_acknowledge=1;
            P_output_request=0;
            P_output_payload=r0;
         end
         S_L2: casez(cc0)
            1'b1:  begin
               P_input acknowledge=0;
               P_output request=0;
               P_output payload=r0;
            end
            1'b0:  begin
               //send d0=P, r0
               P_input_acknowledge=0;
               P_output_request=1;
               P_output_payload=r0;
            end
         endcase
         default: begin //default outputs
            P_input_acknowledge=0;
            P_output_request=0;
            P_output_payload=r0;
         end
      endcase
   end //always @(*) begin //combinatorial outputs
endmodule //loop1
```

Any synthesis technique can be used to create hardware from the Verilog code obtained from EPS. But in order to clearly state our method to create hardware from sequential single-threaded code, independently of any particular synthesis platform, we describe here the preferred hardware synthesis technique for Verilog code obtained from EPS:

For each unique expression (r1 op r2) on right hand sides of assignments in the Verilog program, where r1 and r2 are registers, only one functional unit (performing the function op, with inputs tied directly to r1 and r2) is created. More than one occurrence of (r1 op r2) in a right-hand side in the Verilog program will lead to only one hardware functional unit performing (r1 op r2).

States are implemented with one-hot encoding, with one flip flop allocated to each state. Boolean condition registers will be available in the beginning of the cycle, in such a way that state transition signals, clock enable signals, and multiplexer select signals will likely be available early in the cycle.

Each register is formed from one or more flip-flops, which are not inside any register file. Each register's clock-enable signal is the logical OR of all (state,condition) pairs where that register is assigned with a non-blocking assignment in the Verilog code. When there is more than one expression assigned to a register r1, an input multiplexer is created before the register, whose selection signal for each distinct expression e, is the logical OR of the (state,condition) pairs where e is assigned to r1. The (state,condition) pairs where the clock-enable signal for r1 is false, are don't care conditions, which should be used for logic optimizations of these multiplexer selection signals.

Combinatorial one bit output signals (such as output_request in a sending FIFO or input_acknowledge in a receiving FIFO) are obtained as the logical OR of (state,condition) pairs where the said output signal is a 1.

A combinatorial output_payload bus, when it can be set to more than one possible expression in the Verilog program, is obtained using a multiplexer whose inputs are the distinct expressions, and whose select signal for each expression e, is derived from the logical OR of (state, condition) pairs where that expression e is assigned to the said output_payload bus. The (state, condition) pairs where the corresponding output_request signal is false, are don't case conditions, which should be used for logic optimization of the multiplexer select signal.

Optimization 4 in the optimizations section describes frequency optimization techniques within the synthesis paradigm described above.

The following improvements can be made to original Enhanced Pipeline Scheduling algorithm, to improve the generated hardware:

- The original EPS cannot execute dependent operations (e.g., xor r1=r0,r3 followed by and r2=r1,N) in the same tree VLIW. As an improvement, multiple dependent operations that do not exceed a cycle (one cycle can approximately hold the latency of a 32 bit add and a simple multiplexer) can be placed in the same tree VLIW. This technique is known, and has for example been called combining or chaining.

- The original EPS is greedy: it will schedule an operation as soon as possible if resources are available. To reduce register pressure, achieve lower cycles/iteration and improve scheduling with finite resources, scheduling of certain operations can be made non-greedy, in a way analogous to prior work in modulo scheduling [27]. I.e., even if such an operation is ready to schedule in a given cycle, its scheduling can be deferred to a future cycle.

As a more complex example, in FIG. 21 to FIG. 32 we provide the transformation of the inner loop of the RandomAccess program to a Verilog module.

FIG. 21 Provides the sequential intermediate code and C code for the RandomAccess inner loop, after the update instruction has been converted to a send. The loop invocation inputs of the j loop are received from the outer (i) loop with a receive instruction. The fence (which makes the code temporarily acyclic) is at the top of the loop body, ready for EPS algorithm to start.

FIG. 22 Shows the RandomAccess inner loop after Enhanced Pipeline Scheduling (EPS) stage 1. The fence is at the instruction with label L1.

FIG. 23 Shows the RandomAccess inner loop after Enhanced Pipeline Scheduling (EPS) stage 2. The fence has moved down to the instruction with label L2.

FIG. 24 Shows the RandomAccess inner loop after Enhanced Pipeline Scheduling (EPS) stage 3 (last stage). The tree VLIW instruction with label L2 executes at a rate of one iteration per cycle.

FIG. 25 Shows the final Tree VLIWs for the RandomAccess inner loop.

FIG. 26 Shows the Verilog module for RandomAccess inner loop, part 1 of 7 (I/O pins of module).

FIG. 27 Shows the Verilog module for RandomAccess inner loop, part 2 of 7 (register declarations).

FIG. 28 Shows the Verilog module for RandomAccess inner loop, part 3 of 7 (Finite State Machine whose states are the tree VLIW instructions with conditional execution).

FIG. 29 Shows the Verilog module for RandomAccess inner loop, part 4 of 7 (Finite State Machine, continued).

FIG. 30 Shows the Verilog module for RandomAccess inner loop, part 5 of 7 (Finite State Machine, continued).

FIG. 31 Shows the Verilog module for RandomAccess inner loop, part 6 of 7 (Finite State Machine, combinatorial FIFO handshaking outputs.).

FIG. 32 Shows the Verilog module for RandomAccess inner loop, part 7 of 7 (quiescence detection circuit for the memory and parent loop networks). The update instruction quiesces when the number of requests equals the number of acknowledges. This inner loop module becomes quiesced (input_quiesced=1) when the FSM is in the start (idle) state, and all previously issued update requests to memory have been completed. At this point, the FSM starts waiting for a new loop invocation request.

To show in detail how an inner loop B waits for the quiescence of logically earlier instances of a dependent inner loop A, we also provide here the hardware implementation of the outer loop example mainLoop given in the paragraph above beginning with the words "To make dependences between complex instructions/inner loops more clear . . . ". The following is the set of tree VLIW instructions for this outer loop with index i:

```
//Tree VLIWs for mainLoop
start:
receive n=P, 0, 32, d0
i=0;
goto loop
loop:
cc0 =i<n
cc1=tst1 (i)
cc2=tst2 (i)
i_=i+1
goto L1
//tree VLIWs for mainLoop (continued)
L1:
if ( !cc0)  {
        send d0=P, 0, q1, q2;
        goto start
} else  {
```

```
        if(cc1) {
           q1=send LOOPj1, i, q2
           if(cc2) {
              goto L2
           } else {
              i=i_;
              cc0=i_<n
              cc1=tst1 (i_)
              cc2=tst2 (i_)
              i_=i_+1
              goto L1
           }
        } else {
           if(cc2) {
              q2=send LOOPj2, i, q1
              i=i_;
              cc0=i_<n
              cc1=tst1 (i_)
              cc2=tst2 (i_)
              i_=i_+1
              goto L1
           } else {
              i=i_;
              cc0=i_<n
              cc1=tst1 (i_)
              cc2=tst2 (i_)
              i_=i_+1
              goto L1
           }
        }
     }
     L2 :
        q2=send LOOPj2, i, q1
        i=i_;
        cc0=i_<n
        cc1=tst1 (i_)
        cc2=tst2 (i_)
        i_=i_+1
        goto L1
```

The following Verilog code for mainLoop illustrates how waiting on quiescence flip flops is implemented. For example, referring to state S_L2 in the Verilog code below, where loop j2 is spawned, the LOOPj2_output_request signal for spawning loop j2 is set to the quiescence flip flop q1 of the prior dependent inner loop j1; therefore the LOOPj2_output_request signal will not be asserted until the quiescence flip flop q1 becomes 1. Also in state S_L2, the state transition condition is specified as (LOOPj2_output_acknowledge && q1); therefore the transition to the next state after S_L2 will not occur before the quiescence flip flop q1 becomes 1. The FSM will freeze in state S_L2 while q1 remains 0. Other waiting requirements for quiescence flip-flops are handled similarly. Compared to software thread synchronization techniques using shared memory, a specialized hardware approach is much more efficient.

```
//Verilog module header for mainLoop
'define tst1(x) ...
'define tst2(x) ...
module mainLoop
(
  input reset
  ,input clock
  //P (Parentloop network) slave port
  ,input P_input_request
  ,output reg P_input_acknowledge
  ,input[31:0] P_input_payload
  ,output reg P_output_request
  ,input P_output_acknowledge
  ,output reg[31:0] P_output_payload
  //LOOPj1 master port
  ,output reg LOOPj1_output_request
  ,input LOOPj1_output_acknowledge
  ,input LOOPj1_output_quiesced
  ,output reg[31:0] LOOPj1_output_payload
  //LOOPj2 master port
  ,output reg LOOPj2_output_request
  ,input LOOPj2_output_acknowledge
  ,input LOOPj2_output_quiesced
  ,output reg[31:0] LOOPj2_output_payload
) ;
//register declarations for mainLoop
reg[31:0] n,i,i_;
reg cc0, cc1, cc2;
//quiescence counter and flip-flop for LOOPj1
localparam LOOPj1_DELAY=10, LOG2_LOOPj1_DELAY=4;
reg[LOG2_LOOPj1_DELAY:0] ctr_LOOPj1;
wire q1=ctr_LOOPj1[LOG2_LOOPj1_DELAY] ;
//quiescence counter and flip-flop for LOOPj2
localparam LOOPj2_DELAY=12, LOG2_LOOPj2_DELAY=4;
reg[LOG2_LOOPj2_DELAY:0] ctr_LOOPj2;
wire q2=ctr_LOOPj2[LOG2_LOOPj2_DELAY];
//main state machine for mainLoop
reg[1:0] state;
localparam S_START=0, S_LOOP=1, S_L1=2, S_L2=3;
always @(posedge clock)
  if(reset) begin
    state <= S_START;
  end else
  casez(state)
    //synthesis full case parallel case
    S_START: casez (P_input_request)
      1'b1: begin
        //n=receive P, 0, 32
        n <= P_input_payload;
        i <= 0;
        state <= S_LOOP;
      end
      default: begin end //wait for network
    endcase
    S_LOOP: begin
      cc0  <=  (i<n) ;
      cc1  <=  'tst1 (i) ;
      cc2  <=  tst2 (i) ;
      i_   <=  i+1 ;
      state  <=  S_L1 ;
    end
//main state machine for mainLoop (continued)
    S_L1: casez({cc0, cc1, cc2,
      P_output_acknowledge && q1 && q2,
      LOOPj1_output_acknowledge && q2,
      LOOPj2_output_acknowledge && q1})
      //synthesis full case parallel case
      6'b0??1??: begin
        //send P, 0, q1, q2;
        state  <=  S_START;
      end
      6'b110?1?,
      6'b101??1,
      6'b100???: begin
        //if(cc1) send LOOPj1, i, q2
        //else if(cc2) send LOOPj2, i, q1
        i    <=i_;
        cc0 <= (i_<n);
        cc1 <= 'tst1 (i_) ;
        cc2 <= 'tst2 (i_) ;
        i_  <=  i_+1;
        state <= S_L1;
      end
      6'b111?1?: begin
        //send LOOPj1, i, q2
        state <= S_L2;
      end
      default: begin end  //wait for network
    endcase
    S_L2: casez(LOOPj2_output_acknowledge && q1)
      1'b1: begin
        //send LOOPj2, i, q1
        i   <=  i_;
        cc0  <=  (i_<n);
```

```
            cc1    <=   'tst1 (i_) ;
            cc2    <=   'tst2 (i_) ;
            i      <= i_+1;
            state  <=   S_L1;
          end
        default:  begin end //wait for network
      endcase
    endcase   //case(state)
end   //always
//combinatorial outputs for mainLoop (1 of 3)
always  @(*)  begin
    case(state)
    //synthesis parallel case full case
    S_START:  begin
        //n=receive P, 0, 32
        P_input_acknowledge=1;
        P_output_request=0;
        P_output_payload=0;
        LOOPj1_output_request=0;
        LOOPj1_output_payload=i;
        LOOPj2_output_request=0;
        LOOPj2_output_payload=i;
    end
//combinatorial outputs for mainLoop (2 of 3)
    S_L1:  casez ({cc0, cc1, cc2} )
        3'b0?? : begin
            //send P, 0, q1, q2
            P_input_acknowledge=0;
            P_output_request=(q1 && q2);
            P_output_payload=0;
            LOOPj1_output_request=0;
            LOOPj1_output_payload=i;
            LOOPj2_output_request=0;
            LOOPj2_output_payload=i;
        end
        3'b110,
        3'b111: begin
            //send LOOPj1, i, q2
            P_input_acknowledge=0;
            P_output_request=0;
            P_output_payload=0;
            LOOPj1_output_request=q2;
            LOOPj1_output_payload=i;
            LOOPj2_output_request=0;
            LOOPj2_output_payload=i;
        end
        3'b101: begin
            //send LOOPj2, i, q1
            P_input_acknowledge=0;
            P_output_request=0;
            P_output_payload=0;
            LOOPj1_output_request=0;
            LOOPj1_output_payload=i;
            LOOPj2_output_request=q1;
            LOOPj2_output_payload=i;
        end
        default:  begin
            //default outputs
            P_input_acknowledge=0;
            P_output_request=0;
            P_output_payload=0;
            LOOPj1_output_request=0;
            LOOPj1_output_payload=i;
            LOOPj2_output_request=0;
            LOOPj2_output_payload=i;
        end
      endcase
//combinatorial outputs for mainLoop (3 of 3)
    S_L2:  begin
        //send LOOPj2, i, q1
        P_input_acknowledge=0;
        P_output_request=0;
        P_output_payload=0;
        LOOPj1_output_request=0;
        LOOPj1_output_payload=i;
        LOOPj2_output_request=q1;
        LOOPj2_output_payload=i;
    end
    default:  begin
        //default outputs
        P_input_acknowledge=0;
        P_output_request=0;
        P_output_payload=0;
        LOOPj1_output_request=0;
        LOOPj1_output_payload=i;
        LOOPj2_output_request=0;
        LOOPj2_output_payload=i;
    end
    endcase // case(state)
end //always @(*) begin
//quiescence circuits
//LOOPj1 quiescence flip flop and counter begin
always  @ (posedge clock)   begin
    if(reset) begin
        ctr_LOOPj1 <= -1;
    end else if(!LOOPj1_output_quiesced  ||
        (LOOPj1_output_request && LOOPj1_output_acknowledge))
        ctr_LOOPj1 <= LOOPj1_DELAY-1; begin
    end else if(!q1) begin
        ctr_LOOPj1 <= ctr_LOOPj1-1;
    end
end
//LOOPj2 quiescence flip flop and counter
always @(posedge clock) begin
    if(reset) begin
        ctr_LOOPj2 <= -1;
    end else if(!LOOPj2_output_quiesced  ||
        (LOOPj2_output_request && LOOPj2_output_acknowledge))
        ctr_LOOPj2 <= LOOPj2_DELAY-1;
    end else if(!q2) begin
        ctr_LOOPj2  <=   ctr_LOOPj2-1;
    end
end
endmodule
```

Quiescence flip-flops have the following problem that we should be aware of: When an inner loop A is initiated, setting quiescence flip-flop q1, and then inner loop B starts waiting on inner loop A's quiescence through q1, a new instance of inner loop A setting the same quiescence register q1 again cannot be started (a write-after-read dependence exists, since B is still reading and waiting for q1). Of course, for the new instance of A, we could use a new independent quiescence circuit and a different quiescence flip flop: The request message for the new instance of A should have a tag different from the request message for the old instance of A, and this tag should be propagated to all sub-tasks of the new and old instances of A, in order that the quiescence of activities emanating from the new and old instances of A can be independently determined. But to retain the hardware simplicity for the baseline supercomputer, we simply respect the write-after-read dependences within quiescence flip flops as follows: whenever there is a quiescence dependence (A,B), but there is no dependence (B,A), we add the dependence (B,A) to ensure the dependence is symmetric. In this manner, whenever B is waiting on an old instance of A, a new instance of A should in turn wait for B. Therefore, the new instance of A cannot overwrite the quiescence flip-flop that is now being read/waited on by B. This problem is also solved by optimization number 2 in the optimizations section, which describes a more general synchronization technique, which can be used in lieu of quiescence detection.

How to do Multiple Network Sends and Receives in the Same State/Cycle

When two send and/or receive operations are being done in the same FSM state and condition:

Exactly one data transfer should be done in each FIFO; and

The transition to the next state should wait until all FIFO transfers specified within this state and condition are done.

For example, if memory operation 1 asserts output_request and gets output_acknowledge during the first cycle of a stalled state, while memory operation 2 asserts output_request but does not get an acknowledge for several cycles (therefore preventing a state transition), in the second cycle a second transfer of the same data should not occur on the sending FIFO of memory operation 1: therefore, further transmission should be stopped on the sending FIFO of memory operation 1, as soon one transfer has successfully been completed.

To prevent this potential error: we use
A request satisfied flip-flop for each sending fifo interface; and
An acknowledge satisfied flip-flop for each receiving fifo interface.

A request_satisfied flip-flop operates and is used as follows:
The request_satisfied flip-flop is set to zero at system reset time
If the request_satisfied flip-flop is zero, and a transfer on this FIFO is requested and it is about to occur (output_request and output_acknowledge are both 1), but the current state cannot complete because of some other stall condition, the request_satisfied flip-flop is set to one.
If the request_satisfied flip-flop is one, and all stall conditions within the state are resolved, allowing transition to the next state, the request_satisfied flip-flop is set to zero again.
The outgoing output_request is set to (!request satisfied), thus, all communication on this FIFO is inhibited while the request_satisfied flip-flop is on.
For the case of the two simultaneous send operations, the state transition to the next state will occur when (request_satisfied||output_acknowledge1) && (request_satisfied2||output_acknowledge2). More than two simultaneous sends are similarly handled.

Receive FIFOs operate similarly, with an acknowledge_satisfied flip-flop.

The objective of the request_satisfied flip-flop is to prevent further FIFO transactions once a transition occurs within a state, and also to send output_request and input_acknowledge signals with very little logic delays at the beginning of the cycle (output_request is connected to the inverted version of the request satisfied flip-flop, AND'ed with the one-hot state flip-flop and tree path condition within that state).

If during a receive operation, the old value of a register r1 which is accepting the data is also the source of a sending FIFO performing a concurrent send operation, and the sending FIFO is stalled but the receiving FIFO is not stalled, the sending FIFO might incorrectly send the new value of r1 instead of the old value of r1 (which would violate a dependence over register r1). To solve this, the compiler should avoid using the same register as the source of a sending FIFO and the destination of a receiving FIFO, within the same state and condition. Where this is not possible, whenever the receiving FIFO is about to transfer data to r1, but there is a concurrent send of the old value of r1 which is stalled, the incoming data should be received into a different register r1', and then r1' should be copied to r1, when all stall conditions are removed and the transition to the next state is made.

How to Receive Responses Out of Order

In a memory network with multiple ports and multiple interleaved banks, load request 0 and load request 1 may be sent from the same port in that order, but load request 0 may go to bank 0 causing a cache miss, and load request 1 may go to a different bank, say bank 3, causing a cache hit. Therefore the response to request 1 may come back before the response to request 0.

To be able to identify which request is being responded to when out of order responses are possible, a tag is added as an additional least significant field of a request, as described in FIG. 13.

For each tag number i=0, . . . , n−1 of the given master port, where n is the maximum number of outstanding requests, the following registers are created:
Tag i busy flip-flop (1 bit). This is 1 if and only if a request with this tag number i has been sent out, but the response has not come back yet.
Tag i data register (N bits, equal to the payload width of the receiving FIFO of the master port).

The number of tags should be approximately equal to the pipeline depth of a primitive operation (or the loop replication count of an inner loop), subject to resource constraints. Tags are used in round-robin order. The sending of a request is stalled while the tag busy flip-flop for the next tag number to use is 1 (which means that the response for the last request using this tag has not come back yet). When the tag busy flip-flop is finally 0, and the send request is accepted by the network, the send operation finally succeeds by returning the next tag number, while the tag counter for this sending FIFO is incremented modulo the total number of tags. Even though sends and receives are pipelined, the receive operation corresponding to a send, will use the same tag that was used for the send, in order to ensure that the correct response is received.

When the response to a request with tag x has arrived at the receiving FIFO of the present master port, it is immediately accepted into the tag x data register, and the tag x busy flip-flop is set to 0 again.

A receive operation for tag x now becomes a purely local operation within the thread unit. The receive operation
receive r1=NW, x, . . .
stalls until the tag number x busy flip-flop is zero, and then receives the contents of tag x data register into the destination register r1.

This guarantees that even if the responses to requests come back out of order, the responses are saved in the corresponding tag data register. If and when the state machine finally gets to process that response, it will be available in its tag data register.

The thread unit may send requests for operations without side effects (such as loads, multi-cycle operations such as divide, or even inner loops) speculatively, that is, without waiting for the condition guarding the request in the original sequential program to be computed. Speculative execution often improves performance. To support speculative execution, the memory system should be prepared to receive load requests from non-existent or otherwise inaccessible addresses, since a speculative load on an untaken path can attempt to access just any value as an address, including invalid values. If the speculatively sent request is not on the actual taken path, the corresponding response, if any, is still always received by the thread unit, but may remain unused. To maintain frequency, once a request for a speculative operation is sent out by a master port of a thread unit, it will not be canceled by this thread unit even if the speculation is later found to be incorrect. A speculatively issued inner loop nest that is on an untaken path may take a long time, or may not even terminate, since the loop exit condition may depend on garbage (for example, if an inner loop is speculatively issued whose "loop count" comes from a tagged union in C++ code, before checking the tag of the union, there is no telling what the "loop count field" really contains). Therefore, speculatively issued inner loop nests should be confined to those which the compiler can prove will terminate in a reasonable time regardless of whether the speculation is correct. However, optimization number 8 within the optimizations section will relax this restriction.

The response to a speculative load operation with tag x is always accepted into the tag x data register. However, the response may remain unused since the load was not on the taken path. In this case, the same tag x data register will be overwritten at the next opportunity where tag x is re-used.

As a frequency optimization, an incoming response to the receiving FIFO and its tag can be accepted into a staging buffer without checking the tag of the incoming data, and written back to the corresponding tag data register on the next cycle. When the tag data register is read during a receive operation on this port, the data will be bypassed from the staging buffer, if it is still there, and is not yet stored in the tag data register.

Out of order reception of responses costs one extra cycle in terms of minimum latency.

This approach does not solve the latency tolerance problem, pipelined responses are still processed in the order they were sent by the finite state machine. In fact, responses sometimes should be processed in order because of dependences, for example, exceptions occurring in inner loops of a loop, invoked in a pipelined manner with hierarchical software pipelining, should be checked in the original sequential order. But the responses can arrive in an arbitrary order; and the circuit will still function correctly thanks to the tags described in the present section. Remedies to the latency tolerance problem are discussed in optimization number 9 Later in this document.

Designing an out-of-order response unit: In case the number of tags (maximum number of outstanding requests) is large, it is no longer possible to use flip-flops and registers. Similarly when incoming messages have variable length, tag data registers are no longer appropriate. One idea, in this case, is to use a circular buffer, made out of a multi-ported SRAM, that mimicks the algorithm given above.

Partitioning Large Designs

Now that we have covered the conversion of a loop/program region to a hardware thread unit, and have also described the construction of the top level design, we can go back to the problem of partitioning large designs that do not fit on a chip.

Partitioning a Design Across Multiple Chips

It is clear that, as a result of hierarchical software pipelining, an array of inner loops, where each inner loop contains its own array of inner loops, where each inner loop contains its own array of inner loops, and so on, will quickly fill up the area of a single chip for an application with sufficient parallelism. For this reason, application-specific supercomputers should be implemented using multiple communicating chips. However, for lowering the cost of testing and manufacturing, chips and boards/rack modules should preferably follow a standard uniform format, the chip-to-chip communication mechanism should use a well-understood scalable network (an incomplete hypercube implemented with high-speed serial communication cables in this embodiment) and the messages going across chips should preferably follow a standard format rather than a custom format.

First, a flat design is created that assumes all components and networks will fit on a single chip as described in the section on the top level design. Notice that a component can communicate with another component only through a network. This property is essential for making partitioning easy.

Note that the memory hierarchy "black box" super-component in the flat design can also be partitioned across chips, by exploding the super-component into its internal components and networks, before partitioning.

Now we regard this flat design as a hypergraph [30], with hypervertices being components, and hyperedges being the networks. I.e., a network, when viewed as a hyperedge, is the set of components (hypervertices) this network connects to. Using a heuristic hyperedge weight, such as network communication volume obtained from a software or hardware profiler (the communication volume will be proportional to the number of loads/stores that were executed for a given memory, or the total inner loop register parameters and results communicated over a task network, all available from the basic profiler-feedback statistics), the components of the flat design hypergraph are partitioned into multiple chips while trying to minimize the weight of the cut set edges (cutsize) and trying to achieve an almost equal distribution (e.g., ranging from 45%-55% to 55%-45%) of each kind of resource in each component. As a result, a mapping is created from each component to its partition number (chip number).

If a hypergraph bipartitioning algorithm (e.g., [30]) which creates two almost equal sized hypergraphs from one while minimizing the cutsize is available, it can be used to recursively partition a design into as many chips as needed until all resource constraints are satisfied. Here is a recursive hypergraph bipartitioning algorithm in pseudo C++ code:

```
int part[ ];//maps each vertex to its part number
int partNo= -1;   //part no. counter
//recursively bipartition hypergraph (V,E)
void partition (
    const set<HyperVertex>& V
    ,const set<set<HyperVertex> >& E,
    ,const Weights maxweight) {
    if (vertex_weight(V) > maxweight) {
        //resources are exceeded,
        //try to cut them in half,
        //while minimizing the cutsize
        set<HyperVertex> V1,V2;
        tie(V1, V2) = bipartition(V,E);
        set<set<HyperVertex> > N1, N2;
        foreach(n,E) {
            //  hyperedge splitting
            set<HyperVertex> n1  =n.intersection(V1);
            set<HyperVertex> n2  =n.intersection(V2);
            if (n1.size( ) > 1) N1 = N1.insert(n1};
            if (n2.size( ) > 1) N2 = N2.insert(n2};
        }
        partition( V1, N1, maxweight);
        partition( V2, N2, maxweight);
    } else {
        partNo++;   foreach (u,V)  part [u]=partNo;
    }
}
```

Inter-partition communication has a significant energy cost. Notice that by minimizing the inter-partition communication volume at each recursive bipartitioning step, the partitioning algorithm above will also reduce the total energy consumption of the application specific supercomputer, by preferring not to partition networks that have a high communication volume.

Finally, for each network such that not all the endpoint components are on the same chip, a partial network (also formed from butterfly sub-networks or task sub-networks) is created on each chip, which is also connected to the chip I/O controller. For simplicity, messages are sent by components as if the design were flat (destination port=flat network output port number). The partial network uses a custom routing lookup table ROM to convert a destination (master or slave) port of the original flat design network to a destination port of the local partial network on the present chip, before a message enters the local partial network. An extra local output port field is appended to the first word of the message for local routing (the word size is expanded if needed), which then guides the message to the correct local output port, through normal incomplete butterfly network operation.

The purpose of the I/O controller component on each chip is to route an internal network message from the chip containing the message source component, to the chip containing the message destination component. Components normally communicate over highly customized application-specific networks. When not all components attached to a customized network Y can be placed on a single chip, the I/O controller makes it possible for a component on a first chip A to send a message to a component on a second chip B over network Y, in effect extending the custom application-specific network Y over multiple chips.

- The I/O controller on the first chip A accepts the message from the source component through the local partial Y network, converts the message to a standard format (variable length messages with 64 bit words, with a header word indicating the destination chip, the global network id for Y, and a bit indicating whether this message is a request or response, and the length of the message), and sends it outside the chip, to a (possibly incomplete) hypercube network. The format change typically requires a payload size change (wide to narrow or narrow to wide conversion). Task network requests are sent to the next higher numbered chip, which contains a component attached to the same task network. When there is no such higher numbered chip, the request is sent to the lowest numbered chip that has a component attached to this task network. Chips internally use Gray code numbering, so sending a message to the next higher numbered chip becomes a neighbor to neighbor communication on a hypercube. Normal (non-task) requests are sent to the correct chip containing the destination component, through greedy deterministic incomplete hypercube routing.
- I/O controllers of several chips on the way route the message to the correct next chip in the incomplete hypercube network, using a greedy deterministic incomplete hypercube routing algorithm (described in APPENDIX G) until the message reaches the destination chip B.
- The I/O controller on chip B accepts the message, deletes the header word, and converts the message back to the original customized format of the Y network, by a message payload size change (narrow to wide or wide to narrow conversion). The message is then delivered to the destination component on chip B by the local partial Y network.

FIG. 33, FIG. 34, and FIG. 35, show the partitions resulting from the flat design for RandomAccess in FIG. 19, including the I/O controllers on each partition. To improve the presentation, we made these figures independent of the internal implementation details of the memory hierarchy, by assuming that the memory hierarchy components have been put together again as a partial super-component in each partition.

Reducing NRE Costs Through Chip Unioning

While the application-specific supercomputer can be prototyped by using FPGAs, in order to benefit from the performance and power reduction advantages of an ASIC, an ideal solution is to use an ASIC instead of FPGAs when creating the final accelerator after all optimizations are done. However, releasing different ASICs for each partition will likely incur Non Recurring Expenses (such as mask expenses) multiple times. The final partitioning algorithm will attempt to distribute almost equal number of components of a given type to each chip. The compiler can then apply chip unioning to the partitions, in order to create a union chip that can act as any one of the partitions depending on the initial value of configuration registers and SRAMs added to the design, which will be written at system initialization time to make each chip, on each rack module, on each rack, realize the correct partition. The initialization of the configuration SRAMs can be done with a separate small embedded microprocessor and a separate serial bus connected to the configuration I/O pins of all chips in the system. Based on the initial value of the configuration SRAMs/registers, the union chip can act as one of several partitions of a design. The components within the union chip will still be implemented with custom logic within the ASIC design, and the union chip will be recompiled to accommodate the extra delays for accessing the configuration SRAMs and the extra latencies of enlarged networks due to chip unioning; thus, the ASIC performance advantage will likely remain intact within the union chip.

Creating such a union chip in the context of an FPGA prototype of the supercomputer can also help reduce total FPGA synthesis and implementation time and FPGA programming time at application startup. However, the union FPGA chip will require more resources than any individual partition.

To explain chip unioning, we will call the components of the original flat design the global components. We will call the master (slave) port numbers of a network of the original flat design the global master (slave) port numbers. Notice that after chip unioning, all messages are still sent with global master port and global slave port numbers of the flat design (pretending that the design was never partitioned). Translation tables (that are part of the configuration SRAMs of the union chip) convert a global master (slave) port number to a local master (slave) port number on the union chip, and handle the correct inter-chip and intra-chip routing on the different instances of the union chip. The following are the main configuration SRAMs/registers that are needed to make a union chip realize a particular partition.

For each partition:
For each partitioned network which is connected to at least one global component in the partition,
- The global slave port number to local slave port number map. The value of this map for a global slave port number, is
  - the local slave port number of the I/O controller, if the desired global slave port number is not in this partition, and
  - the local slave port number this global slave port number was mapped to within this partition, otherwise.
- The global master port number to local master port number map. The value of this map for a global master port number, is
  - the local master port number of the I/O controller, if the desired global master port number is not in this partition, and the local master port number this global master port number was mapped to within this partition, otherwise.

These maps ensure that the message is routed to the correct port of the correct global component within the partitioned and unioned variant of the design.

Regardless of the partition:

For each partitioned network
- A global slave port number to partition number map denoting the partition which contains that global slave port number.
- A global master port number to partition number map denoting the partition which contains that global master port number.

These tables are needed by the union chip I/O controller, so it can identify the destination chip to send a request or response message. These tables are the same for all partitions and can be therefore placed in a ROM in the union chip. If a simple regular distribution, such as a block or cyclic distribution [32], is used by the partitioning algorithm, not even a ROM is needed: the destination partition number can be obtained in this case from a substring of the bit string representing the global port number.

For each partition:

For each partitioned task network that is connected to at least one component in the partition,
- a next partition register indicating the next higher partition number where there is a thread unit connected to this task network. If there are no more thread units in the remaining partitions, then the next partition register contains the smallest partition number where there is a thread unit connected to the task network.
- Notice that a task parameters message travels through all thread units connected to a task network until it finds a free thread unit, going back to the beginning if there are no free thread units anywhere. The partition id's use Gray coding internally (e.g., the binary partition id numbers 00, 01, 10, 11 become 00, 01, 11, 10 in Gray code), so this forwarding approach often results in neighbor-to-neighbor routing in a hypercube.

For each partition:
a local component presence mask, whose one bit represents the subset of local components to which some global component is mapped in this partition. When the presence mask bit is zero for a local component, no global component is mapped to this local component, which then does nothing in this partition. This component can be powered off to reduce leakage current.

FIG. 36 shows the results of chip unioning applied to the partitions created from RandomAccess. The local components of a given type are given the sequence ids A, B, C, . . . while the global flat design components of the same type were given the sequence ids 0, 1, 2, . . . . FIG. 37 and FIG. 38 show the different contents of configuration SRAMs required for realizing each partition.

Let us say that a set of identical global components forms a component type. Examples are: a thread unit for a particular inner loop, replicated many times, or an L2 cache that is replicated many times.

The union chip is constructed from the flat design and its partitions as follows:

For each component type t:
Create on the union chip the maximum number of instances of the given type that occurred in any partition.
For each partition, create a global to local component map that assigns each global component of type t in the partition to a same-type local component of the common chip, greedily, in increasing numerical order of global components and local components. This map will be called the local version of a global component of type t in a given partition.
Note that, a local component of type t may remain unused in a given partition, if no global component of the partition is mapped to it.

Create the union chip networks.
For each global network that occurred in any partition, create an instance of the same network
Create an instance of the I/O controller
Create the maximum number of external (serial) chip-to-chip communication devices that occurred on any partition. Connect all these serial communication devices to the I/O controller with a one to one network.
For each network n:
If the I/O controller is connected to the network n with a master port on any partition, also connect the I/O controller with a master port to network n on the union chip.
If the I/O controller is connected to the network n with a slave port on any partition, also connect the IO controller with a slave port to network n on the union chip.
The I/O controller will thus be assigned the local master (slave) port number 0 for each of the networks it is connected to, with a master (slave) port.
For each local component x on the union chip:
For each (partitioned or non-partitioned) network n that x will be connected to,
For each internal master port m of component x connected to network n
Connect this internal port m to the next local master port m' of local network n on the union chip.
For each internal slave port m of component x connected to network n
Connect this internal slave port m to the next local slave port m' of local network n on the union chip.
This will complete the creation and wiring of the local components, local networks and the I/O controller on the union chip. APPENDIX K gives an additional algorithm for creating the configuration SRAMs and registers for each partition, which completes the construction of the union chip.

How to manage finite resources on the union chip: The union chip should contain at least one instance of each component type. Thus, if including one of each component type already exceeds resources on the union chip, aggressive optimizations that increase the number of component types (such as creating customized caches through specialization) should be confined to the most critical components.

To increase the chances that the union chip will fit in the target technology, the partitioning algorithm should give high priority to dividing all component types equally among partitions, while also minimizing the volume of cross-partition communication. The union chip should preferably have a large area to start with.

After partitioning, the union chip still may not fit in the target technology, even though each partition alone fits. For example when one partition contains 1 X component and 100 Y components, and another contains 100 X components and 1 Y component, causing the union chip to have 100 X components and 100 Y components and exceeding the allowed area, one can apply the following algorithm to break up offending groups of components contributing to a large area on the union chip, through additional partitioning:

```
Let A(p,t)= total area of components of type t on partition p
Let N(p,t) = number of components of type t on partition p
while(the union chip does not fit) {
    within { (p,t)  |   N(p,t)>1} find a (p,t) which
    maximizes A(p,t).
    bipartition p, giving high priority to equal
    distribution of resources.
}
```

Optimizations

Several optimizations can be applied over the baseline technique for generating an application specific supercomputer from a sequential program, which was described above.

1. Customized Partitioned Memory

By means of custom partitioning of the memory hierarchy in an application specific supercomputer obtained by applying the present document's techniques, its memory system performance can be improved. The idea of customized partitioning of memory for creating application specific hardware was disclosed in the co-pending U.S. patent application Ser. No. 13/156,881 (entitled "storage unsharing") by the present inventors. In that document, the basic memory partitioning idea and its many optimizations were presented in detail as stand-alone concepts for potential memory system performance improvements in an application-specific hardware accelerator. We will briefly summarize this technique here, and additionally provide an algorithm for constructing the customized, partitioned memory hierarchy of an application-specific supercomputer, using the concepts of this technique.

This optimization partitions the memory of application-specific hardware compiled from a software program, into multiple smaller memories that can operate independently and in parallel, without needing coherence. Multiple smaller memories can provide improved performance, energy savings, and area savings, compared to the baseline system with a single, unified memory and coherent caches.

Through symbolic execution-based dependence analysis of memory load, store and update instructions in the program (as described in APPENDIX J), the storage unsharing technique creates a memory address space hierarchy tree, whose root is the software application memory address space. Each node in the memory address space hierarchy is also annotated with the hierarchical program region where the memory address space is active. Each child memory address space (henceforth to be called just memory) contains only a subset of the addresses in its parent memory. All memories use the same addressing structure (i.e., if a data structure at address x in the software application memory is present in a node of the memory tree, it is also located at the same address x within that node). Because the children of a given parent memory are guaranteed, by virtue of dependence analysis, not to share any writable addresses among them, these children do not need to be coherent among themselves.

The root memory MEM (the software application address space) is always active. A child memory becomes active only during the scope of a hierarchical program region (loop, or begin-end block), from the time the region starts and until the time the region ends. The immediate child memories of MEM become active during the top program region. At the entry to the region which constitutes the scope where a child memory MEMc is active, MEMc is initialized from its parent memory MEMp (the contents of the memory addresses that will be read during the execution the region are conceptually copied from MEMp to MEMc) with a link MEMc=MEMp instruction. At the end of the region which constitutes the scope where MEMc is active, the changes made to the child memory MEMc during the execution of the region, are flushed back to the parent MEMp, with an unlink MEMp=MEMc instruction. The original program's memory instructions are changed to refer to specific different memories, instead of a single memory MEM.

Memories are frequently implemented as caches, such that
- a link MEMc=MEMp is implemented as a no-op (meaning: start MEMc as an empty cache, and bring in lines from its parent MEMp cache as misses occur in the MEMc cache); and
- an unlink MEMp=MEMc results in the efficient flushing of all dirty lines of the MEMc cache to the parent MEMp cache, and the efficient invalidation of all the lines in the MEMc cache.

When initialization or final flushing of a child memory is not necessary (as in the case of a data structure locally declared on the stack) the link MEMc=MEMp instruction can be optimized as link MEMc=NULL (meaning: let MEMc be initialized with undefined contents), and unlink MEMp=MEMc can be optimized as unlink NULL=MEMc (meaning do not flush the changed lines in MEMc, just invalidate all the lines in MEMc). More details are given in the above-mentioned co-pending patent application.

We provide here an algorithm for creating a customized memory hierarchy for an application-specific supercomputer using these concepts. The algorithm takes the following inputs:
  i. The abstract memory hierarchy created by the maximal recursive application of storage unsharing to the program, and
  ii. Profiling feedback information about the locality of access for each memory instruction;
and produces the following output:
  The non-partitioned, flat structural hardware design for the memory hierarchy.

First, the maximal memory hierarchy is examined for memory nodes that can be removed, using the following techniques:
  Register promotion,
  L1 cache removal due to lack of locality of access, and
  Removal of unprofitable memory nodes.

To remove a node from the memory hierarchy tree, the following technique is used:
  Convert the children of this node into the new children of the parent of this node;
  Detach this node from its parent; and
  Finally delete the node.

Register promotion by compiling the write-update snoopy cache protocol: When all the memory instructions accessing a memory within a region refer to one single address through the region which is the scope of the memory, the memory is implemented as a register. The register is:
  Loaded from its parent memory within the region as soon as the address in the parent memory is computed (if the memory location is read before being written) and
  Stored back to the same address in the parent memory when exiting the region (in case the memory location is live outside the region, and the register may have been modified during the region).

Loads from the memory location now copy from the register, and stores to the memory location now copy to the register, thus eliminating the references to the memory location within the region.

Application-specific hardware has many more registers than a general purpose processor (which typically has 8-32 registers), thus, register promotion can indeed reduce memory references compared to a general purpose processor.

When there are two or more memory instructions referencing the memory address space, each with a distinct address expression, registers are still used for eliminating memory references, but for each distinct address expression, the behavior of snoopy write update caches each with a single one-word line, is compiled into customized finite state machine hardware. For example, referring to FIG. 39, assume that in a program region to be converted to a finite state machine, there are loads and stores to A[j] and A[k], but that the compiler does not know if j==k at run time. This is a difficult compilation problem: existing register promotion techniques for general purpose processors leave these accesses as loads/stores to memory, and are unable to place them in a register. But hardware is more resourceful than a general purpose microprocessor. Referring again to FIG. 39, here is how the compiled finite state machine code acts like snoopy write-update caches:
  An initial load from A[j] proceeds as a usual load.
  Then, an initial load from A[k] gets the data from the already cached A[k] that is available in a register if (k==j), and from A[k] in memory, otherwise.
  Subsequent loads and stores just use or update the cached register value of A[k].
  Then, a store into A[k] updates the cached register value of A[k] and also updates the cached register value of A[j] as well, if (k==j).
  Accesses to A[j] are similarly optimized. Many loads/stores are eliminated in this manner throughout the region. At the end of the region, the cached values of A[j] and A[k] are stored into the parent memory (A) (if they could have been altered); and the single line, single word register caches of A[j] and A[k] are conceptually invalidated. Note that the final stores into A[j] and A[k] can occur in any order, and give the correct result regardless of whether j==k or not: if j==k, both stores will store the same value to the same address, thus, the ordering of these stores is irrelevant. This technique can be easily generalized to more than two distinct address expressions and to general control flow. Notice that armed with a state-of-the-art compiler dependence analysis algorithm for avoiding unneeded runtime address comparisons, and special purpose customized circuits, very aggressive register promotion can be done as a result of the present technique while constructing a customized finite state machine for a region, above and beyond existing register promotion techniques for general purpose processors. Even though we are presenting the present register promotion technique as part of the memory hierarchy design, because the technique enforces dependences between memory instructions and bypasses data directly between memory instructions, it is in fact a customized hardware synchronization unit, inlined into the main finite state machine of the thread unit.

A memory that is register-allocated is removed from the memory hierarchy. Register allocation is an optimization that should be done on the sequential code, before scheduling and software pipelining for creating the finite state machine begins.

Removing L1 caches of memories with low locality of reference: Memory hierarchies involving L1 caches, are simply pointless for very large data structures randomly accessed within some scientific and commercial applications with low locality of reference: all references to the data structure will cause an L1 cache miss in such applications, leading to wasted energy and increased latency due to the L1 caches. Only large amounts of DRAM can accommodate the working set of such applications (RandomAccess is one such example application). When, through profiling feedback, it is determined that accesses to a certain memory node have a low locality of reference, the memory node is removed from the hierarchy. If the parent memory is not already the lowest level, it is similarly removed.

Removing unprofitable memory nodes: Creating a child memory MEMc of a parent memory MEMp has the benefits of:
  Removing coherence hardware between MEMc and the siblings of MEMc in the memory hierarchy tree,
  Achieving a smaller amount of physical as well as logical ports in caches/SRAMs implementing MEMc, and
  Possibly creating a specialized small cache for MEMc (e.g., an SRAM or flip-flop implementation, with fewer data and address bits).

Creating a child memory MEMc of a parent memory MEMp has the cost of:
  Reading lines from MEMp to MEMc (if needed) for initialization, and flushing changed lines from MEMc to MEMp (if needed) at the end of the region.

If the data will be used just once between the time it is loaded from MEMp to MEMc and then stored from MEMc back to MEMp, the child memory will likely just waste energy. Therefore the average re-use rate for a memory node (average number uses of each datum loaded from a parent memory) should be measured by a profiler and should be used within a cost-benefit calculation that also depends on the technology parameters. Unprofitable memory nodes should be removed.

Notice that the costs of flushing the dirty lines of a child cache to the parent cache, and invalidating all lines in a child cache, can be reduced by:
  Using the following hardware algorithm for flushing groups of dirty lines within a dirty line bit set, without needing to search sequentially through all cache lines:

```
for(x=dirtyLineSet; x!=0; x=resetRightmostOneBit (x) ) {
    flush (oneHot2Binary (isolateRightmostOneBit (x) ) ) ;
}
Where:
resetRightmostOneBit (x) = (~ (-x) ) &x; //1010-> 1000
isolateRightMostOneBit (x) = (-x) &x; //1010-> 0010
oneHot2Binary(x) = a hardware encoder for mapping
    a one-hot encoded number to the corresponding
    binary number, e.g.,
    0001 ->00, 0010->01, 0100->10, 1000->11
```

Using one of the following techniques for invalidating all lines in the child cache:
  Implementing an "SRAM reset" hardware function, for resetting the entire contents of the SRAM array for the "line valid" bit to 0; or
  Using a "current region invocation time stamp" in an existing SRAM technology without a reset function:
    Storing the value of the current region invocation time stamp in the cache line tag as new lines are brought in from the parent cache;
    Incrementing the time stamp register after the completion of each region invocation;
    Treating lines with an outdated time stamp as invalid during child cache accesses;
    Really invalidating all lines in the child cache only when the time stamp register overflows its limit.

The surviving memory nodes in the revised memory hierarchy are implemented in hardware with the following algorithm:
  First, initial transformations are done (applicable to both leaf and non-leaf memories)
    Compaction of address space: If possible, a forward address transformation (converting a program address to a compact array address) and a reverse address transformation (converting a compact array address to a program address) is added, to remove holes (unused locations) in the address space, and to improve spatial locality of accesses within the region, at the expense of applying the address transformations during the initialization and flushing of the child memory. For example, a normally non-contiguous row of a matrix in a column-major layout, is made contiguous in the child memory containing the row, with a forward transformation consisting of subtracting a base address, and dividing by the spacing between elements. A reverse transformation of multiplying by the spacing between elements and adding the base address is used for computing the address in the parent memory, for the purpose of flushing an entry.
    Removal of dead, constant or redundant bits: Dead, constant or redundant bits (bits that are copies of other bits) in the region where the memory is active, are removed from both the address and data bits of this memory. These bits are not implemented in the physical data arrays (register array, SRAM, L1 cache, L2 cache) for this memory. An unimplemented bit is re-instantiated when flushing the changed locations in the child memory to the parent, whenever the bit does exist as a non-constant bit in the region of the parent. Address and data bits that appear constant within the region as indicated by thorough profiling of individual memory instructions, but are not provably constant, can be speculatively left unimplemented, and (i) an error can be raised, (ii) the accelerator results can be discarded, and (iii) execution can switch to the original software, if an address bit or data bit does not have the expected constant value at run time.
  Now that the compaction transformations and data and address bit removal are possibly in place, a hardware module is instantiated for each memory node, as follows:
  If a leaf memory is being realized:
    If the memory has a single port
      If this memory is read only within its region, and the addresses used within the region follow a predictable sequence accessed within a loop (such as a fixed stride array access a[i] in a loop with index i, or an indirectly addressed sequence a[f(i)] in a loop with index i, where f is any function, not necessarily a one-to-one function) a streaming load cache is created for this memory. A request containing the beginning address, parameters for the f function, and (if known) the number of items in the sequence, is first sent by the thread unit before entering the loop. Each data item of the sequence is then received by the thread unit, with multiple back-to-back receives from the same master port. The addresses of the elements to be fetched are not sent, the streaming load cache figures them out by itself. Where possible, the streaming load cache will speculatively prefetch the next lines from its parent cache or from its small local storage, and will keep the next element to be read in a register for fast access. If the number of items to load is unknown even at run time when the loop is entered, a request to stop sending further data is sent by the thread unit to the streaming load cache to conserve energy, immediately after the loop is exited.
    If this memory node is write-only within its region, and the address sequence is a predictable sequence accessed within a loop (such as fixed stride array access a[i] in a loop with index i, or an indirectly accessed sequence a[f(i)] in a loop with index i, where f is any function, not necessarily a one-to-one function), a streaming store cache is created. First, a request containing the beginning address, the extra parameters to the f function, and (if known) the number of items in the sequence is sent to the streaming cache before entering the loop. Then, the sequence of the data items to be stored is sent back-to-back inside the loop using the same master port. The addresses of the data items to be stored are not sent; the streaming store cache figures them out by itself. At the exit of the loop a special word indicating end-of-data is sent from the same master port, unless the number of items was already known in the beginning of the loop. The streaming store cache will write the incoming data first to its small local storage and then to its parent cache, and will always buffer the incoming data items in registers, for fast access.
    If the address range of the memory node is bounded by a small compile time constant (as in accesses to a row of a matrix):
      an SRAM or flip-flop register file covering the address range is used instead of an L1 cache
        If any SRAM/register file element may be used before being set, at the entry to the region, the SRAM is initialized from the parent memory node, as the implementation of the link instruction.
        If any memory location is modified within the region and used outside the region, at the exit of the region the changed entries of the SRAM/flip-flop register file are written back to the parent cache, as the implementation of the unlink instruction.

Otherwise (if the address range of the memory is not bounded)
    A pipelined L1 cache with a single slave port for receiving loads/stores and a single master port for sending line reads/line flushes to the parent memory, is used Else (for a multiple port leaf memory)
    If the address range of the memory is bounded by a small compile time constant
        A multi-ported flip-flop array or a bank-interleaved shared SRAM with fixed size, covering the address range is used instead of an L1 cache:
        If any SRAM/register file element may be used before being set, at the entry to the region, the SRAM/register file is initialized from the parent cache, when implementing the link instruction. If any modified location within the SRAM/register file is used outside the region, at the exit of the region, the changed entries of the SRAM/register file are written back to the parent cache, when implementing the unlink instruction.
    Otherwise (leaf node, where the address range is not bounded)
        Like a very small version of the scalable globally coherent memory design described in FIG. 16 and APPENDIX E, each port is connected to dedicated L1 caches, which are in turn connected to each other via one or more directories with a directory-based write update protocol. The directory bits for each child are in kept in extra bits of the parent cache line. The directory bits, whenever they are not all zeros are cached in the directory within the child memory. This directory bit caching within the child memory, enables the identification of the owners of an L1 cache line, without accessing the directory bits in the slower lower-level parent cache.
        The directories access the parent cache, when a requested line is not present in any of the coherent group of L1 caches Else (A non-leaf memory)
    In case there are no performance critical accesses by a thread unit to the non-leaf cache,
        A bank-interleaved organization is chosen to support requests both from child caches and thread units.
    Else
        A directory-based write-invalidate organization is chosen to support requests both from child caches and the thread units.

Implementing the Root Memory:

The data and tag arrays of each L2 cache in the system are in a DRAM adjacent to it. The L2 cache controller itself contains just the pipeline controls. A simple approach is to use all the L2 caches in the supercomputer collectively as a robust bank-interleaved L2 cache for the root memory. The dirty lines of the L2 cache should be flushed to the software application memory at the end of the accelerated code fragment. The children of MEM that do not need to be flushed back to the root memory (e.g., stack variables) can be mapped to regions of the DRAM above a certain fixed address. The lines above the fixed address will not be flushed to the root memory when the accelerated code fragment finishes. In this manner, the accelerator can use much more memory than the maximum allowed for a 32-bit software application. If the accelerator memory is indeed much larger than the application address space, this approach guarantees that the actual software application will service only mandatory cache misses. Also if an error is detected before committing the changes in the L2 back to the application memory, the commit can be canceled as an error recovery technique.

Another approach is to use a different L2 to implement each immediate child of the root memory MEM. In this case each L2 needs to include a dirty bit mask in its tag, to prevent false sharing.

Hardware implementation of a memory hierarchy node: Memory nodes with a fixed small number of memory locations, implemented with a flip-flop register array or plain SRAM, are best realized if inlined into the finite state machine of the region, without send or receive operations, since the access time will usually be fixed for such a memory node. Otherwise, the realization of a memory hierarchy node is a black box selected from a parametrizable library of memory hardware modules, that has one or more slave ports receiving requests from thread units and child caches, and one or more master ports sending read line/flush line requests to the parent cache. The cache data and tag arrays can be outside the box (as in the case of an L2 cache whose data and tag arrays are in external DRAM). When there is more than one slave port of a memory box, the accesses to this memory from the multiple ports are kept coherent. The implementation of the memory box can follow a directory-based write-update protocol, directory-based write-invalidate protocol, or a bank-interleaved shared cache organization. As an orthogonal feature, the memory box may include a customized forward address transformation and a customized reverse address transformation, in order to achieve higher spatial locality.

Deciding on the cache parameters: This is a difficult task for a compiler when using only static analysis. However, software profiling feedback about locality of accesses by each memory instruction can be used for determining an initial set of cache parameters (line size, associativity, cache size) for each memory node. Then, using an FPGA prototype of the accelerator hardware with reconfigurable, self-profiling caches (maintaining event counters on each access), a search algorithm may be used for improving the implementation efficiency of each memory node. The search algorithm (e.g., hill climbing for each cache being monitored) will repeatedly execute the following steps: (i) run the application with the current sets of cache parameters, (ii) read, through a scan chain, the event counters in each reconfigurable cache being monitored, and then (iii) decide on the incremental changes for the next sets of cache parameters to try, until a time budget is exhausted, or a performance objective is reached. To save time, the cache parameter space for two sibling nodes in the memory hierarchy tree, can be searched in parallel (although there will be some interaction due to the common parent). As an example, the memory hierarchy tree can be processed in parallel stages, starting from the leaf nodes, followed by the parent nodes whose children are already processed, and so on. The end result will be the best cache parameters found so far for each node in the memory hierarchy.

Effect of memory partitioning on dependence analysis, scheduling, software pipelining and synchronization: Finally, we should describe how memory partitioning impacts dependence analysis, scheduling, software pipelining, and synchronization. For scheduling to work well together with memory partitioning, the region used by memory hierarchy creation is made to agree with the region of scheduling. This region will be a loop invocation (all iterations of a loop), not one particular iteration of a loop. As a special case, the outermost program is treated as the top region. For memories that are local to a inner region, the thread unit responsible for implementing the inner region, first executes the link for the local memory, executes the loop in pipelined fashion, and finally executes an unlink for the local memory (flushes and invalidates the caches associated with the local memory) after the loop invocation is complete. Each instance of an inner loop replica will use a different local memory node, through renaming. Each inner region of an inner region will in turn use the renamed memory of its parent.

Luckily, scheduling, software pipelining and synchronization are not at all affected by memory partitioning. Scheduling, software pipelining and synchronization are done as if the memory were not partitioned at all. The only requirement is that the initial link MEMc=MEMp for a child memory activated within a region should precede all references to MEMc within the region, and the final unlink MEMp=MEMc in a region should follow all references to MEMc within the region.

An example: FIG. 40 through FIG. 45 show an example of how hierarchically partitioned memory is implemented.

FIG. 40 shows a code example for hierarchical memory partitioning.

FIG. 41 shows the memory address space hierarchy for the code example: the original code and the code after memories have been renamed and link and unlink instructions have been inserted. Notice that it can be inferred that each instance of the A1 memory only needs to retain 3 bits, showing an opportunity for data width reduction in the implementation. Also in case N is a power of two, the upper bits of the address are constant bits (i), which is another opportunity for optimization. The A memory has unknown width and hence the original 32 bits need to be kept.

FIG. 42 illustrates a memory node implementation with private coherent caches

FIG. 43 illustrates a memory node implementation with shared bank-interleaved caches FIG. 44 illustrates a memory node implementation also with shared bank-interleaved caches (with the data array being external). This setup is usually used for communication with DRAM as an external data array for a cache.

FIG. 45 illustrates an implementation of the memory hierarchy example. Assuming the loop replication count for the inner j loop was 2, two copies of the child memory A1, (A1 and A1') were created.

2. Relaxing the Requirement for Waiting for a First Complex Instruction to Complete Before a Dependent Second One Starts Consider a program region C with two inner loops A and B immediately included within C. When an instance of the complex instruction (inner loop) B depends on an instance of a previously executed complex instruction (inner loop) A, in our baseline supercomputer's synchronization algorithm, the given instance of B waits for the activities started by all logically earlier instances of A to quiesce, before B even starts. While quiescence detection is desirable since it requires very little hardware, there is a performance cost for this approach. Assume that an instance of instruction $I_2$ in the given instance of B depends on an instance of instruction $I_1$ in the given instance of A, moreover that the dependence edge (instance of $I_1$, instance of $I_2$) is on the global critical path of the execution trace for this input to the region C. Making the instance of B wait for the instance of A to complete, lengthens the global critical path (contributes to slowing down the program) by at least the following extra amount of time:

The time between points where $I_1$ executes and A completes, plus:

The time between the points where B starts and $I_2$ executes.

However, in some cases the instance of the second complex instruction/region does not need to wait for the instance of the first one to finish entirely. In this section, we will describe four important optimizations, which will be implemented by creating a significant amount of new special purpose hardware for the purpose of achieving inter-thread synchronization, above and beyond quiescence detection. The present section demonstrates the advantages of using specialized hardware circuits for solving difficult problems in automatic parallelization: the synchronization algorithm to be described here would be infeasible using existing microprocessors and software alone. The four optimizations are:

1. A (the producer thread) can incrementally send synchronization information (such as the array indices being accessed by A) to B (the consumer thread). In this manner, B can begin before A ends.
2. It is possible that only a conditionally executed sub-region B' within B (and not the rest of B) depends on A. In this case, B should start without waiting for A to complete, and synchronization with A should occur only if B' is actually executed within B. Such fine grain differentiation among B and its sub-regions is not possible in the baseline synchronization algorithm.
3. It is possible that B depends only on a conditionally executed sub-region A' within A (B does not depend on the rest of A). In this case, B should wait until all earlier instances of A' and ancestor regions of A' within A are finished. Making B wait for ancestors of A' within A is required even if B only depends on A' (it is not sufficient to make B wait just for A'), since while any ancestor region of A' within A is still running, A' might still be (re)executed at any time. But once A' and all ancestors of A' within A are finished (therefore allowing B to start), if a different sub-region A" within A, such that A' is not reachable from A", is still running, then A" should freely execute concurrently with B, since B does not depend on A". Such fine grain differentiation between A and its sub-regions is not possible in the baseline synchronization algorithm.
4. While an instance of B is waiting for a logically earlier instance of A, it should be possible to start a new instance of A (if the new instance of A does not in turn depend on B). This is not possible in our baseline synchronization algorithm, when using one single quiescence circuit for A, as already described around the paragraph above beginning with the words "Quiescence flip-flops have the following problem that we should be aware of . . . ".

These four optimizations are in agreement with our spawn-and-forget model of compiler-managed parallelism, which is unstructured compared to co-begin/co-end [23], but which forces a thread 2 to wait for a thread 1 only when required by first principles of dependence analysis.

To implement these four optimizations, let us first define a new subclass of dependence. A pair of memory instructions $I_1$ immediately inside region A and $I_2$ immediately inside region B (where both $I_1$ and $I_2$ access a common data structure) have a train crash dependence, if and only if $I_1$ and $I_2$ are dependent in at least one common ancestor region of A and B (i.e., at least one of $I_1$ and $I_2$ is a store, and there is an execution of such an ancestor region where an instance of $I_1$ and an instance of $I_2$ access the same location), and $I_1$ in region A accesses addresses within the common data structure using a non-decreasing sequence in a given direction, and $I_2$ in region B accesses addresses within the common data structure also with a non-decreasing sequence in the same direction. In this context, A is called the producer region and B is called the consumer region.

If the only dependent pair of instructions belonging to the region pair (A,B) is $(I_1,I_2)$, which has a train crash dependence, then the region pair (A,B) is said to have a train crash dependence.

In the synchronization scheme to be described, synchronization is done between pairs or producer and consumer regions, regardless of where the regions are located in the region hierarchy. For every pair of regions (A,B)

If (A,B) have a train crash dependence, then a train crash synchronization unit is inserted between all the replicas of A and all the replicas of B.

Else, if there is any dependence between A and B, a serialization synchronization unit is inserted between all the replicas of A and all the replicas B.

Considering the remarks about waiting for ancestor regions, given in optimization number 3 above, finally, for each dependent pair (A,B) where A and B are not ancestors of each other, let C be the youngest common ancestor (least upper bound) region of A and B. For each ancestor A' of A until but not including C, a serialization synchronization unit is inserted between all replicas of A' and all replicas of B. If there was already a train crash synchronization unit (A',B), it is deleted (converted to a serialization synchronization unit).

A train crash synchronization unit is a kind of network that (i) includes logic in it and (ii) normally does not use FIFO handshaking signals. It operates as follows: it receives producer requests from thread units implementing A (the producers) and consumer requests from thread units implementing B (the consumers), and ensures that no instance of $I_2$ accessing an address x will execute, until a logically preceding instance of $I_1$ has already completed an access to an address past x, in the direction of the accesses. In a flat, non-partitioned design, for synchronizing N producer thread unit replicas of region A with M consumer thread unit replicas of region B, the corresponding train crash synchronization unit (A,B) has N producer request slave ports and M consumer request slave ports. Each of the N producer thread units implementing region A have a single producer master port connected to the (A,B) train crash synchronization unit. Each of the M consumer thread units implementing region B have a single consumer slave port connected to the (A,B) train crash synchronization unit. Here is the specification for the producer and consumer requests accepted by a train crash synchronization unit:

Producer slave port of the train crash synchronization unit: This port is connected point to point to the corresponding producer master port of the producer thread unit. A producer thread unit for region A transmits its global dynamic thread sequence number, its lower and upper index bounds (index==array index, equivalent to an address, but with fewer bits), and its first index into the shared data structure (equal to "minus infinity," meaning a new sequence is about to start). The lower index bound, upper index bound, and dynamic thread sequence number are saved in registers inside the train crash synchronization unit. Then, the slave port receives the sequence of indices accessed by the producer thread within the shared data structure. Finally the slave port receives the special index "plus infinity" (meaning the access sequence of the producer thread is complete). The global dynamic thread sequence numbers impose a logical execution order on threads, allowing clear differentiation between past and future threads; these numbers will be explained around the paragraph below beginning with the words "For dynamic thread sequence number comparisons, a global dynamic thread numbering technique is used . . . ". A producer thread unit is initially inactive as seen by the synchronization unit. After the first index of a producer thread unit's access sequence within a region invocation (minus infinity) is received, that producer thread unit becomes active as observed by the train crash synchronization unit. A producer thread unit becomes inactive again as seen by the train crash synchronization unit, when the final "plus infinity" is received from it, meaning this producer thread unit has completed its current region invocation.

The producer slave port sends back an acknowledgement response to the producer thread unit after a new dynamic thread sequence number is received, when sufficient time has elapsed to allow the "minus_infinity" value that starts the new index sequence to reach all the consumer thread units. The producer thread unit does not need to stall while waiting for this acknowledge signal, as explained below in the race conditions section.

Consumer slave port of train crash synchronization unit: This slave port connects point to point to the consumer master port of the corresponding consumer thread unit. A consumer thread unit for region B sends its thread sequence number, and its lower and upper index bounds to the train crash synchronization unit. This consumer's dynamic thread sequence number and upper and lower index bounds are saved in registers within the synchronization unit. The slave port then sends back a response which is a non-decreasing sequence of indices starting with the current minimum index currently being accessed by logically earlier producers and ends with plus infinity. The current minimum logically earlier producer index depends on how far logically earlier producer threads have progressed: it is non-deterministic, but this non-determinism does not affect program results. If all logically earlier producer threads are finished, or there are no logically earlier producers, then a sequence consisting only of plus infinity is received by the consumer as the response. In more detail, the response sequence sent to the consumer is computed as follows:

Consider only the active producers
  i. whose index range overlaps with the consumer's range based on the given index bounds (meaning there is a potential dependence), and
  ii. whose dynamic thread sequence number is less than the consumer's dynamic thread sequence number (meaning the producer is in the past, not the future).

At any given cycle, these active producers are accessing indices in the common data structure in parallel, each with a non-decreasing sequence that starts with minus infinity. The dynamic minimum of the current indices being accessed by all such active producers is computed at each cycle. The value of this dynamic minimum at each cycle constitutes the sequence sent to the consumer. The computation of the dynamic minimum is done with a pipeline whose latency is a number of cycles, say k. The output of the pipeline reflects the true dynamic minimum k cycles ago, where k is pipeline depth. Since the active producer sequences are non-decreasing, and since no new threads that are logically earlier than the consumer will appear in the allowed time windows for observation (see the race conditions section below), the response sequence sent to the consumer thread unit is also a non-decreasing sequence ending with plus infinity. The pipeline for a consumer is a multi-stage tree of "minimum" operations (each performing min (x,y) on inputs x and y) whose leaves (inputs) are the current indices accessed by potential producers and whose root (output) is the current minimum logically earlier producer index being fed as input to the consumer. A separate "minimum" tree is used for each consumer. I.e., the train crash synchronization unit looks like an N input M output crossbar switch, constructed with M copies of N input 1 output multiplexers, except that each multiplexer is replaced by a pipelined "minimum" computation tree.

Consumer master port on consumer thread unit: This port continuously receives the index sequence representing the current logically earlier minimum producer index, from the corresponding consumer slave port on the synchronization unit. Before making an access to index n within the common data structure, the consumer thread will wait (the state machine will freeze) until the current logically earlier minimum producer index is ahead of n (ahead relative to the direction of the data structure traversal).

Producer master port on the producer thread unit: This port continuously sends the index sequence for accesses made to common data structure. An index for an access is sent in the original sequential program order of the producer, after the access is completed (after a load response comes back for the case of a load, and after a store acknowledge is received for the case of a store). For the case of a sequence of store indices a separate little FIFO and a separate finite state machine (index sending engine) handles the waiting for store acknowledge signals, and the sending of the indices of completed stores in the original program order. The main finite state machine of the producer thread unit is not stalled unless the FIFO for communicating with the index sending engine becomes full.

Notice that while a consumer thread is monitoring the indices of logically earlier producer threads, a logically later producer thread can be started. This is harmless: logically later producer threads shall not affect the response sequence sent to this consumer thread FIG. 46 and FIG. 47 show a train crash synchronization unit. FIG. 46 depicts the generation of the index stream being transmitted from producer i, and going to an input leaf node of consumer j's "minimum operation" tree. In more detail, the circuit in FIG. 46 implements the algorithm described above in hardware, as follows:
If:
Consumer j's upper index bound is less than the producer i's lower index bound (meaning: there is no overlap); or
Consumer j's lower index bound is greater than producer i's upper index bound (again meaning: there is no overlap); or
Consumer j's dynamic thread sequence number is less than producer i's dynamic thread sequence number (meaning: producer i is in the future);
Then:
There is no dependence between producer i and consumer j; producer i will transmit the constant index "plus infinity" to consumer j, as if it were inactive;
Else:
Producer i will transmit the sequence of indices it is accessing within the common data structure, to consumer j.

FIG. 47 shows the tree of minimum operations, connecting the index streams of all producers (8 in this example) to consumer j. There will be multiple pipeline stages through this circuit by inserting pipeline stage registers (not shown). When there are many outputs of the synchronization unit, additional pipeline stages in the form of a fan-out tree should be added to drive the inputs from the producers to all the separate trees for the outputs going to the consumers. Long wires between thread units and the synchronization unit can also be padded with extra pipeline stage registers to maintain frequency, without harming the semantics of the synchronization circuit.

For dynamic thread sequence number comparisons, a global dynamic thread numbering technique is used, where dynamic thread sequence numbers are conceptually formed of multiple digits separated by dots (where the number of dots is equal to the nesting level of the thread). The thread sequence numbers are compared using lexicographic ordering. The outermost region of the program (the main thread) has sequence number 1. The sub-regions of the top region have thread sequence numbers 0.1, 0.2, 0.3, . . . (these are less than the parent's sequence number 1 in lexicographic order, because a parent thread spawns a child thread and then immediately keeps going. A child thread is therefore logically earlier than the continuation of its parent thread, and should have a dynamic thread sequence number less than its parent thread). The sub-threads of the dynamic sub-thread numbered 0.1 of the main thread are given dynamic thread sequence numbers 0.0.1, 0.0.2, . . . and so on. In general, if a thread has dynamic sequence number
$Xn$
where X is either empty or is a string ending with a dot, and n is a number, its sub-threads will have the dynamic sequence numbers
$Xn'.1, Xn'.2, \ldots$ where $n'=n-1$
It is not necessary for the sub-threads of a thread to be assigned dynamic thread numbers whose last digit consists of consecutive numbers; this last digit only needs to be positive and increasing. For example the concatenation of the bits (iteration number of loop, reverse post-order number of the inner loop spawning send operation within loop) would also do. When a sub-thread is spawned, the live digits of its dynamic thread sequence number (i.e., the digits required for comparing dynamic thread sequence numbers) should be sent as part of the parameters of the sub-thread.

Not all digits of the entire dynamic thread sequence numbers need to be compared within a train crash synchronization unit, to determine which thread is logically earlier. If one dynamic thread sequence number X is longer than another dynamic thread sequence number Y.Z, where X and Y have the same length (one of the threads is deeper in the region hierarchy), the missing trailing digits of the shorter number X are assumed to be zero, while Z is never all zeros, therefore it suffices to compute Y>=X to infer that Y.Z>X. Also, initial digits that are always identical among the two thread sequence numbers W.X and W.Y (where W emanates from common ancestor regions) can be disregarded: it suffices to compute Y>X to infer that W.Y>W.X.

Between a pair of program regions (A,B) a serialization synchronization unit can be created as a special case of a train crash synchronization unit that does not need to transmit indices continuously from a producer to a consumer: a producer thread forming part of a serialization synchronization, as its first action when its starts, sends its thread sequence number, followed by 0 ("minus infinity" for a null index). It sends 1 ("plus infinity" for a null index) when the producer thread terminates, indicating this producer thread is "done". The minimum current producer index is computed with a tree of AND gates ("minimum" operations for data width=1 bit). A consumer thread monitors the incoming stream of current "producer done" signals of active producers whose dynamic thread sequence number is less than the consumer, and waits until the incoming value is 1 (all logically preceding dependent threads are complete), before starting. FIG. 48 and FIG. 49 show the hardware for a serializing synchronization unit.

Some optimizations are possible on the train crash synchronization unit:
  If for a given producer-consumer region pair, all producer thread instances are known at compile time to be logically earlier than any consumer thread instance, the thread sequence numbers need not be sent to the train crash synchronization unit (meaning: all consumers need to synchronize with all active producers). For example, when the parent thread is not a loop, a second child thread will always have a dynamic sequence number greater than the first child thread.
  If each consumer thread instance is known at compile time to have an overlapping range with each logically earlier producer thread (as determined by profiler feedback or static analysis), i.e., it does not help to again check for actual overlap at runtime, or if the lower and upper bounds of the address sequence cannot be determined, then the range checking with lower and upper bounds can be removed. In this manner, each consumer thread instance will be assumed to have a potentially overlapping range with each logically earlier producer instance, and synchronization will be performed.
  When both thread sequence number checks and range checks are eliminated, we are left with simple pipelined "minimum" trees which are identical for each consumer, where each inactive producer transmits "plus infinity" at its leaf node, and each active producer transmits the current index it has just accessed. An important consequence of this optimization is that resources can be shared among the different "minimum" operation trees for each consumer, resulting in very efficient hardware. For example, a 5 producer to 3 consumer train crash synchronization unit with resource sharing, will look exactly like the incomplete butterfly sub-network given in FIG. 7, where each node of the butterfly sub-network (containing one half of a core crossbar switch) is replaced by "minimum" operation unit followed by a pipeline register stage. There will be no need for the initial fan-out tree pipeline stages.

When a given region Z is a consumer for multiple kinds of producer regions $X_1, X_2, \ldots, X_n$ with serializing dependences, and Z is also a consumer for multiple producer regions $Y_1, Y_2, \ldots, Y_m$ with train crash dependences, Z's finite state machine should first wait for each logically earlier producer X, to send "plus infinity" or "done" over the serialization synchronization unit $(X_i, Z)$. Then, each access by Z to index n within a data structure shared with a producer region $Y_i$ should wait until an index greater than n is received from the $(Y_i, Z)$ train crash synchronization unit. For each producer region, Z should initially send its thread sequence id and other parameters to the appropriate synchronization unit, before waiting for a response.

When the result of a producer region X is used by multiple consumer regions $Z_1, Z_2, \ldots, Z_n$ with serializing or train-crash dependences, the producer region X transmits multiple sequences of indices starting with minus infinity over separate producer master ports, one producer master port for each consumer region. The thread sequence id, index bounds if applicable, and the minus infinity index value is sent at the beginning of each sequence. During the body of the producer region X's execution, the train crash synchronization signals (current indices) are incrementally sent to connected train crash synchronization units, as accesses are being made to shared data structures. The "plus infinity" index value is sent as the last index of each sequence when X terminates.

Race conditions: A consumer thread instance cannot read a current minimum producer thread index input and perform its next access during a forbidden time window, i.e., until each producer thread instance that is logically earlier than this particular access of the consumer thread instance, has gone through task networks and has reached a producer thread unit, and has started transmitting its current indices, and this transmission has reached the present consumer thread unit. We will accomplish the correct desired behavior and prevent a consumer thread from reading its input during the forbidden windows of time, by slightly modifying the existing quiescence signals. The original quiescence circuit should be kept intact if it is needed for another purpose (the original and modified quiescence detection networks can co-exist).

The original quiescence signal for a leaf region A normally means: all previous instances of A have completed, in other words, either there was no prior instance of A, or all thread units of A are idle, and the task network for A is also empty. To make train crash hazard detection work, we create a new, completely independent modified quiescence circuit, where the only difference is that the "(this unit is) idle" signal from an A producer thread unit that feeds into the quiescence detection network "Qunit" as in FIG. 11, is replaced by the logical AND of the signals "(this unit is) idle or transmitting,". one signal for each producer master port of the producer thread unit.

For each producer master port of the producer thread unit, the idle or transmitting signal (implemented as a flip-flop) is defined as follows: At system reset time, the idle or transmitting flip-flop is set to 1. When a producer thread unit receives the parameters of a new loop/region invocation, idle or transmitting is set to 0. Then:
  The producer thread unit sends its thread sequence number, lower and upper bounds if needed, and the minus infinity index value to the synchronization unit connected to this producer master port;
  The thread unit then keeps going with other operations without waiting;
  After enough delay has elapsed, an acknowledge signal arrives from the synchronization unit to this master port, indicating that the synchronization unit has received the minus infinity index value, and sufficient time has elapsed for the signal to reach all the consumer units. When the acknowledge signal arrives the idle or transmitting flip flop for this producer master port is automatically set to 1, without intervention from the main finite state machine.

Then, as the producer thread is about to end:

The producer thread waits for each of its inner regions that are producers of serializing or train-crash synchronization units, to reach modified quiescence, by waiting for their modified quiescence flip-flops to become 1; (to prevent a "glitch" period where I have ended yet my child has not yet started transmitting)

The producer thread waits until all idle or transmitting flip flops within this thread are 1, i.e. until acknowledge is received from each producer master port; (to prevent a late arriving acknowledge signal from causing an error during the next loop invocation)

Then, for each producer master port the thread unit sends plus infinity to the corresponding synchronization unit.

Finally the producer thread finishes (starts to wait for the next region invocation request). At this time all idle or transmitting flip flops of the thread unit are 1.

The idle or transmitting flip flops will become 0 again when the producer thread unit accepts a new task.

The modified quiescence flip flop is built using the circuits as in the original quiescence flip flop. The definitions above guarantee that when the modified quiescence flip-flop that is associated with sending the request for an inner producer region A is a one, all of the following are true:

All logically earlier instances of A have either terminated or have started transmitting on each of the producer master ports they are connected to.

If a logically earlier instance of A spawns its own inner producer regions, by the time A ends, every instance of these inner regions will be either be idle or transmitting on each of their producer master ports. When in turn the inner regions end, their inner-inner regions that are producers will be idle or transmitting, and so on. This means when a consumer thread B depends on both A and an inner region A' of A, then B will start receiving the transmission of A', before the transmission of A finishes: there will be no "glitch" period between the two points where A stops transmitting, and A' starts transmitting, which might lead B to falsely think it is free to proceed. This property is important for implementing optimization 3.

Referring to FIG. 50 and FIG. 51, let us start with a simple synthetic example program to show how the optimizations to parallel execution occur based on the principles given above. In the program of FIG. 50, it is useful to follow this example sequence of events in detail:

```
main thread, with dynamic thread sequence number (1),
starts
main thread spawns i loop (0.1)
main thread starts waiting for i loop activities to
quiesce, using normal (not modified) quiescence
i loop spawns first j loop (0.0.1) at iteration (i=0)
    j loop (0.0.1) parameters reach a j-loop thread unit
    through the task network, which first sets its idle
    or transmitting flip flop to 0. After this j-loop
    thread unit's transmission has reached the j-loop->k-
    loop synchronization unit and all the k-loop thread
    units, the idle or transmitting flip flop of this j-
    loop thread unit is set again to 1.
i loop (0.1) spawns a second j loop (0.0.2) at iteration
(i=2) after waiting for the first j loop (0.0.1) to reach
modified quiescence
    The second j loop does not wait for the first j loop
    to complete, it starts right after the first j loop
```

-continued

```
    starts transmitting.
i loop (0.1) finishes.
second j loop (0.0.2) spawns a k-loop (0.0.1.1) at
iteration (i=2;j=0); there is no wait since this is the
first k-loop spawned by this j-loop
    Since before j-loop (0.0.2) was started, the i loop
    waited for the modified quiescence of the first j-
    loop (0.0.1), by the time this k loop (0.0.1.1)
    starts, the transmission from the logically earlier
    first j loop (0.0.1) (i=0) is available to k-loop
    (0.0.1.1). Since j-loop (0.0.1) might still issue a
    logically earlier k-loop, k-loop (0.0.1.1) waits for
    j-loop (0.0.1) to complete. It does not wait for the
    second j loop (0.0.2) (i=2) since that is not
    logically earlier.
second j loop (0.0.2) finishes after waiting for its inner
k-loop (0.0.1.1) to reach modified quiescence (but no-one
will use the transmission from (0.0.1.1)).
first j loop (0.0.1) spawns k loop (0.0.0.1) at iteration
(i=0; j=1);
    the k-loop (0.0.0.1) just starts, the logically later
    (0.0.1.1) k-loop has no effect on it.
first j loop (0.0.1) spawns a second k loop (0.0.0.2) at
iteration (i=0;j=2) after waiting for the first k loop
(0.0.0.1) to reach modified quiescence;
    k loop (0.0.0.2) train-crash synchronizes with
    logically earlier k loop (0.0.0.1) (not with the
    logically later (0.0.1.1))
first j loop (0.0.1) spawns an l-loop (0.0.0.3) at
iteration (i=0;j=3)
first j loop (0.0.1) waits for all of its inner producer
regions to reach modified quiescence (including k loop
(0.0.0.2), but not the 1-loop) and then finishes, allowing
k loop (0.0.1.1) belonging the second j loop, to proceed
    Notice that as seen by k-loop (0.0.1.1) there was
    never an incorrect "glitch" period between the time j
    loop (0.0.1) stopped transmitting and k-loop
    (0.0.0.2) started transmitting. The k-loop (0.0.1.1)
    now train crash synchronizes with logically earlier k
    loops (0.0.0.2) and (0.0.0.1).
k loop (0.0.0.1) finishes
k loop (0.0.0.2) finishes
k loop (0.0.1.1) finishes
l loop (0.0.0.3) finishes
main thread finishes
```

All of the four optimizations, 1,2,3, and 4 were demonstrated in the example above. We identify here how each optimization was demonstrated:

1. Incremental train crash synchronization occurs between k-loops, e.g., (0.0.0.1) and (0.0.0.2). The latter k-loop instance does not wait for the former to complete.
2. The second j loop instance (0.0.2) starts immediately after the first j loop instance (0.0.1) starts transmitting. The second j loop (0.0.2) really starts waiting for the first j loop (0.0.1), only when the second j loop issues a k loop (0.0.1.1).
3. The first j loop (0.0.1) spawns its inner l-loop (0.0.0.3). There is no dependence from an/loop to any other loop. The k-loop (0.0.1.1) does not wait for i-loop (0.0.0.3), since, unlike j-loop (0.0.1), there is no way the i-loop (0.0.0.3) can start an activity on which the k-loop (0.0.1.1) depends.
4. k-loop (0.0.1.1) is able to start, without disrupting the observation of k-loop (0.0.0.1) by k-loop (0.0.0.2).

A loop can itself be a consumer of one or more of its inner loops acting as a producer, with a train crash dependence. In this case, before the next element is accessed by the loop, it should wait until all previously issued producer inner loops have already passed that element. The consumer will be logically later than each producer in this case; therefore, thread sequence number checking is not required. The dependence (j loop, i2 loop) within the Eratosthenes's Sieve program (given in FIG. 52), is one such example.

FIG. 53 shows the train crash hazards between various loops of the Eratosthenes's Sieve program for finding prime numbers. This is a highly sequential program. We have the following train crash dependence producer-consumer pairs: (i1 loop, i2 loop), (i1 loop, j loop), (j-loop, i2 loop).

FIG. 54 and FIG. 55 show the Bubble Sort program example and a hardware implementation of it using a train crash synchronization unit. Here each instance of the inner loop of the program has a train crash hazard dependence on the previous instance of the same inner loop, since they traverse the array in the same direction. Each inner loop instance is both a consumer of values written by logically earlier inner loops, and is also a producer for logically later inner loops. A consumer inner loop of outer loop iteration i need not wait for the inner loop of outer loop iteration i−1 to finish; it can start as soon as the inner loop of outer loop iteration i−1 has started transmitting to the train crash synchronization unit. While inner loop for outer loop iteration i is consuming the results of the inner loop of outer loop iteration i−1, the inner loop of outer loop iteration i+1 can start consuming the results produced by outer loop iteration i, and outer loop iteration i+2 can start consuming the results produced outer loop iteration i+1. In this setup, the dynamic thread sequence number (in this case, the outer loop iteration number) is important, a consumer inner loop of loop iteration i, should only wait for all logically earlier iterations i−1, i−2 . . . to pass it, it should not wait for future iterations i+1, i+2 . . . . However, all instances of inner loops will have overlapping ranges, and therefore upper and lower bounds checks need not be implemented.

An optimization of a special case of train crash synchronization, where both the producer and consumer access an identical increasing sequence of distinct addresses: when a pair of instructions $I_1$ (a store) in A and $I_2$ (a load) in B write the same number of elements using the same increasing sequence of addresses, and A is executed if and only if B is executed, and there is only one replica each of A and B, a FIFO synchronization unit is created connecting A and B, the store $I_1$ is preceded by a FIFO send of the datum, the load $I_2$ is replaced by a FIFO receive for the datum. If the common data structure accessed by $I_1$ and $I_2$, is not accessed by any other instruction, then the store instruction $I_1$ can be eliminated as well. A network of signal processing filters can be conveniently created in C++, with this technique. Communication through FIFOs is likely to be more energy-efficient than communication through a memory coherence protocol.

The optimization in the last paragraph can be slightly generalized, to cover the case of a producer loop that writes a sequence of elements of a data structure, but skips some elements (leaves the old value of the element in memory) and a consumer loop that reads the same sequence of elements but skips reading some of the elements. This producer and this consumer loop can still be made to communicate with a FIFO synchronization unit, through a technique called sequence completion. The producer is made to produce all elements of the sequence originally containing skipped elements, by loading the old value of the element from memory and writing it back (therefore sending it to the FIFO), for the case of skipped elements. The consumer is then be made to consume (receive from the FIFO) the entire sequence of elements, discarding elements that were skipped in the original algorithm. For example, for each element 0 . . . N−1−i of the a array, the inner loop of Bubble Sort outer loop iteration i, will either write the element, or leave its old value intact, and then elements 0 . . . N−2−i of array a (one element less than the elements that were produced) will be consumed by the inner loop of iteration i+1 (iteration i+1 will receive but discard the last element of its FIFO input). An unrolled bubble sort outer loop can be implemented with cascaded filters using the technique of the previous paragraph. The first inner loop will read the array a from memory. And the last inner loop within the unrolled loop body will write the array a to memory (and therefore the first inner loop and last inner loop can follow the standard train-crash synchronization technique). FIG. 56 and FIG. 57 demonstrate the Bubble Sort algorithm implemented as cascaded filters.

The FIFO synchronization technique can be used even when the accessed sequence of addresses is not an increasing sequence. Rather, it can be used whenever each address in the given sequence is distinct. For example, when the producer region writes into a[f(i)] and the consumer region reads from a[f(i)] inside loops with index i, where f is any one-to-one function, then a[f(i)] can be sent through a FIFO from the producer to the consumer.

Using a thread sequence number with limited bit width for each digit may lead to more economical hardware. When the last digit n overflows its allotted width while an outer region is about to spawn a sub-thread with dynamic sequence number Xn, an outer region can wait for all logically earlier loops Xk (k<n) any sub-activities started by them (a special synchronization unit is built to accomplish this conditional waiting), and issue the next sub-thread with dynamic thread sequence number X1 instead of Xn.

As an additional optimization, note that in most scientific codes a compiler can determine not only that an instance of a region B depends on logically earlier instance of a region A, but can also determine a dependence distance vector and dependence direction vectors for (A,B). For example, in a program where there in an outer i loop and an inner j loop, the j loop in outer loop iteration i may depend specifically on the inner j loop in iteration i−K, when i>=K. Such specific dependence distances can be used to create a custom thread sequence number comparator in the (j-loop, j-loop) synchronization unit: the consumer j loop depends on the producer j loop only if the thread sequence number of the consumer j loop is exactly are K i-loop iterations ahead of the producer j loop; otherwise the consumer and producer j-loops are independent.

Partitioning train crash synchronization units: As an example, assume we have two producer thread units X0 and X1 and three consumer thread units Y0, Y1, Y2, where as a result of partitioning X0, Y, Y1 are placed in chip 0 and X1, Y2 are placed in chip 1.

To achieve the partitioned design of the train crash synchronization network for connecting all the producers to all the consumers, we can create two partial synchronization units (X0,X1) to Y0, and (X0,X1) to Y1, in chip 0, and a third one, (X0,X1) to Y2 in chip 1. Each of the producer thread units X0, X1, should broadcast its index sequence to all chips where there are consumer units. A partitionable and scalable broadcast circuit can be obtained by modifying a task network in the shape of a 1D torus. To achieve a broadcast function, the partial synchronization unit attached to each node of the 1D torus can simply eavesdrop on the network message and accept the next word of the message, without disrupting the forward progress of the messages through the 1D torus. Just before the message reaches the original node it was sent from, it can be discarded. In the partitioned design, after being delivered to local partial synchronization units on the current chip, the producer index stream should enter the I/O controller on the chip through a FIFO, and should then be delivered to the next chip in Gray count order which has a consumer unit (similar to how messages travel in a partitioned task network). While the inputs and outputs of the train crash synchronization unit are combinatorial wire signals, they need to be converted to FIFO interfaces for the purpose of entering the I/O controller and crossing chips, by using wire-to-FIFO adapters, as mentioned in the description of quiescence detection circuit in APPENDIX C. Normal indices within a producer's index stream could be lost during the wire to FIFO conversion without causing harm, for example if a producer thread accessing elements of an array is already at index 1000, but the message has been delayed because of contention in the I/O controller, it is actually better to tell this fact to the remaining consumer thread units ASAP by not sending 1, 2, 3, . . . , 999 in the sequence, and just sending 1000 instead. But local FIFOs before the I/O controller should be large enough so that important words such as thread sequence number, minus infinity or plus infinity are never lost due to a FIFO full condition (buffer overrun).

3. Compiling Thread Level Speculation into Customized Hardware

The data speculation technique for scalar operands (the ability to reorder memory instructions in a compiler targeting a parallel in-order processor) has been proposed for general purpose processors executing load/store instructions (e.g., [Ebcioglu et al., U.S. Pat. No. 5,542,075]; another variant is in the Intel IA-64 processor). Let us quickly review this technique in the context of application-specific finite state machines. For load instructions that are very often not dependent on prior store instructions according to profiling feedback, but that are dependent on prior store instructions according to static dependence analysis, data speculation can be accomplished by first modifying the sequential code as follows, and then performing scheduling/software pipelining and Verilog code generation steps as usual:

```
//initial sequential code
//in this version, load must follow store
store q0=ra1,rd1
load rd2=ra2,q0 //load waits for store to quiesce
=>
//speculative version where load can move above store
store q0=ra1,rd1
//load_speculative is a normal load,
//but does not wait for prior store
load_speculative rd2_=ra2
cc1=error_check1(ra1,ra2);
//or cc1=error_check2 (ra2,rd2_,q0)
if (cc1) { //speculation was erroneous
   load rd2=ra2,q0; //nonspeculative store for recovery
} else {
   rd2=rd2_; // no errors, commit speculative load
}
//error_check1 is true iff (ra1==ra2).
//error_check2 is true iff the contents of the address ra2 is
not equal to rd2_. This check is done after the store.
```

When this code is scheduled, the speculative load will move over the store, as well as additional instructions that depend on the load, leading to a shorter parallel execution. Instructions that depend on the load but are already executed at the time a speculation error is detected, will be re-executed after re-executing the load, as a natural result of normal scheduling.

In the present document, we generalize the data speculation idea to cover not only loads and stores with scalar operands but complex instructions (such as an entire inner loop nest) that may read and write many words within memory. We also apply the idea for creating application-specific hardware from single threaded sequential programs. For example, when an instance of inner region B very often does not depend on logically earlier instances of an inner region A according to profiling feedback, but B depends on A according to static compiler analysis, the following transformation can be done in the sequential code invoking inner regions A and B, before the usual scheduling/software pipelining and Verilog code generation steps:

```
//Initial sequential code
A  q=r2  //inner loop A uses and sets MEM,
B  r1=q  //inner loop B uses and sets MEM waits for A
=>
A q=r2
//create new scratch address space for speculation
link MEM'=MEM
//B_speculative is the same as B,
//but uses and sets MEM' instead of MEM
B_speculative  r1'=...
//verify that all clean, valid bytes of MEM'
//are equal to those of MEM
//This check will be executed after A has executed
cc1=error_check3(MEM',MEM,q)
if (cc1) { //speculation was incorrect
    B r1=q //re-executes B in order, uses and sets MEM
    unlink NULL=MEM' //MEM' is discarded
} else {
    unlink MEM=MEM' //speculation was correct, commit
}
```

Operations that depend on B may also be moved above A (copies will be made for these operations to execute during the recovery code). Atomic and complex instructions (e.g. inner loop nests) that depend on B but are already executed speculatively at the time a speculation error is detected, will be re-executed, as a natural result of normal scheduling. Compared, e.g., to the multiscalar architecture [6] which is a general purpose architecture capable of thread level speculation, selectively compiling hot regions of code to custom hardware with thread level speculation is likely to be more energy efficient and complexity-efficient.

To avoid generation of the recovery code, which can increase code size and hardware area, we can take the following approach in the case misspeculation is very rare: when a misspeculation is detected, an error is raised, the current accelerator results are discarded and the system stops using the accelerator, reverting to software-only execution. A second recompilation of the hardware can generate the recovery code, or alternatively not execute B speculatively before A.

4. Retaining High Frequency in Large Thread Units

Frequency is extremely important in a synchronous design, which the design style chosen by the present preferred embodiment. A component that fails to meet the frequency requirement will slow down an entire chip. Frequency slowdowns can be caused by several factors within a thread unit, and can become exacerbated within large state machines in particular. In case a large finite state machine is generated, the following techniques can be used to address each of these slowdown factors, to retain high frequency and improve performance.

Fanout of state flip-flops and condition registers: state flip-flops are connected to various clock-enable and multiplexer select inputs. This can in general result in a large fanout and long wires in a complex thread unit controlled by a single state machine. One possible solution is to emulate "clustered VLIW" scheduling techniques [33] [34], which are already known for creating schedules for high-frequency general purpose VLIW processors partitioned into clusters, but have not been used for synthesizing application-specific state machines from sequential code. The techniques include:

- Create N approximately equal size clusters, each with its own identical copy of the finite state machine's state transition logic. I.e., emit N Verilog state machines instead of one.
- Assign operations and registers to clusters during scheduling. Each cluster will execute its own operations (with source registers only within the cluster) and will set its own registers.
- Try to place an operation in a cluster which has one of its source operands
- Try to keep a critical dependence cycle of the loop in one cluster.
- Try to have a balanced distribution of operations among clusters
- Add at least one extra delay cycle to cross clusters
- Always allow at least one extra delay cycle after a compare operation to allow the condition code to propagate to all clusters. A local comparison result will be placed in a local register and then broadcast to the condition register copies in each state machine in an extra cycle.
- For one or more memories, each cluster will be connected to its own private L1 cache copy that uses a write update coherence protocol to communicate with the corresponding copies in other clusters.
- Other slave or master ports to various networks (e.g., inner loop invocation, division) will not be replicated; they will be assigned to particular clusters.

Fanout of output_acknowledge: All replicated copies of the state machine should receive the output_acknowledge signal for determining its next state, while sending a request or response. An extra two-element sending FIFO attached to the sending FIFO interface of the finite state machine with a replicated output_acknowledge (FIFO not full) signal, can provide the required drive strength for the fanout.

Fanout of input_request: All replicated copies of the state machine should receive the input_request signal for determining its next state, while receiving a response or a request. Again a small two-element receiving FIFO attached to the receiving FIFO interface of the finite state machine with a replicated input_acknowledge (FIFO not empty) signal, can provide the drive strength.

Big multiplexers: If the same register is set to several distinct expressions in the final tree VLIW code, this will result in a multiplexer with high fan in. This is often the result of register allocation trying to use the same register for unrelated reasons; it is not necessary for performing the function itself. To solve this problem, register coloring should avoid mapping two non-interfering symbolic registers to the same real register if the number of distinct operations being assigned to the real register exceeds a maximum. When this is not sufficient, we can add a one cycle delay after all (or all but one) of the operations the big multiplexer is selecting from; this way, the operations will each set a private local register. The subsequent full cycle will be reserved for the big multiplexer.

Complex logic on output_payload: sometimes when different values are being sent out on the same sending FIFO, depending on the state and condition, instead of the same default condition, this case results on a multiplexer before the output_payload combinatorial output signal. Again, an extra small local sending FIFO attached to the sending FIFO interface of the finite state machine can absorb the potential frequency slowdown.

Inlining simple functional units: Simple operations normally done on networks with a single slave port, such as accessing a memory that became a small SRAM or register array, can be better done internally within the finite state machine as a pipelined multi-cycle operation, without any network handshaking. This can minimize communication between dependent operations and certainly remove the one cycle send and one cycle receive latency that would otherwise be incurred with a network.

5. Meeting Finite Resource Constraints

Reducing hardware resource requirements of a given thread unit: While scheduling the thread unit finite state machine, restrictions can be placed on:

- the number of ports of each kind of network (equal to the maximum number of parallel network operations of this kind, in a given cycle),
- the number of distinct arithmetic, logical or shifting operations of each kind in a given cycle,
- the total number of conditional branches in a given cycle (number of tree VLIW targets-1),
- the total number of distinct arithmetic, logical or shifting operations of each kind in the entire region,
- the total number of registers,
- Speculation control: disabling code motions that result in speculative execution
- Code explosion control: disabling code motions that increase code size and similar resource-related features, using scheduling constraints of Enhanced Pipeline Scheduling or any other scheduling algorithm that is chosen.

Reducing the Number of Thread Units:

A compiler can of course control the number of replicas of each region thread unit in order to reduce the total thread unit count. A more interesting approach is to share hardware resources among thread units where possible.

If there is a bidirectional serializing dependence between two inner loops F and G in a loop, then any replica of F and any replica of G and any replicas of inner-inner loops thereof, will not execute at the same time. Otherwise, it should be assumed that a replica of F and a replica of G may execute at the same time. When inner loops F and G will not execute at the same time, thread units replicas of F and the thread unit replicas of G can share resources by creating a common (F,G) thread unit that can either perform F or G. Thread units of different inner loops F and G that will execute simultaneously can also share resources as a merged (F,G) unit, to improve hardware utilization, if not all threads units for inner loops F and G are busy all the time, due to complex dependences and resource constraints. A task network already provides the required run-time arbitration for a common (F,G) thread unit that will receive simultaneous requests.

Primitive structural transformation for sharing resources among thread units: The key to resource sharing is a primitive structural transformation on the initial flat design produced by hierarchical software pipelining, involving network coalescing and component coalescing, before attaching the flat design to the memory hierarchy. After this step, partitioning and chip unioning can be performed as usual to create the final supercomputer. Referring to FIG. 58 and FIG. 59, two networks x (where master ports of requesting components of x request the F function and where slave ports of responding components of x perform the F function) and y (where master ports of requesting components of y request the G function and slave ports of responding components of y perform the G function), can be coalesced/made to share resources, by the following technique:

Change the request and response message of x and y to a uniform common format, for example, a multi-word message with one bit opcode field, indicating the F function (if the opcode is 0) or G function (if the opcode is 1).

Create a common responding component (F,G) capable of performing either the F function or the G function. Since each replica of F and G have one slave port each, there will be one slave port of the (F,G) component. The common component waits for a request to arrive at its slave port and then:

If the opcode is 0, it performs the F function and sends back the F response

Else, it performs the G function and sends back the G response.

The (F,G) component will also contain the union of the master ports of F and the master ports of G, which will be connected to the same networks they were already connected to. I.e., if F had m master ports for network w and G had n master ports connected to the same network w, (F,G) will have max(m,n) master ports connected to network w.

Create a new common network z replacing x and y. Connect the master ports originally connected to x, and the master ports originally connected to y, to z. If the same component had a master port for x and another master port for y, and requests to the original master ports for x and y were not issued in parallel, then one master port for z from this component is sufficient. Create a pool of the common (F,G) components replacing the original separate F and G components, and connect the slave port of each (F,G) component to z. For each master port of the original F or G component connected to a network w, connect the corresponding master port of (F,G) to same network w.

Determining the number of common responding components: If F and G are not executed simultaneously, set the number of common responding (F,G) components on the z network to the maximum of the number of F components and the number of G components. If F and G are executed simultaneously, set the number of (F,G) components to the total of the number of F components and the number of G components. The number of (F,G) common components can then be further reduced, by monitoring how busy the common components are through profiling feedback, and recompiling the design.

How to create the common responding components: If F and G are sufficiently similar (e.g., their sequential code control flow graphs have a small minimum edit distance to transform one to the other, after a graph matching), or if both of F and G are small, the common function (F,G) (if opcode==0 then do F else do G) can be synthesized into an FSM as usual. Normal scheduling will try to re-use the hardware functional units between the two functions F and G where possible. Similarity naturally arises, for example, among the k-loop threads connected to different j-loop threads shown in FIG. 15.

Repeated merging of components with different function may at one point become expensive in terms of total area; in that case, a general-purpose microprocessor can serve as the (F,G) function. This microprocessor only needs to include the functional unit kinds needed by F and G, and its pre-decoded instructions (for performing either the F or G function) can reside in a ROM. The general purpose microprocessor contains the maximum number of each operation that can be executed in a given cycle, unlike the finite state machine, which contains the total number of distinct simple operations a scheduled region. However, a general purpose microprocessor is likely to spend more energy than the finite state machine, and cannot benefit from hardware specialization optimizations (e.g., implementing a shift left by a constant value, as a wire connection).

The instruction set of the general purpose microprocessor will be a standard RISC ISA, with the following notable exceptions. First, a number of quiescence registers will be added to the architecture. For sending requests to an inner region and enforcing dependences, and for receiving requests and sending responses to an outer, parent region, the following send, receive and synchronization/wait instructions also will be added to the architecture. Notice that the microprocessor is pin compatible with a finite state machine, therefore its intended function should be clear from the rest of the present document.

Send_request q0=network number, internal master port number, opcode, payload registers Send a request over the specified network and port number for which no response will be received (the request is for side effects only).

Quiescence register q0 is 1 at reset time. q0 is set to 0 after sending the request. When q0 becomes 1 again, all activities due to the request have completed. q0 can be waited on with a wait instruction.

Send_request t0=network number, internal master port number, payload registers

Send a request for which a register response will be received.

t0 is a tag to identify the outstanding request number.

If a corresponding receive is executed, it should use this tag, and should use the same master port of the same network. It is also possible to send a request speculatively, and not execute the corresponding receive.

Receive_response r1=network number, internal master port number, tag, start bit, width Receives the response with the specified tag and places width bits beginning with start_bit into r1. Receive instructions for different fields of the same incoming data should be executed back to back. They will be executed simultaneously as one receive operation.

Wait $q_i, q_j, \ldots, q_k$

Wait for all the specified quiescence flip-flops to become 1.

The set of quiescence registers to wait for is indicated with an n bit mask in the instruction, where n is the number of total quiescence registers in the architecture. The assembler will translate the list of quiescence registers specified by the programmer into such as mask. The wait instruction can be used for ensuring that all activities due to previously issued inner loops are complete, before executing a different dependent inner loop or memory instruction.

Receive_request r1=network number, internal slave port number, start bit, width Receives the request from the specified network and slave port number, possibly including the tag and master port id, and places width bits of the incoming message beginning with start_bit into r1. Receive instructions for different fields of the same incoming data should be executed back to back, these receives will be executed simultaneously as one receive operation.

Send_response network number, internal slave port number, payload registers

Send a response over the specified network and slave port number, possibly including tag and destination master port number, if needed.

We prefer to handle load/store/update memory instructions with send and receive instructions as well, for uniformity, although one could use the traditional load and store instruction formats as abbreviations of send/receive.

Resource-sharing at the limit yields a compiler-friendly general purpose supercomputer: The resource sharing transformation can be repeatedly applied to pairs of networks, ultimately resulting in a single task network connected to a pool of tree VLIW thread units that can perform any region function within the original system. For additional flexibility, rather than placing the general purpose instructions in a ROM in each thread unit, the instruction cache hierarchy of each general purpose microprocessor/thread unit can be backed by DRAM L2, and instruction lines can be read from the software application memory in the host processor, whenever there is a DRAM L2 cache miss. A general purpose supercomputer is obtained in this case, which is friendly to a parallelizing compiler, supporting hierarchical software pipelining and efficient quiescence detection synchronization. Each thread unit will have one or more ports to the task network, and one or more ports to the memory hierarchy network. For avoiding unneeded coherence activity, a fixed small number of private local memories MEM1, MEM2, . . . , MEMn may also be made available to each processor, along with an ability to execute link MEMi=MEM and unlink MEM=MEMi instructions.

FIG. 60 illustrates the flat design for a general purpose supercomputer with k general purpose processors and m connections to external DRAM units. Just like the special purpose accelerator in FIG. 19, the general purpose supercomputer communicates with the host processor with the PCI Express connection, and uses the software application memory as the lowest level of its memory hierarchy. After the flat supercomputer design has been partitioned and chip unioning has been done, FIG. 61 illustrates the union chip containing only 8 general purpose processors Proc A . . . Proc H, as well as connections to external DRAM units, and connections to incomplete hypercube links implemented with high speed serial communication devices. The hypercube links allow communication among partitions. As in the case of scalable special purpose accelerators, the configuration SRAM can be modified to make the union chip realize any of the partitions of the flat general-purpose supercomputer design.

6. Generalizing Quiescence Detection to Arbitrary Task Invocation Graphs

We first define a region invocation graph: the vertices of the graph are program regions (loops, begin-end blocks) and there is an edge (x, y) if and only if region x invokes region y.

The transformation of the last section, as a result of creating multi-function merged regions for the purpose of resource sharing, can break the tree organization of region replicas produced by hierarchical software pipelining as shown in FIG. 15, and lead to an arbitrary region invocation graph. When A region A sends a request to invoke a sub-region B, and
A needs to detect the quiescence of region B and all of the sub-regions invoked from it, because a different sub-region B_ or an atomic memory instruction directly contained in A depends on B; but
A does not dominate [35] all sub-regions reachable from B in the region invocation graph E.g., there is a different region A_that can invoke a region C reachable from B, without going through A, as shown in the following region invocation graph example:

```
//region invocation graph edges:
// (main,A_) , (main, A)
main ( ) { ... A_ ( ) ; A ( ) ; ... } //A_, A independent
//(A, B), (A,B_)
A ( ) { ... B ( ) ;... B_ ( ) ; ... } //B_ waits for B
// (B,C)
B ( ) {...C ( ); ...}
// (A_,C)
A_ ( ) { ... C ( ); ...}
```

Then, the simple quiescence detection described in FIG. 12 based on monitoring a spanning tree no longer works: Assume the quiescence detection spanning tree rooted at the A thread unit includes the B and C thread units. An A_task (working in parallel with an A task) might have spawned a long running C task which keeps sending a "not quiesced" signal up this quiescence detection spanning tree, even though the B tasks spawned by A, and the children C tasks spawned in turn from these B tasks have all completed, causing A to incorrectly think that B has not quiesced, although in fact B and all of its sub-region invocations have quiesced. The incorrect "not quiesced" signal will unnecessarily delay the execution of B which should wait for B to quiesce. As one alternative, we could create different quiescence networks as in FIG. 12 for tasks emanating from A and tasks emanating from A_, using tags throughout the system to differentiate between the tasks initiated by A and the tasks initiated by A_, but here is a simpler solution:

B, just before it is about to end, can first wait for all the sub-region tasks that it has initiated to quiesce, and finally report that it has completed, by sending back a zero-width acknowledge. In turn, A needs to wait until number of requests sent to B equals the number of acknowledges received from B to infer that B has quiesced. In more detail, here is what B needs to do before it ends, in order report quiescence of itself and all its sub-regions:

Wait until all inner region invocations within B that do not return a result have quiesced; and
Wait until all stores immediately within B have quiesced (#requests==#acknowledges);
Then, send back a zero-width acknowledge response to the region invoking B (the acknowledge is sent to the master port of the invoker thread unit, which is known to B), before waiting for the next input for region B.

The region A, can in turn detect that all prior instances of B and B's sub-regions have completed, by waiting until (#requests==#acknowledges) for the sending FIFO for invoking B. When B invokes a sub-region D: if B dominates all sub-regions reachable from D, then standard quiescence as in FIG. 12 should be used while B waits for D's quiescence. Otherwise D in turn should use generalized quiescence, and B should wait until the (#requests==#acknowledges) for D, to ensure that all its previous invocations of D have quiesced.

Sometimes two different inner loop/sub-region functions will be invoked from the same master port sending FIFO, for resource sharing purposes. The loop may need to know whether all earlier instances of an inner loop quiesced, separately for each different inner loop. In this case, when the zero-width acknowledge is sent back, the opcode of the inner loop being implemented is also sent back. The loop receiving the acknowledge can count the requests and acknowledges for each inner loop function with separate counters attached to the master port, and can therefore determine the quiescence of functionally different inner loops sharing the same master port, separately, and enforce correct dependences between its inner loops.

The generalized quiescence algorithm holds up the thread unit for a loop while waiting for inner loops to quiesce, hence has less potential parallelism than the original quiescence circuit in FIG. 12. This original quiescence detection circuit implements the true spawn-and-forget model, where a loop can finish without worrying about its inner loops, and then be invoked again, while its previously issued inner loops are still running.

7. Recursive Task Invocation

Although recursive procedures can be converted to iterative loops and handled just like ordinary loops, additional parallelism can be obtained by considering a recursive procedure as a recursively invoked region (i.e. a region invoking one of its ancestor regions). Many common recursive algorithms are in this category, e.g., quicksort, towers of Hanoi, N-queens problem.

Recursion creates a region invocation graph that is cyclic, i.e., not tree shaped. Therefore the generalized quiescence detection technique of the last section can be used, if a recursive function invokes itself a number of times, and should detect the quiescence of these invocations. However, if only the main function needs to know that the top level recursive call has quiesced, the more efficient standard quiescence circuit (shown in FIG. 12) should be used, since the main function dominates all recursively invoked regions reachable from the top level recursive call.

Avoiding deadlock: In case a thread unit invocation cycle is created (as in a recursive region hierarchy), then each thread unit on an invocation cycle should be ready for deadlock: with an algorithm with inherently exponential complexity, thread units on an invocation cycle can quickly flood the task networks with many requests, and then will all wait for the clogged network to accept a new request, effectively becoming deadlocked. When the sending FIFO of the master port for sending requests is full and cannot accept new requests, the request that is being sent to the network should be done by the requesting component itself. This is possible, if the component is a general purpose engine, or it is an application specific finite state machine, but the requested function is a recursive call (hence the component can perform the function itself). This approach guarantees forward progress, provided that all the running tasks eventually finish.

As an example, FIG. 62 and FIG. 63 show the algorithm to find the total number of solutions to the recursive N-queens problem and its parallel hardware implementation. Since the queens subroutine does not return a register value, requests to execute it are just sent to the network, and no response is received. Only the top level queensMain region waits for all queens thread units to quiesce. The updates to nS can be done independently and in parallel, for example, by using updating caches only for nS, attached to each queens thread unit [co-pending application Ser. No. 13/156, 881 by Kultursay et al.]

We will now provide another recursive sequential algorithm example, which is a harder problem to parallelize: this example is the Alpha-Beta pruning algorithm, an artificial intelligence technique used for playing computer games such as chess. In FIG. 64 we provide the sequential algorithm, and in FIG. 65 we provide its parallel hardware implementation. This variant of the sequential Alpha-Beta pruning algorithm is due to Judea Pearl [36][37]. Here void Node::getChildren(Node[ ] c) is a method that fills the c array with the children nodes (next chess board positions) of the current node (current chess board position). There will be a train crash dependence unit from getChildren which produces the children nodes to the for loop in scout which consumes the children nodes. There will be another train crash synchronization between getChildren and scout, for synchronizing the access to c[0]. getChildren should be thought of as a super-component which will have highly parallel internal structure for a complex game. In this variant of Alpha-Beta pruning, the first child node c[0] of the current node is initially fully evaluated. Then, for each remaining child node, a quick check is made (marked as a "test call" to scout) to see if a better candidate has already been found. Only if the "test call" to scout fails to demonstrate that a better candidate already exists, that child node is fully evaluated with a second, non-test (full) call to scout. If the getChildren method returns the best node first, the "test call" quick check method will in fact result in energy savings, as compared to fully evaluating all children. Notice that if speculative execution were not allowed, this original sequential algorithm would exhibit no parallelism beyond the finding of the next board positions. However, since speculative execution of the scout thread unit is possible (since all stores within scout are to its private memory c), the "test call" of iteration i+1 is executed speculatively by EPS, assuming alpha will not be altered in iteration i. As a result, true parallel execution will occur. But if indeed the test call fails and alpha is altered in iteration i, EPS re-executes iteration i+1 from scratch, starting from the "test call". Deeper speculative execution of the test calls of iterations i+1, i+2, . . . of the for loop, will result in more parallelism (and more re-executions when necessary). To avoid the long wait times for the result of a scout invocation to come back, the latency tolerance techniques described in optimization 9 can be used, so that multiple virtual scout threads, each with its own registers, and a pointer to its own c memory, share a physical scout thread unit. Speculatively issued invocations of scout should also be canceled when it is known that the speculative invocation is not on the taken path, as discussed in optimization 8.

8. How to Cancel Speculative Complex Instructions that are on the Untaken Path When a speculative operation is dispatched, it is not known whether the condition to execute the operation in the original sequential code is true or false (let us call this condition the execution predicate of the operation). However, if the inputs for an operation to compute its own execution predicate are sent together with the request, the operation can compute its own execution predicate together with its main computation, and may terminate as soon as the execution predicate turns out to be false, for power savings. The execution predicate can be computed in a separate FSM near the main computation FSM. The main computation FSM can poll the results of the execution predicate FSM periodically, and if the predicate has been determined to be false, can exit early. This is in fact a requirement when the speculative executed complex operation includes a general while loop, since the speculatively executed loop that is not on the taken path, may not terminate, or may take a long time since its loop exit condition is possibly garbage, even though the original program correctly terminates. In case the complex operation normally sends back a response, and just in case the requester of the complex speculative operation waits for its response (due to aggressive speculation), a dummy response is sent back from the canceled operation when it is terminated.

An alternative, more general solution involves creating special hardware for canceling speculative region invocations, when it is discovered that the speculative region invocation is not on the taken path. Dynamic thread sequence numbers (like the ones in optimization 2) can be assigned to threads whenever the depth of thread level parallelism is bounded at compile time (it is bounded even for some recursive procedures). During scheduling, as a send operation is being speculatively moved from a position below one target of a conditional branch to a point above the conditional branch (i.e., at the first point during the upward motion, where the send operation changes from non-speculative to speculative), a cancel operation can be created on the other path of the conditional branch that uses the same unique dynamic thread sequence number as the send. The cancel message will use a separate cancellation broadcast network (e.g., a pipelined ring network going in the reverse direction of the related task network) for sending canceled thread ids. The canceled thread id message will be broadcast within the related task network and thread units. When the incoming canceled thread id is an initial prefix of the running thread's id (meaning this thread is the one being canceled or is a descendant of the thread being canceled), a canceled flip flop inside the thread unit will be set. The main finite state machine of the thread unit will poll this flip-flop, and if it is set, will exit immediately. Task messages belonging to already canceled tasks within task networks will similarly be deleted immediately if a match with the incoming cancellation id is detected. The cancellation message will disappear after it is broadcast to all the required locations.

9. Latency Tolerance Techniques

Finite state machines cannot tolerate unpredictable latencies well. For example, given that the following send-receive command sequence is executed by a finite state machine in the given order:

```
S_0: send t1=MEM1,op_load, r2 ;
    goto S_1; //send request 1 for load r1=MEM1[r2]
S_1: send t2=MEM2,op_load,r4;
    goto S_2; //send request 2 for load r3=MEM2[r4]
S_2: receive r1=MEM1,t1;
    goto S_3; //receive response 1
S_3: receive r3=MEM2,t2;
    goto S_4; //receive response 2
```

Even if response 2 is ready before response 1 is, this finite state machine will still ask for response 1 before response 2, and will stall until response 1 is ready, leading to poor resource utilization during the stall period. But the FSM can make better use of its resources, if for example, it accepts response 2 first in this case, and executes other operations that depend on response 2 until response 1 arrives, or if the FSM works on something completely different until response 1 arrives.

The potential solutions to latency intolerance are well-known in the context of general purpose processors [Barton III et al., U.S. Pat. No. 5,761,515] [38], but have not been considered in application-specific finite state machines automatically synthesized from sequential code. We describe below one solution example, that enables very light-weight and energy efficient multithreading on an application-specific finite state machine, to hide the unpredictable latencies due to loads or inner loops.

The solution example is: keeping more than one identical virtual FSM thread within the same physical finite state machine, where each virtual FSM thread has its own set of registers. This technique will be applied to improve resource utilization in thread units which incur high load or inner loop/sub-thread latencies, as determined by profiling feedback. The objective is achieved by the following technique for converting a single threaded FSM Verilog code to a multi-threaded FSM Verilog code with n threads:

Each register r in the original single-threaded FSM is converted to a register ring $r_0, r_1, \ldots, r_{n-1}$ in the corresponding multithreaded FSM, where each $r_i$ has the same size as r. The registers include the "state" register for controlling the FSM, which also becomes the ring $state_0, state_1, \ldots state_{n-1}$.

Each occurrence of a register r read or written in the original FSM Verilog code is replaced by $r_0$ in the multithreaded FSM Verilog code. I.e., the functional units in the machine, such as adders, will read their input only from an $r_0$ within a register ring, and will write only to an $r_0$ within a register ring. The multithreaded FSM uses the $state_0$ register as its current state. The state transition logic and FIFO handshaking logic of the FSM are thus shared among all threads.

If a register r is initialized to value N at reset time in the original FSM, all of the ring registers $r_0, \ldots, r_{n-1}$ are initialized to N at reset time in the multithreaded FSM.

In each state and condition where the original FSM is stalled because one or more responses to be received are not available, in the multithreaded FSM, a thread rotation $r_0 <= r_1; r_1 <= r_2; \ldots r_{n-1} <= (old) r_0$ is performed for all registers r (including "state"), making the next state the new value of $state_0$.

The tag values for identifying outstanding requests sent to a network will be shared among all threads. (But the temporary registers for propagating a tag value from a send to the corresponding receive are not shared).

The sending and receiving FIFOs (pin sets of the Verilog module) are shared among all threads.

This completes the description of the multithreaded FSM technique. Here is an example scenario, in a multithreaded FSM with two virtual FSM threads, implementing an inner loop that counts the number of elements in a given linked list, as shown in the following C++ code:

```
struct Node {Node* link; ...};
struct Node* lists[N];
for(int i=0; i<N; ++i) {
    int n=0;
    for(Node* x=lists[i]; x!=NULL;x=x->link) ++n;
    process(n);
}
```

The scheduled version of the inner loop speculatively sends a load request for the next list element before checking if the next element pointer is NULL, so it will always load the contents of the NULL address, which marks the end of a list, speculatively. Here is what happens if the outer loop iterates twice, first with a one element list, and then with a zero element list:

Thread 0 of the inner loop receives loop invocation request 0 (for counting the number of elements in a 1 element list #0), sent by the outer loop, and starts working on it, sending out a load of the first list element with tag 0, and then stalls when the response for the load with tag 0 is not available at the expected time, and switches to thread 1;

Thread 1 in turn receives a new loop invocation request 1 from the outer loop (for counting the number of elements of list #1 that has zero elements), and starts working on it, sending out a speculative load with tag 1, but notices that the list has zero elements, sends 0 as the response to the parent loop, waits for a new loop invocation request. Since a new loop invocation request is not available, thread 1 switches back to thread 0. The response from the speculative load of NULL with tag 1 is ignored/discarded.

Thread 0 notices that the load response for the load of the first element of its list (with tag 0) has come back by now. Thread 0 continues execution sending a speculative load request for the next element with tag 2, but later notices that its list had only 1 item, and sends back 1 as the response to the outer loop. The response for the speculative load of the NULL pointer with tag 2 will be ignored/discarded. Thread 0 then starts waiting for a new loop invocation and switches to thread 1, because no new loop invocation is available.

From this point on the two threads repeatedly switch to each other until a new inner loop invocation comes in.

This technique results in an efficient, light-weight multithreading implementation in a finite state machine. Only one 2 to 1 multiplexer is added to the critical path ($r_0$ should either receive the result of a functional unit plus possibly an original multiplexer, or receive the value of $r_1$ in the event of a thread rotation). Creating a multithreading FSM with n virtual threads, is equivalent to creating n replicas of the inner loop as described before, with hierarchical software pipelining. However, both the inner loop replication and the multithreading techniques can be used together. In general, multithreading results in better utilization of resources in applications that incur high load and inner loop latencies, by reducing the idle time of finite state machines.

As an energy saving optimization, when it is detected that all threads are currently stalled after back to back thread rotations equal to the number of threads, the finite state machine can save the present state, and enter a "sleep" state. This way, continuous thread rotation can be disabled until at least one new input arrives into a receiving FIFO, in which case the main FSM is resumed at the saved state. When in the sleep mode, it will take one extra cycle to get out of sleep mode and respond to an input request.

When n, the number of threads, is large, only $r_0$, $r_1$ and $r_{n-1}$ need to be cached in registers, and a one read-port and one write-port n-element SRAM named R can be used instead of the remaining registers of the ring, where R[0], R[1], ..., R[n-1] represent the home locations of register r for threads 0, 1, ..., n-1, respectively. In this case, the parallel actions to be performed to accomplish a thread rotation are:

$r_0$<=$r_1$;
$r_1$<=R[r_read_addr];
r_read_addr<=(r_read_addr==n-1?0:r_read_addr+1);
R[r_write_addr]<=$r_{n-1}$;
r_write_addr<=(r_write_addr==n-1?0:r_write_addr+1);
$r_{n-1}$<=(old) $r_0$;

Here, initially, at reset time:
$r_0$, $r_1$, R[2], R[3], ..., R[n-2], $r_{n-1}$ have all been set to the initial value of register r, and
r_read_addr=2; r_write_addr=n-1.

10. Automatic Hardware-Software Partitioning

To be able to automatically identify the part of the software to be converted to hardware, the present document uses profiling-directed feedback, as well as a hypergraph partitioning algorithm such that:

The time spent in the hardware part covers a large percentage of the total execution time;

The hardware part does not exceed an estimated hardware resource limit; and

Communication between hardware and software is reduced.

The algorithm performs unconstrained partial inlining of basic blocks selected from multiple procedures in different files, including libraries, and finally creates one or more code fragments that look like single-entry single-exit sequential procedures. Standard compiler processing and scheduling can then be performed in these code fragments.

An interesting consequence of omitting basic blocks that are never or infrequently executed is that code that prevents two regions from executing together can sometimes be removed, resulting in better parallelism. If indeed the omitted basic block is executed on some unexpected program input, the parallelized hardware code will exit to software first, execute the omitted basic block in software, and will re-enter the parallelized hardware code at the next entry point.

APPENDIX I describes the hardware-software partitioning algorithm in detail.

11. Hardware Acceleration of Parallel Software

In the section above on the overall application-specific supercomputer system, around the paragraph beginning with the words "The supercomputer generated by the present document's method acts as a coprocessor...", we described the entire application-specific supercomputer as a co-processor of a single uniprocessor. This approach offers the conceptual advantage of the single-threaded sequential programming paradigm.

However, a large body of hand-parallelized applications already exists, and new hand-parallelized applications are being developed as well. For compatibility with existing or new hand-parallelized software, the method of the present document can also be applied to accelerate parallel applications that involve multiple general-purpose microprocessors. One example is a set of general-purpose microprocessors using the popular communication protocol MPI (Message Passing Interface) among them. In this case, a separate coprocessor can be generated for each processor (=MPI process) in the parallel application. The communication functions in the original program remain in the accelerated software program and are executed by the host processors, while the most time consuming parts executed in each processor, typically the main sequential computation, are accelerated using the corresponding coprocessor.

A faster alternative for the idea in the last paragraph is to create a new scalable hardware network spanning all the coprocessors, and to also map critical parts of an optimized software implementation of MPI using the said network, to each of the coprocessors. In this case, low-level MPI communication primitives will be performed only by a coprocessor (not the standard host processor). The most critical sequential computation of each MPI process, as well as the most critical MPI communication operations will be accelerated with application-specific hardware. A natural way to create a scalable (possibly incomplete) hypercube network spanning all of the co-processors is to add extra hypercube communication links to the existing (possibly incomplete) hypercube network within a coprocessor, where the extra links are reserved for MPI communication only.

Another example of supporting hand-parallelized software with the present document's method is to create an optimized new implementation of a parallel programming language with explicit thread level parallelism, such as Cilk [39]. The user can identify a set of subroutines within the parallel language program to be mapped into application-specific hardware. Capabilities of a thread-level parallel language, such as spawning a subroutine (meaning: sending a region invocation request to a task network) and waiting for completion of previously spawned parallel activities (meaning: waiting for the all of a set of quiescence flip-flops set by prior send operations to become one) are already some of the native capabilities of the compiler-generated finite state machines of the present document. Thus, instead of letting the compiler discover correct parallelism and enforce synchronization within single-threaded sequential code automatically, users can create the thread-level parallelism manually using parallel language constructs (in which case the burden of correct parallel coding is on the user). The thread level parallel language could also be extended to use features presented in the present document, such as train-crash synchronization units. The present document's method will also enable the serial code fragments within a single thread of the user's code to be automatically converted into parallel application-specific hardware.

12. Achieving Precise Exceptions in an Application-Specific Hardware Accelerator with Hierarchical Software Pipelining In a general-purpose processor supporting the precise exceptions feature, when an exception occurs just before the n'th dynamic instruction in an execution trace starting from a given input state, an interrupt handling routine observes that:
  All instructions before dynamic instruction n have executed; and
  The n'th and following dynamic instructions have not executed at all; and
  The program counter contains the instruction address of the n'th dynamic instruction.

Achieving the precise exceptions feature becomes increasingly difficult as the parallelism of a microprocessor implementation increases. However, the precise exceptions feature within a new general purpose binary translation target architecture is very useful, since it enables all old code to run on the new architecture, including legacy assembly code software, or low-level operating system assembly codes. Achieving precise exceptions within the scheduled code generated by an optimizing compiler is well-known when targeting general purpose VLIW processors using static binary translation [40] or dynamic binary translation ([41] [42] [Cmelik et al., U.S. Pat. No. 6,031,992]). However, when the binary translation target is a co-processor achieving precise exceptions is more difficult, since for example the main microprocessor gets the external and timer interrupts, as opposed to the co-processor. In the present document, we focus on:
  Achieving precise exceptions in an energy-efficient way when the binary translation target is a customized application-specific hardware accelerator (separate from a host microprocessor); and
  Achieving precise exceptions in the context of the hierarchical software pipelining method of the present document, which has deeply nested thread-level parallelism, unlike prior compiler techniques.

Adding the precise exceptions feature to the present document allows the construction of a static binary translation system [40] (where all profiling directed feedback is obtained offline and where there is no runtime translation software, unlike dynamic binary translation, where translation is done on-the-fly.). Static binary translation is simpler than dynamic binary translation, and is particularly appropriate for an optimized application-specific accelerator made out of an ASIC chip, which cannot be changed.

To achieve precise exceptions within the hierarchical software pipelining algorithm of the present document, here is what needs to be done. In the initial sequential code before even loop and region identification begins, it suffices to insert the following code before each instruction that might cause an exception, and then perform scheduling, software pipelining and Verilog code generation on this sequential code as usual:
  Check if the next instruction will cause an exception;
  If indeed the next instruction will cause an exception:
    Set the program counter register to the original address of the next instruction in the microprocessor object code;
    Exit from the hardware-accelerated program fragment and return to software execution at the next instruction.
    All architected registers of the host microprocessor should be live at the point of the transition from hardware back to the software For example, a precise divide by zero exception involving an unsigned integer division instruction r3=r1/r2 can be created by starting from the following sequential code, and scheduling the sequential code as usual:

```
cc1=(r2==0);
if (!cc1) goto L1
//DIVIDE_INSTR_ADDR==original software addr
program_counter=DIVIDE_INSTR_ADDR;
goto overallReturn
L1:
r3=r1/r2;
...
overallReturn:( all registers are live here)
//exit and go back to software at program_counter
```

If the divisor r2 is zero at runtime:
  The hardware-accelerated program fragment will exit to the software, with the program counter equal to the original unsigned divide instruction address, and with all microprocessor registers having the correct values just before the divide instruction;
Else (if the divisor r2 is not zero at runtime):
  The hardware will continue execution of the normal function of the program fragment, with high parallelism, as usual.

Page faults, and memory read and write protection exceptions can be emulated in a hardware accelerator as follows:
  Let there be an extra bit called "inaccessible" in the tag of each line of the caches in the entire supercomputer system.
  When the accelerator memory hierarchy requests a line from the host microprocessor that is not accessible, the host microprocessor will return a line with the "inaccessible" bit set.
  Then, before the point where a load or store is committed, the sequential code to be converted to hardware will test the addressed line for being inaccessible, by making an extra memory read access in the accelerator memory hierarchy, or by checking a flag set by an earlier access to the same operand.
  If the line is inaccessible:
    The sequential code will return to software execution immediately, with the program counter equal to the address of the offending load or store and with the general registers having the correct values just before the load or store.

The host microprocessor will in turn incur the page fault exception or memory protection exception when it tries to re-execute the offending load or store.

Else (if the line is accessible)

Parallel execution by hardware will continue.

During scheduling, the check for accessibility of the line should be made at the point where a load is committed, not when the load is speculatively executed. If the speculative load is on an untaken path, it is quite acceptable for it to read inaccessible lines.

Here is an example of how a page fault or a divide by zero exception is reported to the host as a precise exception, in the context of thread level parallelism generated by hierarchical software pipelining. Note that each loop containing a potentially exception-causing instruction returns:

A condition code which indicates if an exception occurred during loop execution, The program counter and the register state to resume execution at, in case the exception occurred.

Notice that an outer loop will check if any of its inner loops reported an exception, and if so, will immediately exit itself. There can be nested pipeline parallelism, e.g., inner loops belonging to iteration n+1, n+2, . . . of an outer loop may already be issued, before a response is received from an inner loop issued in iteration n of the outer loop. However, responses from inner loops will be received in the original program order, and the exceptions will be checked in the original program order, in which case, for example, an exception that occurs during the inner loop invocation within outer loop iteration n will be reported (along with the register values and program counter) before any exception that occurs in iteration n+1, n+2, . . . of the outer loop. This the correct behavior required by the sequential single-threaded software semantics.

External I/O or timer interrupts can be implemented as follows, in the context of deeply nested thread level parallelism:

1. The accelerator does not get the external interrupts, the host microprocessor does.
2. As the host microprocessor enters an accelerated code fragment and starts exchanging messages with the hardware accelerator, external interrupts will be disabled in the microprocessor. However, the microprocessor will be able to check if there is a pending external interrupt while this interrupt is disabled. On each iteration of the host-accelerator message exchange loop, the host microprocessor will check if there is a pending external interrupt, and if so, the host microprocessor will send an "external interrupt" message to the accelerator, which sets an external interrupt flag. The host microprocessor will then just continue the ongoing message exchange.
3. The sequential code to be scheduled/software pipelined/converted to Verilog will check the external interrupt flag at the top of each loop in the sequential program, and if so, will return to the software execution with the program counter pointing to the loop header instruction, as if a precise exception occurred there.
4. In the parallel hardware corresponding to the sequential code, the external interrupt message from the host microprocessor will set an "external interrupt flip-flop" in partition 0/chip 0 of the accelerator; and the value change of this flip-flop will be propagated to copies of the same flip-flop in all other partitions (similar to how quiescence signals are propagated from chip to chip) and will in turn will be propagated to all finite state machines within the partition, with a flip-flop tree.
5. Each currently running finite state machine inside the entire accelerator will test the local external interrupt flip-flop each time its loop header instruction is committed, and if the flip-flop is set, will immediately exit the loop with the program counter equal to the loop header instruction, and the microprocessor registers equal to their values just before the loop header instruction.
6. Since each outer loop checks the results of its inner loops in the original program order, the external interrupt will be detected as a precise exception at the first loop header instruction in the original program order, where the local external interrupt flip-flop was found to be true.
7. The software application running on the host, upon receiving the resume request reg1, reg2, . . . message from the accelerator, will restart the program at the given register state and loop header instruction, while re-enabling exceptions.
8. Thus, the pending external interrupt will finally occur at the precise loop header instruction boundary in the host microprocessor.

The external interrupt latency from the time the external interrupt request is received by the microprocessor to the time the interrupt occurs at the loop header instruction in the microprocessor is equal to the time for executing the longest loop body in the accelerated code fragment, plus a round-trip through the supercomputer at about the speed of light, plus various additional communication delays.

Once software execution is resumed abruptly in the middle of an accelerated code fragment, as a result of an external interrupt or exception, the software in turn will invoke the accelerator at the next accelerated code entry point.

There is a hardware cost to providing precise exceptions, namely, each thread unit returns a larger message, containing all the microprocessor registers and a program counter. Also, precise exceptions will lead to increased code and increased hardware area.

13. Memory Mapped I/O Accesses, Sequential Memory Consistency, Volatile Variables and Kernel Code Execution It will be seen that parallelizing a single-threaded application as described in the present document is simpler than building and programming a multi-processor system with sequential memory consistency. Also, allowing a hardware-accelerated user application access a dedicated port of a fast network directly (without going through an OS) is a better way to do I/O. However, for the purpose of protecting customers' investments in existing software, the present section describes how to make an application-specific accelerator remain compatible with an existing multiprocessor system running a traditional OS, with sequential consistency and memory mapped I/O capabilities.

The accelerator acts as co-processor to the host microprocessor in the present preferred embodiment, with a separate memory hierarchy. The separate memory hierarchy makes the implementation of memory mapped I/O and sequential multiprocessor consistency problems a little more difficult than integrated systems considered in the past [41] which used a single memory.

I/O accesses:

The hardware accelerator does not perform memory mapped I/O space accesses, only the host microprocessor does.

The host-accelerator messaging mechanism will be able to probe and find out if the addressed line is in I/O space without actually performing the I/O access, and will send back an "inaccessible line" to the accelerator, if indeed the line is in the I/O space.

Speculative loads to I/O space that are not on the taken path, are harmless, but if a load or store to I/O space is committed in the accelerator, the hardware accelerator will recognize it as accessing an inaccessible line, and exit to software as if it had a page fault precise exception, and re-execute the I/O space access on the host microprocessor.

If the compiler knows ahead of time that a load or store accesses I/O space, then the code fragment containing the load/store should not be converted to hardware.

Sequential memory consistency with multiple host processors: An accelerator's job is to be functionally equivalent to a single threaded code fragment. Thus, the accelerator considers it safe to load memory lines into a cache in the accelerator, do the most aggressive reordering of memory operations consistent with single threaded execution, and finally write back the changed memory locations back to the host processor memory. But then, consider a sequential multiprocessor memory consistency test such as Dekker's test:

```
Microprocessor 1:
store X
load Y
Microprocessor 2 (with accelerator):
store Y
load X
```

In this test, by examining all possible interleaved orderings of accesses from the two microprocessors, one can see that it should not be the case that microprocessor 1 loads the old Y, and microprocessor 2 loads the old X. But here is a sequence that fails this test when microprocessor 2 uses an accelerator:

Microprocessor 2 starts the accelerator. Seeing that the addresses of X and Y are different, the accelerator loads the old value of X first into its cache (since this is legal in a single thread), The non-accelerated microprocessor 1 stores X into system memory (having no effect on the accelerator's cached value of X), The non-accelerated microprocessor 1 loads the old value of Y from system memory, and finally The accelerator stores the new value of Y into its cache and then flushes Y to the system memory.

Therefore both microprocessors will appear to have loaded the old values of X and Y, which is incorrect for this test.

One solution is to run the accelerator using a transactional memory feature in the host processor, and only if the bytes read by the accelerator from the host memory have not been changed by other processors during the execution of the accelerated code fragment, commit the changes made by the accelerator, and to otherwise reject/roll-back the changes and re-execute the accelerated code fragment in software. This solution is acceptable if roll-back occurs very infrequently. Another solution is to connect the memory system of the accelerator and the two microprocessors to the same coherent memory hierarchy (described in the APPENDIX E of this document, for example), and in the accelerator, verify that the speculatively loaded value has not been changed each time any load that has been moved above a prior load or prior store is committed by the accelerator. In this example sequence above, when the load X is committed in the accelerator, the accelerator will observe that X has changed, and re-execute the load X and all other operations that depended on the load X, and that were already executed, through its pre-compiled recovery code.

Volatile variables: In case the compiler passes information about variables that were declared volatile in the C/C++ source code to the scheduler, one solution is to make accesses to volatile variables un-cached accesses directly to the system memory and not reorder these accesses. Host synchronization operations such as compare-and-swap, test and set, and any memory instructions that lock the memory bus of a microprocessor, can also be executed by the host microprocessor, assuming the relevant variables were properly declared volatile in the C++ code. If the host microprocessor has weak memory consistency, accesses to volatile variables can be followed by memory barrier instructions. This is easier than implementing sequentially consistent memory, although slower, because re-ordering is inhibited.

OS kernel code execution: The computation part of an operating system kernel code fragment can be accelerated equally well on application-specific hardware. For example a kernel code fragment accessing memory only in real address mode from beginning to end, can be implemented in an application-specific accelerator, by letting the message exchange mechanism access lines in real address mode. Privileged operations of the kernel will still need to be done in the host microprocessor: the present accelerator model only performs normal arithmetic and logical operations and memory accesses without I/O side effects. The message access mechanism should run with kernel memory access privileges if invoked from kernel code, and with user memory access privileges if invoked from user code.

14. Using the Present Document's Method for Designing Traditional Hardware Components To create a hardware component from single-threaded sequential code, we should have a way to specify the hardware component pinout, and we should have a means of communicating with the component's pins within the sequential code. A single-threaded sequential code fragment written in a language such as C++ does not have a native means of specifying the pins of a hardware component, nor does it have a means to accomplish communication with the pins. The supercomputer system created by the present document's method does have a pin specification for communicating with the host microprocessor, but these are default pins; the programmer does not have control over them. For creating a proper hardware component, the programmer should be able to explicitly specify the component pins.

In this section we describe a different application of the present document's method, that of generating a parallel hardware component at the Register Transfer Level from untimed, behavioral C++. We use the SystemC "module" abstraction for the purpose of specifying the component pinout, and we use FIFO primitives to make the C++ code communicate with the component pins. Since the present document's compilation system is based on sending and receiving FIFO interfaces, the hardware component will also use these same standard interfaces through a simple extension of the SystemC sc_fifo class, called ez_fifo, which is downward compatible with sc_fifo. A key difference in ez_fifo is that a write(object) method for sending a message to a FIFO is not a void method, as in sc_fifo. The write method returns a dummy result, so that other FIFO operations that should be done after this write/send operation are made clear to the compiler by making them use the dummy result (the compiler will otherwise freely re-order operations subject to dependences in the C++ program and available resources only). The compiler will simply schedule an ez_fifo write method as a hardware FIFO send primitive and an ez_fifo read method as one or more hardware FIFO receive primitives. Checking if an input FIFO is not empty, can be accomplished by testing the corresponding input_request input signal of the top region finite state machine, and checking if an output FIFO is not full, can be implemented by testing the corresponding output_acknowledge input signal of the top region finite state machine. Non-blocking FIFO reads and FIFO writes can be constructed from these primitives in turn. All of the techniques in the present document's method are available for creating the internals of the hardware component, such as hierarchical software pipelining, and customized memory partitioning.

Here is the behavioral, untimed SystemC paradigm for creating a pipelined filter that, if dependences and resources permit, receives a request every cycle and returns a response every cycle in its steady state, with a latency of, say k cycles, between a request and the corresponding response. The code specifying the functional behavior of the filter can be any C++ code, as long as it only uses local, lexically scoped variables.

```
# include systemc.h>
# include <ez_fifo.h>
...
class Response {...};//the fields of a response
class Request {...};//the fields of a request
class State {...};//the internal state
SC_MODULE(myFilter)
{
public:
  //slave port
  ez_fifo_in<Request> in;//receiving FIFO
  ez_fifo_out<Response> out;//sending FIFO
  SC_CTOR(my_fliter) {
    SC_THREAD(main);
  }
  static boost::tuple<State,Response> process(
    const State& state,
    const Request& req) {.../*the filter function*/}
  void main( ) {
    State state; //initial state
    //compute the next state and response message
    //for each incoming request
    while (true) {
      const Request req=in.read( );
      Response resp;
      tie(state,resp)=process(state,req);
      out.write(resp);
    }
  }
};
```

If, on the other hand, the main filter loop code were written as:

```
//zero-width dummy variable
//for making in.read occur after
//the prior iteration's out.write
Int0 dummy;
while (true) {
  const Request req=in.read(dummy);
  Response resp;
  tie(state,resp)=process(state,req);
  dummy=out.write(resp);
}
```

An entirely different non-pipelined filter would be created, that reads the first input, processes it in k cycles, and sends back the result, then reads the second input, processes it in another k cycles, and sends back the result, and so on. Without dummy variables, the compiler will move the FIFO read from the n+1st iteration above the FIFO write of the n'th iteration, and will even execute FIFO read and FIFO write operations speculatively. The dummy dependence variables make it possible for a user to tell the compiler exactly what the required dependences are, and to control the parallelism.

The standard implied message communication between the application-specific supercomputer and the host microprocessor should be avoided altogether, so that the user obtains a top level Verilog module with only the FIFO I/O pins specified in the SystemC code. If only lexically scoped variables are used in the main( ) thread subroutine and its subroutines in turn, this objective is accomplished, by avoiding each possible message as follows:

Initial resume_response reg1, reg2, . . . message from host to accelerator: The initial registers (registers that are live at the beginning of the code fragment main) are not needed, and therefore this message is not needed. The hardware can create a suitable value for the stack pointer all by itself, and map the stack area to its own local memory Line read and line flush messages from accelerator to host: The line reads from and line flushes to the software application address space will not occur since all data structures are local. Therefore, these messages are not needed.

Final resume_request reg1, reg2, . . . message from accelerator to host: Since the hardware component is intended to run forever in a system, through FIFO communication only, the final registers need not be sent back to the software application. Therefore this message is not needed either.

Therefore, all the standard host-accelerator messaging will be eliminated from the top level Verilog module defining the component, leaving only the user-declared FIFO interface I/O pins there.

For each receiving (sending) FIFO I/O pin set of the SystemC module, a receiving (sending) hardware FIFO interface is created at the top level Verilog module enclosing the component, with a payload width specified by the user, via the declaration of the class instance that is being communicated in this FIFO. Using parameters in the class constructor for a FIFO, different kinds of hardware FIFOs can be created, for example:

Single wide word versus variable length M-bit narrow-word messages. Variable length messages can be obtained by adding a wide to narrow FIFO converter for a sending FIFO, and adding a narrow to wide FIFO converter for a receiving FIFO.

A set of sending/receiving pairs of FIFOs, representing either slave ports or master ports following the network interface conventions as described in the present document.

When the component to be created is interfacing with only standard FIFO interfaces defined in this document with blocking reads and writes, then, the interfaces will be perfectly matched, and the precise timing of events will not matter as long as dependences are respected in the ordering of events. Either the sender or receiver component of a FIFO interface can pause for an arbitrary number of cycles at an arbitrary time, by setting the appropriate input_request or output_acknowledge signal to 0. But timing does matter, for example, when interfacing with an existing hand-designed hardware component that does not comply with any FIFO interface. To ensure that a receive or send operation occurs at least m cycles after a prior send or receive, and occurs and at most n cycles after a prior send or receive, minimum and maximum latencies can be declared for each (possibly dummy) output variables of a software fifo send or receive in the software program. For instance, once a DDR2 dynamic RAM interface receives a write command, the first byte to be written should appear on the DQ bus exactly K cycles later, where K is an initial configuration parameter of the DDR2 chips, and the rest of the bytes should appear on the DQ bus back to back thereafter, without any pauses whatsoever. This can be ensured by making the sending of the first byte depend on the sending of the write command with exactly K cycle latency (making the second send depend on the first with a dummy variable, using a declared latency), and making the sending of the 2nd byte depend on the sending of the 1st byte with exactly 1 cycle latency, and so on. Scheduling with both minimum and maximum latency requirements is known in the literature of microprogramming and microcode scheduling, for example, [43].

Armed with exact latency control over send and receive operations, a compiler generated module can also safely interface with combinatorial inputs and outputs of existing hardware systems, that lack the FIFO handshaking signals input_request and output_acknowledge (by tying output_acknowledge input permanently to 1 and using output_payload as a combinatorial output, or tying input_request input permanently to 1, and using input_payload as a combinatorial input).

When performing mixed SystemC simulation, with a designated module running on an FPGA, and the rest of the system remaining in SystemC software, a SystemC software glue code capable of communicating with the FPGA replaces the original SystemC module. The glue software module repeatedly executes the following actions;

If any SystemC software receiving FIFO of the original software module has a pending message, read it and forward it the correct hardware receiving FIFO.

If a message has arrived from a hardware sending FIFO, forward it to the correct SystemC software sending FIFO of the original software module.

The technique of the present section just needs a way to specify component pins, i.e., any precise contract between the sequential code programmer and the compiler on defining the component pins and on communicating with these pins. It does not require SystemC specifically. As one example, in order to specify the component pinout using C++ only, without SystemC, specific arrays of structures can be identified as component pins, for example by making them reference parameters of a subroutine whose name has a special prefix known to the compiler. These arrays will either be read sequentially or written sequentially, they will never be accessed in any other way.

Blocking write to a FIFO: This is accomplished by writing to the next element of a write-only array of structures designated as an output FIFO pin set. It is translated to a hardware send operation within the finite state machine.

Blocking read from a FIFO: this is accomplished by reading the next element of a read-only array of structures designated as an input FIFO pin set. This is translated to a set of hardware receive operations within the finite state machine.

Non-blocking read from a FIFO: This can be accomplished by creating a second read-only array of Boolean bits indicating if an input FIFO is not empty and checking if the next element of the Boolean array is true, before reading the next element of a the read-only array of structures designated as an input FIFO. Testing the next element of the special Boolean array is translated to testing input_request as the finite state machine communicates with the corresponding input FIFO.

Non-blocking write to a FIFO: this can be accomplished by creating a second read-only array of Boolean bits indicating if an output FIFO is full, and checking if the next element of the Boolean array is true, before writing the next element of the write-only array of structures designated as an output FIFO. Testing the next element of the special Boolean array is translated to testing output_acknowledge as the finite state machine communicates with the corresponding output FIFO.

The component test bench should be written and random test vectors should be generated using pure sequential C++ in this case.

APPENDICES

Appendix A. Incomplete Butterfly Sub-Network

Here are more details of the design of an incomplete butterfly sub-network (butterfly switch) with nInputs input ports (receiving FIFO interfaces) and nOutputs output ports (sending FIFO interfaces).

We will use low-endian notation throughout this document. I.e., bit 0 of an N-bit word is its least significant bit; bit N−1 is its most significant bit.

The butterfly sub-network is constructed from simple high frequency 2 input 2 output core crossbar switches. The core crossbar switch has two receiving FIFO interfaces, and two sending FIFO interfaces, each with the width of a word (where the width of a word is a parameter). The incoming and outgoing messages are variable length multi-word messages, where the most significant bit of a word (called the end-of-data bit) indicates the last word of a multiword message, when it is 1. A specified destination port address bit (with the bit position known at compile time and specified as a parameter) in the first word of an input message coming to the core crossbar switch, indicates which output port (0 or 1) of the core crossbar switch this message should go to. Messages can be received from any receiving FIFO interface, and routed to any sending FIFO interface of the core crossbar switch.

At each output port of the core crossbar switch, there is a small FIFO with two elements made of flip-flops, carefully designed for high frequency operation, allowing simultaneous accesses at both ends of the FIFO. The FIFO is full if it has two elements. The FIFO is empty when it has zero elements. For transferring data from an input to an output, the core crossbar switch only checks that an output small FIFO is not full and a prior stage FIFO is not empty, both of which are local signals, not dependent on any further core crossbar switches elsewhere in the butterfly sub-network. This locality property is important for achieving a faster cycle time.

Even though the commonly used core crossbar switch has 2 inputs and 2 outputs, we will describe a more general core crossbar switch with nI>=1 inputs and nO>=1 outputs, so that the technique for creating a crossbar switch other than a 2 to 2 switch, such as a 2 to 1 switch, 1 to 2 switch, a 4 to 4 switch, and switches with other numbers of inputs and outputs, also becomes clear. An nI input nO output core crossbar switch consists of nO copies of nI to 1 multiplexers, one for each switch output port, and an nI by nO flip-flop matrix, called the engagement matrix, whose element (i,j) is 1 if and only if output port j is engaged in transmitting an ongoing multi-word message coming from input port i. We will say that output j is engaged with input i if and only if the engagement matrix element (i,j) is a 1.

The following circuit describes the payload multiplexer input selection algorithm for output port j of a core crossbar switch, for j=0, 1, . . . , nO−1:

If output j is presently engaged with an input i, select input payload i;
Else, if
  There is an un-engaged input i whose address is selecting output j; and
  There is no un-engaged input i'<i whose address is selecting output j and whose FIFO is not empty;
Select input payload i;
Else, do not select any input (input selection is immaterial; no transfer to output j will occur).

The output j request signal (meaning output j sending FIFO interface of the core crossbar switch is not empty), for j=0, 1, . . . , nO−1, is tied to a combinatorial signal which is true if and only if:

Output j is engaged with some input i whose FIFO is not empty; or
Output j is not engaged with any input, and there is an un-engaged input i whose input FIFO is not empty, and whose address is equal to j.

The input i acknowledge signal (meaning that the input i receiving FIFO interface of the core crossbar switch is not full), for i=0, 1, . . . nI−1, is tied to a combinatorial signal which is true if and only if:

Input i is engaged with some output j whose FIFO is not full; or
Input i is not engaged with any output, and input i's address selects an un-engaged output j whose FIFO is not full, and there is no un-engaged input i'<i whose FIFO is not empty and whose address selects j For any i=0, 1, . . . , nI−1, and j0, 1, . . . nO−1, an actual transfer occurs from input port i to output port j on the next rising clock edge if and only if Output j payload selects the input i payload,
Input FIFO i is not empty, and
Output FIFO j is not full.

The engagement matrix elements are set to 0 at system reset time. At the rising clock edge where the first word of a message is transferred from input port i to output port j, which is not also the last word, the ongoing connection is remembered by setting the engagement matrix element (i,j) to 1. At the rising clock edge where the last word of a multi-word message is transferred from input port i to output port j, the engagement matrix element (i,j) is reset to 0. The output port j then becomes free (not engaged), and is now open to contention by newly starting messages.

Referring to FIG. 6, a traditional complete butterfly sub-network can be formed from the 2 to 2 crossbar switches described above, as follows. In the following paragraphs, the $\log_2(n)+1$ stages of a n input n output traditional butterfly sub-network (where n is a power of two) are numbered 0, 1, . . . , $\log_2(n)$ starting from the output stage and going towards the input stage. Stage log 2(n) represents the receiving FIFO interface I/O pins for the inputs of the entire sub-network; there are no multiplexers in this stage. At each stage i, there are n nodes, and n/2 2 to 2 core crossbar switches including their small output FIFOs. In stage i, each pair of nodes (j, (j with bit i inverted)) form a 2 to 2 core crossbar switch. I.e., each node in stage i (comprising a 2 to 1 multiplexer and a small output FIFO) forms one half of a 2 to 2 crossbar switch. The core crossbar switch half represented by node j in stage i, is connected to node j in the previous stage i+1 with a straight set of wires, and is also connected to node (j with bit i inverted) in the previous stage i+1 with a transverse set of wires. The destination port address for the whole butterfly sub-network is given in a substring of the first word of a message, whose bit positions are known at compile time. The last stage (stage 0) uses bit 0 of the destination port address field of the first message word, stage 1 (one before the last stage) uses bit 1 of the destination port address field of the first message word, and so on. Stage log 2(n) does not use any address bit, since it has no multiplexers. The outputs of the small FIFOs of the core crossbar switches in the last stage, stage 0, constitute the sending FIFO interface I/O pins of the entire butterfly sub-network.

Referring to FIG. 7, we introduce the incomplete butterfly sub-network, which is a customized butterfly sub-network where the number of inputs and outputs need not be a power of two. The incomplete butterfly sub-network is obtained by deleting unneeded edges and nodes from the corresponding complete butterfly sub-network. Since some nodes and edges may be missing in the incomplete butterfly sub-network, in some cases only 1 to 2, or 2 to 1, or even 1 to 1 (which can be implemented with just a small FIFO, to make paths latencies about equal) core crossbar switches are needed. If there is one output at a given core crossbar switch stage (a 2 to 1 switch or 1 to 1 switch) the corresponding address bit is not even looked at: the inputs (if more than 1) compete for the single output port. For example, when constructing a 5 to 3 incomplete butterfly sub-network as in FIG. 7, only the last two stages (stages 1 and 0) need any 2 to 2 core crossbar switches. Stage 2 of this sub-network has one 2 to 1 (from nodes 0 and 4 of stage 3, to node 0 of stage 2), and three 1 to 1 core crossbar switches (from node k of stage 3 to node k of stage 2, k=1, 2, 3). Therefore, no address bit is needed for stage 2. Only two bits of destination port address, with stage 0 using address bit 0, and stage 1 using address bit 1, are needed for this example's incomplete butterfly sub-network.

A designated bit range
  ADDR_LS_BIT to ADDR_LS_BIT+ceil($\log_2$(nOutputs))−1
within the first word of the message indicates the destination port number for the entire sub-network. In case there is only one output (e.g., an 8 to 1 incomplete butterfly sub-network), no address bits are used.

The incomplete butterfly sub-network consists of a subset of the nodes and edges of an imaginary complete butterfly sub-network, which is defined as follows:

Let m=ceil(log 2(max(nInputs,nOutputs)))
Let n=$2^m$

The imaginary complete butterfly sub-network has m+1 stages and n nodes (n/2 2 to 2 core crossbar switches) at each stage. The required nodes and edges for the incomplete sub-network are selected using the following algorithm given in pseudo C++ code, from the complete butterfly sub-network. The selected edges and nodes in turn define the 2 to 2, 2 to 1, 1 to 2, or 1 to 1 crossbar switches, which should be constructed as part of the final Verilog output for the desired incomplete butterfly sub-network, and instantiated inside a top Verilog module with nInputs receiving FIFO interfaces and nOutputs sending FIFO interfaces. The width of the payload word will be passed as a Verilog parameter to the module. The least significant bit position of the destination port address for the entire sub-network, ADDR_LS_BIT, is also provided as a module parameter. In case the message format is single-word, not multi-word, the end-of-data bits of all the nInputs inputs can be tied permanently to 1; logic synthesis tools will then likely delete the associated logic examining the end-of-data bit.

```
//emit an incomplete butterfly sub-network
//with nInputs inputs and nOutputs outputs
//j with i'th bit negated
int bitflip(int j , int i) {return j ^ ( 1<<i ) ; }
//a ones mask consisting of bits 0..i-1 (zero if i==0)
int mask(i) { return (1<<i)-1;}
void incomplete butterfly(const int nInputs,const int nOutputs) {
    const int m=ceil(log2(max(nInputs , nOutputs)));//no. stages
    const int n=(1<<m);//number of nodes at each stage
    //stage[i][j]==incomplete butterfly sub-network stage i, node j exists
    bool stage[m+1][n]; //initialized to all false
    // preds[i][j]=nodes in stage i + 1 that are connected to stage i node j
    set<int> preds[m][n];//initialized to empty sets
    //create nodes for each input at stage m
    for(int j=0; j< nInputs; ++j) stage[m][j]=true;
    for (int i=m-1; i>=0; --i) { //for each stage m-1 to 0
        //look only at bit i for routing
        for(int j=0;j<n; ++j) {//for each node j in that state
            if (
                //j with bits 0..i-1 cleared is among the outputs, and
                (j& ~mask(i)) < nOutputs &&
                //(j has a straight path predecessor in stage i+1, or
                (stage[i+1][j] ||
                //j has a transverse path predecessor in stage i+1)
                stage[i+1][bitflip(j,i)]) {
                //add this node j to stage i of the butterfly sub-network
                stage[i][j]=true;
                //add edge to j from straight path predecessor in stage i+1,
                //if any
                if(stage[i+1][j]) preds[i][j].insert(j);
                //add edge to j from transverse path predecessor in stage i+1,
                //if any
                if(stage[i+1][bitflip(j,i)]) preds[i][j].insert(bitflip(j,i));
            }
        }
    }
    //now emit the Verilog code for the sub-network using preds and stage
}
```

We just described a radix-2 incomplete butterfly sub-network. Radix-4 incomplete butterfly sub-networks and higher radix incomplete butterfly sub-networks can be similarly constructed based on the description above. For example, in a radix 4 incomplete butterfly sub-network implementation, each stage looks at 2 address bits; and at a given stage, groups of 4 nodes form a 4 input to 4 output core crossbar switch. The high fan-in payload priority multiplexer that occurs with higher radix designs can be optimized with known techniques such as parallel prefix sum [28]. Higher radix sub-networks will have lower frequency depending on the technology, but lower latency as well.

Appendix B. Task Sub-Network

A task sub-network sends a message from a requesting input port (i.e., whose FIFO is not empty) to any output port that can accept the request (i.e., whose FIFO is not full). With the objective of better load balancing, a task sub-network is formed from 2 input, 2 output task crossbar switches organized as a 1-dimensional torus in this preferred embodiment. Tasks will circulate in the torus until they find a free thread unit. A 2 to 2 task crossbar switch is a like a normal 2 to 2 core crossbar switch, but does not use any destination port address. A request at an input port of the task crossbar switch can be sent to any output port which can accept a request. The requesting inputs of a task crossbar switch are connected ("matched") to accepting outputs in a single cycle, with a greedy graph matching algorithm applied to a complete bipartite graph (with requesting input ports on one side and accepting output ports on the other side), where the sequential code specification for the greedy matching algorithm is given by:

```
//Initially there are no connections (matching edges)
//An input port i is requesting if
//(input port i is un-engaged and its FIFO is not empty)
//An output port j is accepting if
//(output port j is un-engaged and its FIFO is not full),
for(int i=0;i<nI;++i) {
    if input port i is not requesting
        continue;
    for(int j=0;j<nO;++j) {
        if output port j is not already connected, and
            output port j is accepting
                connect input port i to output port j
    }
}
```

We will describe the hardware for the general case, for a task crossbar switch with nI inputs and nO outputs. More precisely: the output port j payload, j=0, . . . , nO−1 is determined by the following multiplexer input selection algorithm:

a) If there is an input i such that j is engaged with i, select input payload i;
b) Else, if there is an un-engaged input i whose FIFO is not empty, such that the number of un-engaged inputs i'<i whose FIFO is not empty, is equal to the number of un-engaged outputs j'<j whose FIFO is not full, select input payload i;
c) Else, do not select any input (output j payload selection is immaterial; no transfer to output j will occur).

Note that if the bullet b) above selects an input i, the input is unique (if there are n accepting outputs j'<j, output port j will select the n+1st requesting input port, if there is one). Output j may or may not accept a request (there is no need to check, no harm is done if the request selected by the multiplexer is not accepted). But in case output j does accept a request, applying this bullet collectively for all outputs and inputs of the task crossbar switch is equivalent to performing the greedy matching algorithm in parallel.

Output j request (meaning: output j sending FIFO interface is not empty) is tied to the combinatorial signal which is true if and only if:

a) Output j is engaged with some input i whose FIFO is not empty; or
b) Output j is not engaged with any input, and the number of un-engaged outputs j'<j whose FIFO is not full is less than the total number of un-engaged inputs whose FIFO is not empty.

Bullet b) means that the number of requesting inputs is larger than the number of accepting outputs numerically less than j; hence, if output port j will accept a request, then it is guaranteed to get a request (but output port j may or may not accept an incoming request; there is no need to check).

Input i acknowledge (meaning: input i receiving FIFO interface is not full) is tied to the combinatorial signal which is true if and only if:
  a) Input i is engaged with some output j, and output j FIFO is not full; or
  b) Input i is not engaged with any output, and the number of un-engaged inputs i'<i whose FIFO is not empty is less than the total number of un-engaged outputs whose FIFO is not full.

Bullet b) means the total number of accepting outputs is larger than the number of requesting inputs numerically less than i, hence if there is a request from input port i, it is guaranteed to get accepted (but input port i may or may not actually send a request, there is no need to check).

Like the core crossbar switch, there are small 2-element FIFOs attached to each output port of a core task crossbar switch, which improve frequency. Also like the core crossbar switch, there is an engagement flip flop matrix in the task crossbar switch that works in the same manner.

Note that while the task crossbar switch provides a good load balancing service for dispatching tasks rapidly, in order to achieve high frequency, it is critical to optimize the circuits given above for comparing the cardinality (population count) of bit sets. The population count circuits can be optimized by the parallel prefix sum algorithm [28], which computes multiple sums of up to n inputs, within $\log 2(n)$ logic stages, which also allows the sharing of hardware, especially as the number of input and outputs increase. Frequency will be lower when the number of inputs and outputs are large, but total network latency will also be lower. Another alternative for achieving higher frequency is to pipeline a large task crossbar switch and share its hardware among multiple virtual systems. For task crossbar switches with only a few inputs and outputs, simple Verilog case statements can be used for comparing the cardinality of bit sets, for creating fast hardwired logic in an ASIC or a single LUT in an FPGA. For example, here is an efficient circuit in Verilog to determine if a 3 wide bit set has less elements than a 2 wide bit set:

```
function popcount_lt_3_2(input[2:0] a,input[1:0] b);
  //return 1 iff the number of items in
  //3-bit wide bit set "a"
  //is less than the number of items in
  //2-bit wide bit set "b"
  case({a,b})
  //synthesis full case parallel case
    00001, //0<1
    00010, //0<1
    00011, //0<2
    00111, //1<2
    01011, //1<2
    10011: //1<2
      popcount_lt_3_2=1;
    default:
      popcount_lt_3_2=0;
  endcase
endfunction
```

Referring to FIG. 8, a scalable high frequency task sub-network shaped as a 1-dimensional torus with nInputs inputs and nOutputs outputs can be constructed with at least max(nInputs,nOutputs) task crossbar switches, each with up to 2 inputs and 2 outputs. The inputs of each task crossbar switch within the 1-dimensional torus will be tied to (higher priority input listed first)
  1. If present, an outer loop thread unit task request output, or the I/O controller output, after the task has made a round trip in the supercomputer system;
  2. The previous task crossbar switch in the torus.

The output ports of the task crossbar switch will be tied to (higher priority output listed first):
  1. If present, the local thread unit input for accepting a new task request, or an I/O controller input, to send the task request for a trip around the supercomputer system;
  2. The next task crossbar switch in the torus.

Note that in case of variable length messages being injected into the torus, there should be enough extra trivial 1 to 1 switches (just small FIFOs) in the torus, to avoid a deadlock in case the total length of the messages that are attempted to be injected into the torus exceeds the available FIFO stages in the circular path of the torus.

Also, note that a task sub-network may deliver results from an a given input port to an output port out of order, since a task that is sent first may be unlucky and may keep circulating around the thread units, while a task that is sent second may be more lucky and may find a free thread unit before the first one does.

Referring to FIG. 9, a two dimensional torus task sub-network where task data flows from north and west inputs to south and east outputs, and where a task can be injected by a thread unit or I/O controller output, and can be extracted from the sub-network by local thread unit or I/O controller input, can be constructed with up to 3 input 3 output task crossbar switches. A 2-D torus will likely result in faster diffusion of tasks, compared to a 1-D torus.

Some alternative task sub-networks: An incomplete butterfly sub-network where the destination port number of each incoming request is obtained from a pseudo-random source, such as a substring of a linear feedback shift register, is one alternative task sub-network organization that can help load balancing and fast diffusion of tasks within the system. A task sub-network can also be created from an incomplete butterfly sub-network whose core crossbar switches are replaced by modified task crossbar switches, such that the sequence of un-engaged available outputs is first rotated by a pseudo-random amount, before routing un-engaged requesting inputs to un-engaged available outputs with the greedy matching algorithm. With such an approach, modified task crossbar switch output ports which only lead to busy thread units will eventually have full FIFOs; in which case the modified task crossbar switch will send an incoming task request to a random alternate available output port whose FIFO is not full (if there is such an output port). Selecting a random modified task crossbar switch output port whose FIFO is not full within an incomplete butterfly sub-network, will likely lead to faster diffusion of tasks and better load balancing.

Appendix C. Quiescence Detection Circuit

A quiescence detection circuit serves to determine that all activity has ceased in a collection of thread unit components connected to each other with task sub-networks. For example, consider an outer loop thread unit, which issues tasks to several inner loop thread units without waiting for the inner loops to finish. Assume that the inner loops in turn spawn several of their own inner loops without waiting for them to finish. The objective of the quiescence detection circuit for this collection of thread units is to ensure that the outer loop, all its inner loops, and their inner loops in turn, have completed, before starting a different activity that depends on the given loop nest.

While there exist several software quiescence detection algorithms that used in distributed computing [44], designing one in hardware has some advantages not available in software, which we will use here:

Each chip in the hardware has a real hardware clock, which allows the latencies of quiescence messages within the same chip to be determined precisely in terms of clock cycles;

It is inexpensive to create new special-purpose system-wide hardware monitoring circuits for detecting quiescence.

The net result of these advantages is a substantially simpler hardware quiescence detection algorithm as compared to its software counterparts. It uses very little extra hardware. We will describe this hardware algorithm here.

For the purpose of describing a quiescence detection circuit, it suffices to model the application-specific supercomputer system, which is possibly partitioned across multiple chips, as a directed graph whose nodes are either thread units or task networks, and each edge (x,y) indicates that the node x can potentially send a task request message to node y (i.e., x invokes y for side effects only, such that y does not return any register result to x). If there is no edge (x,y), then x cannot send a task request message to y. A particular set of nodes of the graph is identified as the roots set; the nodes in the roots set have no incoming edges. For example, the top region of the program is in the roots set. Quiescence signals propagate in the reverse direction of task requests in a depth-first spanning tree of the directed graph, from child thread units toward parent thread units. There will be a node propagation delay for each node (the time for a quiescence signal to propagate through this node, from the children of the present node toward the present node, normally one cycle), and an edge propagation delay for each edge (normally zero cycles, but with a higher delay for edges that cross chips, with the worst-case delay calibrated separately for each edge, at system initialization time). A set of edges in the directed graph are identified as quiescence observation edges. If an edge (x,y) is a quiescence observation edge, this means node x may send one or more task requests to y, and then may wait until all activity due to the task requests sent by x toy has completed. We assume that for each quiescence observation edge (x,y), x dominates [35] all nodes reachable from y. As examples, a tree-shaped directed graph topology meets this dominator requirement. In a directed graph making recursive task invocations (which will certainly include cyclic paths), if the main task that makes the first recursive call is the only one that needs to observe quiescence of all recursive tasks, it indeed dominates all nodes executing the recursive calls, so the same condition is satisfied. Optimization 6 in the optimizations section, relaxes this dominator requirement for quiescence detection.

To create the quiescence detection circuits, first:

Nodes in the directed graph are given reverse post order numbers with a depth-first search;

At each root node of the graph, a depth-first spanning tree is identified; and

The propagation delay height of each node (maximum delay from this to node to any of the leaves of the spanning sub-tree rooted at this node) is computed.

Here is the pseudo C++ code of the initial algorithm:

```
int n=N; //N=number of nodes
bool visited[N]; //initially false
int rpost[N];//reverse post order number of X
int height[N];//height of subtree rooted at x
set<Edge> T; //spanning tree edges
void visit(Node x) {
    visited[x]=true;
    int d=0;
    for each unvisited successor s of x {
        visit (s);
        d=max(d,height[s]+edgeDelay(x,s));
        add (x, s) to T;
    }
    rpost [x] = --n;
    height[x]=d+nodeDelay(x);
}
//initial call
//foreach r in roots visit(r);
```

Referring to FIG. 11, for each node in the graph we create a basic building block of a quiescence detection circuit, called the Qunit flip-flop, which drives the input_quiesced output pin of the present node, and where at each rising clock edge, the flip-flop is set to the logical AND of:

the Qunit flip-flops all the child nodes of the present node in the spanning tree (arriving via the output_quiesced input pins of this node), and the idle signal of the present node.

The result is a pipelined flip-flop tree continuously propagating quiescence monitoring signals (meaning "I am idle in this cycle, and all my children in the spanning tree were idle in the previous cycle") toward the root of the spanning tree. Only for the directed edges (x,y) included in the spanning tree, the sending FIFO of parent node x has an output_quiesced input pin, which is tied directly to the input_quiesced output pin on the corresponding receiving FIFO of the child node y, in turn tied to the Qunit flip-flop output of the child unit. Edges (sending and receiving FIFO connections) that are not on any spanning tree do not include input_quiesced or output_quiesced pins.

Each node in the graph has an output signal called idle, which is 1 if and only if there is no activity within the unit, as follows:

A thread unit is idle if and only if it has completed any prior task request and is in the state where it is waiting for a new task request to arrive;

A task sub-network is idle if and only if all FIFOs within the sub-network are empty.

The idle signal fed to the Qunit may not reflect the current state of the node instantly: A node x is allowed to send a task request message to a currently idle node z at cycle t, and x can then immediately become idle on the next cycle t+1. If node z's idle output does not become 0 until cycle t+M+1, for an M>0, due pipelining in the x to z task request transmission (possibly crossing chips) or due to a deeply pipelined calculation of the idle signal within z, there may be a period of M cycles where a task is present in the system but is not observed any of by the idle monitoring signals. We will call this amount M the maximum task hiding time, and will also consider it before inferring quiescence. The task hiding time will be computed separately for each quiescence observation edge. For the system to work, every hiding task should eventually come out of hiding, i.e., M should, of course, be finite, and should be engineered to be as small as possible.

On each edge (x,y) which is a quiescence observation edge, a flip-flop called the quiescence flip-flop is created inside the parent node x, associated with the sending FIFO that sends task requests from node x to node y. The quiescence flip-flop operates as follows:

The quiescence flip-flop is set to 1 at system reset time.
If the quiescence flip flop is 1, and a task request is accepted into sending FIFO (i.e., the task request is launched to the task network), the quiescence flip-flop is set to 0.
Else, if the quiescence flip flop is 0, and a new task request is not being accepted at this time, and the output_quiesced input signal has remained 1 for a sufficient number of back to back cycles (equal to the propagation delay height of the sub-tree rooted at y plus the maximum task hiding time for nodes reachable from y), the quiescence flip-flop is set back to 1 again.

A second parallel activity to be launched from node x, that depends on the y loop nest, can simply be delayed until the quiescence flip-flop for the first activity is 1. If the quiescence flip-flop is 1, it means the loop nest y was either never started, or all logically earlier instances of the loop nest y were already completed.

To determine that the incoming output_quiesced signal from node y is 1 for a sufficient number of back to back cycles, at the quiescence detection edge (x,y), we simply add a counter associated with the sending FIFO in node x that dispatches tasks to y. The quiescence flip-flop itself can be implemented as the sign bit of the counter, where the counter does the following:

At system initialization time, the counter is set to −1 (the quiescence flip-flop is set to 1).
If a new task is being accepted into the sending FIFO (output_request and output_acknowledge are both 1), the counter is set to the non-negative value M+k−1, where k the propagation delay height of the node y, and M is the maximum task hiding time for nodes reachable from y; The quiescence flip flop is therefore set to 0;'
Else, if the input_quiesced signal from the sending FIFO interface is 0, the counter is set to M+k−1; The quiescence flip flop is therefore set to 0;
Else, if the counter is not less than 0 (and therefore the quiescence flip flop is 0), the counter is decremented; The quiescence flip flop will become 1 when the counter value of 0 is decremented to −1
Else, the counter does not change.
The counter should now be −1; and the quiescence flip flop should be 1
All this circuitry is quite inexpensive (a flip-flop and a few gates for the Qunit building blocks at each node, plus a counter at the quiescence observation edges). The counter (1201) in FIG. 12 implements this combined quiescence flip flop and counter idea.

For the simple case where each node has one cycle latency for propagating quiescence signals, and all edges have zero cycle latency, here is why this technique does detect quiescence correctly. Assume the propagation delay height of node y is k. If the output_quiesced input from the quiescence observation edge (x,y) is 1 in cycle n, since the quiescence circuit is pipelined, this means level 1 node(s) of the spanning tree rooted at y were idle in cycle n−1, level 2 node(s) of the spanning tree were idle in cycle n−2, . . . level k node(s) of the spanning tree were idle at cycle n−k. If the output_quiesced signal at the quiescence detection edge is 1 for M+k consecutive cycles n, n+1, n+2, . . . , n+M+k−1, then All level 1 nodes were idle in cycles n−1, n, n+1 . . . , n+M−2, n+M−1 . . . , n+M+k−2
All level 2 nodes were idle in cycles n−2, n−1, n, . . . , n+M−2, n+M−1, . . . , n+M+k−3
. . .
All kevel k nodes were idle in cycles n−k, n−k+1, . . . , n−1, n, . . . , n+M−2, n+M−1

Then there are at least M consecutive cycles, namely cycles n−1, n, . . . , n+M−2, where all nodes in all levels of the spanning tree were idle. Therefore, until a new task is injected at the quiescence observation edge (x,y) again, for each node z reachable from y:
No existing but hiding task will ever appear in z (since z remained idle for the maximum task hiding time); and
No new task will ever come to z from any node (since x dominates all nodes reachable from y and all of these are idle).
Therefore, the collection of nodes reachable from y has quiesced. Note that nodes with many children can be modeled as a tree of nodes, each with a small number of children; also, edges that cross chips within a predictable maximum number of cycles can be modeled by a chain of single output, single input one-cycle nodes where the chain length is equal to the calibrated delay; thus, as long as the cross chip worst case delay calibration is accurate, this argument also works for the general case.

When a spanning tree edge ($x_1$, $x_2$) with $x_1$ being a parent unit and $x_2$ being a child unit, crosses chips, we should simulate the wire driven by the input_quiesced output of $x_2$ and going to the output_quiesced input of $x_1$ with cross-chip "signal toggle" messages each time the value on the wire changes. Messages are best sent across chips connected with fast serial links, through sending FIFOs in the message originator chip and receiving FIFOs in the message recipient chip. A wire input to sending FIFO converter is added after the $x_2$ input_quiesced output: When $x_2$ input_quiesced output changes state, a "signal toggle" message is sent to the cross-chip sending FIFO. After the "signal toggle" message reaches the receiving FIFO within the destination chip containing $x_1$, a receiving fifo to wire output converter is used between the cross chip receiving FIFO and the $x_1$ output_quiesced input pin.

A wire input to sending FIFO converter works as follows: if the input wire has a different value than it had in the previous cycle, output_request is asserted, with output_payload being equal to the new wire value. The local FIFO size should be large enough to guarantee that there will not be a write to the local FIFO when it is full.

A receiving FIFO to wire output converter works as follows: The input_acknowledge signal is tied to 1. When input_request is 1, the input-payload is captured in a register driving the wire output.

Of course, in order to announce that a loop nest has quiesced, all the stores within the loop nest should also have completed. We should therefore add the quiescence signals for memory store (or update) instructions issued from the thread units, to the quiescence detection circuits for a loop nest. As also summarized around the paragraph above beginning with the words "The quiescence of a store alone is easier to detect than a loop nest . . . ", this is accomplished as follows: An outstanding store counter is associated with each master port performing stores connected to the memory hierarchy in the thread unit, which is set to −1 at system reset time. Each time a store or update request is accepted into the sending FIFO of the memory master port, the outstanding store counter is incremented. Each time a zero-width acknowledge comes back from a store or update operation, in the receiving FIFO of the same master post, the outstanding store counter is decremented. It is possible for the counter to be incremented and decremented at the same time, which results in a no-op for the counter. A dependent activity that should wait for the stores from a particular master port to complete, can simply wait until the (outstanding store counter==−1) signal is true Thus, the sign bit of the counter (counter<0) can be used to mean the store has quiesced. For each memory master port of a thread unit, the (outstanding store counter<0) signals are fed as inputs to the Qunit AND gate for the present thread unit, in addition to the output_quiesced signals coming from the child nodes in the spanning tree. In case the counter will overflow (there were too many outstanding store requests), a new store request should be stalled until the counter is decremented. FIG. 12 shows the complete quiescence detection circuit for a loop nest, which includes both stores and inner loops.

To use the present quiescence detection algorithm with I/O controllers within a partitioned design, a new network, say Z, is created for sending quiescence "signal toggle" messages only. Given that a task request edge $(x_1, x_2)$ is on the spanning tree and crosses chips, for sending a "quiescence signal toggle" message from the chip containing unit $x_2$ to the chip containing unit $x_1$, the wire input to sending FIFO converter unit on chip containing $x_2$ is connected as a master port of the Z network, and the wire to receiving FIFO converter on the chip containing unit $x_1$ is connected as a slave port of the Z network. Then the signal toggle message is sent from the source wire to FIFO converter to the destination FIFO to wire converter like any regular message crossing chips. Signal toggle messages (Z network messages) should have highest priority within I/O controllers, followed by task requests, followed by other messages. Moreover, the maximum packet size of any message should be limited, in order to reduce the worst-case latencies.

Energy saving optimization: Cross-chip messages consume energy. In order to save energy in a situation where many "signal toggle" messages are sent from chip to chip due to random 0-1-0 quiescence transitions, the following technique can be used. When a Qunit in a chip containing a child node, transitions from 0 to 1, the wire to FIFO converter should wait until the Qunit remains 1 for a few more back-to-back cycles before sending the "signal toggle" for the 0 to 1 transition to the chip containing the parent node. This optimization might delay the quiescence detection, but will not lead to an incorrect quiescence conclusion.

Quiescence of speculative computations: Notice that by the time a thread unit finishes working on a task request, any speculative loads and inner loops returning a result that were on the taken path, will be completed. Any speculative loads and inner loops that were not on the taken path, might still be ongoing, but do not matter; the system will not wait for their quiescence, until an outstanding operation tag due to a prior ongoing speculative load or inner loop needs to be re-used.

Appendix D. Estimating the Component Replication Counts and Latencies

Estimating the Loop Replication Count

Obtaining an initial estimate of the loop replication count: Such an estimate can be obtained from a theoretical maximum parallelism simulation (implemented by the profiler) that implements the present document's spawn-and-forget parallelism model, and returns the maximum and average number of outstanding invocations of an inner loop at any given simulated cycle. If this profiling input is not available, a user-specified value or a compiler-default value can be initially used for the replication count for an inner loop. When the inner loop is not invoked from a loop (e.g., it is invoked from the outermost program region) a replication count of 1 should be used.

After the initial replication count is obtained, for the case of an inner loop that returns a register response, we need the latency of the inner loop thread, in order to perform the scheduling. The average and maximum values of this latency can also be estimated with a theoretical maximum spawn-and-forget parallelism simulation done by the profiler. The estimated inner loop latency may then need to be reduced, for the following reasons:

Resource constraints such as register pressure: we should often settle for a smaller number for the inner loop latency.

Deadlock avoidance: the inner loop latency used by the compiler should not be greater than (the actual replication count of the inner loop times the minimum initiation interval, for back to back inner loop invocations), because of the following reason: if n+1 requests are sent to n inner loop thread units without receiving the response from the first request, there is a danger of deadlock, in case the forward network and reverse network FIFOs are all full. A deadlock of this kind will occur even when n+1 outstanding requests are sent to any pipelined unit (even a multiplier) of n stages, before receiving the response for the first request.

Corrections to the replication count with static scheduling: An inner loop, which does return a register result, can be scheduled with an estimated latency equal at most to the replication count of the inner loop, but subsequently, the loop replication count of the inner loop may need to be further reduced, to the maximum number of outstanding invocation requests to the inner loop, occurring in the resulting schedule. For example, if the compiler believes that an inner loop is on a dependence cycle with its own instance in the prior iteration of the outer loop, instances of the inner loop cannot run in parallel, and just one outstanding instance of this inner loop will suffice (the loop replication count for this inner loop will be 1).

Corrections to replication count through hardware profiling feedback: Loop invocations may have a varying latency, and may contain conditional dependences that are not easy to estimate without generating the initial hardware. Thus, hardware profiling feedback will be useful for determining replication hardware parameters. While an FPGA-based prototype of the hardware is constructed, the following circuits for collecting statistics about each task network can be added to the design: The hardware profiling circuits will monitor the "idle" signals from each of the thread units for an inner loop ("idle" is true, if and only if the thread unit is in the idle (start) state, waiting for a new request). The population count of the 0 bits in this "idle" bit vector is the current number of busy thread units, which can be sampled every cycle through a pipelined multi-stage population count tree circuit. By recording the maximum of the samples, the sum of the samples and the number of samples, and reading back the registers containing the results from each chip, through a serial scan-chain running through the profiling units in the entire chip, at the end of benchmark runs, the average utilization of the thread units can be measured. Then, during the next compilation, the thread units for a given inner loop that were too busy can be increased, subject to resource constraints. The thread units that were not fully utilized can be reduced in number. The new replication count can be used as the new scheduling latency during subsequent runs. The hardware profiling/recompilation cycle can be repeated as needed.

An important special case: In an important special case likely to occur in scientific code, where the inner loop has a predictable latency of M cycles, and the inner loops spawned in consecutive iterations of the outer loop are independent from each other, M copies of the inner loop can be created, to achieve the behavior of a true primitive pipelined operation for the inner loop, capable of accepting a request every cycle. In this case the outer loop can be executed at a rate of one iteration per cycle if other dependences and resources permit. The same technique can be used for another loop that encloses the outer loop, to achieve one iteration per cycle as well, by replicating thread units for the outer loop (along with their inner loop replicas), if other dependences are resources permit. In an ideal case that entails the creation of a large special purpose supercomputer, an outermost loop in a program may sustain one iteration per cycle. This approach requires the creation of increasingly larger pipelined register files in outer loops, instead of the usual flip-flops, to tolerate the register pressure as inner loop latencies increase. Any inner loop that does not return a register value (executed for side effects only) does not add to the register pressure.

Estimating Latency of Complex Operations

The compiler needs to know the latency of complex operations that return a response, to construct the finite state machine. We already indicated how to estimate the inner loop latencies in the previous section.

For standard pipelined operations (multiply, divide) the latency will be the natural latency of these operations, based on how the library unit was designed.

For loads sent to a coherent low-latency private cache, as described, for example, in FIG. 16, the latency will be the minimum L1 cache hit latency. Coherent low-latency private L1 caches are the preferred for creating a finite state machine, because of their fixed latency in the case of a hit.

To reduce unnecessary port usage, the utilization of cache ports can be monitored by including simple hardware profiling circuits in an FPGA prototype of the design, which do the following.

For each memory load/store master port, a counter is created, which counts the cycles where there was at least one outstanding memory request.

For the containing region/loop, another counter is created, which counts the cycles where the loop thread unit was not idle.

After reading out the various hardware profiling counters for each chip in the entire supercomputer with a serial scan-chain at the end of the benchmark test, we can compute:

The utilization of each memory load/store port as (total cycles there was an outstanding load/store request)/(total non-idle cycles of the thread unit).

Based on the profiling feedback, we can then:

Reduce the maximum number of ports if utilization of some ports is very low before re-scheduling and re-creating the hardware. This schedule/re-run cycle can be repeated as needed.

Bank-interleaved caches can be similarly scheduled first with the minimal hit latency. The scheduler can then create as many ports as dependences and resource constraints allow. The number of banks can be found using a heuristic function, e.g., the smallest power of two that is at least as large as the number of ports, but not exceeding a resource limit. But, by adding profiling circuits to the hardware to monitor the load latency, switch contention and memory bank contention, during a second scheduling of the hardware, The number of ports can be reduced if utilization is low The latency assumed by the compiler can be increased to account for the minimum butterfly network delays The number of banks, the interleaving distribution, and the switch organization can be changed, based on the profiling feedback.

Estimating the Replication Count of Complex Operations

If the total number of thread unit master ports requesting a particular kind of complex operation does not exceed a resource budget, the preferred approach is to connect a dedicated complex operation unit to each complex operation master port of each thread unit. The complex operation unit will be connected to the thread unit master port with a dedicated one-to-one task network.

If the maximum allowable number of complex operation units of the given kind is M, and there are N>M master ports on the thread units requesting this kind of complex operation, we can create a task network with N master ports and M slave ports, where the M complex operation units are connected to the M slave ports of the task network. A few critical thread unit master ports that request this kind of complex operation very frequently can still be given their own dedicated complex operation units.

In each of the above cases, optimization number 5 in the optimizations section can be applied for further reduction of resources, for example, for sharing hardware between different kinds of complex operations or different kinds of loops.

Appendix E. A Memory Hierarchy with a Directory-Based Write-Update Coherence Protocol While any multi-ported memory hierarchy can be used by the present document's method, a scalable and efficient multi-ported memory hierarchy is very important for achieving good performance.

In the cited art on directory-based cache organizations [45], the directory-based write-invalidate protocol has been used, for supporting multi-threaded parallel software. We present a directory-based write-update coherence protocol suitable for highly parallel execution of single-threaded software in this section. A write-update cache is perhaps the ideal coherent cache, where a store to a shared line in one cache, automatically updates all copies of the line in the other caches, avoiding the data ping-ponging that occurs in write-invalidate caches using the MESI coherence protocol [46].

The write-update memory coherence mechanism to be described in this section possesses the following features:

Even when a clean line is replaced by an L1 cache, it sends an abandon message for this line to the directory responsible for the line, so that the directory is aware of the correct set of L1 caches owning the line at all times. In turn, the always-correct bookkeeping on the set of L1s that share a line leads to reduced network traffic during a store broadcast (write update). During a store broadcast, communication occurs strictly between the L1s that are sharing the line, and the directory responsible for the line, through scalable networks.

The single-threaded programming model of the present document simplifies the memory hierarchy hardware:

If instances of two memory instructions (at least one of which is a store) in the execution trace of the single threaded program refer to the same address, the compiler already ensures that the logically earlier one completes its access, including cache misses and store broadcasts, before the logically later one starts, through an intervening synchronization action, such as quiescence detection. Therefore, if two memory instructions refer to the same cache line without an intervening synchronization action, they should be referring to different locations within that line (i.e., false sharing): the two memory instruction actions on the cache line can be reordered without impacting the final result of the program.

There is no need for implementing multi-processor locking instructions such as test-and-set, compare-and-swap or memory barrier instructions, which occur only in multi-threaded software and not in parallelized single-threaded software.

The combined implication of these features is significant, and makes a scalable directory-based write-update protocol simpler to implement.

The set of requests on a memory load/store network (between a thread unit master port and an L1 cache slave port) include:
load address
  response: data
store address data
  response: acknowledge
update_op address data//MEM[address]=MEM[address] op data
  response: acknowledge
flush_all//flush all dirty lines, and invalidate all lines
  response: acknowledge The acknowledge response for store, update and flush all requests, is used by a thread unit only for memory quiescence detection and does not normally cause a stall. E.g., the finite state machine implementing a thread unit does not wait for a given store's acknowledge signal unless a logically later load, store or inner loop needs to occur after the logically earlier store, because of a specific dependence found by the compiler.

The address space of the hardware accelerator is the software application address space (any distinction between virtual vs. real memory is not relevant for the hardware accelerator). The address space is partitioned into disjoint sections each handled by its own directory. The cache directory for a section of the address space handles traffic between the L1 caches and the L2 cache for this section of the address space, and is responsible for maintaining the owners set for each line in this section of the address space. Owner sets that are not empty are cached inside the directory unit's owner set cache, when cache space is available, in order to avoid accesses to the L2 cache where possible. For example, when the owner set for a line is cached in the directory's owner set cache, and an L1 cache y accesses the same line for the first time, when the line is already present in a different L1 cache x, L1 cache y can recognize that the line is available in L1 cache x, by consulting the cached owner set in the directory, and can obtain the line from the L1 cache x, without requiring any accesses to the L2. Owner sets that are empty are never cached inside the directory unit. The L2 line has been extended to include the owner set: the L2 constitutes the backing store for owner sets cached within the directories' owner set caches.

In the present write-update cache, we will be using only the Invalid, Exclusive, and Shared states of the MESI coherence protocol. There will be no Modified state. Hence, we can call the present cache coherence protocol the ESI coherence protocol. There is also a dirty bit associated with each line in each L1 cache. An L1 cache that stores into a line contained in it, marks the line as dirty. A line is clean (not dirty) when it is first brought into an L1 cache, and can then be independently marked dirty in each L1 cache that shares it: this feature reduces data races.

We will describe the coherence requests sent from L1 caches to a directory in the write-update protocol. This cache coherence protocol has been designed to minimize data races, and to enable simple parallel operation. The only ways a remote coherence request can change an L1 line are as follows:
  a remote_store to a shared line can change this L1's line data.
  a remote line_read request can change this L1 line's Exclusive state to Shared.
The dirty bit is not changed remotely.

Here is the complete list of coherence requests:
Remote store address data
  Issued when the requester stores into a shared line. The requester says: I am writing to a line I share with you, I would like to update your copy of the line as well.
  Response: acknowledge
  Action:
    If the owner set for this line is not cached in the directory's owner set cache, the line and owner set are read from the L2 into the directory's owner set cache (if needed, a previously modified owner set is written back to the L2 to make space; only the owner set and not the line data is written back to L2).
    The remote store is sent to each of the other line owners, which updates its line with the specified store operation. The dirty bit of the other cache is not impacted. Any "least recently used" data structure in the other cache is not impacted either.
    Comment: The remote_store instruction will normally not cause a cache miss, since the other owners should each have a copy of the line.
    The requester's line becomes dirty, so that the requester is now one of the owners responsible for flushing the line to the parent.
    Comment: Multiple copies of the line may be marked dirty but it is harmless to flush the same line twice when the second flush stores the same data, or if the first flushed value is dead (will be overwritten before being read).
line_read lineAddress
  Issued when the requester wishes to load or store an invalid line. The requester says: I want to read the line at address lineAddress; my current ESI state for this line is Invalid.
  Response: yourNewEsiState (Shared|Exclusive), line data
  Action:
    If the owner set for this line is not cached in the directory's owner set cache, the line and owner set are read from the L2 cache into the directory's owner set cache (if needed, a previously modified owner set is written back to the L2 to make space; only the owner set is written back to L2).
    If there is another owner,
      The same line_read message is forwarded to the first other owner, so that the first other owner responds with the line contents, and changes its state to Shared if it is not already Shared. The response (line contents) is then sent back to the requester, who gets the line in Shared state as a clean (not dirty) line. The dirty state of the other owner is not changed.

The requester is added to the existing set of owners of this line.

Else, //If there is no other owner

A line read message is sent to the L2. The line is then forwarded to the requester who gets the line as a clean (not dirty) line, in Exclusive state.

The requester is added as the sole owner of this line.

flush lineAddress lineData byteMask

Issued when the requester should replace a dirty line. The requester says: I stored into this line and made it dirty. I am replacing this dirty line. Your shared copies are already identical to mine.

Response: acknowledge

Action:

If the owner set for this line is not cached in the directory's owner set cache, the line and owner set are read from the L2 into the directory's owner set cache (if needed, a previously modified owner set is written back to the L2 to make space; only the owner set is written back to L2).

The requester is removed from the line's owner set.

Comment: Even only one owner L1 cache is left, it is not made exclusive (shared is sticky).

The line data and the owner set are written to the L2 cache at the given address. Only the specified bytes in the byteMask are written to the L2.

Comment: The byte mask avoids the false sharing error, if another independent memory's collection of L1's wishes to write to another part of the same line in the same L2 cache. See optimization 1.

If the owner set is empty,

The owner set is removed from the directory's owner set cache;

Else,

The owner set is made clean (not modified) in the directory's owner set cache.

abandon lineAddress

Requester: I am replacing this shared line which I did not store in; adjust your records Response: acknowledge Action:

If the line's owner set is not in the directory's owner set cache, the owner set is read from the L2 into the directory's owner set cache (if needed, a previously modified owner set is written back to the L2, to make space; only the owner set is written back to the L2).

The requester is removed from the line's owner set.

Comment: Even only one owner L1 cache is left, it is not made exclusive (shared is sticky).

A store to an invalid line can be executed as:

a line_read of the line, followed by a remote_store to the other owners of the line.

Here are further L1 actions (cache hit cases) not requiring any communication with a directory: When the incoming request is a load and the line is in the Exclusive or Shared state, the load request is performed without notifying the directory. When the incoming request is a store or update and the line is in the Exclusive state, the store or update request is performed, and the line is made dirty, without notifying the directory.

Preventing harmful data races during parallel operation: L1 caches should work independently and in parallel, generally not being aware of the activities in other L1 caches or directories. In particular, the memory operations that follow a store to a shared line and that do not depend on the store, should execute uninterrupted without any possibility of a roll-back, while the store broadcast to the other Lis that share the line occurs in highly pipelined fashion. Initially all caches are empty. The compiler has placed synchronization between dependent memory operations as follows:

When a store $I_1$ is followed by a dependent load or store $I_2$, the second instruction $I_2$ waits until the first one $I_1$ quiesces (an acknowledge is received from all prior store broadcasts).

When a load $I_1$ is followed by a dependent store $I_2$, the store is not issued until the load has resolved all cache misses and has returned its data.

At the end of execution, a final flush all is issued in each L1 cache after all logically earlier stores have quiesced, and all loads on the taken program path have resolved their cache misses and returned their data.

The order in which coherence requests for a given line arrive at the directory is called the primary execution order for this line: regardless of the unpredictable order of parallel activity in the Lis, the equivalent of a global atomic transaction is performed for each coherence request for a given line, following the primary execution order. In general, a coherence request op1 from L1 a and another coherence request op2 from L1 b can have a primary execution order of (a, op1), followed by (b,op2) in the directory while in the L1s the order of events is reversed, as in (b,op2) followed by (a,op1), because of the unpredictable, parallel independent operation of each L1. Here op1 and op2 can be any of the commands (line read, remote store, flush, abandon). In this implementation, a single request queue in an L1 selects an incoming coherence request (remote_store, remote line read) from a remote cache or an incoming load/store request from the attached thread unit, with incoming remote coherence requests having higher priority. A cache miss might lead a remote line read for the new line being brought in to the L1 cache, followed by a flush or abandon request for the line being replaced. The following three modifications are sufficient to support parallel execution of the coherence requests from Lis, without any roll-backs or "NACK-negative acknowledge" responses as in other complex directory-based designs:

A flush or abandon request also saves the flushed/abandoned line in a victim cache associated with the current L1 and keeps going without waiting for any acknowledge. When the acknowledge response is eventually returned to the current L1 from the flush or abandon request, the victim cache line is automatically released/deallocated at the next coherence action boundary.

A remote line read from an L1 cache a, looks for the requested line first in the current L1 cache b, and then in the victim cache of current L1 cache b (it should find the line in one of the two).

A remote store from an L1 cache a, will be ignored if the line is not in the current L1 cache b.

We enumerate below each possible pair of coherence request events in the order they arrive in the directory (the primary execution order), discuss what happens if the order of events is reversed in the L1s, and show that in each case the result of the program still remains the same as if the primary execution order were followed sequentially. Where the result is different, the difference does not matter, the final result of the program is not changed:

(a, line read) followed by (b, line read) in the directory: Assume that initially neither L1 a nor L1 b have the line. Assume that first b requests a line read and waits, and then a requests a line read and waits, but that the line read from a arrives first in the directory. Initially the line read from a reads the line from memory as an exclusive line. Then the line read from b will read from the line in a, making the line shared in a and b.

(a, line read), (b, remote store): Assume that initially only b and c have the line. Assume that the store/remote store request in L1 b occurs first, immediately continuing after sending the request, before a remote line read request is sent from L1 a, but a's request arrives first in the directory. a's line read will get the line value from b, but it will get the new value (after the store from b) instead of the correct old value. But reordering does not change the program result since operands do not overlap. Then, the remote store is completed, updating the line in a as well. Result of reordering is different, but the difference is immaterial.

(a, line read), (b, flush or abandon): Assume that initially the line is only in b. Assume that the flush or abandon request in L1 b occurs before the remote line read request in L1 a, but a's request arrives first in the directory. Then, the flush or abandon request is sent by b to the directory, the line is saved in a victim cache in b, and b immediately proceeds with other instructions. The directory will first complete the line read from a, which will attempt to pick up the line from b, since b is listed as an owner of the line. When the remote line read arrives in cache L1 b, the line is not found in the cache but it is picked up from the victim cache. The line is received as a shared line in a. Then the flush or abandon from b is completed (b is removed from the owner set and the flushed line is written to memory (if a flush)), and an acknowledge is sent back to b which will release the victim cache line at the next coherence action boundary.

(a, remote store), (b, line read): Assume that initially only a and c have the line. Assume b issues the line read request first and waits for the response, and then a issues the remote store and keeps going. But the remote store request from a arrives first in the directory. The remote store from a gets completed first in the directory, by forwarding the request to c only (since b does not yet have the line) and waiting for an acknowledge. Then the line read from b is completed, bypassing the updated line from a and returning that line to b.

(a, remote store), (b, remote store): Assume that initially a and b both have the line. Assume that b sends the remote store request first, followed by the remote store request from a, but a's request makes it to the directory first. In L1 cache b, the local store from b is followed by remote store from a. In L1 cache a, a local store from a is followed by remote store from b. Since the stores are independent and the store operands are not overlapping, reordering the stores does not impact the result of the program.

(a, remote store), (b, flush or abandon): Assume that initially both a and b have the line. Assume that the flush or abandon is requested first by L1 cache b causing the line to be removed from b, and then the remote store is requested in L1 cache a, but a's request arrives first in the directory. The remote store from a will be completed by being forwarded to b, and causing a cache miss, which will be ignored. Finally the flush or abandon from b will be processed, writing the old value of the line (if a flush) in memory. The value stored in memory is dead, since each line read will bypass from the line in a, and since the line in a is now dirty. Result of reordering is different, but the difference is immaterial.

(a, flush or abandon), (b, line read): Assume that initially a has the line. Assume that b requests a line read first and waits for a response, and then a requests a flush or abandon and keeps going. But a's request arrives first in the directory. The flush or abandon by a is completed in the directory, removing a from the owner set and storing the flushed line in memory (if a flush). Then b's line read is completed in the directory, by reading back the flushed line from memory and returning the line to b as the response.

(a, flush or abandon), (b, remote store): Assume that initially a, b and c have the line. Assume that b first requests a remote store and keeps going and then a requests a flush or abandon and keeps going. But a's request arrives first in the directory. The flush or abandon by a will be completed in the directory first, by removing a from the owner set and writing the line to memory (if a flush), then the remote store from b will be completed in the directory by forwarding the remote store to c and waiting for an acknowledge.

(a, flush or abandon), (b, flush or abandon): Assume that both a and b have the line initially. Assume b sends the flush or abandon request first, then a sends its flush or abandon request, but a's request arrives first in the directory. The flush or abandon requests are completed in the directory transaction order. Finally neither a nor b have the line.

We will now describe the structure of the memory hierarchy hardware. The baseline memory hierarchy consists of:

One data L1 cache unit for each memory port of each thread unit. Coherence is maintained with other L1 data caches using a directory-based ESI coherence protocol whose request types were listed above. The L1 cache has:

one memory load/store slave port for receiving load, store, update, and flush-all requests from the thread unit.

one coherence slave port for receiving remote_store, line_read, and abandon requests from any directory.

one coherence master port for sending remote_store, line_read, flush, abandon requests to a directory.

The L1 cache can accept a new load/store/update request every cycle when there are hits and dependences permit. A fast pipelined L1 cache can be constructed that does not check for any dependences between memory instructions, since the compiler already imposes synchronization between dependent memory instructions. Alternatively, the L1 cache can be designed to respect sequential dependences between requests: for example, a load after a store reads the new value of the memory location, if the store and load addresses are the same. Update requests should be atomic in all cases, since compiler dependence analysis assumes updates are atomic.

Several directory units, each connected to a corresponding L2 unit with a one to one network, and each responsible for a section of the address space.

The nearby DRAM unit on the board contains the L2 cache data and tag array, including valid bits, dirty bits and owner set (i.e., the set of L1 data caches that have this line). The owner sets only for lines that have at least one owner L1 cache, will be cached inside the directory's owner set cache (if cache space can accommodate these owner sets). Owner sets can be modified inside the directory. When a modified owner set is replaced, the directory bits are written back to L2 (the line data is not written). When the L2 cache misses, a group of lines is obtained from the host software application memory and the directory bits of these lines are set to zeros (no one owns the lines). At the very end of an accelerated code fragment, when control returns to software, the L1 and L2 caches are flushed all the way to the application memory and invalidated. However, since the supercomputer will likely have larger memory than the software application, a designated unmapped memory region is available to the accelerator only, and is not flushed to the host. (this area is suitable for keeping, e.g., very large data structures with local lexical scope in the accelerated code fragment). Each directory unit has one coherence slave port for receiving remote_store, line_read, flush, or abandon messages from an L1 cache, one coherence master port for sending remote_store, line_read, and abandon messages to any L1 cache (flush requests from a directory are sent only to the L2), One L2 master port for sending line read and line flush requests to L2. The line data, dirty byte mask and owner set bits will be transmitted during a flush. When a cached owner set is being flushed and the directory bits are nonzero (meaning that an L1 cache owns the line) only the directory bits are written to L2.

Each L2 cache has:
One slave port to receive line read and line flush requests from a directory;

A host master port to send line read or line flush requests to the host application memory; and A cache array master port to read and write line data, tag and directory bits from or to the attached DDRn DRAM unit on the board, through the DDRn external communication device.

The memory hierarchy includes the following networks:
A one to one memory load/store network from a memory load/store master port of the thread unit and the memory load/store slave port of the corresponding L1 cache.

Two coherence networks:
Coherence network 1, for sending remote_store, line_read, flush or abandon requests from an L1 cache to a directory unit Coherence network 2, for sending remote_store, line_read, or abandon requests from a directory to an L1 cache unit A directory_L2 one to one network for delivering line read/line flush requests from a directory to an L2. The line data includes the owner set bits.

A host communication network connecting each host master port of each L2 cache to the slave port of the PCI express external communication device, which in turn leads to the host microprocessor.

A one to one L2 cache array network, to send pipelined data and tag array read/write requests from the memory master port of each L2 cache, and the slave port of the DDRn controller external communication device.

This completes the structural description of the directory-based write-update cache, also shown in FIG. 16. Note the one-to-one networks will finally be deleted after the partitioning/chip unioning stages, through network elision.

Appendix F. Algorithm for Creating and Connecting the Top Level Components of the Supercomputer Flat Design The top level components of the supercomputer's flat design are created and connected as follows:

Create a new instance of the top task adapter, which has one task master port facing the outermost program region thread unit network, and one host master port facing the host communication network (going toward PCI Express). This adapter does format conversion of messages suitable for communication with the host software.

Create a one-to-one network (topNw) to connect the top task adapter and the thread unit for the outermost program region.

To create all the thread units, call the following recursive procedure initially with createTasks(topRegion,topNw), where topRegion is the outermost region in the program. This recursive algorithm implements the hierarchical software pipelining technique given in the section above entitled "Introduction to the thread unit and hierarchical software pipelining".

This top region is usually not a loop, but may contain loops.

```
createTasks(Region r,Network parentNw) {
    create a new instance t of
        the thread unit for region r,
    attach the task slave port of t to the parentNw
    for each inner region r' of r {
        create the new task network childNw for r'
        attach the task master port of t for r', to childNw
        for i=1 to loopReplicationCount(r') {
            createTasks (r',childNw) ;
        }
    }
}
```

At this point, all the thread units have been created and wired to their task networks. Now, create a new instance of the memory hierarchy with A number of memory load/store slave ports equal to the memory load/store master ports on all the thread units.

A number of host master ports equal to the number of DDRn connections

A number of L2 data array master ports equal to the number of host master ports. These will communicate point to point with the corresponding DDRn controller external communication device.

For i=0 to (number of host network master ports of the memory hierarchy)−1 do

Connect the host master port of the memory hierarchy to the host communication network Create a new DDRn external communication device Create a new one-to-one L2 cache array network to connect the corresponding L2 cache array master port of the memory hierarchy and the DDRn communication device slave port.

Create a new instance of the PCI Express communication device.

Connect the top task adapter host master port, and the PCI Express unit slave port to the host communication network.

for each thread unit t
   for each memory load/store master port of t
     Create a new one-to-one memory load/store network and connect this memory load/store master port of t and the corresponding memory load/store slave port of the memory hierarchy.
   For every other master port of t
     Create a new complex operation unit (e.g., divider) matching the type of this master port
     Create a new unique one-to-one network connecting this master port of t to the slave port of the complex operation unit The unconnected wires in the above design are only: the PCI Express I/O signal connections (PCI Express lanes), and the DDRn I/O signal connections (e.g., driving a DRAM unit on the board). These will indeed be the I/O pins of the entire chip.

Appendix G. Greedy Deterministic Routing Algorithm for an Incomplete Hypercube For clarity, we provide the greedy deterministic routing algorithm for an incomplete hypercube here. An incomplete hypercube has a number of nodes that is not a power of two, where the nodes are numbered with consecutive Gray code numbers starting at 0. For example, a 5 node incomplete 3-cube contains nodes with Gray code numbers 000, 001, 011, 010, 110 (the following nodes 111, 101, 100, which would be present in the 8 node complete 3-cube, are left out). As a result, for some nodes in the incomplete hypercube, some of the links to the potential neighbors are missing. For example, 110 is only linked to 010 (has link #2). 110's links to other potential neighbors (111 over link #0, 100 over link #1) are missing, because these neighbor nodes are missing.

Given that standard greedy deterministic routing on a complete hypercube from a node with Gray code number x to a node with Gray code number y is done as follows:
   Let z be (x xor y). Find the bit position k of the least significant 1 bit in z. Send the message over link k.
     For example a message sent from 110 to 001 would follow the route: 110→111→101→001.

Greedy deterministic routing on an incomplete hypercube from a node with Gray code number x to a node with Gray code number y, is similarly done as follows:
   Let z be (x xor y). Find the bit position k of the least significant 1 bit in z, such that flipping bit k in x yields a neighbor number that exists in the incomplete hypercube. Send the message over link k.
     For example, a message from 110 to 001 in the 5 node incomplete 3-cube would follow the route: 110→010→011→001. Unlike the complete hypercube case, 110 cannot send to 111 or 100, since these nodes do not exist in the incomplete hypercube.

Appendix H. Deep Profiler

The profiler tool is used to extract important information about the application. Its operation is shown in FIG. 66. First, the original sequential program is instrumented at the assembly level such that special operations and function calls are placed at particular points of the program. The instrumented program code is then linked with the profiler library which includes definitions of the profiling functions inserted into the program in the previous step. The output of this step is an instrumented executable which is then executed with representative inputs. This execution produces detailed information about the dynamic behavior of the application. The deep profiler is different from the existing profiler tools in several aspects.

First, it can identify actual dependences between the load and store operations in the target program. This is achieved by instrumenting the application source code at a very fine granularity. The profiler inserts extra assembly instructions around all memory instructions such that the load/store addresses and data values are recorded in the subroutines that are called. This information is then used in dependence analysis. This dependence analysis gives the exact answer to the question of whether a dependency actually occurred at runtime between any two memory instructions (for that particular input and particular enclosing region). Using the exact profiler feedback on dependence information, the deep profiler can also cluster the memory instructions and identify opportunities for speculative execution.

The deep profiler records information about the locality and data access patterns of memory instructions, which can lead to several other optimizations (e.g., cache optimizations). It can also identify register/memory bits that are constant or redundant at runtime, which can be used to reduce the size of the executed operations and the size of the data stored or communicated. By keeping the number of times each basic block is visited, it can identify the hot basic blocks in the application.

The deep profiler can also detect the maximum parallelism in an application using various parallelism models (e.g., spawn-and-forget). It identifies the number of iterations for each loop and also using the dependency information, it can decide on the maximum and average number of loop thread units that can be spawned in parallel, as well as the maximum and average latency of a loop invocation.

The amount of information recorded by a profiler tool directly affects its runtime overheads. For efficiency purposes, the deep profiler employs a sampling technique. In this technique, the profiler generates an executable that contains both the original executable and the instrumented executable. Then, at runtime, the execution intermittently switches between the original and the profiled versions of the code. This enables profiling of even very large applications as a whole, without constraining the profiling to only some parts of the application.

Appendix I. Hardware-Software Partitioning

The method in the present document can be used to execute only some parts of the input sequential application in hardware. This requires a partitioning of the application into two parts, one that will be compiled into hardware and the other that will be compiled into a software executable that will be executed on a general purpose processor (i.e., the host machine).

The goal of the hardware-software partitioning technique to be described in this section is to automatically identify the best code fragments to convert to hardware. But such a technique will in general identify arbitrary sequential code fragments and will not be useful without an additional method that is indeed able to convert arbitrary sequential code fragments into parallel hardware. Thus, the general method to convert arbitrary code to hardware described in the present document and the hardware-software partitioning technique we are about to describe, work together to become useful.

FIG. 67 illustrates the result of application of hardware-software partitioning on a sequential application that comprises two source files, F1 and F2. One basic block of the procedure main in file F1 and the whole procedure P1 in file F2 are identified by the partitioner as program fragments that will be executed in hardware. The resulting parallel program contains the two source files where the accelerated regions are deleted and a call to a special startAccelerator subroutine is inserted at the entry point of the accelerated region. This call initiates execution of the hardware equivalent of the basic blocks that are carved out of the sequential program, by implementing the message exchange sequence given in the section above entitled "Communication interface with host computer".

Referring to FIG. 68, the detailed operation of the hardware-software partitioning technique is as follows. Before executing this algorithm, a hypergraph that represents the target application program is constructed. This hypergraph has the basic blocks of the application as its vertices and the memory data structures referenced by more than one of these basic blocks as hyperedges that connect those basic blocks. The vertices are weighted according to the estimated area required to implement the assembly instructions in the corresponding basic blocks in hardware. The edges are weighted according to the total number of accesses to the data structure. Then, the partitioning algorithm executes the computation shown in FIG. 68. This algorithm consists of two loops, the outer loop terminating when the parts of the application that are moved to hardware meet either the area limit or the time percentage provided to the algorithm as parameters. At every iteration of this loop, first, a seed vertex is selected. This seed corresponds to the software basic block that has the highest execution time. Then, this seed is moved from software to hardware. In order to reduce the communication between software and hardware domains, all basic blocks that are closely related to this seed basic block need to be moved from software to hardware too. The second loop performs this task by examining all software basic blocks, calculating the total weight of the edges that connect them to the hardware basic blocks, and identifying the ones that have a total edge weight higher than a provided threshold. Whenever such a vertex is found, it is also moved to hardware.

There is an important point to emphasize in this algorithm. The inner loop considers not only the direct software neighbor basic blocks of the seed basic block, but all software basic blocks. This is because, the basic blocks that will be moved to hardware need not be connected to the seed directly with a branch, but an indirect connection via a shared data structure is also sufficient. In order to be able to move indirectly connected basic blocks to hardware, at every iteration, the inner loop recalculates the total weight of the hyperedges connecting a software basic blocks to all hardware basic blocks. This is necessary because, after every iteration of the inner loop, this value might change.

This algorithm aims to obtain the best performance with minimum area and to reduce communication.

It partitions the application at a basic block granularity as opposed to procedure granularity. As a result, un-executed or rarely executed portions of procedures are not moved to hardware.

In order to reduce the overhead of communication between hardware and software, the algorithm tries to put all basic blocks that access a data structure into the same domain, i.e., it tries to put all of them to either hardware or software. As a result, if a data structure is in the memory of the accelerator, then it preferably always stays there, and vice versa.

Appendix J. Dependence Analysis with Symbolic Execution

Various optimizations employed in the compiler require disambiguation of dependences across the memory instructions in the target program. For this purpose, first, a static program analysis pass is applied to extract information regarding these memory instructions.

The static analysis technique used in the compiler is a symbolic evaluation-based data flow analysis that can handle programs with arbitrary control flow, loops, and pointers. The algorithm for this analysis is given in FIG. 69. This algorithm executes the target program symbolically and identifies symbolic program states at various points inside the program. A program state is a mathematical expression that represents the result of all possible executions of the program ending at that point. In order to correctly express information about loops, induction variables should be identified. For each loop, this iterative algorithm checks whether there are any induction variables of that loop that are not discovered yet. If there are any new induction variables, their values are frozen to symbolic value expressions that represent all possible values that the induction variable can take. Then, the program is re-executed symbolically in order to propagate the frozen values of the newly discovered induction variables to the rest of the program. This iterative induction variable detection process continues until a fixed-point is reached, in which case all induction variables in the program are identified and all program states (written in terms of the frozen values of induction variables) accurately represent all possible program executions.

FIG. 70 illustrates the result of applying symbolic execution to a program fragment with three loops. These loops are assigned index variables that are symbolic virtual iteration counters that starts from 0 and increments at the end of every iteration of the corresponding loop. Considering the example in FIG. 70, the index variables of the i, j, and k loops in this program fragment are I, J, and K, respectively.

The first two loops (the i and j loops) build up a two-deep nested loop which reads from and writes to a two-dimensional array A. The third loop (the k loop) updates the elements of a one-dimensional array B. This program fragment is also annotated with the intermediate program states (PS) obtained from symbolic execution. As a result of symbolic execution, the variables i, j, k, which are incremented at every iteration of the corresponding loops, are discovered to be induction variables and their values are frozen to the symbolic expressions v1, v2, and v3, respectively. The logical assertions in the program states are expressed in terms of these induction variables.

As the next step, the detected induction variables need to be solved. As induction variables can have arbitrary dependences between them, a correct solution order should be used. In order to find this solution order, an induction variable dependence graph which has induction variables as vertices and induction variable dependences as edges is created. This graph can be easily built by syntactically analyzing the values of the induction variables (i) before entering (i.e., their loop entry edge expressions) and (ii) at the back edge (i.e., their loop back edge value expressions) of their associated loops. A traversal of the strongly connected components of this graph in topological order gives a correct solution order for the induction variables in the program. Solution of individual induction variables is a pattern matching process where the loop back edge expressions of induction variables are compared against a table of (loop back edge pattern, solution pattern) pairs. When a match is found, the corresponding solution pattern in the table is used to obtain the closed form solution of the induction variable. These solutions are expressed in terms of loop invariant variables and the index variables of enclosing loops. As an example, an entry in this table would be (v(i+1)v(i)+n, v(i)v(0)+i*n). This means that, if an induction variable loop back expression shows that the induction variable is incremented by n at each iteration, then its solution is its loop entry value expression (i.e., v(0)) incremented by i*n, where i is the index variable of the target loop The three induction variables in FIG. 70 also follow this pattern. As their loop entry values are all zero, their solutions are simply I, J, and K, respectively. As the next step, these closed form solutions are used in place of the frozen value expressions of induction variables in all symbolic program states obtained from symbolic execution.

The symbolic expressions obtained from symbolic evaluation-based data flow analysis are used to perform a dependence analysis between all instructions in the target program. The dependence analyzer uses the symbolic address, value, and predicate expressions (a predicate expression is a symbolic Boolean expression that represents the condition be satisfied for the program execution to reach this point) obtained for each memory instruction in the target program, and it performs the tests shown in FIG. 71. The first test is to compute the logical conjunction of the two predicate expressions in order to prove that the two instructions are never executed on the same invocation of the program. For instance, the then and else parts of an acyclic code fragment simply can never be executed together in the same invocation of the program. As the next test, the two address expressions are compared, and if these address expressions are equal, then there exists a dependence. The GCD test is used to detect memory access patterns that do not intersect because they access interleaved elements, such as two instructions that access the even and odd elements of an array, respectively. The value expressions are compared to see whether two store instructions are involved in a silent store situation where their actual execution order is not important. The dependence analyzer also includes other tests, such as an Integer Fourier-Motzkin Elimination-based dependence test, that is more suitable to rule out dependences in array-intensive scientific applications and an overlap test that can be used to prove that two contiguous regions accessed by two memory operations do not overlap by examining the minimum and maximum addresses that they access.

Considering the running example in FIG. 70 and concentrating on the nested loop including the i and j loops, there is a single operation that accesses the memory. However, this operation gets translated into the following three instructions in IR:

I1: load R1=MEM[A+I*N+J+4]
I2: add R1=R1+1
I3: store MEM[A+I*N+J]=R1

The first instruction reads the value at memory location A[I][J+4] into register R1, the second instruction increments the value at register R1, and the third instruction writes the value in register R1 into the memory location A[I][J]. Consequently, there are two memory instructions, namely, $I_1$ and $I_3$, and these two memory instructions can be involved in the following possible dependencies over the j-loop: (i) $I_1$-$I_1$ inter-iteration dependence, (ii) $I_1$-$I_3$ intra-iteration dependence, and (iii) $I_1$-$I_3$ inter-iteration dependence. Intra-iteration dependencies impose an order among memory operations within a single iteration of the target loop, whereas inter-iteration dependencies are used to define an order among memory operations across different iterations of the target loop. The dependence analysis pass analyzes these three possible dependences and tries to prove that these dependences cannot occur during any program execution by performing the following types of checks:

a. $I_1$-$I_1$ Inter-Iteration Dependence Over the j-Loop

The address expressions for the two memory instructions are:

Addr1: A+I*N+J'+4
Addr3: A+I*N+J"+4.

As the posed dependence analysis question targets the j-loop, the two expressions use the same index variable of the outer i-loop (i.e., both expressions refer to the same I), but have two distinct copies of the index variable of the j-loop (i.e., they refer to J' and J", respectively, where J'≠J"). Then, the dependence analysis checks whether these address expressions can be equal by trying to disprove:

Addr1-Addr3=0, for all possible values of I, J', and J". Using the closed-form address expressions, this assertion becomes:

A+I*N+J'+4−A+I*N+J"+4=0,
J"−J'=0.

Using the fact that J' and J" refer to index variables of distinct iterations of the j-loop (i.e., J'≠J"), this assertion evaluates to false, which means that there is no dependence for this case.

b. $I_1$-$I_3$ Intra-Iteration Dependence Over the j-Loop

The intra-iteration analysis of the j-loop targets a single iteration. Therefore, both address expressions refer to the same index variable for the j-loop as well as the same index variable for the i-loop. This gives us the following logical assertion to disprove the existence of a dependence:

Addr1-Addr3=0,
A+I*N+J+4−A+I*N+J=0,
4=0

As this assertion evaluates to false, there is no dependence for this case.

c. $I_1$-$I_3$ Inter-Iteration Dependence Over the j-Loop

Using different symbolic j-loop index variables for the address expressions of the two instructions (J' and J" with J'≠J") but the same index variable for the i-loop, the following logical assertion is obtained:

Addr1-Addr3=0,
A+I*N+J'+4−A+I*N+J"=0,
J'+4−J"=0

This logical assertion holds for a constant dependence distance of 4, which means that a location accessed at one iteration by instruction $I_1$ will be accessed by instruction $I_2$ after four iterations, so there is a dependence.

Note that, in order to disambiguate dependences, the dependence analyzer not only compares the address expressions, but also performs other tests. These tests include, but are not limited to, comparison of value expressions to identify silent stores, applying overlap and GCD-tests, using path predicates to disprove simultaneous execution of memory instructions, converting the obtained equalities and loop bound inequalities to a linear system and applying integer Fourier-Motzkin elimination to prove that the system has no solution. Further, in case of dependences that can be proven to exist, the dependence analyzer can detect the dependence distance vector, which can lead to generation of specialized synchronization unit such as producer-consumer FIFO queues.

A dependence analysis, similar to the one applied to the j loop, can be performed for the i loop, which encloses the j loop. In case of inter-iteration dependences over the i loop, the dependences between one iteration of the i loop and another iteration of the same loop, over all possible iterations of the inner j loops in both iterations, are considered. Note that such a dependence check is useful to identify whether there are any dependences that prevent the target loop from being executed in parallel. For vectorization of the target loop, the posed dependence questions would be slightly different (for instance, the index variables of inner loops will be assumed to refer to not two different symbolic expressions, but the same symbolic expression). The symbolic execution-based analysis and the dependence analyzer discussed here are very general and can be used to answer many types of other dependence questions.

Although any static program analysis technique can be used to obtain information corresponding to the memory instructions in the target program, using symbolic execution for this purpose can extract more information and enable better disambiguation. No symbolic execution technique has been employed in any existing parallelizing compiler due to its high computational complexity which results in high execution time. However, various heuristics can be employed to make symbolic execution practical. For instance, in order to reduce the number of symbolic execution iterations over the target program, an explicitly named scalar variable (i.e., a scalar variable that is solely not accessed through pointers) whose value is updated inside a loop can be directly identified as an induction variable of the enclosing loop without performing symbolic execution. As a second heuristic, memoization of operations on symbolic expressions (e.g., multiplication of two symbolic expressions) can be used, which eliminates recomputation of the same operations over the same operands over and over again. One problem with symbolic execution is that, the size of the symbolic expressions grows exponentially during symbolic execution. In order to solve this problem, a limit on the maximum size for symbolic expressions can be placed so that all expressions that reach this limit are converted into symbolic unknown expressions. Finally, the number of logical assertions in a symbolic program state can be limited so that the look-up and update operations in the symbolic program state are performed efficiently.

Although its exponential behavior is unavoidable, these heuristics reduce the slowdown due to this behavior.

Appendix K. Algorithm for Creating the Configuration Memory of a Union Chip

Here we give an algorithm for creating the configuration SRAMs and registers for each partition.

For each partition p
    For each global componenty on the partition p
        1. For each internal master port m of y connected to
            partitioned network n, and connected to global
            master port number m'' of network n
                a. Find the local component x corresponding to global
                   component j on this partition p.
                b. Find the internal master port m of component x, for
                   network n. Find the local network master port m'
                   that m is connected to.
                c. Add (m'',m') to the global master port to local master
                   port map, for this partitionp and network n.

-continued

2. For each internal slave port m of y connected to a
            partitioned network n, and connected to global master
            port number m'' of network n
                a. Find the local component x corresponding to global
                   component j on this partition p.
                b. Find the internal slave port m for network n, of
                   component x. Find the local network slave port m'
                   that m is connected to.
                c. Add (m'',m') to the global slave port to local slave
                   port map, for this partitionp and network n.
        Now, complete each global master (slave) port to local
        (slave) port map so that each missing global master
        (slave) port in the map is routed to the local master
        (slave) port connected to the I/O controller.
        Note that non-partitioned networks do not require global
        to local port translation. Global port number == local port
        number for non-partitioned networks.
•For each partition p
    For each global componenty on the partition p
        1. For each internal master port m of y connected to global
            master port m'' of a partitioned network n
                a. Add (m'',p) to the global master port to partition
                   id map for network n.
        2. For each internal slave port m of j connected to global
            slave port m'' of a partitioned network n
                a. Add (m'',p) to the global slave port to partition
                   id map for network n.

For each partitioned task network n
    For each partition p
        If there is a component connected to network n in
            partition p
            1. Set next_partition id to
                a. The next higher partition p' which contains a
                   component connected to n, if there is one
                b. The smallest numbered partition p' which contains a component connected to n, otherwise.
        Else (if partition p does not contain any component connected to n)
            1. Set next partition id to an illegal value
                a. (task requests of network n should never visit partition p)
For each partition p
    For each local component x on the union chip
        Let presence[x] be 1 if some global component is mapped to x on partition p
        Let presence[x] be 0, otherwise
    Presence[#local components-1:0] constitutes the local component presence mask for the partition. It can be used for powering off components that are not present in the partition.

The invention has been shown and described with reference to a particular preferred embodiment. However, it is to be understood that the invention is not limited to that particular embodiment, and that various modifications, additions and alterations may be made to the invention by one skilled in the art without departing from the spirit and scope of the invention.

What is claimed is:

1. A hardware system automatically compiled, by a compiler, from a single-threaded software program;
where the single-threaded software program includes a recursive function f, which is defined to be a function that calls itself;
where the recursive function f is implemented within the hardware system by a customized hardware unit comprising a finite state machine;
where a plurality of copies of the customized hardware unit are interconnected by a task network, so that each customized hardware unit on the task network is able to send a task for implementing the recursive function f to any other customized hardware unit on the task network, or receive a task for implementing the recursive function f from any other customized hardware unit on the task network;

where the recursive function f calling itself is implemented within the customized hardware unit as follows:
   (i) if the task network is accepting tasks at a point of call, sending a task for implementing the recursive function f over the task network toward another customized hardware unit on the task network; and
   (ii) otherwise, if the task network is not accepting tasks at the point of call, performing the recursive function f locally inside the customized hardware unit with an ordinary recursive call, without sending any task to the task network at the point of call;

for purposes of avoiding a deadlock resulting from all customized hardware units on the task network having to wait after the task network gets filled with tasks, ensuring forward progress, and achieving high task parallelism in addition to fine-grain parallelism;

where the hardware system is functionally equivalent to the single-threaded software program that the hardware system is compiled from; and where design of the hardware system is partitioned and further comprises:
   a. a plurality of finite-state machines and a plurality of memory units;
   b. networks connected to the plurality of finite-state machines and the plurality of memory units for managing task invocations in hardware and memory data transfers in hardware;
   c. a hardware synchronization unit to ensure executing memory instructions in a same order as within the single threaded software program; and
   d. a coherent memory hierarchy which signals completion of memory instructions for supporting the hardware synchronization unit.

2. The hardware system of claim 1, where the recursive function f calls itself indirectly, through a sequence of intermediate functions $f_1, f_2, f_3, \ldots f_n$, where f calls $f_1$, $f_1$ calls $f_2$, $f_2$ calls $f_3$, ... and $f_n$ finally calls the recursive function f.

* * * * *